(12) United States Patent
Karafin et al.

(10) Patent No.: US 11,754,974 B2
(45) Date of Patent: Sep. 12, 2023

(54) RELAY SYSTEMS

(71) Applicant: LIGHT FIELD LAB, INC., San Jose, CA (US)

(72) Inventors: Jonathan Sean Karafin, San Jose, CA (US); Brendan Elwood Bevensee, San Jose, CA (US)

(73) Assignee: Light Field Lab, Inc., San Jose, CA (US)

( * ) Notice: Subject to any disclaimer, the term of this patent is extended or adjusted under 35 U.S.C. 154(b) by 0 days.

(21) Appl. No.: 17/776,130

(22) PCT Filed: Nov. 12, 2020

(86) PCT No.: PCT/US2020/060312
§ 371 (c)(1),
(2) Date: May 11, 2022

(87) PCT Pub. No.: WO2021/097149
PCT Pub. Date: May 20, 2021

(65) Prior Publication Data
US 2022/0397862 A1    Dec. 15, 2022

Related U.S. Application Data

(60) Provisional application No. 63/001,471, filed on Mar. 29, 2020, provisional application No. 62/934,353, filed on Nov. 12, 2019.

(51) Int. Cl.
*G03H 1/22*      (2006.01)
*G02B 30/56*      (2020.01)

(52) U.S. Cl.
CPC .......... *G03H 1/2205* (2013.01); *G02B 30/56* (2020.01)

(58) Field of Classification Search
CPC .......... G03H 1/2205; G03H 2001/221; G03H 2001/2236; G03H 2223/24; G03H 1/26;
(Continued)

(56) References Cited

U.S. PATENT DOCUMENTS

| 5,166,813 A | 11/1992 | Metz |
| 5,686,960 A | 11/1997 | Sussman et al. |

(Continued)

FOREIGN PATENT DOCUMENTS

| CN | 108428716 A | 8/2018 |
| EP | 1256822 A2 | 11/2002 |

(Continued)

OTHER PUBLICATIONS

International Search Report and Written Opinion of PCT/US2020/060312 dated Apr. 27, 2021.

(Continued)

*Primary Examiner* — Jade R Chwasz
(74) *Attorney, Agent, or Firm* — Charles C. Yang

(57) ABSTRACT

Relay systems may be incorporated into optical systems to direct light from at least one image source to a viewing volume. Light from a plurality of image sources may be directed by relay systems to a viewing volume. Some light from the plurality of image sources may be occluded by an occlusion system to reduce undesirable artifacts in when the relayed light from the plurality of image sources are observed in the viewing volume.

33 Claims, 53 Drawing Sheets

(58) Field of Classification Search
CPC ........ G02B 30/56; G02B 5/124; G02B 17/06; G02B 27/141; G02B 27/283; G02B 30/31; G02B 27/0093; G02B 30/27; G02B 30/30; G02B 30/10; H04N 13/30; H04N 13/307; H04N 13/346; G06F 3/011; G06F 3/01
See application file for complete search history.

(56) References Cited

U.S. PATENT DOCUMENTS

| | | | |
|---|---|---|---|
| 5,822,125 | A | 10/1998 | Meyers |
| 9,417,610 | B1 | 8/2016 | Kim |
| 11,474,370 | B2 * | 10/2022 | Karafin ................ G03H 1/268 |
| 2003/0107712 | A1 | 6/2003 | Perlin |
| 2009/0238217 | A1 | 9/2009 | Moser et al. |
| 2010/0265808 | A1 | 10/2010 | Yamakawa et al. |
| 2014/0104665 | A1 | 4/2014 | Popovich et al. |
| 2016/0270656 | A1 | 9/2016 | Samec et al. |
| 2016/0309065 | A1 | 10/2016 | Karafin et al. |
| 2017/0102671 | A1 | 4/2017 | Damm et al. |
| 2017/0123204 | A1 | 5/2017 | Sung et al. |
| 2018/0356591 | A1 * | 12/2018 | Karafin .............. G02B 6/02042 |
| 2018/0372926 | A1 | 12/2018 | Karafin et al. |
| 2019/0064435 | A1 | 2/2019 | Karafin et al. |
| 2020/0301164 | A1 * | 9/2020 | Karafin .............. G02B 17/0864 |
| 2021/0356742 | A1 | 11/2021 | Hong |

FOREIGN PATENT DOCUMENTS

| | | |
|---|---|---|
| JP | H06102812 A | 4/1994 |
| JP | 2012048002 A | 3/2012 |
| JP | 2013182121 A | 9/2013 |
| WO | 2018003861 A1 | 1/2018 |
| WO | 2018014046 A1 | 1/2018 |
| WO | 2018014047 A1 | 1/2018 |
| WO | 2018043673 A1 | 3/2018 |
| WO | 2018154564 A1 | 8/2018 |
| WO | 2018165117 A1 | 9/2018 |
| WO | 2019140269 A1 | 7/2019 |
| WO | 2019140343 A1 | 7/2019 |
| WO | 2019140348 A2 | 7/2019 |

OTHER PUBLICATIONS

International Search Report and Written Opinion of PCT/US2019/053918 dated Jan. 2, 2020.
JP-2021-507949 Non-Final Office Action of the Japanese Patent Office dated May 16, 2023.

* cited by examiner

Figure 3A
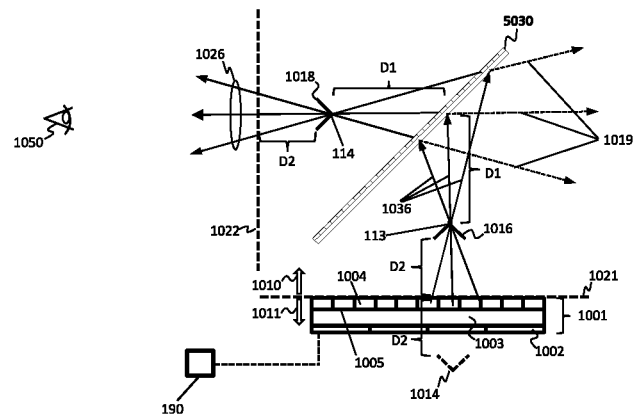
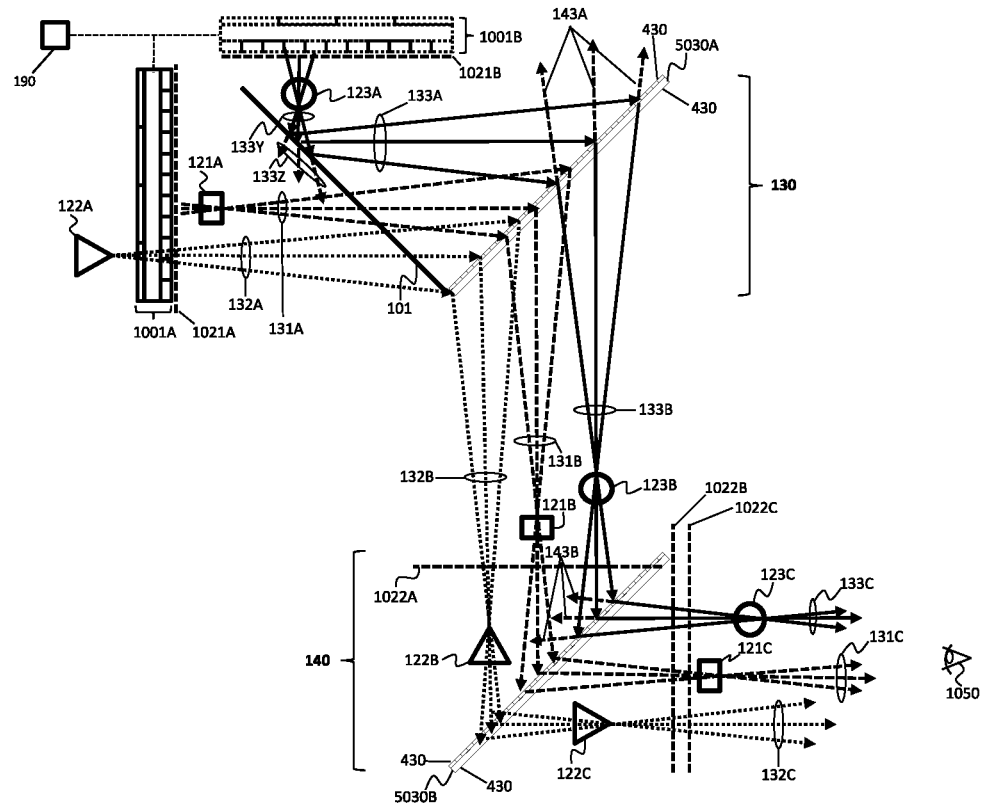
Figure 3B

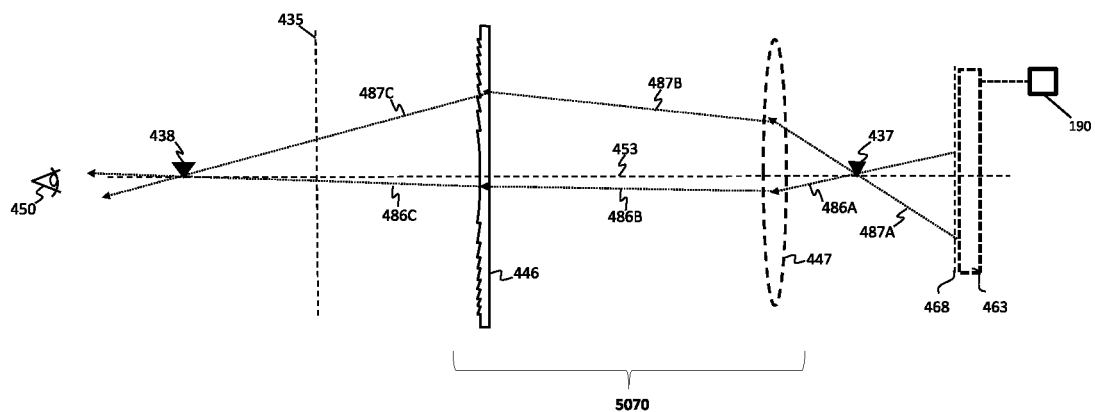
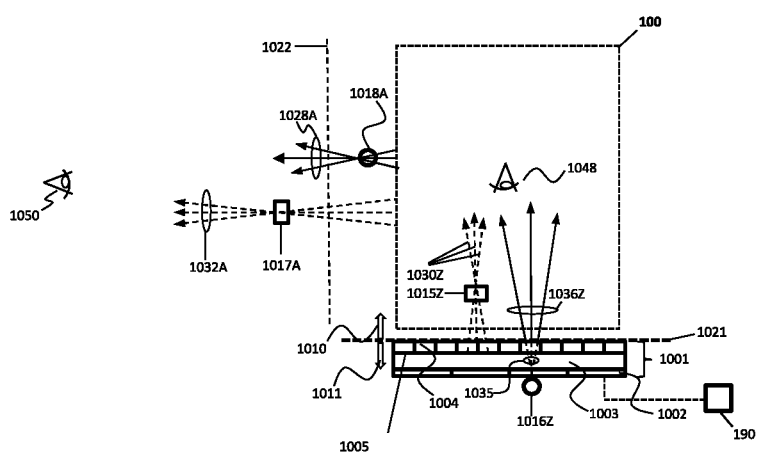

5055

9002

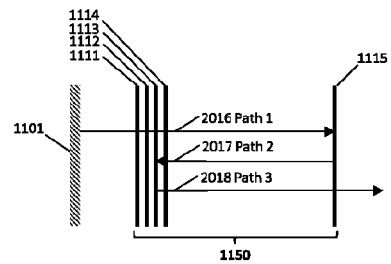
Figure 10A
Figure 10B
| Layer | 1111 | 1112 | 1113 | 1114 | 1115 | 1114 | 1113 | 1114 | 1115 |
|---|---|---|---|---|---|---|---|---|---|
| Path | 1 | 1 | 1 | 1 | 2 | 2 | 2 | 3 | 3 |
| Polariz. State | ↕ | ↻ | ↻ | ↕ | ↕ | ↻ | ↻ | ↔ | ↔ |
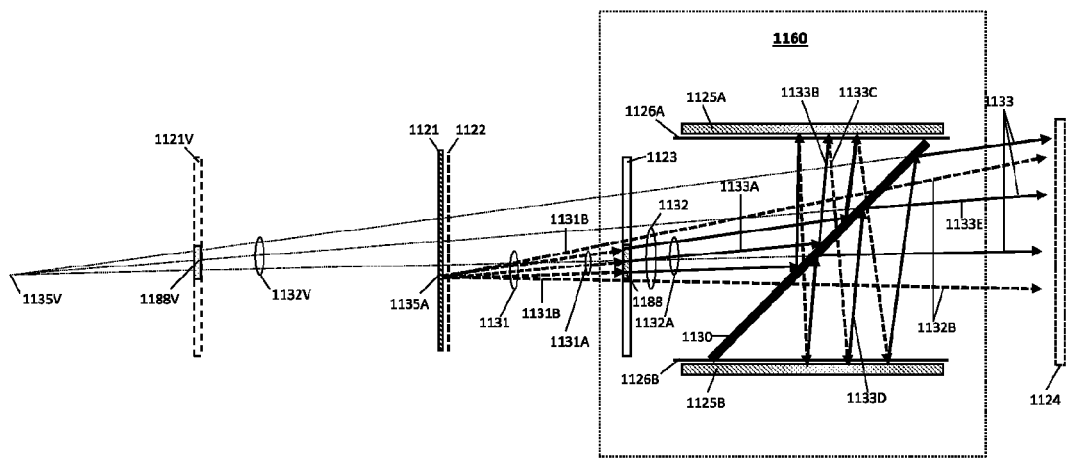
Figure 10C

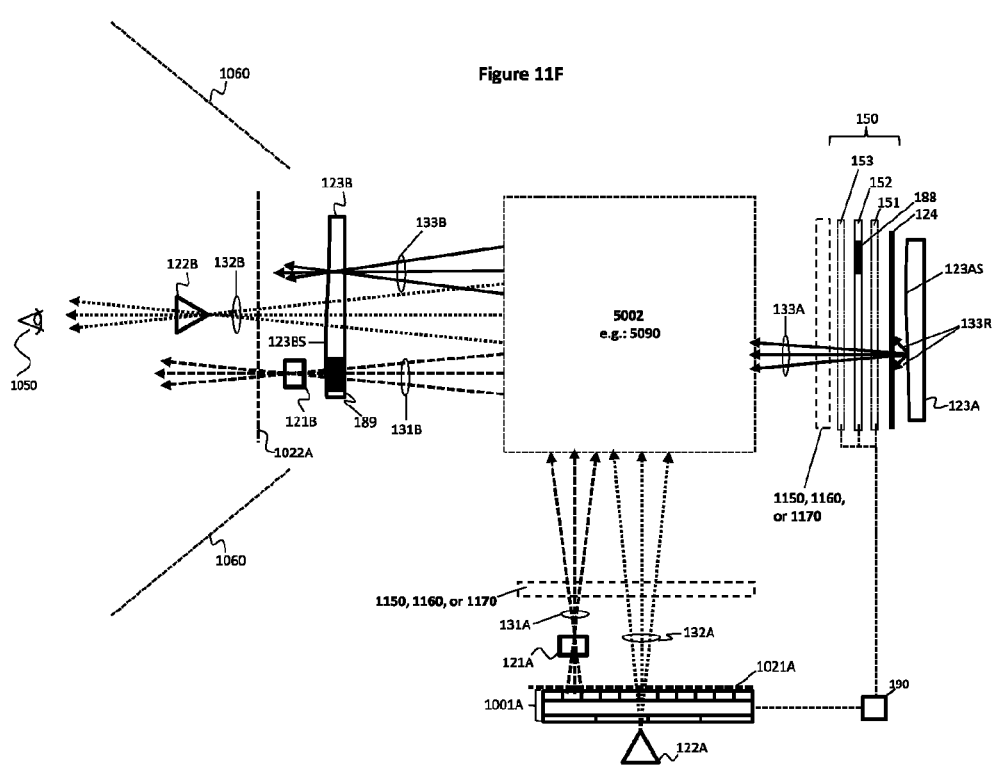
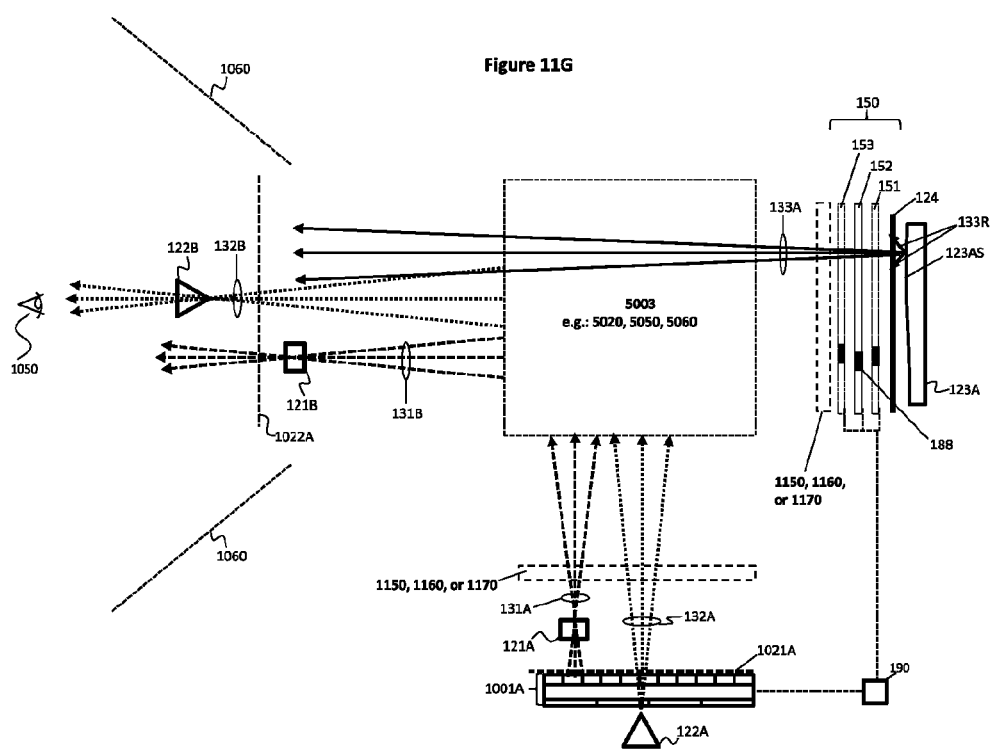

1400

1410

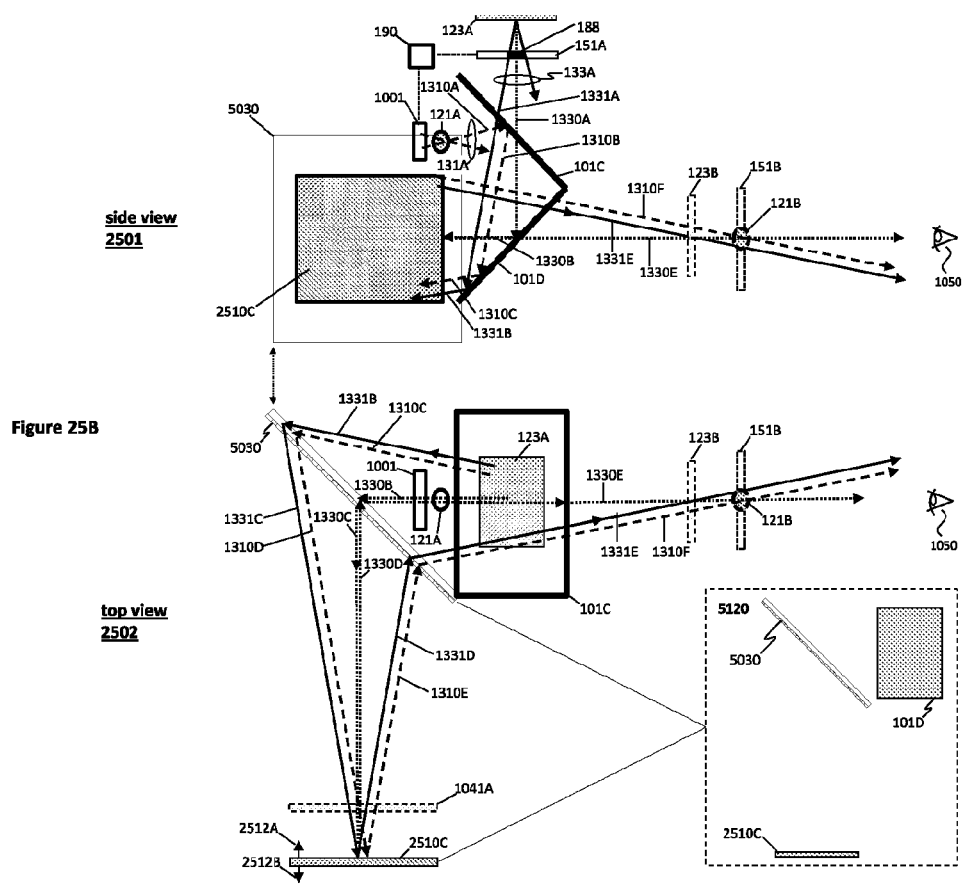
Figure 25B
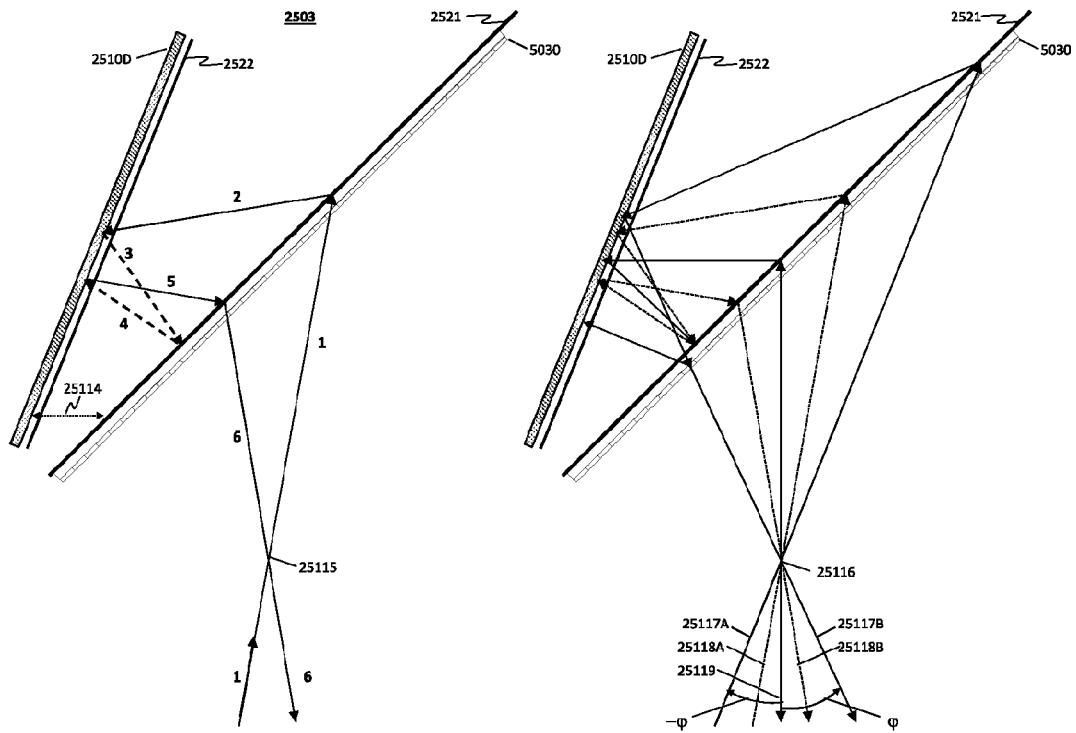
Figure 25C
Figure 25D

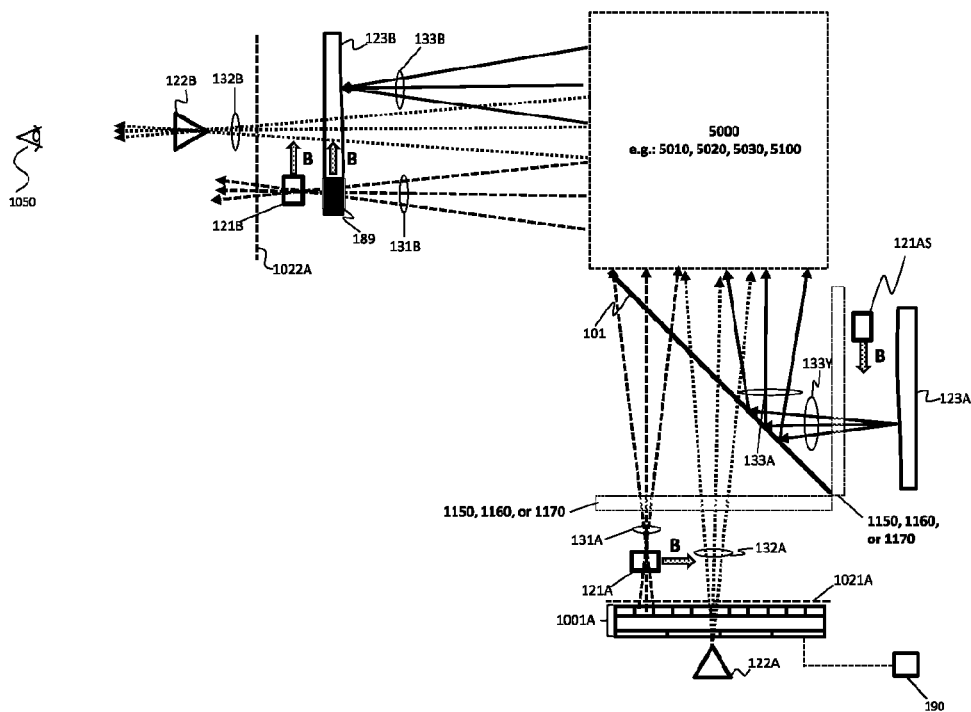
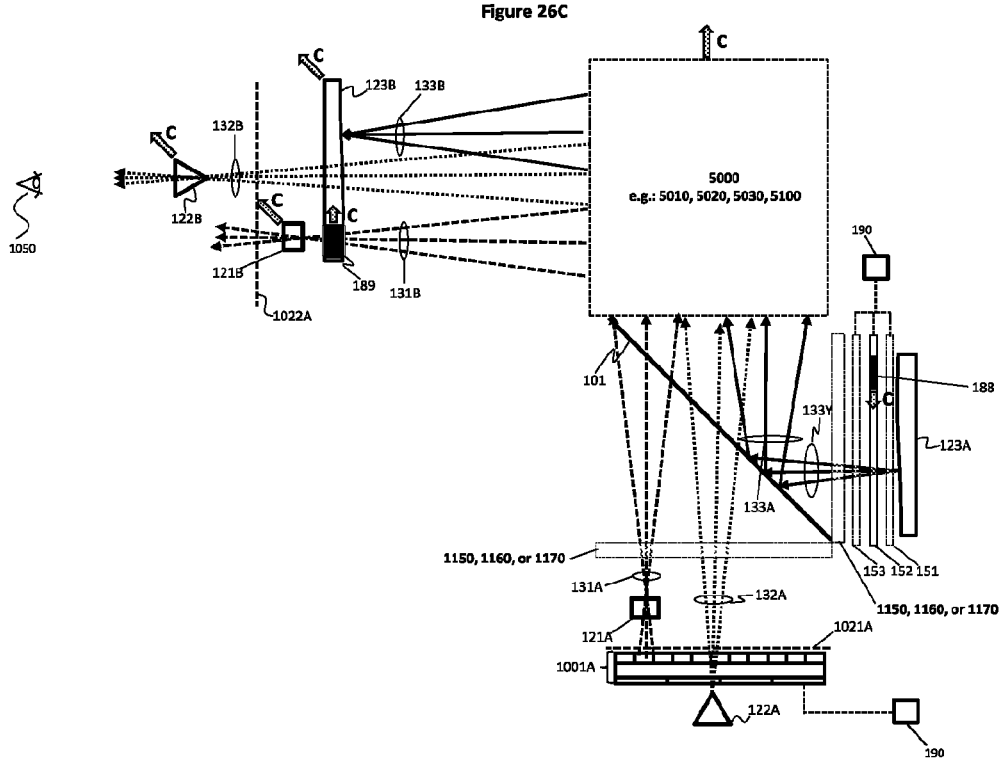

2810

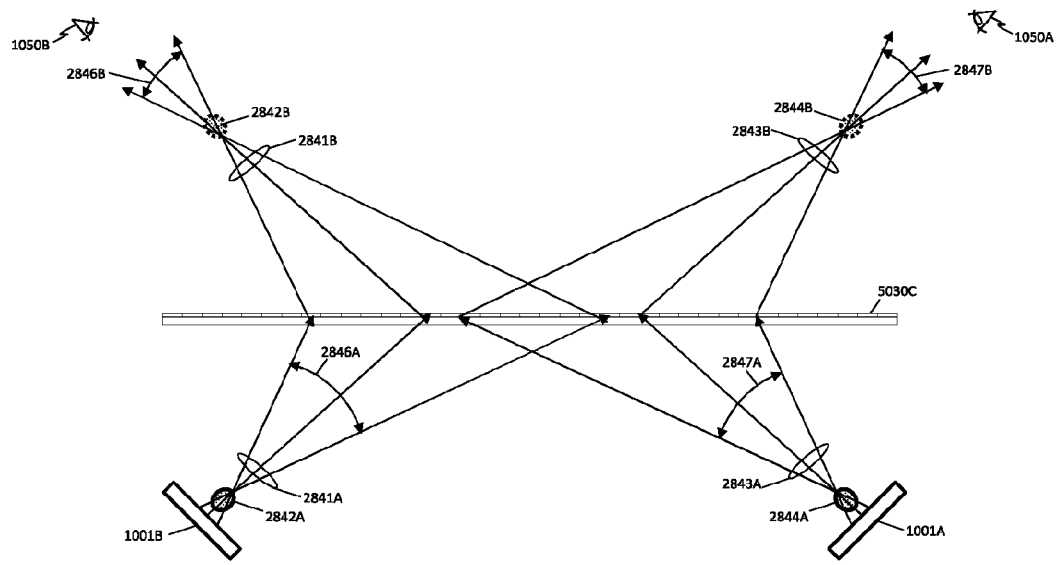
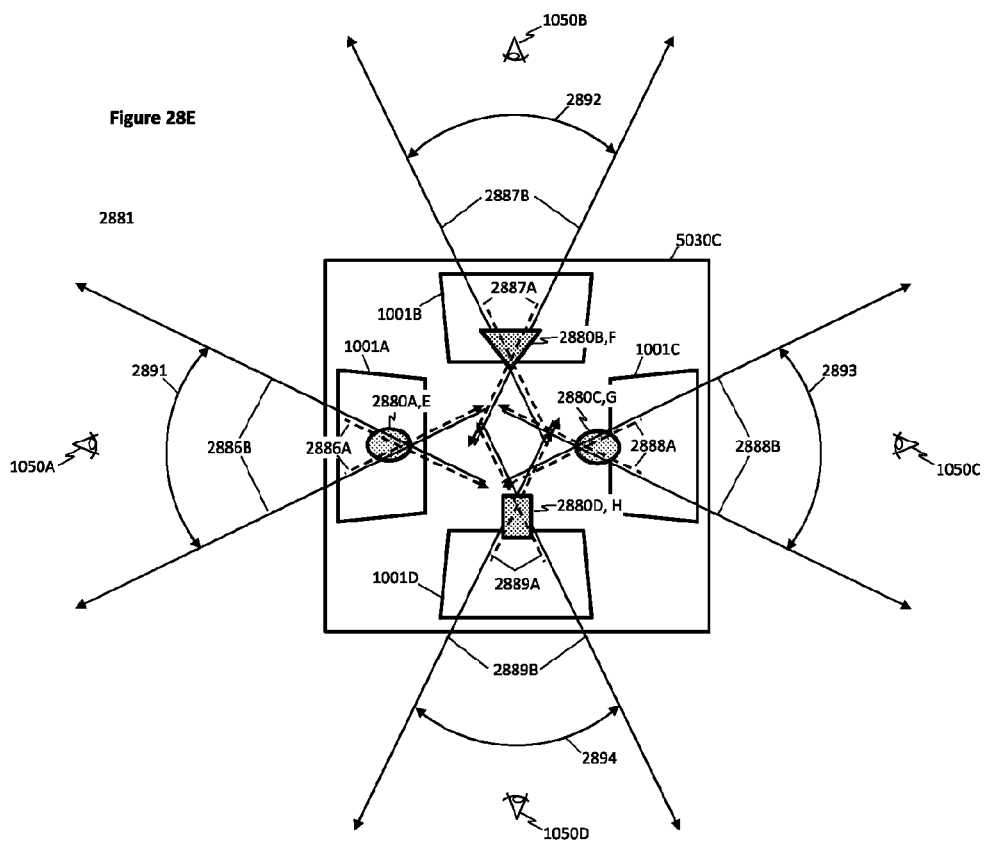

2920

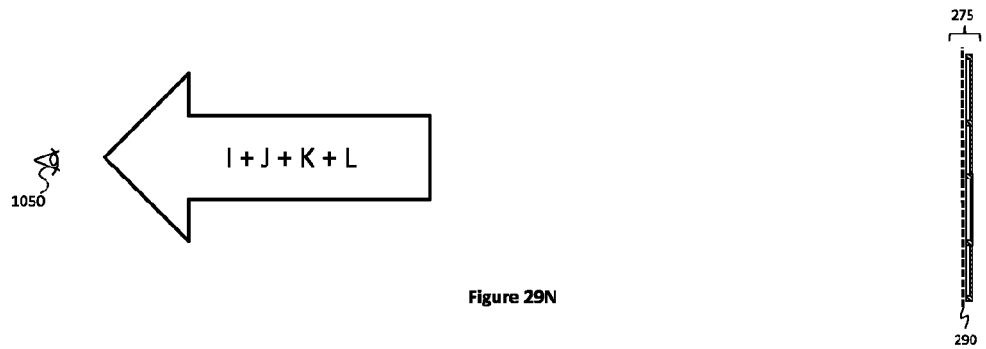
Figure 29N
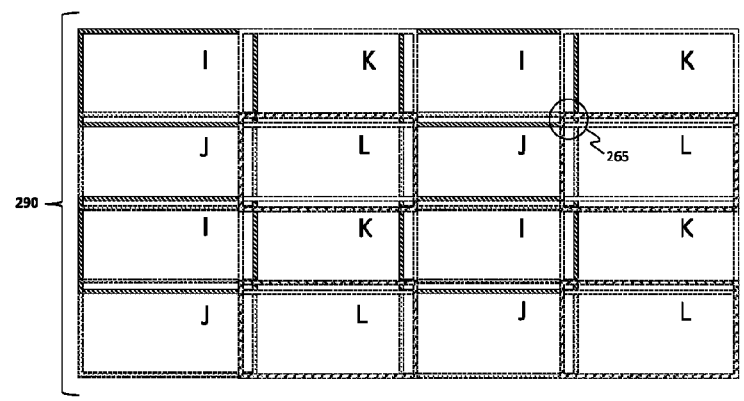
Figure 29O
Figure 30A
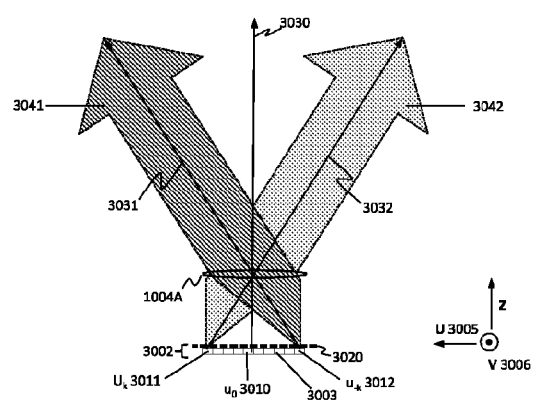

Figure 30B
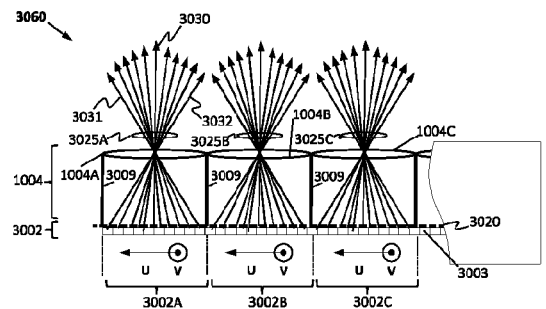
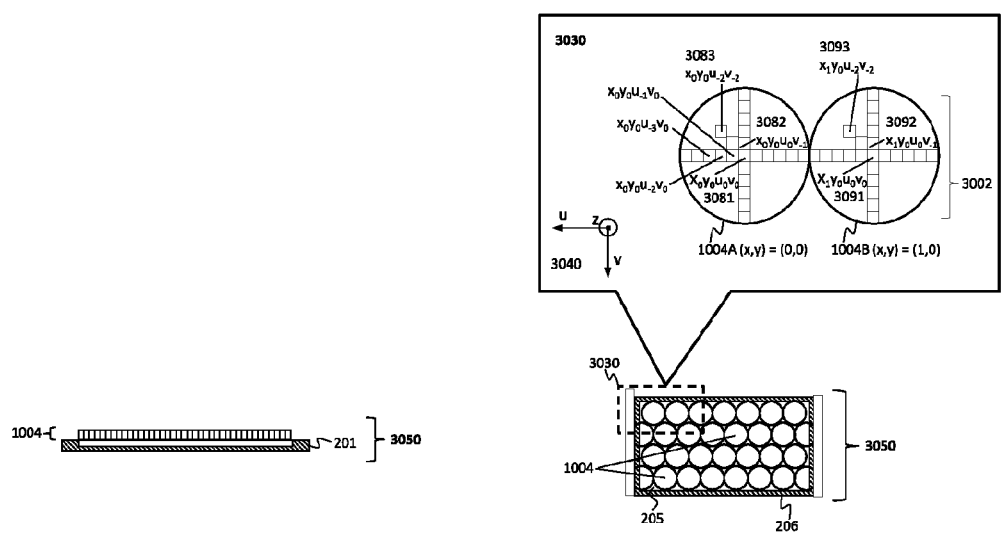
Figure 30C        Figure 30D

Figure 30G
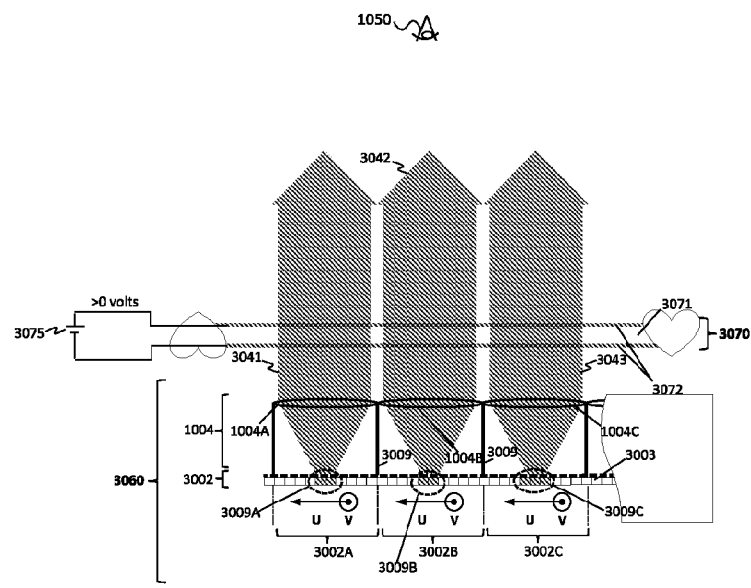
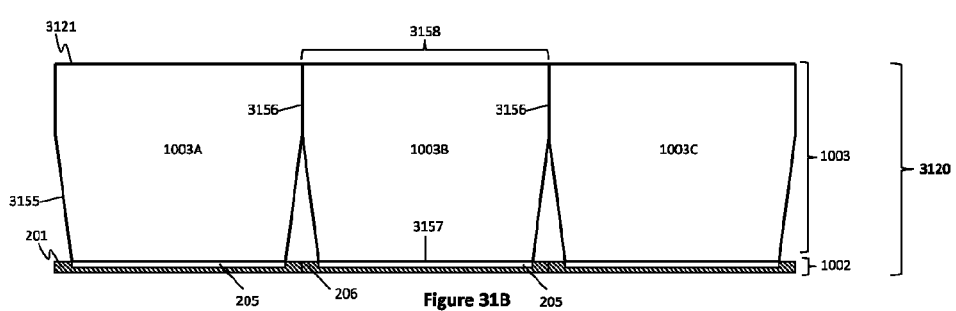
Figure 31A
Figure 31B
Figure 31C
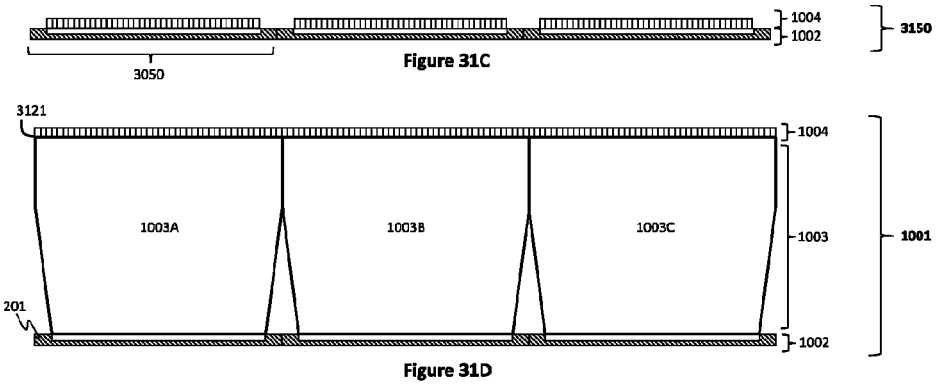
Figure 31D

RELAY SYSTEMS

TECHNICAL FIELD

This disclosure generally relates to systems configured for generating light corresponding to 2D, 3D, or holographic imagery and further configured to relay the generated holographic imagery to desired locations.

BACKGROUND

Many technologies exist today that are often confused with holograms but lack the ability to stimulate the human visual sensory response in the same way that a real object does. These technologies include lenticular printing, Pepper's Ghost, glasses-free stereoscopic displays, horizontal-only parallax displays, head-mounted VR and AR displays (HMD), and other such illusions generalized as "fauxlography." These technologies may exhibit some of the desired properties of a true holographic display, but they fall short of the ideal of a full-parallax viewing experience with correct occlusion handling for any number of viewers with no headgear or glasses required in which the light field is reproduced almost exactly as it exists when light emerges from a real object.

SUMMARY

An embodiment of an optical system in accordance with the present disclosure may comprise a first input interface configured to receive light along a first set of light paths from a first image source, wherein the light from the first image source is operable to define a first image surface, a second input interface configured to receive light along a second set of light paths from a second image source, wherein the light from the second image source is operable to define a second image surface, and a relay system configured to direct the received light from the first and second image sources to a viewing volume, wherein at least one of the first and second image surfaces is relayed by the relay system into the viewing volume, wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system.

An embodiment of an optical system in accordance with the present disclosure may comprise a first input interface configured to receive light along a first set of light paths from a first image source, wherein the light from the first image source is operable to define a first image surface, a second input interface configured to receive light along a second set of light paths from a second image source, wherein the light from the second image source is operable to define a second image surface, a relay system configured to direct the received light from the first and second image sources to a viewing volume, wherein at least one of the first and second image surfaces is relayed by the relay system into the viewing volume, and an occlusion system configured to occlude a portion of light from at least one of the first and second image sources.

An embodiment of an optical system in accordance with the present disclosure may comprise an optical combining system comprising a first input interface configured to receive light along a first set of light paths from a first image source, wherein the light from the first image source is operable to define a first image surface, and a second input interface configured to receive light along a second set of light paths from a second image source, wherein the light from the second image source is operable to define a second image surface, and a first relay system configured to receive combined image light from the optical combining system and relay the received light to relayed locations in a viewing volume thereby defining first and second relayed image surfaces corresponding to the first and second image surfaces respectively, wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system.

An embodiment of an optical system in accordance with the present disclosure may comprise an optical combining system comprising a first input interface configured to receive light along a first set of light paths from a first image source, wherein the light from the first image source is operable to define a first image surface, and a second input interface configured to receive light along a second set of light paths from a second image source, wherein the light from the second image source is operable to define a second image surface, a relay system configured to receive combined light from the optical combining system and relay the received light to relayed locations in a viewing volume, whereby first and second relayed image surfaces are observable at the respective relayed locations, and an occlusion system configured to occlude a portion of light from at least one of the first and second image sources.

An embodiment of a display system in accordance with the present disclosure may comprise a relay system comprising at least one transmissive reflector, first and second image sources operable to output light along first and second sets of source light paths, respectively, wherein the first and second image sources are oriented relative to the at least one transmissive reflector such that light along the first and second sets of source light paths is relayed along first and second sets of relayed light paths, respectively, the first and second sets of relayed light paths defining first and second viewing volumes, respectively, wherein the first and second relayed viewing volumes are different.

An embodiment of a display system in accordance with the present disclosure may comprise a relay system comprising at least one transmissive reflector, an image source operable to output light, and a beam splitter positioned to receive the light from the image source and direct the light along first and second sets of source light paths, wherein the image source and beam splitter are oriented relative to the at least one transmissive reflector such that light along the first and second sets of source light paths is relayed along first and second sets of relayed light paths, respectively, the first and second sets of relayed light paths defining first and second relayed viewing volumes, respectively, and wherein the first and second relayed viewing volumes are different.

An embodiment of a relay system in accordance with the present disclosure may comprise a first relay subsystem comprising a first transmissive reflector of the first relay subsystem, the first transmissive reflector positioned to receive image light from an image source, the image light operable to define a first image surface, wherein the first transmissive reflector is configured to relay the image light received along source light paths within first and second ranges of angular alignment relative to the first transmissive reflector to define a first relayed image surface in a first relayed location, and a second transmissive reflector of the first relay subsystem, the second transmissive reflector positioned to receive relayed image light from the first transmissive reflector and configured to relay the relayed image light from the first transmissive reflector to define a second relayed image surface in a second relayed location.

An embodiment of a display system in accordance with the present disclosure may comprise arrays of modular display devices, each modular display device comprising a display area and a non-imaging area, wherein the arrays of modular display devices define a plurality of display planes, each display plane comprising imaging regions defined by the display areas of the respective display devices and non-imaging regions defined by the non-imaging areas of the respective display devices, a light combining system operable to combine light from the arrays of modular display devices, wherein the light combining system and the arrays of modular display devices are arranged such that the combined light has an effective display plane defined by superimposing the plurality of display planes so that the non-imaging regions of the plurality of display planes are superimposed by the imaging regions of the plurality of display planes.

An embodiment of a light field display system in accordance with the present disclosure may comprise arrays of modular display devices, each modular display device comprising a display area and a non-imaging area, wherein the arrays of modular display devices define a plurality of display planes, each display plane comprising imaging regions defined by the display areas of the respective display devices and non-imaging regions defined by the non-imaging areas of the respective display devices, arrays of waveguides each positioned to receive light from the of the display plane of one of the arrays of modular display devices, a light combining system operable to combine light from the arrays of waveguides, wherein each array of waveguides is configured to direct light from the respective array of modular display devices such that the combined light from the light combining system comprises light paths each defined according to a four-dimensional function and having a set of spatial coordinates and angular coordinates in a first four-dimensional coordinate system.

An embodiment of an optical system in accordance with the present disclosure may comprise; a first input interface configured to receive light along a first set of light paths from a first image source, wherein the light from the first image source is operable to define a first image surface; a relay system configured to relay the received light from the first image surface to a viewing volume to define a relayed first image surface, wherein the first image sources comprises a light field display, and the first set of light paths are determined according to a four-dimensional (4D) function defined by the light field display such that each light path from the light field display has a set of spatial coordinates and angular coordinates in a first four-dimensional coordinate system, and; a sensor operable to collect data related to a condition in the viewing volume.

BRIEF DESCRIPTION OF THE DRAWINGS

FIG. 3A illustrates an embodiment of a holographic display system similar to the system shown in FIG. 1A, in which the beam splitter and image retroreflector have been replaced by a transmissive reflector;

FIG. 3B illustrates an embodiment of a holographic display system having multiple relay systems;

FIG. 4E illustrates another embodiment of a holographic display system having a relay system comprising a lens system;

FIG. 5A illustrates an embodiment of an ideal relay system;

FIG. 10A demonstrates the sequence of reflections and transmissions that light takes as it travels through an optical folding system;

FIG. 10B is a table tracking how light from a display changes polarization states after interacting with each layer of each path of the optical fold system of FIG. 10A;

FIG. 10C shows another embodiment of an optical folding system with selectable regions;

FIG. 11F illustrates another embodiment of a relay system configured to relay light projected from a first image source simultaneously with the light from a second image source;

FIG. 11G illustrates an embodiment of a relay system configured to relay light projected from a first image source and simultaneously transmit light from a second image source.

FIG. 25B illustrates orthogonal views of a relay system in which the light paths from at least one object are received and relayed by passing the light rays through a transmissive reflector relay a first time, reflecting from a mirror, and passing the reflected light rays through the same relay a second time;

FIG. 25C illustrates a partial view of a relay system comprised of a mirrored surface disposed at an angle to a transmissive reflector;

FIG. 25D illustrates more light paths for the relay in FIG. 25C;

FIG. 26B shows the coordinated movement between a holographic object and an occlusion object within a display system with a relay;

FIG. 26C shows the movement of three relayed images and an occlusion region of an occlusion plane when a relay within a display system is physically moved;

FIG. 27P is a side view of the relay system shown in FIG. 27O with an additional optical path for light which is at a normal angle to the surface of the first transmissive reflector.

FIG. 27Q is an orthogonal top view of the display system shown in FIG. 27P;

FIG. 28D shows a table-top display system comprised of two image sources and a transmissive reflector;

FIG. 28E shows a table-top display system comprised of four image sources and a transmissive reflector;

FIG. 29N shows overlapping display planes from the configuration shown in FIG. 29M, with an effective overlapped seamless 2D display surface;

FIG. 29O shows the configuration of four overlapping display planes I, J, K, and L that produce the combined light I+J+K+L seen by an observer from the configuration shown in FIG. 29M;

FIG. 30A shows a waveguide system placed over an illumination plane, which is comprised of individually addressable pixels located on a seamless display surface;

FIG. 30B shows a light field system comprised of an array of waveguides over pixels on an illumination plane which forms a seamless display surface;

FIG. 30C shows a side view of a light field display comprised of the display device shown in FIG. 29B with a waveguide array shown in FIG. 30B mounted onto its active display area surface;

FIG. 30D shows a magnified view of a portion of a display device with an active display area covered with an array of waveguides, surrounded by a non-imaging area;

FIG. 30G shows the light field display shown in FIG. 30F, where the voltage source applies a sufficient voltage to the transparent smart glass electrodes for the smart glass to become transparent;

FIG. 31A shows a side view of an array of display devices, comprised of individual displays shown in FIGS. 29A and 29B;

FIG. 31B shows how a 2D array of display devices containing imaging gaps may be combined with an array of energy relays to produce a seamless display system with a seamless display surface without non-imaging regions;

FIG. 31C shows an array of individual light field display units shown in FIGS. 30C and 30D;

FIG. 31D is one embodiment of a light field display that appears in many of the diagrams of this disclosure;

FIG. 32 shows a light field display comprised of an overlapped 2D display system formed from one or more planes of display devices, an optical combiner, a relay system, and an array of waveguides placed at a virtual display plane;

FIG. 33 is a light field display similar to the light field display shown in FIG. 32, except that the two display planes in FIG. 32 are replaced with a single seamless display surface, which may be an embodiment of the seamless display surface shown in FIG. 31B, and an optional second seamless display surface;

FIG. 34A is a light field display system comprised of two arrays of light field display devices, each of which may contain non-display regions, combined by an optical combiner;

FIG. 34B shows how the display system shown in FIG. 34A appears to an observer;

FIG. 34C shows the light field display system shown in FIG. 34A combined with a relay system which relays holographic objects to a virtual display plane;

FIG. 35 shows a diagram of a display system shown in FIG. 11A wherein a sensor records the gestures of a viewer and moves the relayed objects in response;

FIG. 36 shows the display system of FIG. 35, with the path of light from a viewer's hand travelling through the relay system in the opposite direction from the direction of the combined light rays from the light field display and real-world object, with these reverse light rays detected by a sensor.

DETAILED DESCRIPTION

Figure 1A:
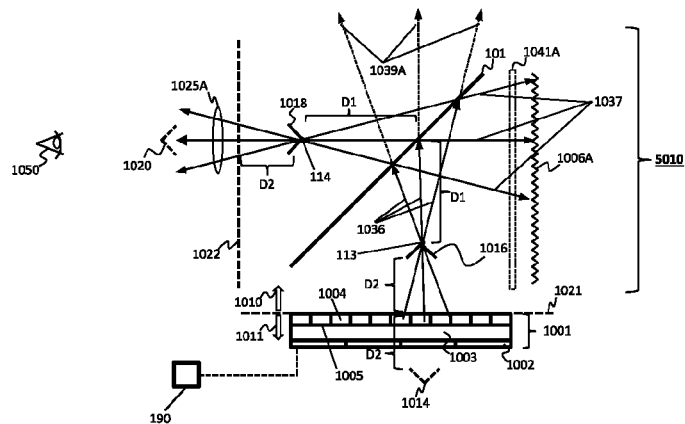
FIG. 1A illustrates an embodiment of a system configured to relay a holographic surface projected by a light field display using a beam splitter and an image retroreflector.

FIG. 1A shows an embodiment of a holographic display system including a first display 1001 comprising a light field display configured to project light along a set of projected light paths 1036 to form at least a first holographic surface 1016 having a first projected depth profile relative to a display screen plane 1021. In an embodiment, the first holographic surface 1016 may be any surface in a holographic scene, such as a portion of an object, a face, a background scene, etc. In an embodiment, the projected depth profile of the holographic surface 1016 may include a depth perceivable by a viewer (not shown) observing the first display 1001 along a normal axis (not shown) of the display 1001. The holographic display system of FIG. 1A also includes a relay system 5010 positioned to receive light along the first set of projected light paths 1036 from the light field display 1001 and relay the received light along a set of relayed light paths 1025A such that points on the first holographic surface 1016 are relayed to relayed locations thereby forming a first relayed holographic surface 1018 having a first relayed depth profile relative to a virtual screen plane 1022. In an embodiment, the virtual screen plane 1022 is oriented at a non-parallel angle relative to the display screen plane 1021 of the light field display 1001. In an embodiment, the virtual screen plane 1022 is oriented at a perpendicular angle relative to the display screen plane 1021 of the light field display 1001.

In an embodiment, the depth profile of the holographic surface 1016 may include a depth perceivable by a viewer 1050 observing in the direction of the virtual screen plane 1022. As illustrated in FIG. 1A, the first relayed depth profile of the relayed holographic surface 1018 is different from the first projected depth profile of the first holographic surface 1016: first holographic surface 1016 is projected as an off-screen holographic surface while the first relayed holographic surface 1018 is perceivable by viewer 1050 as an in-screen holographic surface relative to the virtual screen plane 1022.

In an embodiment, the relay system 5010 may relay holographic objects projected by a light field display 1001 using a beam splitter 101 and an image retroreflector 1006A. In an embodiment, the light field display 1001 comprises one or more display devices 1002, having a plurality of light source locations (not shown), an imaging relay 1003 which may or may not be present which acts to relay images from the display devices to an energy surface 1005, and an array of waveguides 1004 which project each light source location on the energy surface 1005 into a unique direction (u,v) in three dimensional space. The energy surface 1005 may be a seamless energy surface that has a combined resolution that is greater than the surface of any individual display device of the one or more display devices 1002. Examples of light field display 1001 are described in commonly owned U.S. Pat. App. Pub. Nos. US2019/0064435, US2018/0356591, 2018/0372926, and U.S. patent application Ser. No. 16/063, 675, all of which are incorporated herein by reference for all purpose. Projected light rays 1036 may converge at a location 113 on the surface of a holographic object 1016, and then diverge as they approach the beam splitter 101. The beam splitter 101 may be configured to include a polarizing beam splitter, a transparent aluminum-coated layer, or at least one dichroic filter. In an embodiment, the beam splitter 101 may be oriented at a 45 degree angle relative to the light field display screen plane 1021 and the retroreflector 1006A, with the retroreflector 1006A oriented orthogonally relative to the display screen plane 1021. Some fraction of the incident light along the projected light paths 1036 reflects from the beam splitter 101 toward the image retroreflector 1006A along a set of reflected light paths 1037, while some of the remaining light may pass straight through the beam splitter 101 into rays along a set of transmitted light paths 1039A, which may not contribute to the formation of the relayed holographic object 1018 in the configuration shown in FIG. 1A. In an embodiment, the retroreflector 1006A may contain a fine array of individual reflectors, such as corner reflectors. The retroreflector 1006A acts to reverse each ray of incident light in the opposite direction from the approach direction, with no significant spatial offset. Rays along light paths 1037 reverse their direction upon reflecting from the retroreflector 1006A, substantially retracing their approach angle to the retroreflector 1006A, and some fraction of their intensities pass through the beam splitter 101 along the set of relayed light paths 1025A, converging at the location 114 of the holographic object 1018. In this way, holographic object 1016 projected directly by the light field display 1001 is relayed to form the relayed holographic object 1018. The retroreflector 1006A can be placed to the right of the beam splitter 101, as shown in FIG. 1A, or placed above the beam splitter 101, orthogonal to the placement shown in FIG. 1A, directly facing the LF display surface 1021 (in the same place as retroreflector 1006B shown in later diagram FIG. 1B). In other words, the retroreflector can be placed so that light from LF display 1001 is reflected to the right by the beam splitter, and then reflects from the retroreflector, or placed so that light from LF display 1001 is transmitted vertically by the beam splitter, and then reflects from the retroreflector. Later in this disclosure, both orientations will be shown. In an embodiment, the light field display 1001 may include a controller 190 configured to issue display instructions to the light field display and output light according to a 4D function.

FIG. 1A may have an optional optical element 1041A located between the beam splitter 101 and the retroreflector 1006A. The relative placement of this optional optical element 1041A is similar to the optional optical element 1041A that appears in FIG. 1B. This optical element may be a polarization controlling element used together with a polarization beam splitter 101. If the display 1001 produces only one polarization state, then a polarizing beam splitter 101 may be arranged to direct almost all the light of the display toward the retroreflector 1006A, eliminating most of the light rays 1039A which may pass vertically through the beam splitter and not contribute to imaging the holographic object 1018. Using a polarizing beam splitter 101, the light rays 1037 are linearly polarized as they approach the optical element 1041A and are circularly polarized after passing through the optical element 1041A, which may include a quarter wave retarder. Upon reflection from the retroreflector 1006A, most of the light on rays 1025A may be circularly polarized in the opposite direction, and for this opposite circular polarization, the return pass through the quarter wave retarder will result in these light rays converted to a linear polarization that is rotated 90 degrees relative to the light rays 1027 approaching the retroreflector 1006A. This light has the opposite polarization to the light that was reflected by the beam splitter 101, so it will pass straight through the beam splitter 101 rather than being deflected and contribute to the imaging of holographic object 1018. In short, a quarter wave plate optical element 1041A placed between the beam splitter 101 and the retroreflector 1006A may assist in converting the majority of light reflected from the beam splitter 101 from one linear polarization to the opposite linear polarization, so that this light is passed by the beam splitter 101 with optimal efficiency in generating a holographic image, and limited wasted light.

Figure 1B:
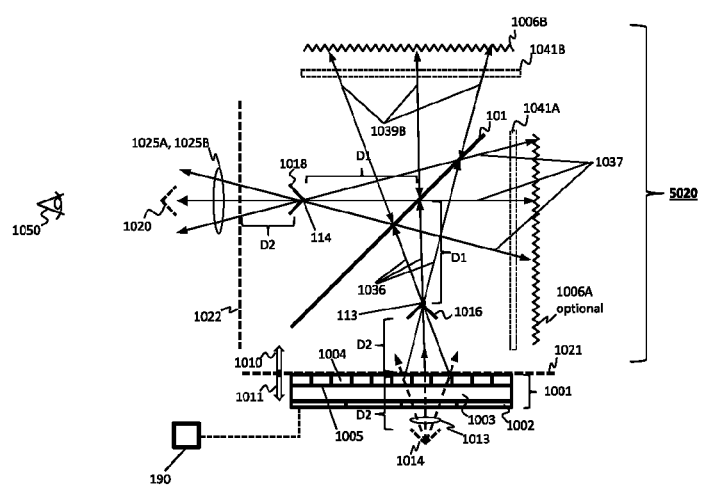
FIG. 1B illustrates an embodiment of a system configured to relay a holographic surface projected by a light field display using a beam splitter and a plurality of image retroreflectors.

In cases where the display 1001 produces unpolarized light, about half of the incident light 1036 on the beam splitter will be directed to light rays along the set of light paths 1037 toward the retroreflector 1006A, and about half of the incident light will be directed along a set of transmitted light paths 1039A, in the vertical direction. This results in a loss of light rays 1039A. In an embodiment, as shown in FIG. 1B, the holographic display system of FIG. 1A may include a relay system 5020 that includes an additional retroreflector 1006B. In an embodiment, the additional retroreflector 1006B may be disposed opposite to the display 1001 from the beam splitter 101, symmetric in distance but orthogonal in orientation to retroreflector 1006A. FIG. 1B shows a display system which relays holographic surfaces projected by a light field display 1001 using a holographic relay system 5020 comprised of a beam splitter 101 and two image retroreflectors 1006A and 1006B, where each retroreflector reflects rays of incident light in the direction reverse of their incident direction. In FIG. 1B, the retroreflector 1006A is labeled as optional, but the relay 5020 may operate with retroreflector 1006A present and retroreflector 1006B absent, with retroreflector 1006A absent and retroreflector 1006B present, or with both retroreflectors 1006A and 1006B present. Both configurations may be implemented in accordance with the principles of this disclosure. In contrast to relay system 5010 in FIG. 1A in which the light rays along the transmitted paths 1039A are lost, in FIG. 1B the light rays along the transmitted paths 1039B are retroreflected from retroreflector 1006B in the same way as rays along the reflected paths 1037 are retroreflected from retroreflector 1006A. Light rays along light paths 1039B are reversed in direction by retroreflector 1006B and then reflect from the optical combiner 101 so that they are directed towards light paths 1025B which converge to form the holographic object 1018. The light rays along paths 1039B and paths 1037 are retroreflected and converge at the beam splitter 101, combining to form light rays along the set of relayed paths 1025A and 1025B, wherein both sets of relayed light paths 1025A and 1025B may focus at point 114, contributing to form the first relayed holographic surface 1018. In an embodiment, the additional retroreflector 1006B and the beam splitter 101 are aligned such that projected light that was transmitted through the beam splitter 101 towards the additional retroreflector 1006B is reflected from the additional retroreflector 1006B and further reflected by the beam splitter 101 along an additional set of relayed light paths 1025B towards the virtual display screen 1022, and the set of the relayed light rays 1025A from first retroreflector 1006A and the additional set of relayed light rays 1025B from the additional retroreflector 1006B substantially overlap. As discussed in regard to the optional optical element 1041A shown in FIG. 1A, the optical element 1041B may include a quarter wave retarder which may result in a majority of light rays along the transmitted paths 1039B returning to the beam splitter 101 with the opposite linear polarization, such that the majority of these light rays will be directed by the beam splitter 101 toward the formation of the holographic surface 1018, rather than being transmitted straight through the beam splitter 101 and towards the display 1001. The optional optical element 1041B may contain polarization controlling elements, diffractive elements, refractive elements, focusing or defocusing elements, or any other optical elements.

Referring now to FIGS. 1A and 1B, in an embodiment, the vertical distance D1 between location 113 on the directly projected surface 1016 and the light field display screen plane 1021 may be the same as the horizontal distance D1 between corresponding point 114 on the relayed holographic surface 1018 relative to the relayed virtual screen plane 1022. The relay system 5010 or 5020 may be configured to relay a plurality of holographic surfaces distributed around light field display screen plane 1021, including the out-of-screen surface 1016 on the side 1010 of the screen plane 1021, and surfaces that are projected in-screen on the side 1011 of the screen plane 1021. In the example shown in FIGS. 1A and 1B, the surface 1016 is projected as an out-of-screen holographic surface. These holographic surfaces may be relayed from screen plane 1021 to virtual plane 1022 so that surfaces 1016 which are out-of-screen for the screen plane 1021 appear behind the virtual plane 1022 with respect to a viewer 1050, and similarly, so that surfaces that are in-screen for the light field display 1001, projected on the side 1011 of screen plane 1021, appear in front of the virtual screen plane 1022 with respect to a viewer 1050. For this reason, the depth of holographic surface 1016 flips polarity—the location 113 of the out-of-screen holographic surface 1016 that is furthest away from the display screen plane 1021 is relayed to location 114 of the relayed holographic surface 1018 that is furthest from the viewer 1050. To account for this reversal of depth, and to present the observer 1050 with the same view and same depth profile of the relayed holographic surface 1016 that an observer of directly projected out-of-screen holographic object 1016 would see without the use of relay system 5020, the polarity of the U-V light field coordinates may be reversed. These U-V light field coordinates are the two angular coordinates in the 4D light field function with coordinates (X, Y, U, V). Reversing the polarity of the U-V light field coordinates transforms projected light rays 1036 into projected light rays 1013, each of which have the opposite slope. This converts out-of-screen holographic projected surface 1016 into in-screen holographic projected surface 1014 with a reversed depth, which will be relayed into relayed holographic surface 1020. Relayed holographic surface 1020 is out-of-screen relative to the virtual display plane 1022 and will appear to observer 1050 to have the same depth profile relative to the virtual screen plane 1022 as projected object 1016 has relative to the display screen plane 1021. Projected holographic surface 1014 will appear to be depth-reversed relative to the display screen plane 1021. In summary, to project a holographic surface 1020 for observer 1050 of the virtual screen plane 1022, the intended projected holographic surface 1016 with the intended depth profile may be rendered for the light field display 1021 without the effects of the relay 5010 or 5020 being considered, and then each of the U-V angular light field coordinates may be flipped to produce a depth-reversed surface 1014 which appears on the opposite side of the display screen plane 1021 from holographic object 1016, but which is relayed by relay system 5010 or 5020 into relayed holographic object 1020 with the intended relayed holographic surface and the intended depth profile relative to the virtual screen plane 1022. The 4D light field coordinate system for (X, Y, U, V) is described in in commonly-owned U.S. Pat. App. Pub. Nos. US2019/0064435, US2018/0356591, US2018/0372926, and U.S. patent application Ser. No. 16/063,675, which are incorporated herein by reference and will not be repeated here.

In an embodiment, each of the set of projected light paths 1036 has a set of positional coordinates and angular coordinates in a four-dimensional (4D) coordinate system defined with respect to the display screen plane 1021, and each of the set of relayed light paths 1025A, 1025B has a set of positional coordinates and angular coordinates in a four-dimensional (4D) coordinate system defined with respect to the virtual display plane 1022. As described above, holographic surface 1014 may be rendered so that the light forming the surface of object 1014 will be relayed as the intended distribution for the relayed surface 1020, which may be directly viewed by observer 1050. One way to render holographic surface 1014 is to first render holographic object 1016, the intended object to be shown in absence of relay systems 5010 or 5020, and then reverse in polarity its U-V angular coordinates. This reversal of U-V coordinates may result in holographic object 1014 being projected instead of object 1016, which may be relayed to the intended holographic object 1020. The U-V polarity reversal may be done with a corrective optic element, as summarized below in reference to FIG. 2A, or using an adjustment in the 4D light field coordinates, possibly as a holographic object rendering step, as summarized below in reference to FIGS. 2B and 2C.

Figure 2A:
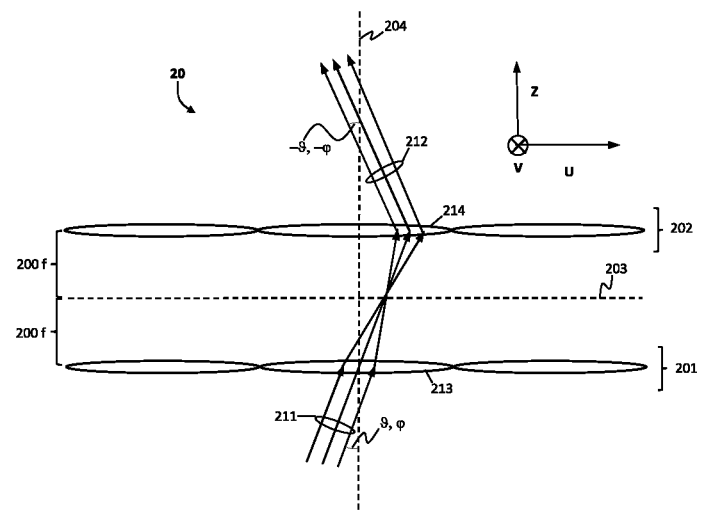
FIG. 2A illustrates an embodiment of a corrective optical element configured to reverse the polarity of U-V angular coordinates in a four-dimensional (4D) coordinate system.

FIG. 2A shows an embodiment of a corrective optical element 20 which acts to reverse the polarity of U-V angular light field coordinates. Two substantially identical planes 201, 202 of lenses are placed parallel and separated from one another. Each lens has a focal length f 200, and the planes of lenses are oriented parallel to one another and separated by a spacing of twice the focal length f 200, so that their focal planes overlap at virtual plane 203, and so that lenses on opposite sides of virtual plane 203, such as 213 and 214, share a common optical axis 204. Incoming parallel light rays 211 are incident on lens 213 in plane 201 with an incident angle to the optical axis 204 of $\vartheta$, in the U-Z plane, and $\varphi$ in the V-Z plane. The light rays 211 are focused by lens 213 onto the focal plane 203, and then diverge toward lens 214 which refracts the rays into parallel rays 212. Parallel rays 212 leave lens 214 in plane 202 with the reversed polarity angles of $-\vartheta$, with respect to the optical axis 204 in the U-Z plane, and $-\varphi$ with respect to the optical axis 204 in the V-Z plane, resulting in a direction that has been reversed relative to the incident direction of parallel rays 211. This relay system may be placed above the screen plane 1021 in the path of projected light paths 1036 or in the relayed light paths 1025A, 1025B shown in FIGS. 1A and 1B in order to reverse the polarity of U-V coordinates for projected holographic surfaces or relayed holographic surfaces, respectively.

Figure 2B:
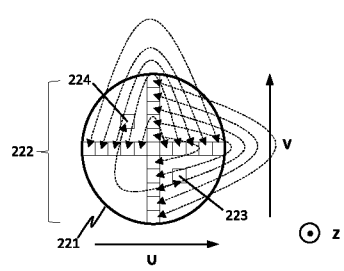
FIG. 2B illustrates a top-level view of a waveguide placed over a number of illumination source pixels in the U-V plane.

In an embodiment, the light field display 1001 may include a controller 190, as shown in FIGS. 1A and 1B, configured to receive instructions for accounting for the difference between the first projected depth profile and the first relayed depth profile by operating the light field display 1001 to output projected light such that the first relayed depth profile of the first relayed holographic object is the depth profile intended for a viewer 1050. FIG. 2B shows a top-level view of a waveguide 221 of the light field display 1001 placed over a number of illumination source pixels 222 in the U-V plane, including a row of pixels at V=0, a column of pixels at U=0, and individual pixels 223 and 224. In an embodiment, the waveguide 221 may be one of the waveguides 1004 in FIGS. 1A and 1B, and the pixels 222 may be on the energy surface 1005 in FIGS. 1A and 1B. In an embodiment, the waveguide 221 allows light from the pixels 222 to be projected along the set of projected light paths where each projected light path has set of positional coordinates (X,Y) and angular coordinates (U,V) in a four-dimensional (4D) coordinate system. The projected light paths may be light paths 1036 shown in FIGS. 1A and 1B. In order to reverse the polarity of the U-V coordinates and create holographic object 1014 from a light field rendered for holographic object 1016 in FIGS. 1A and 1B, one would exchange the polarity of the U and V coordinates as shown in the diagram, so that a pixel 224 with −U and +V coordinates would swap places with a pixel 223 with +U and −V coordinates. All other pixels would swap positions as indicated by the dashed lines, with the exception of (U,V)=(0,0) which stays in place.

Figure 2C:
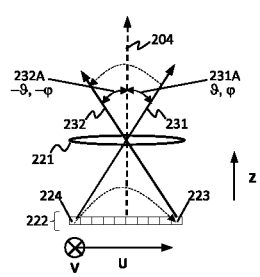
FIG. 2C illustrates a side view of the embodiment shown in FIG. 2B in the U-Z plane with a thin lens as the waveguide.

FIG. 2C shows a side view of the embodiment shown in FIG. 2B in the U-Z plane with the waveguide 221 projecting the light from two different pixel locations 223 and 224 on the pixel plane 222 along chief light rays 232 and 231, respectively. The chief light rays 232 and 231 define the axis of propagation for the light received from the corresponding two pixels and projected by waveguide 221, even if the light from each pixel fills up a substantial portion of the aperture of the waveguide 221. The two pixels 223 and 224 may be located at the minimum and maximum U coordinates for a row of pixels 222 at a constant value of V. A reversal in the angular coordinate U may result in the chief light ray 231 with angles 231A ($\vartheta$, $\varphi$) relative to the optical axis 204 of waveguide 221 becoming chief light ray 232 which has the opposite angular coordinates 232A ($-\vartheta$, $-\varphi$) relative to the optical axis 204 but may have the same intensity and color of the chief light ray 231. If such a reversal in angular light field coordinates ($\vartheta$, $\varphi$), or equivalently (U,V) for each ray of a light field display then the depth profile of a projected holographic object surface may be reversed, as shown above in reference to FIG. 1B.

FIG. 3A shows an embodiment of a holographic display system which is similar to the configuration shown in FIG. 1A, except that the relay system 5010 shown in FIG. 1A comprised of the beam splitter 101 and image retroreflector 1006A has been replaced by a relay system which is comprised of a single transmissive reflector 5030 positioned to receive light along the set of projected light paths 1036 from the light field display 1001 and direct the received light 1036 along the set of relayed light paths 1026. In an embodiment, the transmissive reflector 5030 internally reflects a portion of the received light 1036 among a plurality of internal reflective surfaces (described below in reference to FIG. 4A) of the transmissive reflector 5030 and outputs light along the set of relayed light paths 1026 towards the virtual screen plane 1022 in a first direction. Projected light rays 1036 from the light field display 1001 may converge at a location 113 on holographic surface 1016, and then diverge as they approach the transmissive reflector 5030. The transmissive reflector 5030 internally reflects the diverging rays 1036 such that they exit the other side of the reflector 5030 as rays along the relayed paths 1026 and converge at location 114 of relayed holographic surface 1018. This may be accomplished within the transmissive reflector 5030 through a sequence of multiple reflections, described in detail below. In this way, holographic surface 1016 projected directly by the light field display 101 is relayed to form relayed holographic surface 1018. In an embodiment, the display system shown in FIG. 3A may include a controller 190 configured to issue display instructions to the light field display and output light according to a 4D function.

Figure 4A:
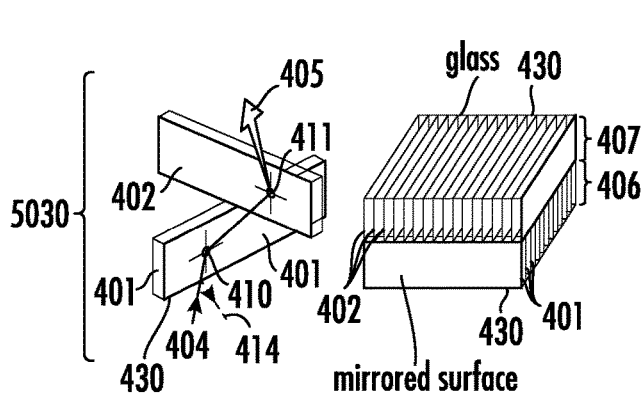
FIG. 4A illustrates a combined view of an embodiment of a dihedral corner reflector array (DCRA)

In an embodiment, the transmissive reflector 5030 is a dihedral corner reflector array (DCRA). A first possible implementation of a DCRA is a planar structure with numerous micromirrors placed perpendicular to the surface of a substrate. The micromirrors may be square through holes, each hole providing internal walls which constitute small corner reflectors. An incident light ray is reflected twice by two of the orthogonal adjacent internal walls of a square hole as the light ray passes through the DCRA, resulting in a retroreflection of the light ray in the plane of the structure while leaving the component of light direction perpendicular to the plane undisturbed. A second possible implementation of a DCRA is a structure with two thin layers of closely-spaced parallel mirror planes, oriented so the planes are orthogonal to one another as shown in FIG. 4A. In the embodiment illustrated in FIG. 4A, the transmissive reflector 5030 is constructed of two layers 406 and 407 of closely-spaced parallel reflective planes wherein the direction of the reflective planes 401 in layer 406 are oriented orthogonally to the direction of the reflective planes 402 in layer 407 in a second dimension. Reflective surfaces 401 and 402 may be mirrored surfaces. In FIG. 4A, an incident light ray 404 that passes through the transmissive reflector is reflected a first time by a first mirror 401 in the first plane of closely-spaced mirrors 406, and reflected a second time by a second mirror 402 in the second plane of closely-spaced mirrors 407, where mirror 401 and mirror 402 are orthogonal to one another. An incident light ray 404 reflects some of its energy into reflected light ray 414 as it enters one side of the external surface 430 of the transmissive reflector. The amount of reflection may be adjusted by adding an optical coating to one or both surfaces 430 of the transmissive reflector 5030. Light ray 404 has one component of its momentum reversed upon the first reflective surface 401 at location 410, and then has a substantially orthogonal component of momentum reversed upon a second reflection at point 411 from the second reflective surface 402. The component of light ray 404 momentum in the direction perpendicular to the surface 430 of the DCHA 5030 is unaffected.

Figure 4B:
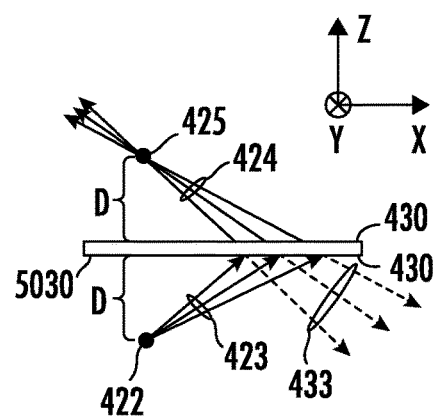
FIG. 4B illustrates a side view of an embodiment of transmissive reflector imaging a point source of light.

FIG. 4B shows a side view of an embodiment of the operation of a transmissive reflector 5030, which may be the DCRA structure of dual thin parallel planes of mirrors just described in FIG. 4A, an array of square through-holes arranged on a planar substrate described above, or some other transmissive reflector. The transmissive reflector 5030 is shown imaging a point source of light 422 located a distance D from transmissive reflector 5030. The transmissive reflector 5030 is aligned parallel to the X-Y plane. Each of the rays of light 423 from the point source 422 has its X and Y momentum components reversed by transmissive reflector 5030, so that the light rays 424 that exit 5030 converge at image point 425, a distance D from transmissive reflector 5030 but on the opposite side of the transmissive reflector 5030 from source point 422. In the embodiment described in FIGS. 4A and 4B, the redirection of the incident light rays 423 that occurs as a result of the two reflections within the transmissive reflector 5030 causes the transmissive reflector to act as a focusing element. A portion of the light rays 423 reflect from one of the external surfaces 430 of the transmissive reflector 5030, creating reflected light rays 433, and the fraction of reflected light may be controlled by applying an optical coating to the surface 430 of the transmissive reflector 5030.

Figure 3C:
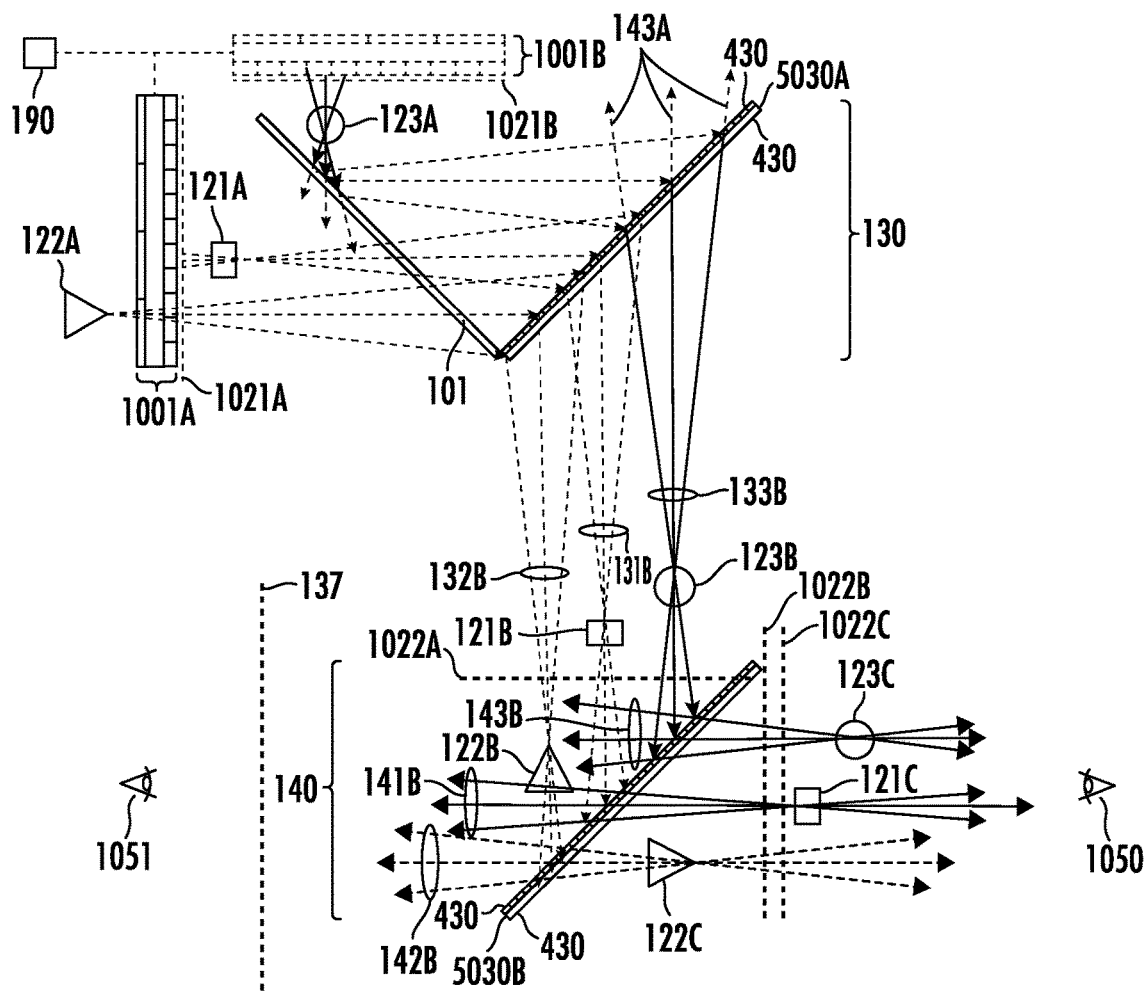
FIG. 3C illustrates another embodiment of a holographic display system having multiple relay systems.

Turning now to FIGS. 3B and 3C, it is possible to use a configuration with more than one relay to relay holographic surfaces. If a holographic surface is relayed twice, then the depth reversal of the holographic object that may occur with the first relay may be undone with the second relay. This is generally true for holographic surfaces that are relayed by an even number of holographic relays. FIG. 3B shows a light field display system comprised of at least a first light field display 1001A, and two relay systems 130 and 140 which together relay at least a first projected holographic surface to a final relay location. In the embodiment shown in FIG. 3B, holographic surfaces 121A and 122A are projected by light field display 1001A around the light field display screen plane 1021A and relayed to final relayed locations 121C and 122C around a virtual display plane 1022B, with no depth reversal. Also shown in FIG. 3B is an optional second light field display 1001B, which may project an image surface 123A. In an embodiment, the display system shown in FIG. 3B may include a controller 190 configured to issue display instructions to the light field display 1001A and optional light field display 1001B and output light on each display according to a respective 4D function. In place of the second light field display 1001B, the surface 123A may instead be the surface of a real-world object, or even the surface of a traditional 2D display. Light from surface 123A (whether it be the surface of a projected holographic object, a real-world object, or a portion of a 2D display) will be combined with holographic surfaces 121A and 122A by the beam splitter 101 and relayed by the pair of relay systems 130 and 140 to image position 123C, with no depth reversal. In the case that object 123A is a real-world object, then the holographic surfaces 121A, 122A and the image of the real-world object 123A are combined and relayed together to holographic surfaces 121C, 122C, and 123C at relayed locations, allowing the holographic surfaces and the real-world object to be displayed together free of a physical display plane.

In FIG. 3B, both relay systems 130 and 140 include transmissive reflectors 5030A and 5030B, respectively, but either one of these relays could also be comprised of a beam splitter and a retroreflector like relay 5010 shown in FIG. 1A. The holographic surfaces 121A and 122A are formed with light along a set of projected light paths 131A and 132A from light field display 1001A, respectively, and some fraction of light along the set of projected light paths are transmitted straight through the image combiner 101. The image combiner 101 may be any beam splitter disclosed in the present disclosure. Projected light along the set of projected light paths 131A and 132A is relayed by first relay system 130 along a first set of relayed light paths 131B and 132B which form depth-reversed first and second relayed holographic surfaces 121B and 122B, respectively, around first virtual screen plane 1022A. Light along the first set of relayed light paths 131B and 132B are relayed by the second relay system 140 along a second set of relayed light paths 131C and 132C forming third and fourth relayed holographic surfaces 121C and 122C, not depth-reversed, around a new virtual screen plane 1022B. Relayed holographic objects 121C and 122C should have the same depth profile relative to screen plane 1022B as the depth profile of source projected surfaces 121A and 122A relative to the screen plane 1021A, respectively.

Image surface 123A may be the surface of a real-world object, a portion of a 2D display surface, or a holographic surface projected by the optional second light field display 1001B with a depth profile with respect to the screen plane 1021B of the light field display 1001B. In other embodiments, image surface 123A may be a relayed holographic object. A portion of light 133Y from surface 123A is reflected by the image combiner 101 into projected light paths 133A, while the other portion passes through the image combiner 101 along a set of transmitted paths 133Z. The transmissive reflector 5030A of relay system 130 has reflective surfaces 430, and some of the incident light along the projected paths 133A reflects into light paths 143A (and this is true for light along the projected paths 131A and 132A, but this is not shown in FIG. 3B). A portion of light along light paths 133A from the surface 123A are relayed by first relay system 130 to relayed light paths 133B, forming depth-reversed image 123B. A first portion of the light along the relayed light paths 133B reflect from the surface of transmissive reflector 5030B of relay system 140 along reflected paths 143B (this is also true for incident light along relayed light paths 131B and 132B, but these reflections from the surface of transmissive reflector 5030B are not shown FIG. 3B). The remaining portion of light along the relayed light paths 133B are relayed a second time by second relay system 140 to relayed light paths 133C, forming relayed surface 123C, not depth-reversed, which is either an image of a real-world object 123A, a 2D image, or a relayed holographic surface 123A. For the case in which surface 123A is the surface of holographic object projected by light field display 1001B, relayed surface 123C has the same depth profile to observer 1050 as the depth profile of surface 123A relative to screen plane 1021B, and first observer 1050 will see three relayed holographic surfaces 121C, 122C, and 123C. For the case in which surface 123A is a real-world object, the relayed surface 123C has the same depth profile to observer 1050 as the real-world object, and first observer 1050 will see the relayed holographic object alongside the relayed holographic surfaces 121C and 122C. For the case in which surface 123A is a 2D display, first observer 1050 will see a relayed 2D display floating with relayed holographic objects 121C and 122C.

In the display configuration shown in FIG. 3B with the second light field display 1001B in place, virtual screen plane 1022C is relayed from the corresponding second light field display screen plane 1021B, and this virtual screen plane 1022C may be disposed a distance from virtual display screen plane 1022B relayed from the first light field display screen plane 1021A. In this way the holographic content from the two light field displays 1001A and 1001B may be superimposed into the same space around virtual screens 1022B and 1022C, without depth reversal, allowing for an increase in the depth range for displaying holographic objects that exceeds the depth range of either of the individual light field displays 1001A or 1001B. Note that each light field display 1001A and 1001B may produce holographic objects in a holographic object volume in the neighborhood of corresponding display screen planes 1021A and 1021B, respectively. The holographic object volume around display screen 1021A is relayed to virtual screen plane 1022B, while the holographic object volume around display screen plane 1021B is relayed to virtual screen plane 1022C. The amount of separation between virtual screen planes 1022B and 1022C is dependent on the difference in a first distance between display 1001A and the transmissive reflector 5030A, and a second effective optical distance between display 1001B and the transmissive reflector 5030A. If these distances are the same, then the virtual screen planes 1022B and 1022C will overlap. On the other hand, if the proximity of either light field display 1001A or 1001B from the transmissive reflector 130 is adjusted, the relayed holographic object volumes in the neighborhood of the virtual screen planes 1022B and 1022C may be made to partially overlap to create a larger combined holographic object volume, or be adjusted to create two distinct and separated regions of relayed holographic object volumes appropriate for a given application. In the event that the relayed holographic object volumes overlap, then a combined relayed holographic object volume larger than the holographic object volume of either of the individual displays may be achieved. Similarly, if a real-world surface 123A is used in place of a projected holographic surface 123A, the relative positioning of relayed holographic objects 121C and 122C with the holographic image 123C from the real-world object 123A may be adjusted and customized to a particular application. Note that this discussion about variable separation between virtual screen planes 1022B and 1022C can also be applied to the case when only one relay is used, such as 130.

FIG. 3C is same display configuration shown in FIG. 3B but shows how light that reflects from the second transmissive reflector 5030B of the second relay system 140 along reflected paths 141B, 142B, and 143B may be received by a second observer 1051. The numbering in FIG. 3B applies to FIG. 3C. Light along the first set of relayed light paths 131B and 132B from depth-reversed relayed holographic objects 121B and 122B are reflected into reflected light paths 141B and 142B, respectively, and may, in an embodiment, pass through a corrective optical element placed at plane 137. The corrective optical element may be similar to that shown in FIG. 2A, acting to reverse the polarity of the angular light field coordinates (U,V), resulting in the second observer 1051 perceiving the relayed holographic surfaces 121C and 122C with the same depth profile relative to plane 137 as the depth profile of the source projected surfaces 121A and 122A relative to display plane 1021 of light field display 1001A, respectively. In a similar way, the object 123A, which may be a holographic surface projected by display 1001B, or the surface of a real-world object, produces rays of light which are relayed by relay system 130 along relayed light paths 133B, forming depth-reversed image 123B, and a portion of these light rays 133B are reflected by the surface 430 of transmissive reflector 5030B into light along the reflected paths 143B. The optional corrective optical element placed at 137 just described may also reverse the depth so that second observer 1051 may see relayed image 123C with the same depth profile as the depth profile of surface 123A. In this way observers 1050 and 1051 will see the same holographic images in the same locations.

As previously described, if first observer 1050 sees depth-correct relayed holographic images 121C, 122C, and 123C, then the corresponding light along paths 141B, 142B, and 143B approaching plane 137 on its way to second observer 1051 will be of depth-reversed images 121B, 122B, and 123B. Instead of placing corrective optics at plane 137, it is possible to instead use a third relay system (not shown) to reverse the depths of these depth-reversed images 121B, 122B, and 123B. An observer of this third relay (not shown) will see images relayed by the third relay at locations different from the locations of holographic images 121C, 122C, and 123C perceived by the first observer 1050.

Figure 4C:
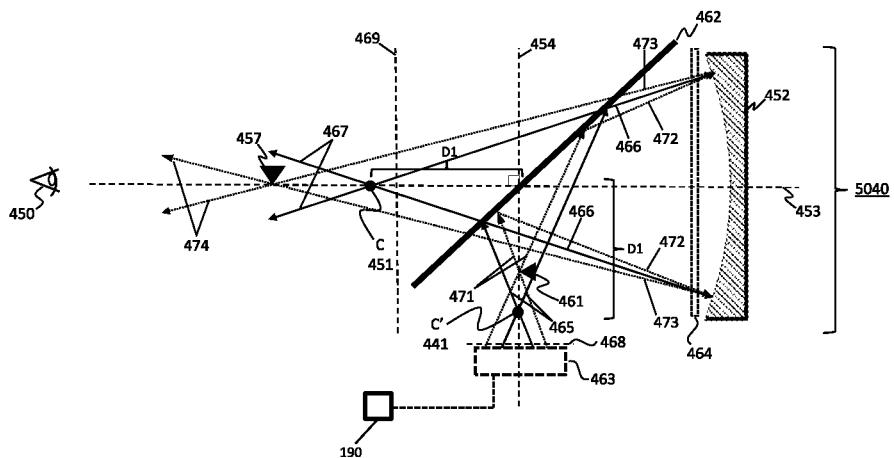
FIG. 4C illustrates an embodiment of a holographic display system having a relay system comprising a concave mirror.

It is possible to use other focusing optical elements, defocusing optical elements, mirrored surfaces, or any combination of these to relay a holographic object volume from a light field display. FIG. 4C shows an embodiment of a display system in which a curved mirror is used as a focusing element in place of a retroreflector to relay a holographic object volume without depth reversal. FIG. 4C shows an orthographic view of a display system with a holographic relay system 5040 comprised of an optical combiner 462 and a concave mirror 452. In an embodiment, the concave mirror 452 may be spherical, parabolic, or some other shape. The optical combiner 462 may be any beam splitter described herein. Since light produced along the vertical axis 454 will be deflected by the optical combiner 462 into light along the optical axis 453 of the mirror 452, the vertical axis 454 is on the optical axis of the mirror 452, and so is a portion of object 461. In other embodiments the object 461 may be displaced fully from the optical axis. The center of the curvature of the mirror C 451 is distance D1 away from the image combiner 462. The point C 451 is the relayed point of point C' 441, which is also the same distance D1 away from the image combiner, on the vertical optical axis 454. A portion of light leaving the point C' 441 along a set of projected light paths 465 will reflect from the image combiner 462 along reflected light paths 466 incident on the mirror 452. The concave mirror 452 and the image combiner 462 are aligned such that the light rays 466 incident on the concave mirror 452 are reflected back through the image combiner 462 along a set of reflected light paths 467 along a return direction substantially parallel but opposite in direction to the set of incident light paths 466. Light along the reflected light paths 467 may converge through point C 451 towards the virtual screen plane 469. The object 461 may be a real-world object, or the surface of a holographic object projected by a LF display 463. Similarly, light rays 471 from surface 461 will reflect from the image combiner 462 into reflected light paths 472 toward the concave mirror 452. Light paths 472 in turn reflect from the concave mirror 452 and back through the image combiner 462 along light paths 474 which contribute to forming a relayed image 457 of the object 461 viewed by observer 450. The optional optical layer 464 may contain polarization-controlling optics, lens elements, diffractive optics, refractive optics, or the like. In one embodiment, as described above for FIG. 3A, optical layer 464 is a quarter wave retarder which may convert linearly polarized light into circularly polarized light, and vice-versa. If a polarization beam splitter 462 is used, the light leaving the beam splitter 462 on the reflected light paths 472 is linearly polarized in a first state. Rays along the light paths 472 may be converted from this first state of linear polarization into a first state of circular polarization incident on the mirror 452, which is converted to a second state of circular polarization orthogonal to the first state upon reflection by the mirror 452, and further converted to a second state of linear polarization orthogonal to the first state of linear polarization by the quarter wave retarder 464. The result is light rays 472 and light rays 474 have opposite states of linear polarization so that almost all the light 471 first striking the optical combiner 462 may be directed to the mirror, and all the light 467 approaching the optical combiner 462 after reflection from the mirror will pass through the polarization beam splitter 462 and contribute to imaging of the relayed object 457 viewed by viewer 450, rather than being deflected. In the case of FIG. 4C where object 461 is a holographic surface projected by the LF display 463 around the display screen plane 468, the holographic object 461 is relayed to relayed holographic object 467 near corresponding relayed virtual screen plane 469 and viewable by an observer 450. In an embodiment, surfaces in the vicinity of point C' 441 are relayed into the vicinity of point C 451.

Another feature of the relay system of FIG. 4C is that objects that are closer to the image combiner 462 than point C' 441 are imaged to a position further than the point C 451 from the image combiner, with magnification, and objects that are further from the image combiner 462 than point C' 441 are imaged to a position closer than the point C 451 from the image combiner 462, with minification. This means that the depth ordering for holographic objects produced in the vicinity of point C' 441 is respected when they are relayed to point C 451. The magnification or minification of objects in the vicinity of point C' 441 may be reduced by increasing the radius of curvature of mirror 452 and/or making the depth range of the projected holographic objects small about point C' 441 relative to the radius of curvature of the mirror 452. While the example illustrated in FIG. 4B shows a spherical mirror, it is possible to use different configurations of mirrors to perform imaging, including parabolic-shaped concave mirrors, and even convex mirrors which may be spherical or parabolic for projection of images with convergence points behind the mirror (to the right of the mirror 452 in FIG. 4C), on the other side of the mirror from the viewer 450. In an embodiment, the display system shown in FIG. 4C may include a controller 190 configured to issue display instructions to the light field display 463 and output light according to a 4D function.

Figure 4D:
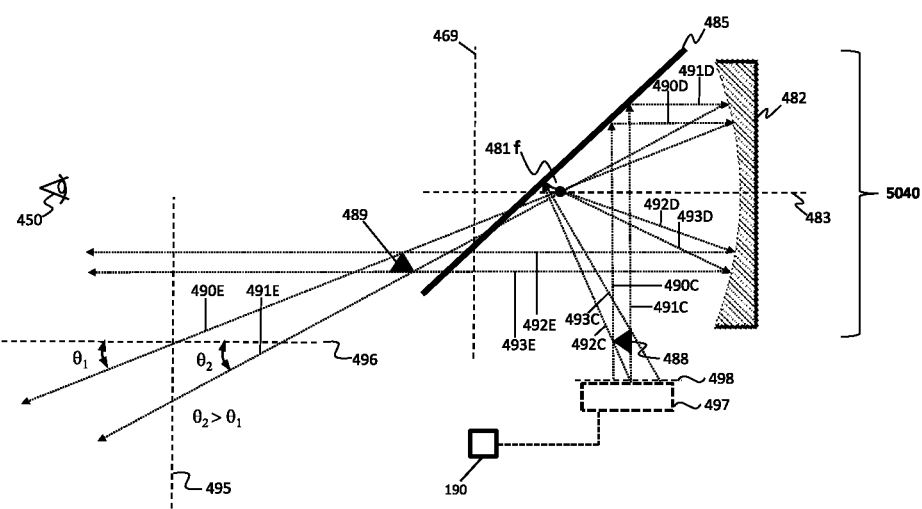
FIG. 4D illustrates another embodiment of a holographic display system having a relay system comprising a concave mirror.

FIG. 4D is an orthogonal view of a display system with a holographic surface 488 being relayed to holographic surface 489 using a holographic relay system 5040 comprised of a curved concave mirror 482 and an image combiner 485, where the holographic surface is offset from the optical axis 483. The point 481 is a focal point of the mirror, which may be spherical, parabolic, or some other shape. As drawn, the surface 488 is a holographic surface projected from a light field display 497, but the imaging described here also works if the surface 488 is a real surface. Image combiner 485 may be any beam splitter discussed in this disclosure. Light paths 490C and 492C are projected at different angles from the light field display 497 and converge to on a vertex of the surface 488. These projected paths 490C and 492C reflect from the image combiner 485 (with some loss for light rays that pass directly through the image combiner, which is not shown) to become light rays along reflected light paths 490D and 492D, which then reflect off the surface of the mirror 482 to become light rays on relayed paths 490E and 492E, respectively, which pass through the beam splitter (with some loss not shown) and converge again at one vertex of the image 489, helping form the image 489. Light rays along paths 491C and 493C are projected at different angles from the light field display 497 and converge to form another vertex of the surface 488. These light rays along 491C and 493C reflect from the image combiner 485 (with some loss not shown) to become light rays along reflected paths 491D and 493D, which then reflect from the surface of the mirror 482 to become light rays on relayed paths 491E and 493E, which pass through the image combiner 485 (with some loss, not shown) and converge again at one vertex of the image 489, helping form the image 489. Light rays along projected paths 492C and 493C reflect as light rays along reflected paths 492D and 493D from the image combiner, and pass through the focal point 481 of the curved mirror 482, turning into rays along relayed paths 492E and 493E, which are parallel to the optical axis 483. Light rays along projected paths 490C and 491C reflect from the beam splitter as light rays along reflected 490D and 491D, respectively, and are parallel to the optical axis before reflecting from the curved mirror 482, so their reflected rays along relayed paths 490E and 491E, respectively, pass through the focal point 481 of the curved mirror 482. In the configuration shown in FIG. 4D, holographic surfaces projected by the LF display 497 around the screen plane 498, which may be the same as the display surface of the LF display 497, are relayed to be projected around the virtual screen plane 469, viewable by an observer 450.

In an embodiment, light rays along projected paths 490C and 491C in FIG. 4D are projected at a normal to the surface of the light field display 497, at a single angle, or equivalently, a single value of light field angular coordinate, which we assign to be u=0 (u is in the plane of the drawing—the orthogonal angular light field coordinate v is not discussed in reference to FIG. 4D, but similar comments apply to v as well). These rays are reflected by the image combiner 485 into rays along reflected paths 490D and 491D, which then reflect from the mirror into rays along the relayed paths 490E and 491E. These two light rays, visible to the observer 450, make different angles $\theta_1$ and $\theta_2$ with a normal 496 to a line 495 parallel with the virtual screen plane 496, and thus contribute two different values of light field angular coordinate u to the imaging of the relayed holographic surface 489. In other words, despite both rays having a single value of light field angular coordinate u=0 as projected by the light field display 497, they have different values of u at the relayed holographic surface 489, and this u value (or equivalently angle) is dependent in part on the position of the object relative to the focal point 481 of the mirror. Also, the two rays along projected paths 492C and 493C, projected at nonzero light field angular coordinates from the light field display 497, reflect from the image combiner 485 and the mirror system to become light rays along relayed paths 492E and 493E, both parallel to each other and parallel to a normal 496 to the virtual screen plane 469, so that they have the same light field coordinate u=0 at this virtual screen plane 469, as viewed by the observer, despite being projected from the light field display 497 with nonzero values of u. In other words, the angular light field coordinates of the holographic surface 488 are rearranged by the holographic relay system 5040 comprised of the image combiner 485 and curved mirror 482 in forming the relayed holographic surface 489.

To correct for this, the angular light field coordinates leaving the screen plane 498 of light field display 497 may be arranged in a compensated manner to achieve the desired angular light field coordinates leaving the relayed virtual screen plane 469. Another perhaps unwanted effect is that the normal to the light field display surface 498, usually the light field angular coordinate u=0, often defines an axis of symmetry for projected rays from the light field display surface 498. The light rays produced at u=0 from the light field display 497, defining axes of symmetry from the light field display surface 498, may be relayed to the virtual screen plane 469 with significant values of u (i.e. angle θ with the normal 496 to the virtual screen plane 469 may vary), especially if the relayed holographic object 488 is offset significantly from the optical axis 483. This may cause the field of view to be altered. In general, to minimize field-of-view changes for holographic surfaces relayed by optical relay system shown in FIG. 4D, the light field display 497 may be centered close to the optical axis so that holographic surfaces such as 488 may relayed to positions 489, also close to the optical axis 483. In an embodiment, the display system shown in FIG. 4D may include a controller 190 configured to issue display instructions to the light field display 497 and output light according to a 4D function.

In some embodiments, the focusing function of the mirror 482 shown in FIG. 4D may be replaced with one or more optical elements such as lenses, mirrors, or some combination of these elements. In one embodiment of a display system, shown in FIG. 4E, the relay system 5040 may be replaced by a relay system 5070 formed with one or more lenses. FIG. 4F shows an embodiment in which lens relay system 5070 comprised of one or more lenses relays the holographic object 437 projected by the light field display 463 to relayed holographic object 438. The one or more lenses including lens 446 and optional lens 447 may have a common optical axis 454 that may be substantially aligned with a normal to the display surface 468. The one or more lenses may perform a focusing function which optically relays the holographic object region around the light field display screen plane 468 to a virtual screen plane 435 near the optical axis but on the far side of the one or more lenses from the light field display 463. Light rays 486A, 487A projected from the surface 468 of light field display 463 contribute to forming the 3D surface of holographic object 437, and these two light rays are relayed by lens 447 into light rays 486B, 487B which are then relayed into light rays 486C, 487C by lens 446 to help form the relayed holographic surface 438 viewed by observer 450. Optical systems with lenses may also contain focus points, resulting in magnification or minification of holographic objects such as 437 as they are relayed. The relay 5070 may relay a projected holographic object 437 that is in close proximity to an effective focal length of the multiple lens 446, 447 system to a relayed location 438 which is at a greater distance from 5070, while relaying a projected holographic object that is further to the right of 437 in FIG. 4E to a relayed location which is at a lesser distance from 5070 to the right of 438 in FIG. 4E. In this case, the relay system 5070 may not reverse the depth profile of a projected holographic object 437, so the relayed surface 438 may have substantially the same depth profile relative to virtual screen plane 435 as the depth profile of 437 relative to the light field display 463 screen plane 468. In an embodiment, the display system shown in FIG. 4E may include a controller 190 configured to issue display instructions to the light field display 463 and output light according to a 4D function.

FIG. 5A shows an orthogonal view of a light field display system comprised of an ideal holographic object relay system 100 which relays two holographic objects projected on either side of a light field display screen plane 1021 at a first location and viewed to a first observer 1048, to two relayed holographic surfaces on either side of a relayed virtual display screen 1022 at a second location and viewed by a second observer 1050. The light field display 1001 may output light along a set of projected light paths that includes light rays along projected light paths 1030Z that help form surface 1015Z in front 1010 of light field display screen plane 1021, and light rays along projected light paths 1036Z that help form object 1016Z behind 1011 the screen plane 1021. Light paths 1035 are traced paths for the light rays 1036Z that originate at the light field display surface, which in this example is collocated with the display screen plane 1021. Under ideal circumstances, the relayed holographic objects 1017A and 1018A on either side of virtual screen plane 1022 appear to observer 1050 exactly as directly projected holographic objects 1015Z and 1016Z appear to observer 1048 in absence of any relay system 100. In other words, the LF display 1001 and the relay system 100 should be configured so that light rays along relayed paths 1032A and 1028A which form relayed holographic surfaces 1017A and 1018A, respectively, reach observer 1050 in the same way that the corresponding light rays along projected paths 1030Z and 1036Z which form the directly projected holographic surfaces 1015Z and 1016Z, respectively, reach observer 1048 in the absence of any relay system 100. From FIGS. 1A, 1B and 3A, and the discussion below, it will be clear that to generate the relayed holographic objects 1032A and 1028A using a practical implementation of a relay system 100, the location, depth profile, and magnification of projected objects 1015Z and 1016Z may have to be adjusted from their locations shown in FIG. 5A, and the light field angular coordinates may have to be rearranged for each of these projected holographic source objects 1015Z and 1016Z. In an embodiment, the display system shown in FIG. 5A may include a controller 190 configured to issue display instructions to the light field display 1001 and output light according to a 4D function.

Figure 5B:
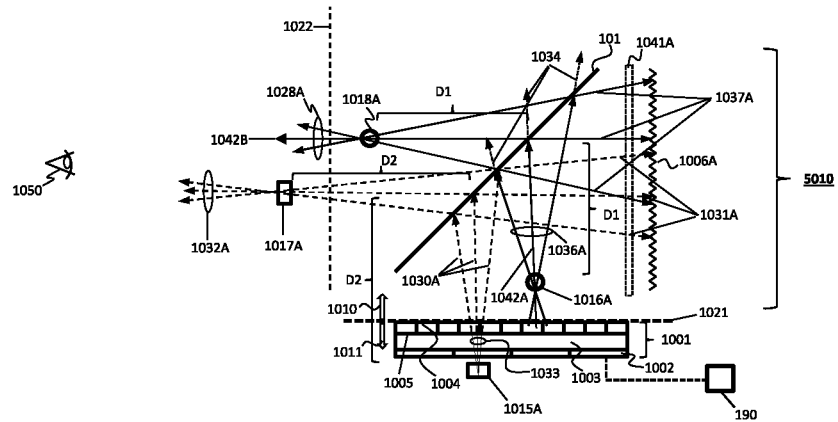
FIG. 5B illustrates an embodiment of holographic display system having a relay system configured to relay first and second holographic surfaces projected by a light field display using a beam splitter and an image retroreflector.

FIG. 5B shows an embodiment of a holographic display system similar to the holographic display system of FIG. 1A. The holographic display system of FIG. 5B includes a first display 1001, which may be a light field display configured to project light along a set of projected light paths 1030A and 1036A to form at least first and second holographic surfaces 1015A and 1016A having first and second depth profiles relative to a display screen plane 1021, respectively. The holographic display system also includes a relay system 5010 positioned to receive light along the set of projected light paths 1030A and 1036A from the light field display 1001 and relay the received light along a set of relayed light paths 1032A and 1028A such that points on the first and second projected holographic surfaces 1015A and 1016A are relayed to relayed locations that form first and second relayed holographic surfaces 1017A and 1018A, having first and second relayed depth profiles relative to a virtual screen plane 1022, respectively.

FIG. 5B shows a holographic relay system 5010 comprised of an image combiner 101 and an image retroreflector 1006A. The light field display 1001 may be similar to the light field display 1001 discussed above respect to FIGS. 1A, 1B, 3A and 5A. The image combiner 101 may be a beam splitter. The light field display 1001 projects out-of-screen holographic surface 1016A on the viewer side 1010 of the screen plane 1021, and in-screen holographic surface 1015A on the display side 1011 of the screen plane 1021. In an embodiment, the light field display 1001 may output light along a set of projected light paths that includes light rays along projected light paths 1036A that help form surface 1016A, and light rays along projected light paths 1030A that help form in-screen surface 1015A (paths 1033 are ray trace lines that don't represent physical light rays). Each of the set of projected light paths 1030A and 1036A has a set of positional coordinates (X,Y) and angular coordinates (U,V) in a four-dimensional (4D) coordinate system defined by the light field display. These light rays may diverge as they approach the beam splitter 101. Some fraction of this incident light is reflected by the beam splitter 101 toward the image retroreflector 1006A along a set of reflected light paths that include paths 1037A from the incident light 1036A and paths 1031A from the incident light 1030A, while the remaining light 1034 not reflected by the beam splitter passes through the beam splitter and may be lost, not contributing to imaging of relayed holographic surfaces 1017A and 1018A. The retroreflector 1006A may contain a fine array of individual reflectors, such as corner reflectors. The retroreflector 1006A acts to reverse each ray of incident light paths 1037A, 1031A in substantially the opposite direction from the approach direction, with no significant spatial offset. Light rays along reflected light paths 1037A reverse their direction upon reflecting from the retroreflector 1006A, substantially retrace their approach angle to retroreflector 1006A, and some fraction of their intensities pass through the beam splitter 101 along relayed light paths 1028A, converging at the location 1018A of a holographic surface. In this way, holographic surface 1016A projected directly by the light field display 1001 is relayed to form relayed holographic surface 1018A. Similarly, rays along light paths 1031A reverse their direction upon reflecting from the retroreflector 1006A, retrace their approach paths to retroreflector 1006A, and some fraction of their intensities pass through the beam splitter along relayed light paths 1032A, converging and forming holographic surface 1017A. In this way, holographic surface 1015A projected directly by the light field display 1001 is relayed to form holographic surface 1017A. The relayed light paths 1028A and 1032A make up a set of relayed light paths that originated from the set of projected light paths from the display 1001 to the beam splitter 101 and then through the set of reflected light paths from the beam splitter 101 to the retroreflector 1006A, and back through the beam splitter 101. In an embodiment, each of the set of relayed light paths has a set of positional coordinates (X,Y) and angular coordinates (U,V) in a four-dimensional (4D) coordinate system as defined by the relay system 5010. In-screen holographic surface 1015A, which is projected at a greater depth than out-of-screen surface 1016A by the light field display 1001, is relayed as surface 1017A, which is now closer to the viewer 1050 than surface 1018A relayed from 1016A. In other words, the depth profile of holographic surfaces 1015A and 1016A projected by the light field display is reversed by the holographic relay system 5010. The vertical distance between holographic surface 1016A and the beam splitter 101 D1 is substantially the same as the horizontal distance between the corresponding relayed holographic surface 1018A and the beam splitter 101. Similarly, the vertical distance D2 between holographic surface 1015A and the beam splitter 101 is substantially the same as the horizontal distance D2 between the relayed surface 1017A and the beam splitter 101. As discussed with regard to the optional optical element 1041A shown in FIG. 1B, the optical element 1041A in FIG. 5B is also an optional optical element. This 1041A may be a quarter wave retarder which may result in a majority of light rays along paths 1031A or 1037A returning to the beam splitter 101 with a linear polarization opposite from that of the light rays leaving the beam splitter 101, whereupon the majority of these light rays will be directed toward the viewer 1050, rather than deflected by the beam splitter 101 and towards the display 1001. Also, the light ray along path 1042A of the projected light paths 1036A from holographic surface 1016A, is projected from the light field display normal to the display screen plane 1021, and usually is assigned to the angular light field coordinate value (u,v)=(0,0). This light ray produces light ray along relayed path 1042B, which helps form relayed holographic surface 1018A. For observer 1050, the light ray 1042B is projected normal to the virtual display plane 1022 and will be perceived as a ray with light field angular coordinate (u,v)=(0,0) to observer 1050. To further generalize, the optical relay system 5010 preserves the light ray at light field coordinate (u,v)=(0,0) to stay at that value, even after being relayed, despite the required rearrangement of light field angular coordinates that is shown in FIG. 2B to reverse depth with the retroreflector configuration shown in FIG. 5B. Alternatively, a corrective optical element may be included in the holographic display system of FIG. 5B to reverse depth. In an embodiment, the corrective optical element 20 shown in FIG. 2A may be disposed in the set of relayed light paths 1028A and 1032A, the corrective optical element is configured to reverse the polarity of the angular coordinates (U,V) of each of the set of relayed light paths such that a viewer perceiving the first and second relayed holographic surfaces 1017A, 1018A through the corrective optical element 20 will perceive a corrected depth order that is the same as the depth order of the first and second holographic surfaces 1015A, 1016A observed in absence of the relay 5010. In an embodiment, the corrective optical element may be disposed in the virtual display plane. In another embodiment, a corrective optical element 20 may be disposed in the set of projected light paths 1030A, 1036A and optically preceding the relay system 5010, and the corrective optical element 20 may be configured to reverse the polarity of the angular coordinates (U,V) of each of the set of projected light paths 1030A, 1036A such that the first and second holographic surfaces 1015A and 1016A have a reversed depth order. In an embodiment, the corrective optical element 20 may be disposed parallel to the display screen plane.

Figure 5C:
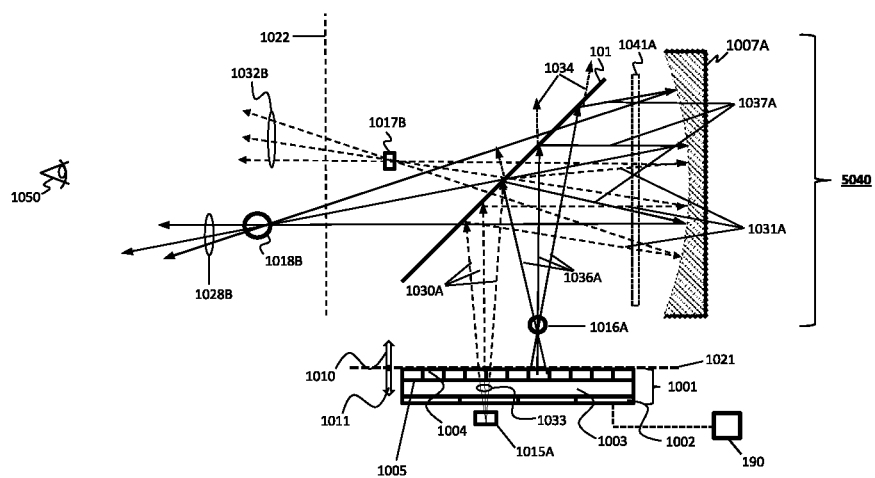
FIG. 5C illustrates an embodiment of a holographic display system having a relay system configured to relay first and second holographic surfaces projected by a light field display using a beam splitter and a concave mirror.

FIG. 5C shows a light field display 1001 comprised of a relay system 5040 similar to the relay system 5040 discussed above with respect to FIGS. 4C and 4D. In an embodiment, the holographic object volume relay 5040 is comprised of an image combiner used to redirect diverging light from holographic surfaces onto a concave reflective mirror 1007A which refocuses this diverging light into relayed holographic surfaces. The image combiner 101 may be a beam splitter. Retroreflector 1006A in FIG. 5B has been replaced with a concave reflective mirror 1007A in FIG. 5C. The concave reflective mirror 1007A can be placed to the right of the beam splitter 101, as shown in FIG. 5C, or placed above the beam splitter 101, orthogonal to the placement shown in FIG. 5C, directly facing the LF display surface 1021 (in the same place as mirror 1007B shown in later diagram FIG. 5E). In other words, the mirror can be placed so that light from LF display 1001 is reflected by the beam splitter, and reflects from the surface of the mirror, or placed so that light from LF display 1001 is transmitted by the beam splitter, and reflects from the surface of the mirror. Later in this disclosure, both orientations will be shown. In the setup shown in FIG. 5C, in an embodiment, the mirror may be a spherical mirror with a radius of curvature approximately equal to the optical path length between the display screen plane 1021 and the surface of the mirror, akin to the mirror center of curvature C' 441 in FIG. 4D being located at or near the screen plane 468 in FIG. 4C. The same holographic surfaces 1015A and 1016A are projected by the light field display 1001 as shown in FIG. 5B along a set of projected light paths 1030A, 1036A. The set of projected light paths 1030A and 1036A may be considered as determined according to a first four-dimensional (4D) function defined by the light field display 1001, such that each projected light path has a set of positional coordinates (X,Y) and angular coordinates (U,V) in a first 4D coordinate system defined with respect to a display screen plane 1021. Light 1030A from holographic surface 1015A reflects from the beam splitter 101 into light rays along reflected light paths 1031A, and rather than being directed backwards along their same path as they were with the retroreflector 1006A in FIG. 5B, these rays are reflected along relayed paths 1032B to converge and form holographic surface 1017B. The relayed holographic surface 1017B is slightly smaller than the source holographic surface 1015A, due to minification performed by the concave mirror corresponding to the optical path length between holographic surface 1015A and the mirror. In an embodiment, the mirror 1007A is a spherical mirror, and the optical path length between the holographic surface 1015A and the mirror 1007A is slightly larger than the radius of curvature of the surface of mirror 1007A. Similarly, light 1036A from holographic surface 1016A reflects from the beam splitter 101 into light rays along reflected paths 1037A, and these rays are reflected along relayed paths 1028B to converge and form holographic surface 1018B. The relayed holographic surface 1018B is slightly larger than the source holographic surface 1016A, due to magnification performed by the concave mirror corresponding to the optical path length between holographic surface 1016A and the mirror. In an embodiment, the mirror is a spherical mirror, and the path length between the holographic surface 1016A and the mirror 1007A is slightly smaller than the radius of curvature of the surface of mirror 1007A. In addition, the depth ordering of the holographic surfaces is conserved by the relay: the source surface 1016A is projected to be in front of the screen plane 1021, and its relayed surface 1018B is also projected in front of virtual screen plane 1022. The source surface 1015A is projected behind the screen plane 1021, and its relayed surface 1017B is also projected behind the virtual screen plane 1022, further from the viewer in each case. Thus, the depth reversal that occurs with the retroreflector in FIG. 5B has been avoided by using the mirror 1007A. Finally, because an image generated by the concave mirror 1007A is flipped, the relayed holographic sphere 1018B is projected to a position beneath the relayed holographic box 1017B, in opposite order to the position of these surfaces that appears in FIG. 5B. The set of relayed light paths 1028B, 1032B may be considered as having been determined according to a second 4D function defined by the relay system 5040, such that each relayed light path has a set of positional coordinates (X,Y) and angular coordinates (U,V) in a second 4D coordinate system defined with respect to a virtual screen plane 1022. The magnification, minification, and position changes of the relayed surfaces 1018B and 1017B are all the effect of the application of the second 4D function in the second 4D coordinate system.

In order to generate the relayed holographic surfaces shown in FIG. 5B to a viewer 1050, some corrections may be made to the holographic surfaces projected by the display shown in FIG. 5C. In an embodiment, the light field display

Figure 5D:
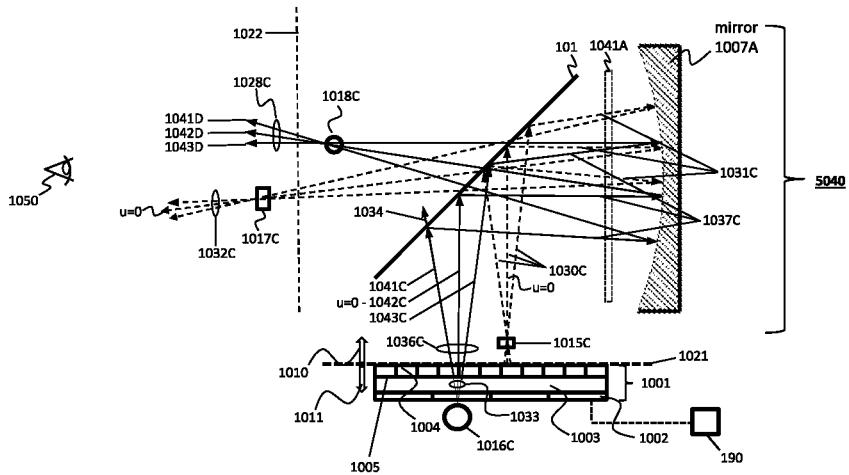
FIG. 5D illustrates an embodiment of correcting the optical effect of the relay system shown in FIG. 5C.

1001 may include a controller 190 configured to receive instructions for accounting for the second 4D function by operating the light field display 1001 to output projected light according to the first 4D function such that the positional coordinates and angular coordinates in the second 4D coordinate system for each of the set of relayed light paths 1028B and 1032B allow the relayed holographic surfaces 1018B and 1017B, respectively, to be presented to a viewer as intended. FIG. 5D illustrates an embodiment of some changes that may be made to the projected objects in the display system of FIG. 5C to correct for the optical effect of the relay system 5040. FIG. 5D shows the position and magnification of the holographic surfaces that would have to be generated by the light field display 1001 if a relay system 5040 with a curved mirror configuration shown in FIG. 5D is used in order to display much the same holographic objects that a viewer 1050 would see in FIG. 5B. Holographic surface 1015A in FIG. 5C would have to be projected to the position of holographic surface 1015C in FIG. 5D and made slightly smaller to compensate for the magnification that results from the surface 1015C being a closer distance to the mirror 1007A. Holographic surface 1016A in FIG. 5C would have to be projected into the position of holographic surface 1016C in FIG. 5D and magnified to compensate for the minification of the relayed holographic surface that occurs at a greater distance from the mirror 1007A. The positions of holographic surfaces 1015C and 1016C are right-left swapped, relative to 1015A and 1016A in FIG. 5C to account for the inversion of the image that occurs with reflection due to the mirror. The result is that holographic surface 1015C is relayed into 1017C, in precisely the same place as 1017A in FIG. 5B, and holographic surface 1016C is relayed into 1018C, in precisely the same place as 1018A in FIG. 5B.

In FIG. 5D, the group of light rays along projected light paths 1036C, which form the projected holographic sphere surface 1016C, are comprised of light rays 1041C, 1042C, and 1043C. These light rays are reflected by the image combiner 101 into light paths 1037C, which are reflected by the mirror 1007A into light ray group 1028C, comprised of light rays 1041D, 1042D, and 1043D, and forming the relayed holographic surface 1018C. In a similar way, in FIG. 5B, the group of light rays along projected light paths 1036A from the holographic sphere surface 1016A map to the group of light rays along relayed light paths 1028A that form the relayed holographic surface 1018A. Upon close inspection of FIG. 5B, the middle ray 1042A projected normal to the screen plane 1021 (or display surface 1021) in FIG. 5B, often associated with a light field angular coordinate (u,v)=(0,0), maps to the middle ray 1042B which is normal to the virtual screen plane 1022 viewed by viewer 1050. In other words, for the retroreflector configuration shown in FIG. 5B, the light ray produced at (u,v)=(0,0) is preserved, despite the fact that the angular coordinates u and v may be swapped as shown in FIG. 2B to correct the reversal of depth. However, in the curved mirror relay configuration shown in FIG. 5D, where no reversal of depth occurs, the center light ray 1042C in the group of projected light rays 1036C projected normal to the screen plane 1021 of light field display 1001, often associated with a light field angular coordinate (u,v)=(0,0), maps to the middle ray 1042D which may not be normal to the virtual screen plane 1022 viewed by viewer 1050. This is the same behavior that is shown in FIG. 4D, where light rays 490C and 491C projected normal to the display surface 497 produce light rays 490E and 491E, respectively, which generate angles $\theta_1$ and $\theta_2$ that vary with respect to the normal to the virtual screen plane 469, depending in part on the location the rays intersect the holographic surface 488. The result is that if this is uncorrected, the viewer will not see the correct light field information from the light ray 1042D. In the example that a specular highlight is projected by the light field display 1001 in FIG. 5D along light ray along the projected light path 1042C, this specular highlight will appear on relayed light path 1042D at an angle to the normal of virtual screen plane 1022. To correct for this, the color and intensity information that is projected on the (u,v)=(0,0) ray along projected path 1042C in absence of relay system 5040 should instead be projected on light ray along the projected path 1043C if the relay system 5040 is in place so that this information will appear on mapped ray along the corresponding relayed path 1043D, which is the (u,v)=(0,0) ray relative to the virtual screen plane 1022 and the observer 1050. In other words, some remapping of light field coordinates may be made on the light field display 1001 (in addition to the magnification adjustments previously described) in order to relay a holographic surface using a relay optical configuration with a curved mirror 1007A. Similarly, in FIG. 5D, light rays 1030C projected by the light field display 1001 and forming holographic object 1015C may also have a center ray at (u,v)=(0,0). These light rays 1030C are directed into light rays 1031C by the image combiner 101, which are then reflected into light rays 1032C which pass through the image combiner 101 and converge to help form relayed holographic object 1017C, with the center ray no longer perpendicular to the virtual screen plane 1022. In FIG. 5D, the light paths 1030C forming projected holographic object surface 1015C and light paths 1036C forming projected holographic surface 1016C are each determined according to a four-dimensional function defined by the light field display 1001 such that each projected light path has a set of spatial coordinates and angular coordinates in a first four-dimensional coordinate system with respect to the light field display screen plane 1021. The holographic surfaces 1015C and 1016C are relayed to relayed surfaces 1017C and 1018C, respectively, wherein relayed locations of the relayed image surfaces 1017C and 1018C are determined according to a second 4D function defined by the relay system 5040, such that light paths from the light field display 1030C, 1036C are relayed along relayed light paths 1032C, 1028C, each having a set of spatial coordinates and angular coordinates in a second 4D coordinate system, respectively. In an embodiment, the light field display 1001 comprises a controller 190 configured to receive instructions for accounting for the second 4D function by operating the light field display 1001 to output light according to the first 4D function such that the positional coordinates and angular coordinates in the second 4D coordinate system for the relayed light paths 1032C, 1028C allow the relayed image surfaces 1017C and 1018C to be presented to a viewer 1050 as intended.

Under the circumstance where the LF display 1001 produces unpolarized light, and an unpolarized 50% beam splitter 101 is used, about half the light from holographic surfaces 1015C and 1016C is lost upon the first pass through the beam splitter 101, and another half of the light is lost upon the second pass through the beam splitter 101, resulting in no more than 25% of the light from the holographic surfaces 1015C and 1016C being relayed. If a polarized beam splitter 101 is used, then it is possible that half of unpolarized light from the holographic surfaces 1015C and 1016C is lost upon the first reflection from the beam splitter 101, but the remaining light directed toward the mirror 1007A will be in a known first state of linear polarization. With a quarter wave retarder used for the optional optical element 1041A, the light returning from the mirror may be mostly in a known second state of linear polarization, orthogonal to the first state, and mostly be transmitted through the polarized beam splitter 101, contributing to the relayed holographic surfaces 1017C and 1018C. Under these circumstances, between 25% and 50% of the light from the holographic surfaces 1015C and 1016C may be relayed to holographic surfaces 1017C and 1018C. If the light field display 1001 produces polarized light, this efficiency can be increased substantially with the use of a polarized beam splitter 101 and a quarter wave retarder 1041A.

The relay 5040 of the configuration shown in FIG. 5D may be used as one or more of the relays in a holographic relay system comprised of two relays, as shown in FIG. 3B. In FIG. 3B, both of the relays 130 and 140 may be replaced with relay systems 5040, but in FIG. 3C, only relay 130 may be replaced by relay 5040, since relay 140 requires light to be transmitted in two different directions. In another embodiment, two substantially identical relays 5040 are used in the holographic relay system configuration shown in FIG. 3B, and the effects of the minification, magnification, and rearranging of light field angular coordinates (u,v) for the first relay 130 described above in reference to FIG. 5D are at least partially reversed by the second relay 140.

Figure 5E:
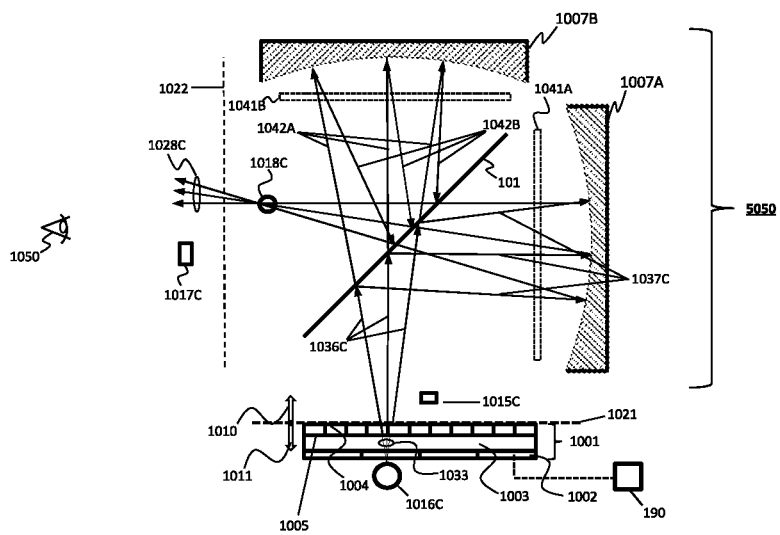
FIG. 5E illustrates an embodiment of a holographic display system having a relay system configured to relay first and second holographic surfaces projected by a light field display using a beam splitter and a plurality of concave mirrors.

In FIG. 5D, half of the light from light paths 1036C or 1030C from the holographic surfaces 1016C or 1015C, respectively, may be wasted since it passes through the beam splitter 101 into light rays along transmitted paths 1034 as shown in FIG. 5C. It is possible to add another mirror 1007B, identical to mirror 1007A, placed opposite to the display 1001A on the other side of the beam splitter 101, and orthogonal to mirror 1007A. FIG. 5E is an orthogonal view of a light field display system comprising a holographic relay system 5050 comprised of a beam splitter 101 and two concave mirrors 1007A, 1007B placed orthogonally to one another to achieve a high efficiency for light transmission from projected holographic surfaces to relayed holographic surfaces. This configuration is similar in concept to the second retroreflector 1006B which appears in FIG. 1B. Although curved mirror 1007A is marked as optional in the relay 5050 shown in FIG. 5E, the relay 5050 operates with curved mirror 1007A present and curved mirror 1007B absent, curved mirror 1007A absent and curved mirror 1007B present, or with both curved mirrors 1007A and 1007B present. These variations of configurations of relay 5050 will be presented in this disclosure. With both curved mirrors present, light rays along the projected paths 1036C from holographic surface 1016C either are reflected by the beam splitter into reflected light paths 1037C directed toward the mirror 1007A, or pass through the beam splitter into transmitted light paths 1042A directed toward the mirror 1007B. Light paths 1037C directed toward mirror 1007A reflect into light paths which are again incident on the beam splitter 101, and a fraction of this light is transmitted through to relayed paths 1028C (while the remaining fraction of this light incident on the beam splitter 101, not shown, is directed downward back toward the light field display 1001). Light paths 1042A directed toward mirror 1007B reflect into light paths 1042B, which are incident on the beam splitter 101, and a fraction of this light is reflected into paths 1028C, combining with the paths of light reflected by mirror 1007A (while the remaining fraction of this light, not shown, is transmitted through the beam splitter 101 and directed back toward the light field display 1001). The same is true for light from holographic surface 1015C, being relayed into holographic surface 1017C, but these light paths are not shown in FIG. 5D. In an embodiment, the concave mirrors 1007A and 1007B and the beam splitter 101 are aligned such that the light along paths 1028C reflected from mirrors 1007A and 1007B substantially overlap.

Under the circumstance where the LF display 1001 produces unpolarized light, and an unpolarized 50% beam splitter 101 is used, almost all the light from holographic surfaces 1015C and 1016C is directed to either mirror 1007A or 1007B. Upon returning, at most half of the light reflected from each mirror may be transmitted through the beam splitter 101 toward the display, and not contribute to imaging of relayed holographic surfaces 1016C or 1017C. This gives an upper limit of 50% of efficiency for light from holographic surfaces 1015C and 1016C to be relayed to holographic surfaces 1017C and 1018C. However, using a polarization beam splitter as well as a quarter wave retarder as the optional optical elements 1041A and 1041B, as described in the discussion of FIG. 1A as well as FIG. 5D, a substantially higher efficiency may result, since most of the light directed toward each mirror has a specific linear polarization which may be rotated by 90 degrees on its return trip back toward the beam splitter, resulting in most of the light of two different reflected polarizations being recombined as it is directed to the relayed holographic surfaces 1017C and 1018C.

In some embodiments, the focusing function of the mirrors 1007A and 1007B shown in FIGS. 5C-5E may be replaced with one or more optical elements such as lenses, mirrors, or some combination of these elements. In one embodiment, the entire relay system 5040 of FIGS. 5C-5D may be replaced with a relay formed with one or more lenses such as the lens relay system 5070 shown in FIG. 4E.

Figure 5F:
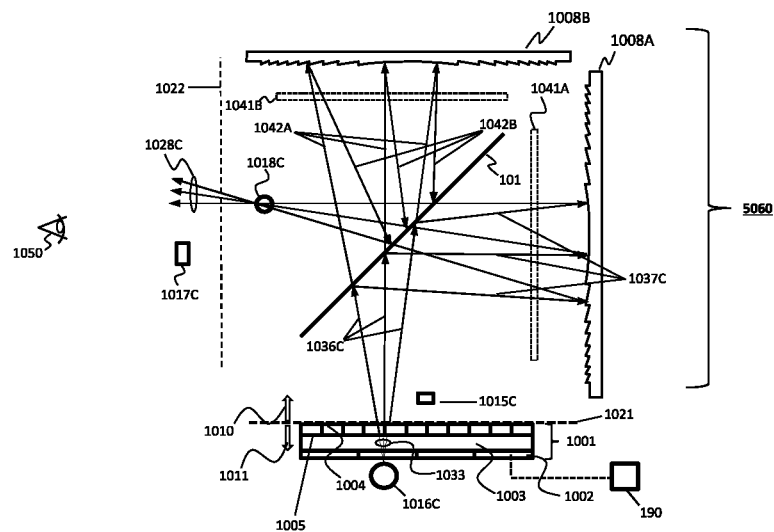
FIG. 5F illustrates an embodiment of a holographic display system having a relay system configured to relay first and second holographic surfaces projected by a light field display using a beam splitter and a plurality of reflective Fresnel mirrors.

It is possible to use more compact Fresnel mirrors in place of the curved mirrors 1007A and 1007B in FIG. 5E. FIG. 5F is an orthogonal view of a light field display with a holographic relay system 5060 comprised of a beam splitter 101 and two reflective Fresnel mirrors 1008A, 1008B placed orthogonally to one another to achieve a high efficiency for light transmission from projected holographic surfaces to relayed holographic surfaces. This relay 5060 configuration is the same as the relay 5050 configuration of FIG. 5E, except the curved mirrors 1007A and 1007B have been replaced with Fresnel mirrors 1008A and 1008B. The numbering of FIG. 5E applies to FIG. 5F, and the operation of relay 5060 with Fresnel mirrors is very similar to the operation of relay 5050 with curved mirrors. Although Fresnel mirror 1008A is marked as optional in the relay 5060 shown in FIG. 5F, the relay 5060 operates with Fresnel mirror 1008A present and Fresnel mirror 1008B absent, Fresnel mirror 1008A absent and Fresnel mirror 1008B present, or with both Fresnel mirrors 1008A and 1008B present. These variations of the configuration of relay 5060 will be presented in this disclosure.

Figure 5G:
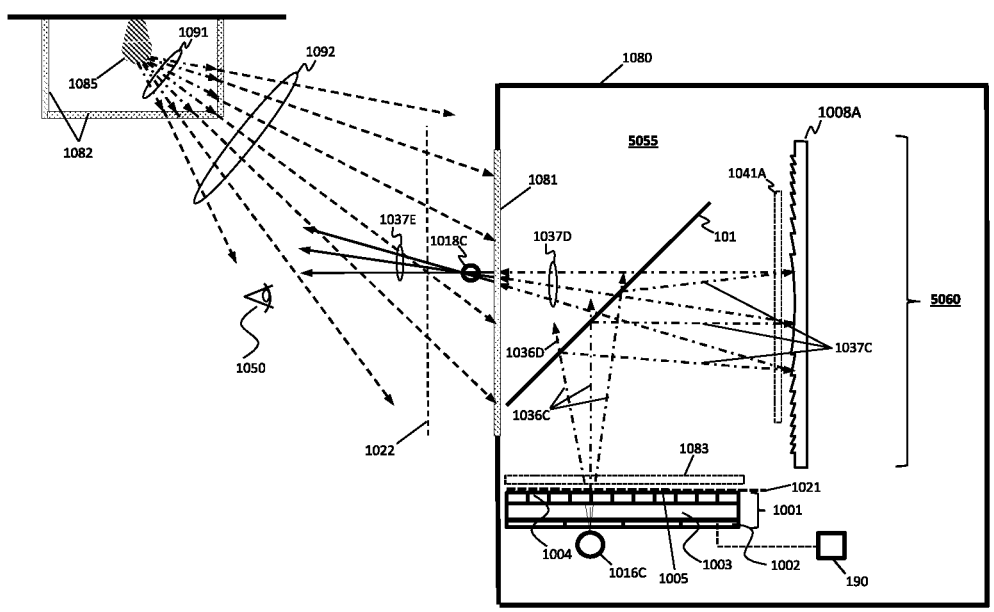
FIG. 5G illustrates an ambient light rejection system using the configuration of FIG. 5F.

Many of the display systems in this disclosure are designed to relay light from one or more light sources through a relay system and to an observer. For the purposes of avoiding unwanted scattering and reflection within these display systems, it is best to avoid directing light into the display system in a direction opposite to the direction of the light from relayed objects observed by one or more viewers. It is not always possible to keep the viewing area for relayed objects presented by a display system in the dark. FIG. 5G shows the display system of FIG. 5F confined to a light blocking enclosure 1080 with a polarization filter 1081 used as a window in the path of relayed light paths 1037C forming the surface 1018C of a relayed holographic object. The numbering of FIG. 5F is used in FIG. 5G. The polarization filter 1081 may only pass light 1037E of a first state of polarization (denoted by the solid lines 1037) while absorbing the remainder of the light (not shown). The environmental light source 1085 produces light of two polarizations 1091 (denoted by dot-dashed lines), but a light source polarization filter 1082 only allows light 1092 of a second state of polarization (denoted by dashed lines) to pass through and illuminate the environment around the display system 5055, and this light will not pass through the polarization filter 1081 window of the display system 5055. This means that the environmental ambient light 1092 cannot enter into the display system 5055 and reflect or scatter from elements within the relay or any other components in display system 5055. In an embodiment, a polarized light source 1085 may be used without a light source polarization filter 1082. It should be appreciated that the ambient light rejection system formed by ambient light polarization filter 1082, the light blocking enclosure 1080, and the display system polarization filter window may be used for any of the display systems with relays presented in this disclosure.

Within display system 5055 in FIG. 5G, the light rays 1036C forming projected holographic object 1016C may be of unpolarized light, denoted by dot-dashed lines. These light rays 1036C pass through an optional optical element 1083 and are partially reflected into light rays 1037C by the image combiner 101 and partially transmitted 1036D through the image combiner. The deflected light rays 1037C pass through the optional optical element 1041A and reflect from Fresnel mirror 1008A into light rays 1037D. The portion of the light rays 1037D in a first state of polarization are passed by the polarization filter window 1081, while the portion of the light rays 1037D that are in an orthogonal second state of polarization are absorbed by the polarization filter window 1081. Environmental light 1092 of a second state of polarization cannot enter through the polarization filter window 1081, eliminating the chance for reflection of these unwanted rays of light within the display system 5055 and back out of the display system to the observer 1050. The optional optical elements 1083 and 1041A within the display system 5055 may be used to control polarization in a more purposeful manner. For example, it may be desirable to minimize the fraction of light 1036C which is passed directly through the image combiner 101 into light rays such as 1036D, since light rays such as 1036D can reflect from surfaces within the enclosure 1080 and exit the enclosure 1080 through the polarization filter window 1081 as scattered light.

Figure 5H:
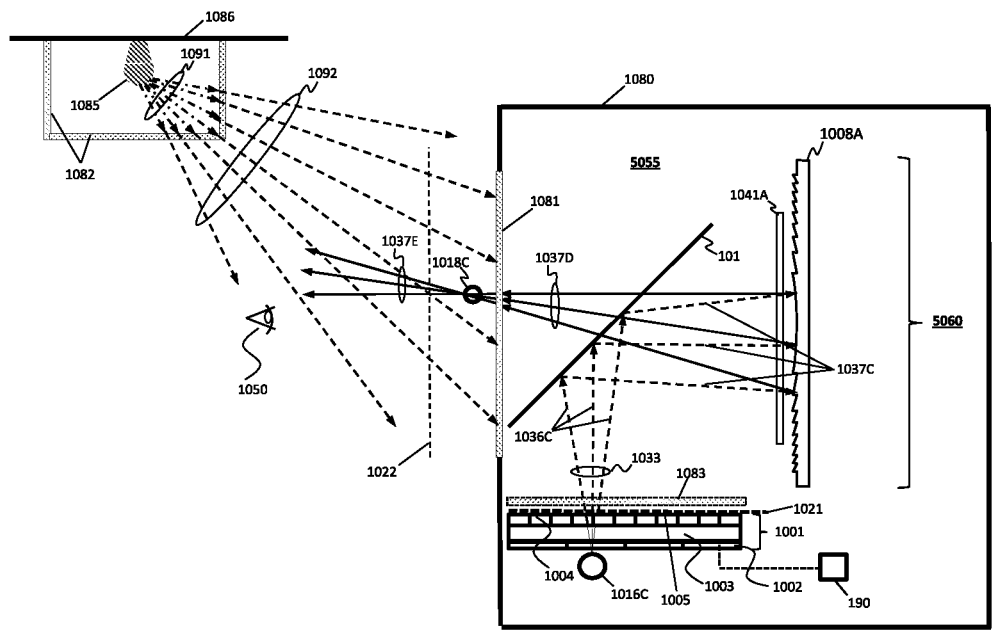
FIG. 5H illustrates the use of polarization controlling elements with an ambient light rejection system.

FIG. 5H shows the display system of FIG. 5G with a display polarization filter 1083 used in the path of the light field display, a quarter wave retarder used in the path of light rays which approach and reflect from the Fresnel mirror 1008A, and a polarization beam splitter 101. The light field display may project unpolarized light, and the display polarization filter 1083 may only pass light of a second state of polarization, denoted by the dashed lines 1036C. In an embodiment, the light field display 1001A may produce only light of a second polarization, and the polarization filter 1083 is not needed. A polarization beam splitter may be use as image combiner 101, wherein the polarization beam splitter passes a first state of polarization and deflects a second state of polarization. Since the incident light 1036C is only of a second state of polarization, almost all the light 1036C is deflected toward the Fresnel mirror 1008. The light of a second state of polarization 1037C (dashed lines) is mostly converted into reflected light 1037D of a first state of polarization (solid lines) by passing through the quarter wave retarder 1041A, reflecting from the surface of a mirror 1008A, and passing through the quarter wave retarder 1041A once again. The light 1037D passes through the polarization filter window 1081 into light rays 1037E of a first state of polarization (solid lines) to form relayed holographic object surface 1018C. Ambient light 1092 of a second state of polarization (dashed lines) cannot enter into the display system 5055 through polarization filter window 1081, avoiding unwanted scatter.

Figure 6:
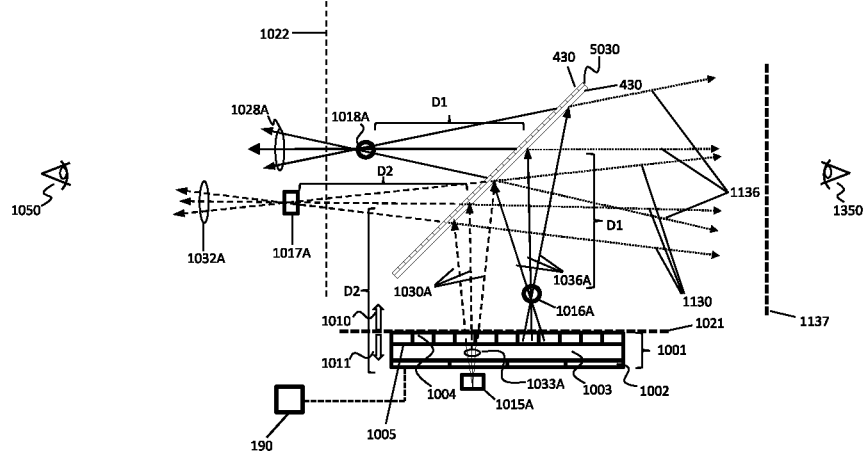
FIG. 6 illustrates an embodiment of a holographic display system having a relay system configured to relay first and second holographic surfaces projected by a light field display using a transmissive reflector.

FIG. 6 shows an embodiment of a display system which relays holographic surfaces projected by a light field display 1001 using a transmissive reflector 5030 as shown in FIG. 3A. The light field display 1001 projects out-of-screen holographic surface 1016A on the viewer side 1010 of the screen plane 1021, and in-screen holographic surface 1015A on the display side 1011 of the screen plane 1021. Projected light rays along the projected light paths 1036A that converge on the surface of holographic surface 1016A, and projected light rays along the projected light paths 1030A that converge at in-screen holographic surface 1015A (see the ray trace lines 1033) all diverge as they approach the transmissive reflector 5030. The transmissive reflector 5030 is positioned to receive light along the set of projected light paths 1030A, 1036A and direct the received light along the set of relayed light paths 1032A, 1028A respectively. In an embodiment, each of the set of projected light paths 1030A, 1036A has a set of positional coordinates (X,Y) and angular coordinates (U,V) in a four-dimensional (4D) coordinate system defined with respect to the display screen plane 1021. In an embodiment, each light path in the set of relayed light paths 1032A, 1028A has a unique set of positional coordinates (X,Y) and angular coordinates (U,V) in a four-dimensional (4D) coordinate system defined with respect to the virtual screen plane 1022. Further, in an embodiment, an external surface 430 of the transmissive reflector 5030 reflects a second portion of the received light along a set of reflected light paths 1130, 1136 in a second direction opposite the first direction. In an embodiment, a first portion of the light 1030A from projected holographic surface 1015A is received and relayed by relay 5030 into light ray group 1032A which forms relayed holographic surface 1017A, while a second portion of the light 1030A is reflected from the surface 430 of relay 5030 into light rays 1130, where the relayed light rays 1032A and the corresponding reflected light rays 1130 substantially overlap, allowing both viewers 1050 and 1350 to observe the same holographic surface 1017A. Similarly, a first portion of the light 1036A from projected holographic surface 1016A is received and relayed by relay 5030 into light ray group 1028A which forms relayed holographic surface 1018A, while a second portion of the light 1036A is reflected from the surface 430 of relay 5030 into light rays 1136, where the relayed light rays 1028A and the corresponding reflected light rays 1136 substantially overlap, allowing both viewers 1050 and 1350 to observe the same holographic surface 1018A. Observers 1050 and 1350 will observe the holographic surface as it were really there—so if the surface of a person's face 1016A is being projected such that the corresponding relayed holographic surface 1018A appears to be a depth-reversed face to viewer 1050, the face will appear to have normal depth to the opposing viewer 1350.

Notice that projected surface 1015A is further from the viewer than projected surface 1016A, but is relayed into relayed surface 1017A which is closer to the viewer than the other relayed object 1018A. The vertical distance between holographic surface 1016A and the relay 5030 D1 is substantially the same as the horizontal distance between its corresponding relayed holographic surface 1018A and the relay 5030. Similarly, the vertical distance D2 between holographic surface 1015A and the relay 5030 is substantially the same as the horizontal distance between its corresponding relayed surface 1017A and the relay 5030. An observer 1050 will see holographic surface 1017A floating in space next to but closer than holographic surface 1018A. An observer 1350 will see the holographic surface 1018A floating in space next to but closer to holographic surface 1017A. If the holographic source surfaces 1015A and 1016A are rendered prior to being displayed in order to achieve the correct depth ordering of relayed holographic surfaces 1017A and 1018A as observed by viewer 1050, which means the depth of surfaces is reversed about the screen plane 1021 and the light field angular coordinates U-V are reversed as shown in FIGS. 2B and 2C, and discussed in reference to FIGS. 1A and 5B above, then the U-V coordinates will be reversed for the surfaces reflected from the surface of transmissive reflector 5030 and observed at 1350. In other words, the depth may not appear correctly for holographic surface 1017A or 1018A for an observer 1350 viewing light rays 1130 or 1136, respectively. To correct for this, it is possible to place a correction optical element similar to that shown in FIG. 2A at the plane 1137 in order to perform U-V coordinate reversal for the set of the reflected light paths 1130, 1136. In another embodiment, with a different light field rendering of holographic surfaces 1015A or 1016A, and with no correction optical element at plane 1137, the observer 1350 may perceive the holographic surfaces 1017A and 1018A with the correct depth ordering, and a corrective optical element 20 similar to that shown in FIG. 2A may be placed at the virtual display plane 1022 to allow observer 1050 to also view the holographic surfaces 1017A and 1018A with the correct depth ordering. In other words, if the correction optical element 20 like that shown in FIG. 2A is used to allow both observers 1050 and 1350 to see the holographic surfaces 1017A and 1018A with the correct depth, they can be placed at plane 1022 or 1137, depending on whether the light field rendering of holographic surfaces from the light field display 1001 contains steps which reverse the depth around the screen plane 1021 by reversing the polarity of the U-V coordinates as shown in FIG. 2B.

Figure 7:
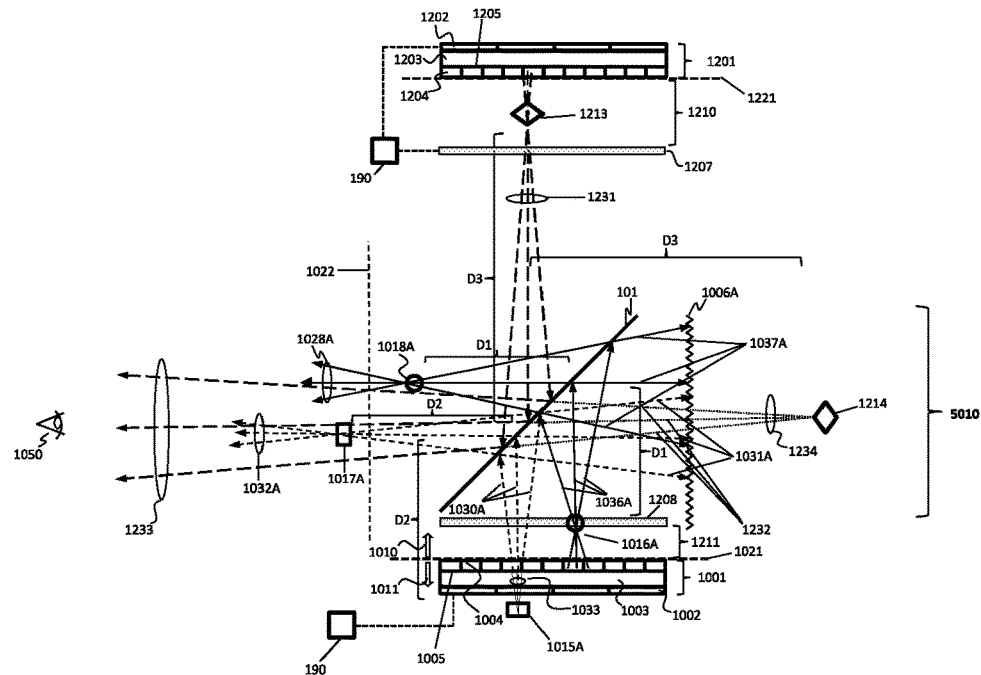
FIG. 7 illustrates an embodiment of a holographic display system having a first relay system configured to relay first and second holographic surfaces projected by a light field display and relay a third surface projected by a second display.

FIG. 7 illustrates a holographic display system that is the same as the holographic system of FIG. 5B with the addition of another display 1201 opposite the first display 1001. The numerical labeling from FIG. 5B applies to FIG. 7. The relay system 5010 is comprised of an image combiner 101 and a retroreflector 1006A. If 1201 is a light field display, then the light field display 1201 may be configured as the light field display 1001 discussed above with respect to FIG. 1A, with one or more display devices 1202 containing a plurality of light source locations, an imaging relay 1203 which may or may not be present which acts to relay images from the display devices to an energy surface 1205, and an array of waveguides 1204 which project each light source location on the energy surface into a particular direction in three dimensional space. The energy surface 1205 may be a seamless energy surface that has a combined resolution that is greater than any individual display device 1202, while plane 1221 is the screen plane of 1201, which may coincide with the display surface. If 1201 is a traditional 2D display, then relays 1203 and/or waveguides 1204 may be absent. Display 1201 may display a 2D image (not shown) or a holographic surface 1213. The rays along an additional set of projected light paths 1231 leaving the display 1201 reflect from the surface of the beam splitter 101, forming diverging ray group along an additional set of relayed light paths 1233, which can be ray traced back through imaginary paths 1234 to reveal a convergence point at a perceived holographic surface 1214. The vertical distance D3 between the projected holographic surface 1213 and the beam splitter 101 is substantially equal to the horizontal distance between the beam splitter and the perceived holographic surface 1214. An observer 1050 will see holographic surfaces 1017A, 1018A, and displayed surface 1214, which may or may not be holographic depending on whether display 1201 is a light field display. Using a 2D display as 1201, it is possible to create a uniform background imaging plane that can be placed at any reasonable distance from the observer 1050 depending on the distance between display 1201 and beam splitter 101. An occlusion system 1207 with individually addressable occlusion elements may block some light from the display 1201. The occlusion system 1207 may be comprised of one or more of: a transparent LED panel, a transparent OLED panel, an LC panel, a portion of a LCD panel (e.g. without a backlight or reflectors), a parallax barrier, a real-world physical object, a mask placed on a glass plane, or some other type of panel that may fully or partially block light at select locations and or select angles. The occlusion system 1207 can be placed in the path of display 1201 at distance 1210 from the screen plane 1221 of display 1201 in order to block some or all of the light from display 1201. The occlusion system 1207 may be considered an occlusion barrier with individually addressable occlusion regions which block all or a portion of the light 1231 from display 1201. The occlusion system 1207 may be placed at the same distance from the display as the projected holographic object 1213 and have a position which is adjustable. The occlusion system 1207 can be used to block out portions of the surface 1213 from reaching the relay 5010, in the event that relayed holographic surface 1017A or relayed holographic surface 1018A occludes perceived holographic surface 1214, and both images are not desired to be displayed at the same time. If the occlusion system 1207 is a portion of an LCD panel containing one or more polarizers and a liquid crystal (LC) layer, the beam splitter can be a polarization beam splitter that is selected to reflect 100% of the polarized light passing through 1207. Similarly, an occlusion system 1208 can be placed above light field display 1001 at a distance 1211 in order to block all or some of the light from display 1001. The occlusion systems 1207 and 1208 may not be necessary to avoid occlusion problems if 1201 is a light field display, since coordinated rendering of both of the light field displays 1001 and 1201 can be used to avoid occlusion. In an embodiment, the display system shown in FIG. 7 may include a controller 190 configured to issue display instructions to the light field display 1001 to output light according to a 4D function. The controller 190 may issue coordinated instructions to the other display 1201 and the occlusion system 1207 to present the holographic surfaces 1017A, 1018A, and surface 1214 as intended. It is to be appreciated the various embodiments in above discussions with respect to FIG. 7 may be implemented in part or in whole in other embodiments of the holographic display systems of the present disclosure, including those in FIGS. 4C-4D and FIGS. 5C-5D. For example, the second display 1201 and occlusion systems 1207 and 1208 discussed above may be implemented to work with a relay system that includes at least one concave mirror as described in FIG. 5C.

Figure 8A:
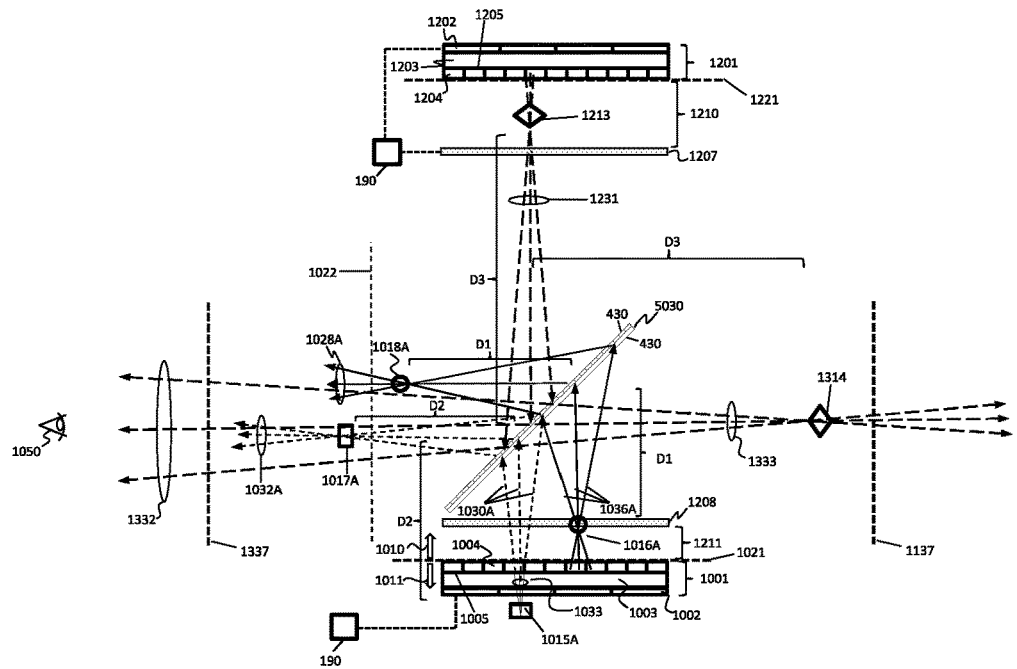
FIG. 8A illustrates an embodiment of a holographic display system having a second relay system, a plurality of displays, and an occlusion layer.

FIG. 8A is a holographic display system that is the same as the holographic display system of FIG. 7 with the relay system 5010 replaced by transmissive reflector relay 5030. The numbering of FIG. 7 is used in FIG. 8A. A first portion of the projected light rays 1231 forming holographic object 1213 may partially reflect from the surface of the transmissive reflector 5030, forming diverging ray group 1332. A second portion of the projected light rays 1231 will be received and relayed to light rays 1333 forming relayed holographic object 1314, where the relayed light paths 1333 substantially overlap with the reflected light paths 1332. The vertical distance D3 between the displayed surfaces 1213 and the transmissive reflector relay 5030 may be substantially equal to the horizontal distance between relay 5030 and the relayed holographic surface 1314. An observer 1050 will see holographic surfaces 1017A, 1018A, and displayed holographic surface 1314. In another embodiment, 1201 is a 2D display rather than a light field display, and observer 1050 sees holographic surfaces 1017A, 1018 in front of a 2D background positioned at virtual plane 1137. Using a 2D display as display 1201, it is possible to create a uniform background imaging plane that can be placed at any reasonable distance from the observer 1050 depending on the distance between display 1201 and transmissive reflector 5030. The occlusion systems 1207 and 1208 may not be necessary to avoid occlusion problems if 1201 is a light field display, since a controller 190 may issue coordinated display instructions for both of the light field displays 1001 and 1201 to support proper computational occlusion of relayed background objects 1018A, 1214 behind foreground objects 1017A. A corrective optical element 20 from FIG. 2A or similar configurations that reverse the polarity of the angular 4D light field coordinates U, V may be placed at virtual plane 1137 and not virtual plane 1337, or virtual plane 1337 and not virtual plane 1137, or at both locations, or at none. Also, corrective optical element 20 placed at planes 1337 and 1137 may both be moved closer or further away from the transmissive reflector 5030. Another option is to have corrective optics 20 from FIG. 2A or similar configurations, which reverse the polarity of U, V coordinates placed just above the screen plane 1021 of the light field display 1001. Finally, system 130 can be built using a mirror in place of transmissive reflector 5030, which may result in two independent views at observer 1050 on the left of 5030 and an observer located on the right of 5030 (not shown), where each observer would only be able to see holographic surfaces from a single display. It is to be appreciated the various embodiments in above discussions with respect to FIG. 8*a* may be implemented in part or in whole in other embodiments of the holographic display systems of the present disclosure, including those in FIGS. 4C-4D and FIGS. 5C-5D. For example, the second display 1201 and occlusion systems 1207 and 1208 discussed above may be implemented to work with a relay system that includes at least one concave mirror as described in FIG. 5C. In an embodiment, the display system shown in FIG. 8A may include a controller 190 configured to issue display instructions to the light field display 1001 to output light according to a 4D function. The controller 190 may issue coordinated instructions to the other display 1201 and the occlusion system 1207 to present the holographic surfaces 1017A, 1018A, and surface 1314 as intended.

Figure 8B:
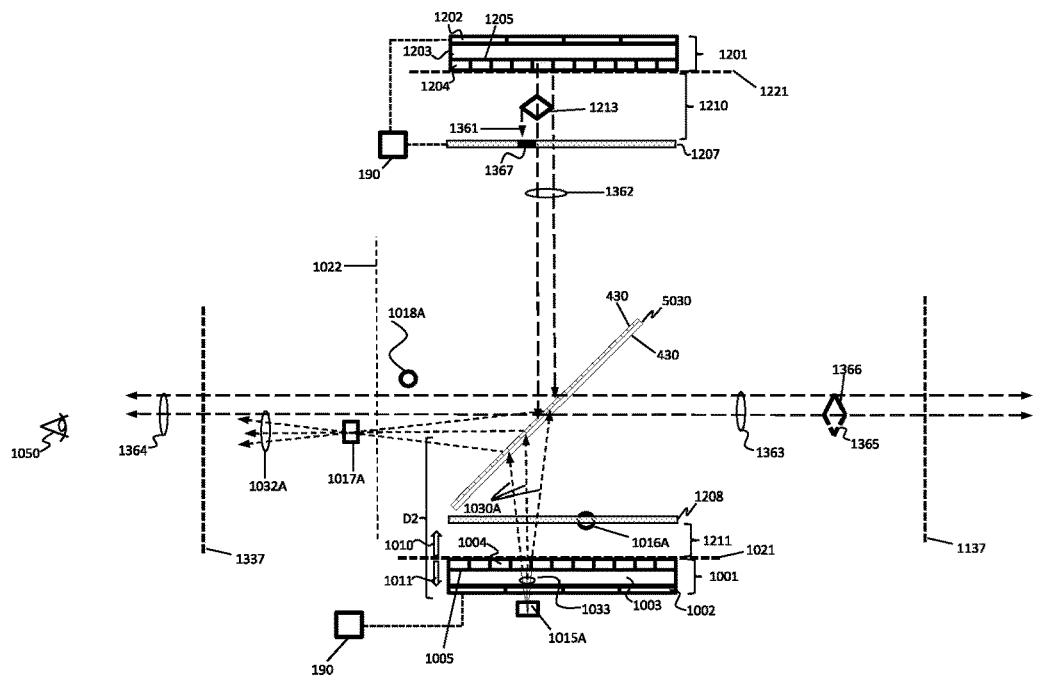
FIG. 8B illustrates an embodiment using the occlusion layer in FIG. 8A to perform occlusion handling.

FIG. 8B shows an embodiment of the display system in FIG. 8A to perform occlusion handling using the occlusion system 1207. The labels of FIG. 8A apply to FIG. 8B. A portion 1367 of occlusion system 1207 may be activated to block light 1361 from one side of projected holographic surface 1213. Only the orthogonal rays 1362 from the surface 1213 are shown, and they partially reflect from the transmissive reflector 5030 into rays 1364 that reach the observer 1050. The rays 1362 are relayed by 5030 into rays 1363, which form the projected holographic surface 1366. Substantially no blocked light rays 1361 from the portion of the surface 1213 are visible to observer 1050, corresponding to the blocked portion 1365 of the relayed holographic image 1366.

Figure 8C:
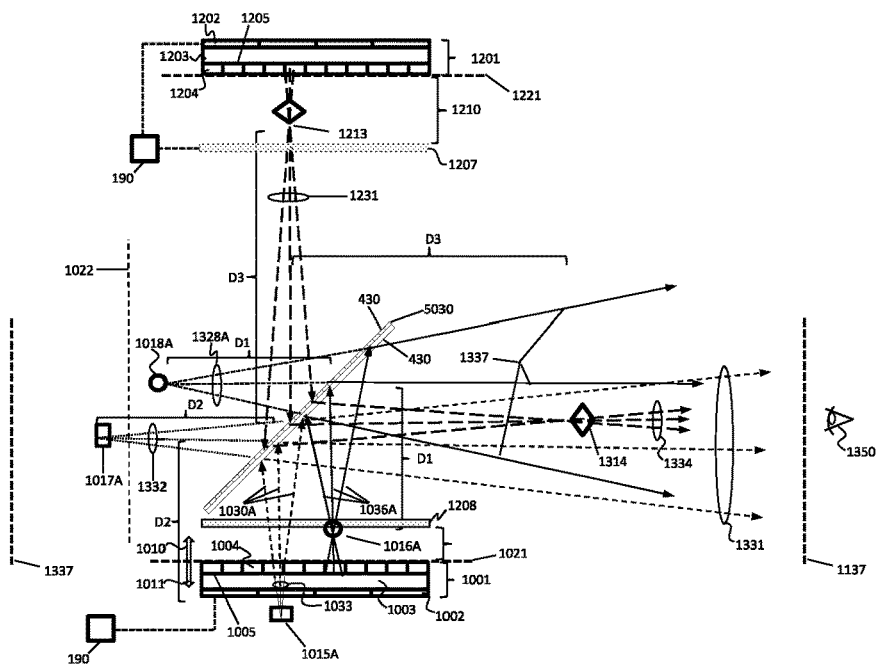
FIG. 8C illustrates an embodiment of a holographic display system similar to that shown in FIG. 8A perceived by a viewer at a different position.

FIG. 8C shows an embodiment of a display system similar to that shown in FIG. 8A, with substantially all the rays of light that would reach an observer 1350 on the right of transmissive reflector 5030, but omitting some of the light rays that would reach an observer on the left of 5030 (not shown) for clarity. The numbering of FIG. 8A applies to this drawing. Light rays 1030A forming holographic object 1015A reflect from the surface 430 of relay 5030 into light rays 1331, which are perceived by observer 1350 to originate from the position of relayed holographic object 1017A. Similarly, light rays 1036A forming holographic object 1016A reflect from the surface 430 of relay 5030 into light rays 1337, which are perceived by observer 1350 to originate from the position of relayed holographic object 1018A. If the display 1201 is a holographic display, then holographic surface 1213 will be relayed to holographic surface 1314, and the observer 1350 will see 1314 in the foreground, and holographic surfaces 1017A and 1018A in the background. If the display 1201 is a 2D display, then observer 1350 will see a flat foreground image, and holographic surfaces 1017A and 1018A in the background. As discussed for FIG. 8A, if 1201 is a light field display, occlusion handling may be done by coordinating the two light fields 1001 and 1201, or by using the occlusion systems 1207 and/or 1208. If 1201 is a 2D display, then occlusion handling may be done using the occlusion systems 1207 and/or 1208.

Combining Images of Real-World Objects with Holographic Objects

With reference to at least FIGS. 3B, 3C, 8A, 8B, and 8C, the present disclosure contemplates and describes various embodiments for using a relay system to relay first and second image surfaces from first and second image sources, respectively. In an embodiment, the first image source may include the surface of a light field display, and the light from the light field display may form the first image surface of a holographic object. In an embodiment, the second image source may include a 2D display surface, a stereoscopic display surface, an autostereoscopic display surface, a multi-view display surface which may be a horizontal parallax only multi-view display surface, the surface or surfaces of a volumetric 3D display, a second light field display surface, the surface of a real-world object emitting light, or the surface of a real-world object reflecting light. Correspondingly, the image surface of the second image source may include an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object formed by light paths projected from a second light field display, a surface of a real-world object, or a relayed image of the surface of the real-world object.

In one embodiment, the relay system of the present disclosure may relay the first and second image surfaces to relayed locations a distance away from the first and second image surfaces, where first and second relayed images surfaces are observable at the respective relayed locations. For example, in an embodiment, the relayed holographic objects and the relayed image of a real-world object may appear together (e.g. 121C, 122C, and 123C shown in FIG. 3C). If a relayed holographic object appears in front of a relayed image of a real-world object, then an occlusion system may be disposed proximate to the real-world object to block off a portion of the light from the relayed image of the real-world object that is being occluded by the holographic object so that a viewer cannot see the real-world object behind the holographic object. This allows a presentation of the holographic object in front of the real-world image with current occlusion handling. This may help avoid having an opaque relayed holographic object (e.g. a human head that is not a ghost) appear transparent with the light from the relayed image of a real-world object visible directly behind the relayed holographic object to an observer. In this disclosure, sometimes no distinction is made between a relayed object and a relayed surface. In FIG. 8C, for example, the projected holographic objects 1015A and 1016A are surfaces which are relayed by relay 5030 to relayed holographic surfaces 1017A and 1018A, respectively. The projected holographic object surfaces 1015A and 1016A may be referred to as 'projected holographic object surfaces', 'projected holographic objects', or 'holographic objects' equally in this disclosure. The relayed holographic object surfaces 1017A and 1018A may be referred to as 'relayed holographic surfaces or 'relayed holographic objects' equally in this disclosure.

In some embodiment of the present disclosure, some relay systems are configured to reverse a depth profile of the image surface being relayed (e.g. relay system 5010 shown in FIG. 1A), and some relay systems are configured not to do so (e.g. relay system 5040 shown in FIG. 5D). If the relay system performs depth reversal, then the relayed image of an image surface, such as a holographic object surface, will have a depth profile different from that of the original image surface. In one embodiment, the relay image surface may have an intended depth profile by configuring the original image surface to have a pre-reversed depth profile; for example, a real-world object may be configured to have a reversed depth profile so that the relayed image surface of the real world object has the intended depth profile. In another embodiment, a relay system may include two relay subsystems, which each relay reversing depth, with the second relay subsystem reversing the depth reversal performed by the first relay subsystem, resulting in a relayed image surface with substantially the same depth profile as the original image surface. For example, an image surface of a real-world object may be relayed twice through two relay subsystems that reverse depth, thereby resulting in a relayed image surface of the real-world object that substantially maintains the same depth profile as the original image surface of the real-world object. In some relay system embodiments, there is no depth reversal and depth reversal does not need to be addressed (e.g. relay system 5040 shown in FIG. 5D).

Figure 9A:
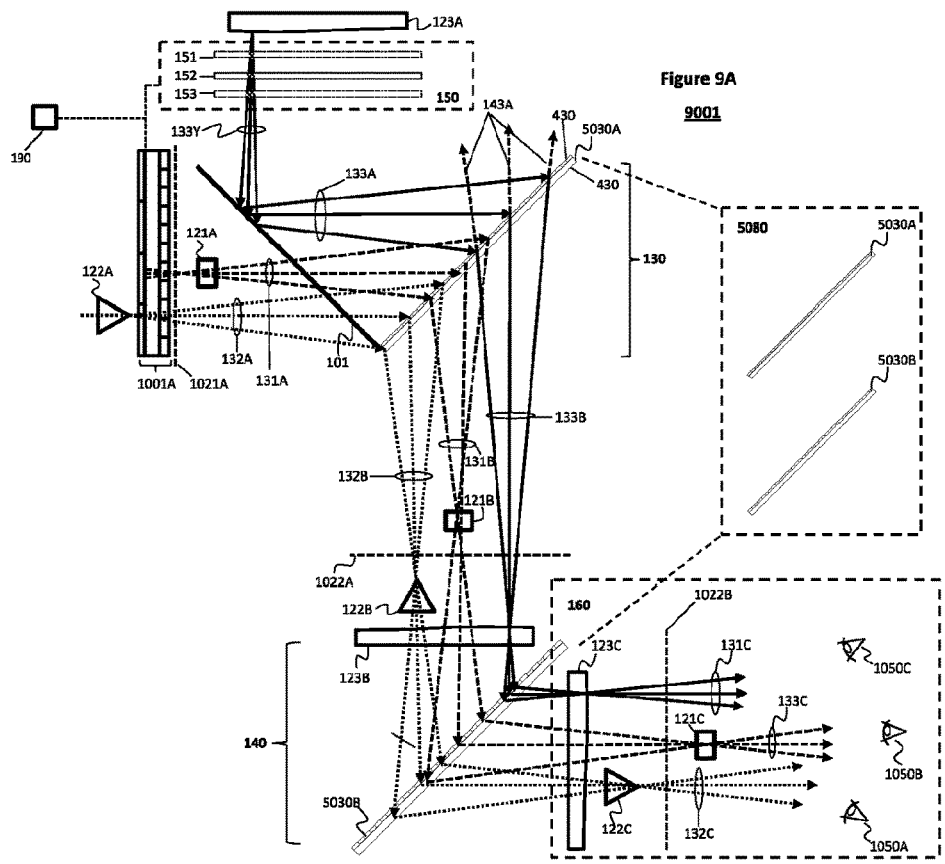
FIG. 9A illustrates an embodiment of a relay system having first and second relay subsystems.

To illustrate the principles discussed herein, FIG. 9A shows an embodiment of a display system 9001 comprised of a relay system 9001 which is similar to the relay system shown in FIG. 3C, wherein the light from two holographic object surfaces 121A and 122A projected around a screen plane 1021A of a light field display 1001A is combined with the light from a real-world object 123A via first and second input interfaces of an optical combining system 101, and these three objects are relayed to another location near a virtual display plane 1022B. The numbering of FIG. 3C is used in FIG. 9A for similar elements. In the embodiment shown in FIG. 9A, the relay system 5080 is configured to receive light from at least one of the first image sources 1001A and second image sources 123A through a first relay subsystem 5030A of the relay system 5080, the first relay subsystem 5030A operable to relay the received light to define a first relayed image surface 121B/122B (relayed holographic objects) or 123B (relayed real-world object surface) corresponding to the respective image surface, the first relayed image surface having a depth profile different from a depth profile of the respective image surface 121A/122A or 123A defined by light from the at least one of the first and second image sources. In a further embodiment, at least one of the first and second image sources comprises a real-world object 123A, wherein the first relay subsystem 5030A is operable to receive light from a surface of the real-world object 123A and wherein the first relayed image surface 123B comprises a relayed image of the surface of the real-world object having a depth profile different from a depth profile of the surface of the real-world object 123A. In another embodiment, the relay system 5080 further comprises a second relay subsystem 5030B configured to direct light from the first relayed image surface 121B/122B (relayed holographic objects) into the viewing volume near observers 1050A-C, thereby defining a second relayed image surface 121C/122C of relayed holographic objects corresponding to the respective image surface, and to relay light from the other one 123A of the at least one of the first and second image that is not projected from a holographic display to relayed locations 123C in the viewing volume, thereby defining a first relayed image surface corresponding to the respective image surface 123A, the second relayed image surface 121C/122C having a depth profile that is substantially the same as the depth profile of the respective image surface 121A/122A defined by light from the at least one of the first and second image sources 1001A. In an embodiment, an image source is comprised of the real-world object 123A, and the relay system 9001 includes an occlusion system 150, which in an illustrated embodiment, may include one or more occlusion layers 151, 152, and 153, wherein the occlusion layers may block out some of the light rays from the real-world object 123A, preventing these light rays from reaching the relay locations of the relayed real-world object image surface 123C. In this case, the relay subsystem 5080 may include a first transmissive reflector relay subsystem 5030A and second transmissive reflector relay subsystem 5030B, each of which reverses the depth, so that the second transmissive reflector 5030B reverses the depth-reversal of the first transmissive reflector relay subsystem 5030A, such that the overall relay system 5080 preserves the depth profile of the real-world object 123A as well as the holographic object surfaces 121A and 122A. The occlusion layers 151, 152, and 153 may contain a plurality of parallax elements, which, in an embodiment, may be individually-addressed light blocking elements. In one embodiment, the occlusion layers 151, 152, and 153 may each be a portion of an LCD panel containing one or more polarizers and a liquid crystal (LC) layer with individually-addressable pixels, a transparent OLED display panel with individually-addressable pixels, or another panel that may selectively occlude light and be transparent, semi-transparent, or light blocking.

The relayed locations 160 are locations where the relayed holographic object surfaces 121C and 122C are distributed about a relayed virtual display screen 1022B, and relayed image surface 123C of the real-world object 123A. A relayed image of a real-world object will appear to be as life-like as a holographic object, since the light rays that leave the surface of the real-world object such as 123A are transported by the relay system 5080 in the same way that the light rays leaving the surface of holographic object 121A are transported to form holographic object 121C. Controller 190 may generate display instructions for the light field display 1001A as well as send configuration instructions to the occlusion planes 151, 152, and 153.

Figure 9B:
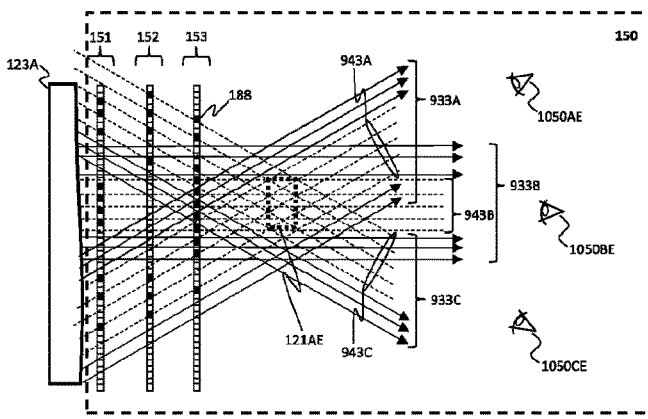
FIG. 9B illustrates an operation of an occlusion system.

FIG. 9B shows a first embodiment of an occlusion system 150, comprising one or more layers of occlusion planes 151, 152, and 153 located close to the real world object 123A, and designed to block the portion of the light from the real-world object 123A that would pass through a projected holographic object 121AE and reach three observer positions 1050AE, 1050BE, and 1050CE. Holographic object 121AE is shown to represent the location of holographic object 121A relative to real-world object 123A once the light rays 131A from projected holographic object 121A are combined with the light rays 133Y from real-world object 123A by the optical combiner 101. In other words, projected holographic object 121AE is shown in the equivalent optical location of holographic object 121A relative to real-world object 123A. The three observer positions 1050AE, 1050BE, and 1050CE correspond to the viewing positions 1050A, 1050B, and 1050E of the relayed image surfaces shown in FIG. 9A, respectively, and appear in the opposite top-down order because the relayed real-world image surface 123C is up-down flipped relative to the real-world object 123A. A pattern of individually-addressable light-blocking elements 188 may be actuated on each occlusion plane 151, 152, and 153 in order to block the portion of light rays from the real-world object 123A passing through a holographic object 121AE and reaching three different viewing locations. This includes blocked light rays 943A of the light rays 933A reaching observer 1050AE, blocked light rays 943B of the light rays 933B reaching observer 1050BE, and light rays 943C of the light rays 933C reaching observer 1050CE. The pattern of light-blocking elements may be determined computationally or algorithmically, and may be updated at the same video frame refresh rate of the holographic display 1001A in FIG. 9A in order for relayed holographic object surface 121C to be perceived by observers 1050A, 1050B, and 1050C to continually occlude the relayed real-world background image surface 123C, even as the relayed holographic object surface 121C is moved relative to the relayed background image surface 123C of a real-world object in FIG. 9A. It is also possible that a portion of the relayed holographic object surface 121C may appear to be semi-transparent to the background image surface 123C of a relayed real-world object, in which case the corresponding occlusion regions 188 may be semi-transparent rather than opaque.

Figure 9C:
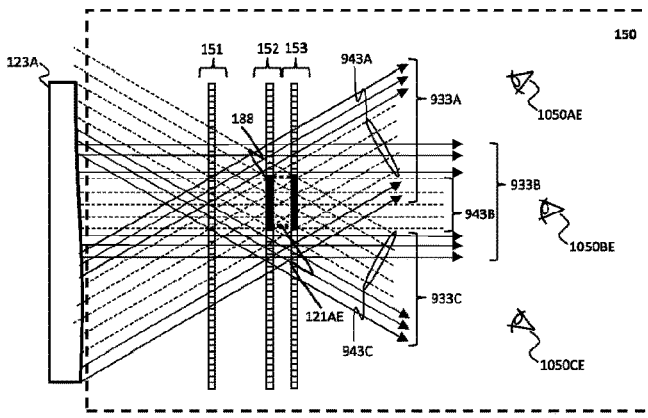
FIG. 9C illustrates another operation of an occlusion system.

FIG. 9C shows a second embodiment of an occlusion system 150, comprised of one or more layers of occlusion planes 151, 152, and 153 located a short distance from the real-world object 123A, and designed to block the portion of the light from the real-world object 123A that would pass through projected holographic object surface 121AE and reach three observer positions 1050AE, 1050BE, and 1050CE. The numbering for FIG. 9B is used in FIG. 9C for similar elements. In the embodiment shown in FIG. 9C, two of the occlusion planes 152 and 153 are located at substantially the same position corresponding with the holographic object 121AE, and the selected occlusion regions 188 on each panel are activated so that they overlap with the holographic object 123AE. The occlusion regions 188 may be determined computationally or algorithmically, and may be updated at the same video frame rate of the holographic display 1001A in FIG. 9A in order for relayed holographic object surface 121C to be perceived by observers 1050A, 1050B, and 1050C to continually occlude the relayed real-world background image surface 123C, updated in synchronization to the movement of relayed holographic object surface 121C relative to the relayed background image surface 123C of the real-world object 123A. If a portion of the relayed holographic object 121C should appear to be semi-transparent to the background relayed image surface 123C of a real-world object, the corresponding occlusion regions 188 may be configured to be semi-transparent rather than opaque. To account for movement of the holographic surface 121A relative to the real-world object 123A, one or more occlusion planes 151, 152, and 153 may be mounted on a motorized translation stage so they can be placed at the same effective position of holographic surface 121A as it moves.

Figure 9D:
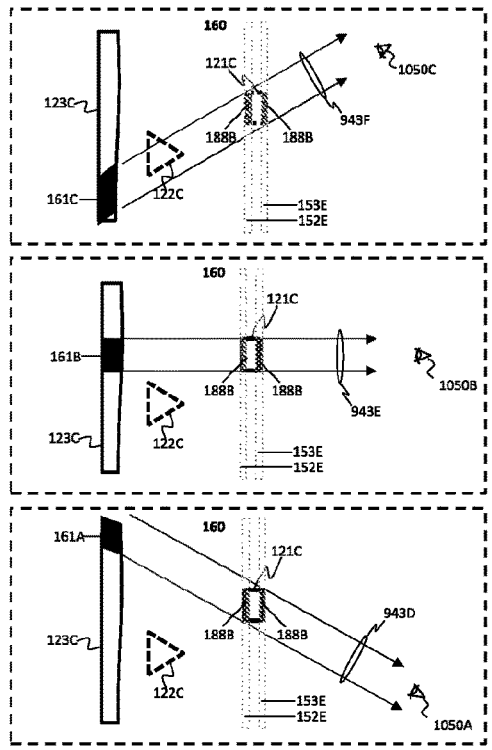
FIG. 9D illustrates the effect of the occlusion system shown in FIG. 9C on the relayed real-world object image, as viewed by three observer positions shown in FIG. 9A.

FIG. 9D shows the effect of the occlusion layers of the occlusion system 150 shown in FIG. 9C on the relayed real-world object image surface 121C, as viewed by observer positions 1050A, 1050B, and 1050C shown in FIG. 9A. The dashed outlines 152E and 153E are relayed images of the occlusion layers 152 and 153 shown in FIGS. 9A and 9C, respectively. The relayed regions 188B of occlusion on these relayed images of planes 152 and 153 show where occlusion sites may be selected to provide the occlusion of relayed surface 123C by relayed holographic surface 121C. Observer 1050A cannot see the portion 161A of relayed image surface 123C of the real-world object 123A that lies behind the relayed holographic object surface 121C because relayed light rays from source 123A that lie between light rays 943D are blocked by occlusion sites activated on occlusion planes 152 and 153 shown in FIG. 9A. Similarly, observer 1050B cannot see portion 161B of relayed real-world image surface 123C behind relayed holographic object surface 121C, as relayed light rays from source 123A between light rays 943E are blocked by occlusion sites activated on occlusion planes 152 and 153 shown in FIG. 9A. Observer 1050C cannot see portion 161C of relayed real-world image surface 123C behind holographic object 121C, as relayed light rays from source 123A between light rays 943F are blocked by occlusion sites activated on occlusion planes 152 and 153 shown in FIG. 9A. In the example shown in FIGS. 9C and 9D, no occlusion handling is shown to be performed for holographic object 122C, although this is possible to happen simultaneously with the occlusion handling of holographic object 121C. The occlusion regions 188 on occlusion planes 151, 152, and 153 may be updated continuously so that light from real-world object 123A is continuously occluded by relayed holographic objects such as 121C and 122C in such a way that those holographic objects look like they are life-like objects moving in front of an actual background formed with relayed real-world object surface 123C, with occlusion handled properly for all viewers of the relayed object 121C, 122C, and 123C. It is also possible that the relayed holographic object surfaces such as 121C and 122C appear to be semi-transparent to the relayed background image surface 123C of real-world object 123A, which in case the occlusion regions 188 may be semi-transparent, only attenuating rather than completely occluding portions of the light from real-world object 123A. And finally, the one or more occlusion planes 151, 152, and 153 may be motorized so they can be moved to optically coincide with one or several projected holographic objects 121A and 121B even if they change position.

Figure 9E:
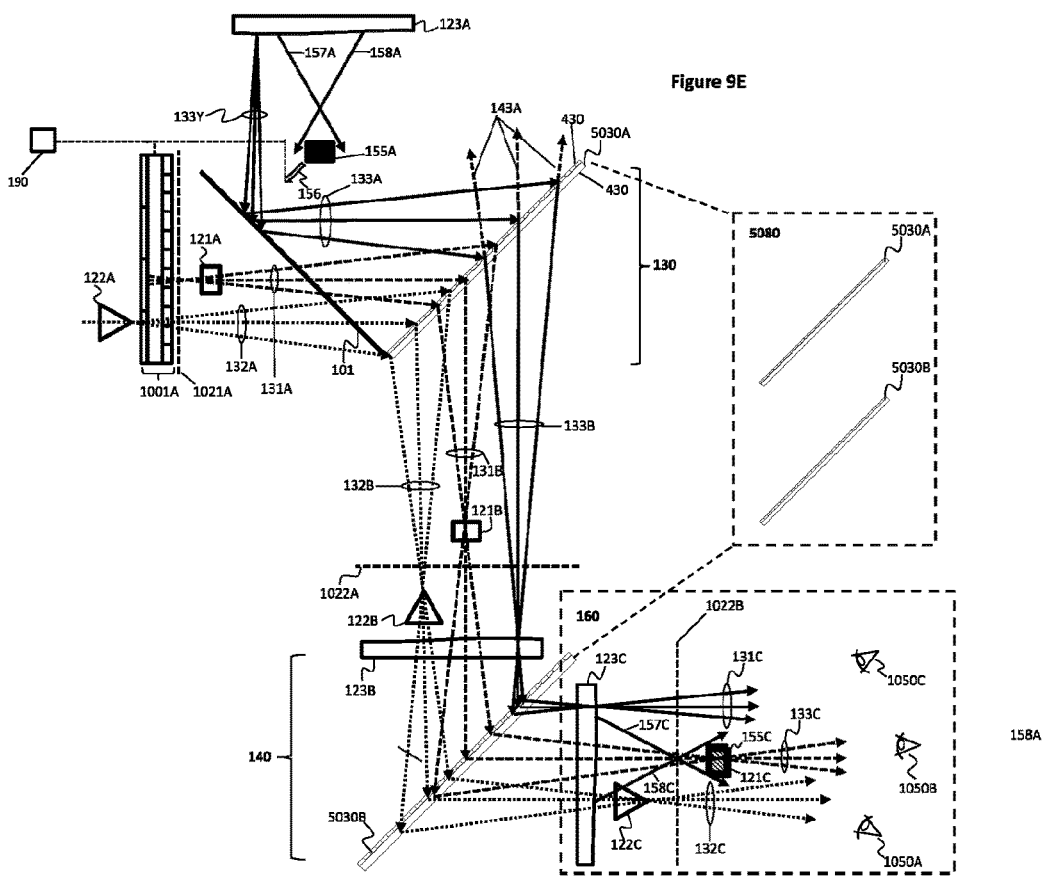
FIG. 9E illustrates an embodiment of a relay system comprised of two relay subsystems comprising transmissive reflectors.

FIG. 9E is the display system of FIG. 9A with the occlusion system 150 replaced by a real-world occlusion object 155A which blocks unwanted light rays from the real-world object 123A. The numbering of FIG. 9A is used in FIG. 9E. The real-world occlusion object 155A may be similar in shape or profile to at least one projected holographic object 122A and may be painted or coated with a light absorbing material such as matte black paint. As shown in FIG. 9E, because the real-world occlusion object 155A has been positioned so that it is equidistant from the image combiner 101 as the projected holographic object 121A, the surface of real-world occlusion object 155A will be relayed to relayed surface 155C by the relay system 5080 so that it coincides at substantially the same location as the relayed surface 121C of the projected holographic object surface 121A. The light rays 157A and 158A from the real-world object 123A are almost occluded by the edges of the occlusion object 155A and are relayed into light rays 157C and 158C by the relay system 5080, respectively. Relayed light ray 158C will be observed by observer 1050A, but light rays from relayed object 123C parallel to light ray 158C that are just below light ray 158C will be blocked by real-world occlusion object 155A before they are relayed by relay 5080. The result is that the portion of the relayed surface 123C will not be visible behind relayed holographic surface 121C from the viewpoint of observer 1050C. Similarly, relayed light ray 157C will be seen by observer 1050A, but light rays from relayed object 123C which are parallel to light ray 157C and just above 157C will also be blocked by real-world occlusion object 155A before they are relayed by relay 5080. The result is that the portion of the relayed surface 123C will not be visible behind relayed holographic surface 121C from the viewpoint of observer 1050A. In summary, FIG. 9E shows that in a display system in which the light from a projected holographic surface 121A and a real-world object surface 123A are combined and relayed, then a real-world occlusion object 155A with the same dimensions as the dimensions of the relayed holographic object surface 121B may be placed in a location which blocks a portion of the light from the real-world object 123A such that the relayed holographic object surface 121C and the relayed surface of real-world occlusion object 155C are coincident, the real-world occlusion object 155A offering occlusion of the relayed real-world object surface 123C behind the relayed holographic object surface for all viewers 1050A-C within the FOV of the relayed objects 121C and 123C. In an embodiment, the real-world occlusion object 155A has its location controlled by a motorized positioning stage (not shown), and 155A can be moved 156 in coordination with the movement of a projected holographic object 121A so that the relayed position 155C of relayed occlusion object 155A continually coincides with the position of a relayed holographic object surface 121C. A controller 190 may simultaneously issue display instructions to the light field display 1001A as well as issue commands to a motion controller in order to direct coordinated movement 156 of the real-world occlusion object 155A as well as movement of a projected holographic object 121A.

Figure 9F:
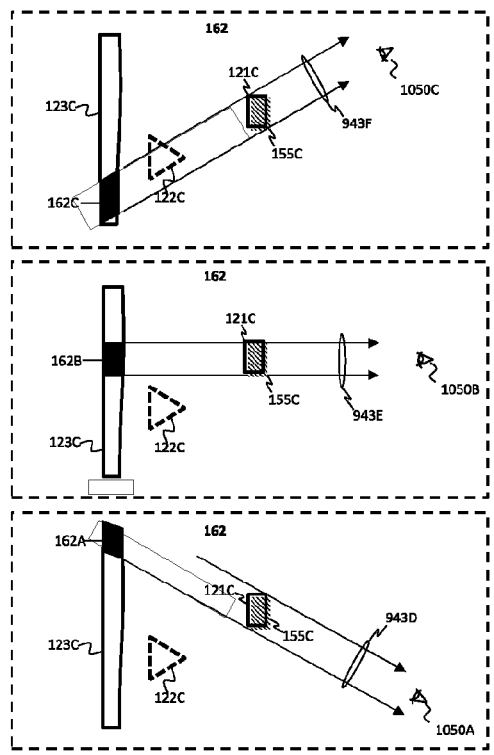
FIG. 9F illustrates the effect of the occlusion system shown in FIG. 9E on the relayed real-world object image, as viewed by three observer positions shown in FIG. 9E.

FIG. 9F shows the effect of the real-world occlusion object 155A shown in FIG. 9E on the relayed real-world object image surface 123C, as viewed by observer positions 1050A, 1050B, and 1050C shown in FIG. 9E. The relayed surface 155C of the real-world occlusion object 155A is substantially coincident with the relayed surface 121C of projected holographic object 121A. Observer 1050A cannot see the portion 162A of relayed real-world image surface 123C of the real-world object 123A that lies behind the relayed holographic object surface 121C because relayed light rays from source 123A that lie between light rays 943D are blocked by the occlusion object 155A. Similarly, observer 1050B cannot see portion 162B of relayed real-world image surface 123C behind relayed holographic object surface 121C because relayed light rays from source 123A that lie between light rays 943E are blocked by real-world occlusion object 155A. Finally, observer 1050C cannot see portion 162C of relayed real-world image surface 123C behind holographic object 121C because relayed light rays from source 123A that lie between light rays 943D are blocked by real-world occlusion object 155A shown in FIG. 9E.

Figure 9G:
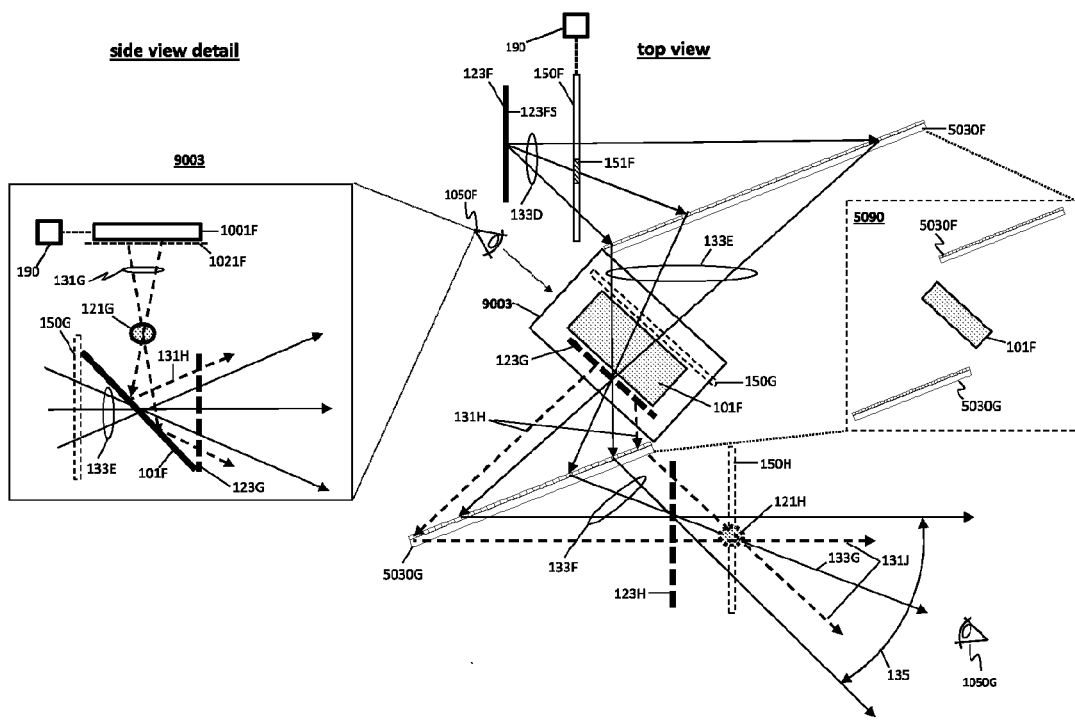
FIG. 9G illustrates an embodiment of a relay system having first and second relay subsystems with an additional input interface for light from one or more image sources.

FIG. 9G is a display system 9002 in which an observer sees the relayed surface of a holographic object projected in front of the relayed surface of a real-world background object or a background display, with no depth reversal of the relayed objects and proper occlusion handling for the background surface behind the relayed foreground holographic surface. The relay system of FIG. 9G is similar to the relay system of FIG. 9A, but while the real-world object or display is relayed through two transmissive reflectors in both configurations, in FIG. 9G the holographic object 121G is inserted into the optical path along with the light from the real-world background object or display 123F at a location between the two transmissive reflectors. In FIG. 9G, the surface of a real-world object or a display 123F is relayed to relayed object surface 123H by the relay system 5090 comprised of two relay subsystems with transmissive reflectors 5030F and 5030G as well as image combiner 101F.

The relay 5090 shown in FIG. 9G is comprised of two transmissive reflectors 5030F, 5030G placed on parallel planes and separated from one another with an image combiner 101F disposed between them. The first transmissive reflector relay subsystem 5030F offers a first input interface configured to receive light from a first image source which is the surface of real-world object or 2D display 123F and is operable to relay the received light to a define a first relayed image surface 123G and be received by an image combiner 101F, the first relayed image surface 123G having a depth profile different from a depth profile of the respective image surface 123F. The relay system 5090 further comprises an image combining element positioned to combine light from the first relay subsystem 5030F forming the relayed surface 123G of real-world object or display surface 123F, and light 131G from second image source 1001F defining a holographic surface 121G, wherein the combined light comprising the first relayed image surface 123G and the holographic surface 121G is directed to the second relay subsystem 5030G which is configured to relay the combined light to the viewing volume 135 near viewer 1050G. The image combiner 101F offers a second interface to receive light from the second image source light field display 1001F, and this light is combined with the light from the second image source and relayed to a viewing volume 135 near viewer 1050 by the second transmissive reflector relay subsystem 5030G. The surface of real-world object or display 123F is relayed twice, first to 123G followed by a second relay to 123H, while the surface of projected holographic object 121G is relayed once to 121H. For this reason, the depth profile of the once-relayed holographic surface 121G is reversed, while the depth profile of the twice-relayed holographic surface 123H of real-world object or display 123F is not reversed. In an embodiment, holographic surface 121G defined by light paths 131G projected from the light field display 1001F has a first projected depth profile with respect to screen plane 1021F, and the holographic surface 121G is relayed by the relay system to define first relayed image surface 121H comprising a relayed holographic surface with a first relayed depth profile that is different from the corresponding first projected depth profile of 121G.

In an embodiment, the relay system 5090 is configured to receive light from one of the first and second image sources 123F that is not a holographic display through a first relay subsystem 5030F of the relay system 5090, the first relay subsystem 5030F operable to relay the received light to define a first relayed image surface 123G corresponding to the respective image surface 123F, the first relayed image surface 123G having a depth profile different from a depth profile of the respective image surface 123F defined by light from the one of the first and second image sources which is not a holographic object. In another embodiment least one of the first 123F and second 1001F image sources comprises a real-world object 123F wherein the first relay subsystem is operable to receive light from a surface of the real-world object 123F, and wherein the first relayed image surface 123G comprises a relayed image surface of the real-world object having a depth profile different from a depth profile of the surface of the real-world object 123F. In another embodiment, the relay system 5090 further comprises a second relay subsystem 5030G configured to direct light from the first relayed image surface 123G to the viewing volume 135 near observer 1050G, and to relay light from the at least one of the first and second image sources defining a holographic surface 121G to relayed locations in the viewing volume 135, thereby defining a relayed image surface 121H of the holographic surface. In another embodiment, the relay system further comprises an image combining element 101F positioned to combine light 133E from the first relay subsystem and light from the at least one of the first and second image sources defining a holographic surface 121G, wherein the combined light 133E and 133H comprising the first relayed image surface 123G and the holographic surface 121G is directed to the second relay subsystem, which is configured to relay the combined light to the viewing volume 135. In an embodiment, the second relayed image surface 123H comprises a second relayed image surface of the real-world object 123F, the second relayed image surface 123H of the real-world object having a depth profile that is substantially the same as the depth profile of the surface of the real-world object 123F.

In an embodiment, the light field display comprises a controller 190 configured to issue instructions for accounting for the difference between the first projected depth profile 121G and the first relayed depth profile 121H by operating the light field display 1001A to output projected light such that the first relayed depth profile of the first relayed image surface is the depth profile intended for a viewer. In another embodiment, relayed locations of the first relayed image surface 121H are determined according to a second 4D function defined by the relay subsystem 5030G, such that light from the light field display 1001F is relayed along relayed light paths 131J each having a set of spatial coordinates and angular coordinates in a second 4D coordinate system, wherein the light field display 1001F comprises a controller 190 configured to receive instructions for accounting for the second 4D function by operating the light field display 1001F to output light according to the first 4D function such that the positional coordinates and angular coordinates in the second 4D coordinate system for the relayed light paths 131J allow the first relayed image surface 121H to be presented to a viewer as intended.

The optical system 9002 shown in FIG. 9G offers first and second input interfaces for first and second sets of light paths from first image source 123F and second image source 1001F respectively. The second set of light paths 131G are determined according to a four-dimensional function defined by the light field display 1001F such that each projected light path has a set of spatial coordinates and angular coordinates in a first four-dimensional coordinate system defined with respect to a display screen plane 1021F of display 1001F, wherein the light from the first image source 123F is operable to define a first image surface 123FS. The first input interface is relay subsystem 5030F configured to receive light along a first set of light paths 133D from a first image source 123F which in this example is a display or real-world object 123F, wherein the light from the first image source 133D is operable to define a first image surface 123FS which is the surface of real-world object or display 123F. The second relay subsystem 5030G is configured to direct the received light from the first 123F and second 1001F image sources to a viewing volume 135, wherein at least one and in this case both of the first image surface 123FS and second image surface 121G are relayed by the relay system into the viewing volume 135 as relayed first surface 123H and relayed second holographic surface 121H, respectively. The side view detail 9003 of FIG. 9G taken from observer viewpoint 1050F shows that light from a second image source of a light field display 1001F forms projected holographic surface 121G, where it is combined with the relayed light 133E from the real-world object or display 123F in between the two transmissive reflectors 5030F and 5030G, and relayed to relayed holographic surface 121H by relay subsystem 5030G. The observer 1050G will see the relayed holographic surface 121H in front of the relayed surface 123H of real-world object or display surface 123FS. One or more occlusion planes 150F may have individually addressable occlusion regions 151F, which may be activated to offer occlusion of real-world object or display 123F. These one or more occlusion planes 150F are relayed by relay system 5090 to relayed position 150H. A controller 190 may issue coordinated instructions to the light field display 1001F and the one or more occlusion planes 150F simultaneously to arrange for occlusion of the relayed real-world surface or display surface 123H by foreground relayed holographic surface 121H as viewed by observer 1050G and any other observers in the viewing volume 135 of the relayed objects 123H and 121H. Some details of the operation of one or more occlusion planes 150 are given above in reference to FIGS. 9B, 9C, and 9D for the configuration of FIG. 9A. In an embodiment, the one or more occlusion planes 150F are replaced with a real-world occlusion object such as object 155A in FIG. 9E, where the occlusion object may be on a motorized stage which causes the occlusion object 155A to move 156 in coordination with the movement of relayed holographic object surface 121C. In an embodiment, as shown in FIG. 9E, a controller 190 coordinates instructions to both the light field display 1001A and the movement of the real-world occlusion object 155A.

FIG. 9G shows light 133D from the surface of display or real-world object 123F passing through one or more occlusion planes 150F that may be comprised of individually-addressable occlusion sites 151F, and this light 133D being received by a first transmissive reflector relay subsystem 5030F and relayed along light paths 133E to form first relayed object surface 123G between the relays. Image light at the first object relayed location 123G is relayed from light paths 133E to light paths 133F to second object location 123H by the second transmissive reflector relay subsystem 5030G. The occlusion plane 150F is relayed to an intermediate virtual plane 150G by the first relay subsystem 5030F, and from this position to the second-relayed virtual occlusion plane 150H by the second relay subsystem 5030G, where the virtual occlusion plane 150H may substantially overlap with the relayed holographic image surface 121H.

The one or more occlusion planes 150F may be configured so an observer 1050G may not be able to see a portion of the background relayed object surface 123H behind the foreground relayed holographic object surface 121H. FIG. 9G provides a side view detail 9003 of optical display system 9002 that would be observed from observer position 1050F. An image combiner 101F disposed in the light path of the light rays 133E from the display or real-world object 123F combines these light rays 133E and the light rays 131G forming the holographic object surface 121G. The light rays 131G are deflected by the image combiner into light rays 131H, which travel in the same direction as the light rays 133E from the display or real-world object 123F. Both these sets of light rays are received by the second transmissive reflector relay subsystem 5030G. Light rays 131H from the holographic object 121G are relayed to light rays 131J, forming relayed holographic object surface 121H, which may be substantially close or overlapping with the relayed occlusion plane 150H. In the configuration shown in FIG. 9G, the relayed holographic object surface 121H is relayed only once by relay subsystem 5030G, which means that relayed holographic surface 121H will have an inverted depth profile relative to projected holographic surface 121G, and so projected holographic surface may have its depth profile inverted by using the optics shown in FIG. 2A or inverting the angular light field coordinates (U,V) so the corresponding relayed surface 121H has the correct depth. The surface 123FS of display or real-world object 123F is relayed twice by depth profile inverting transmissive reflector relays 5030F and 5030G so that the corresponding relayed surface 123H should appear to an observer 1050G with substantially the same depth profile as the surface 123FS of display or real-world object 123F. In an embodiment, the first image source 123F shown in FIG. 9G may comprise: a 2D display surface, a stereoscopic display surface, an autostereoscopic display surface, a multi-view display surface, the surface or surfaces of a volumetric 3D display, a second light field display surface, the surface of a real-world object emitting light, or the surface of a real-world object reflecting light. In another embodiment, the second image source light field display 1001F in FIG. 9G may comprise: a 2D display surface, a stereoscopic display surface, an autostereoscopic display surface, a multi-view display surface, the surface or surfaces of a volumetric 3D display, a light field display surface, the surface of a real-world object emitting light, or the surface of a real-world object reflecting light. In another embodiment, the projected holographic object 121G may be the relayed surface of a holographic object.

Figure 27A:
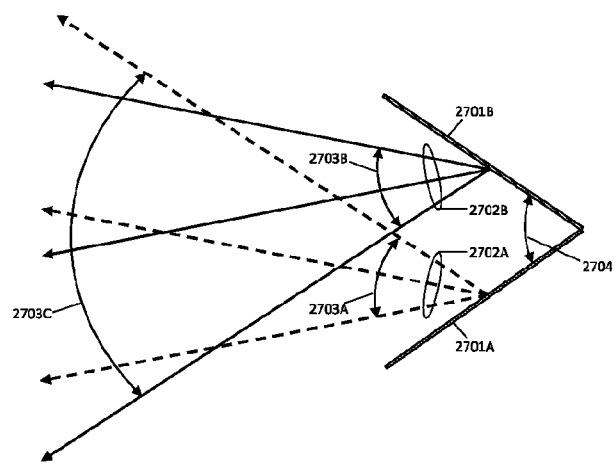
FIG. 27A shows a combined field-of-views for two relays which is larger than the field-of-view for either of the relays separately.

In the example provided by the illustrated embodiment of FIG. 9G, neither of the transmissive reflector relays 5030F or 5030G is at a 45-degree angle with respect to the plane of the display or real-world object 123F. One result is that the light rays 133F and 131J projected from the relay system toward an observer 1050G with an optical axis 133G which is not normal to the plane of the display or real-world object 123F. An advantage of this configuration is that relay system 9002 may be placed side-by-side with a similar relay system to generate a field-of-view which is larger than the field-of-view of a single relay 9002, which is shown in FIG. 27F below.

While the discussions of FIG. 9A-9G above were made with respect to an embodiment where the relayed holographic image surface is in the foreground and the relayed real-world image surface is in the background, the present disclosure also contemplates embodiments where the relayed holographic image surface is in the background and the relayed real-world image surface is in the foreground or where both the relayed holographic image surface and the relayed real-world image surface are in the foreground or background together. It is to be appreciated that each of these embodiments may be implemented in accordance with the same principles and operations illustrated by various embodiments discussed in the present disclosure.

Figure 9H:
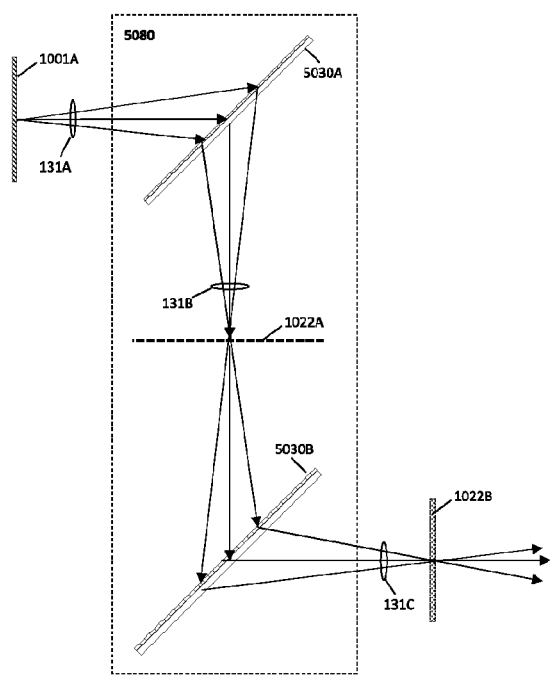
FIG. 9H illustrates an embodiment of a relay system having first and second relay subsystems.
Figure 9I:
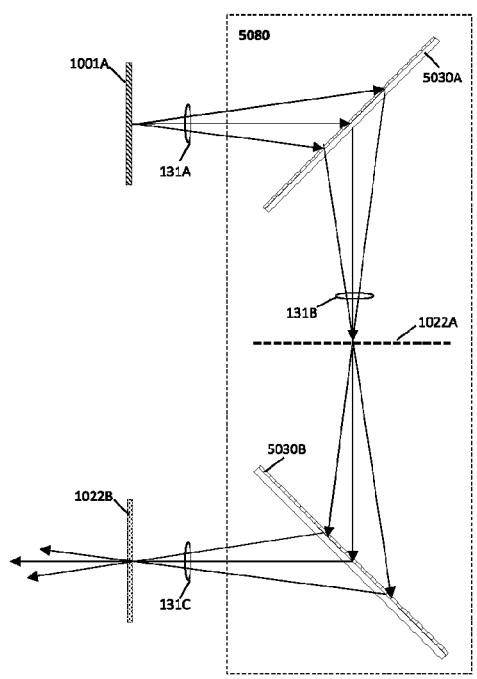
FIG. 9I illustrates an alternative embodiment of the relay system shown in FIG. 9H.
Figure 9J:
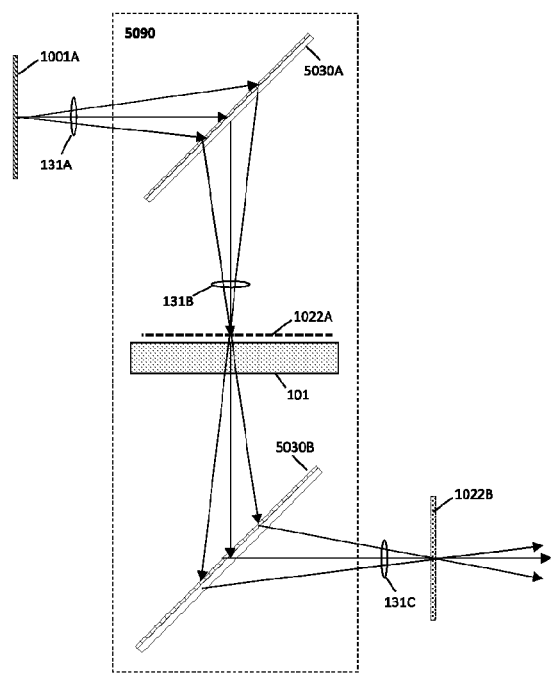
FIG. 9J illustrates an alternative embodiment of the relay system shown in FIG. 9H.

In this disclosure, there are many permutations of the relay configurations that may be implemented in accordance with the principles disclosed herein. FIG. 9H is an orthogonal view of some of the components of the optical system 9001 shown in FIG. 9A including relay system 5080. The numbering of FIG. 9H applies to FIG. 9I. A first image source that may be a display 1001A produces light along paths 131A which are relayed by first relay subsystem 5030A within relay system 5080 to relayed light paths 131B, forming intermediate virtual display plane 1022A, and these light paths are relayed by second relay subsystem 5030B within relay system 5080 to light paths 131C, which form virtual display plane 1022B. This configuration of the relay system 5080 may also be implemented with the second relay subsystem 5030B is rotated by 90 degrees, which may be desired depending on the requirements of the application. FIG. 9I is an orthogonal view of the optical system shown in FIG. 9H, wherein the second relay subsystem 5030B is rotated by 90 degrees. The numbering of FIG. 9H applies to FIG. 9I for similar elements. FIG. 9I operates in the same way as FIG. 9H, except that the output light 131C in FIG. 9I is relayed in a direction opposite from the direction of output light 131C in FIG. 9H. The relay system of FIG. 9H and FIG. 9I may be considered functionally equivalent for the purposes of this disclosure, and no further distinction between the details of the configurations shown in FIGS. 9H and 9I will be discussed and both are referred to herein as the relay system 5080. The same is true for many relay configurations discussed in this disclosure. For example, in relay 5060 system shown in FIG. 5F, the configuration of the relay system 5060 may omit either one of the reflective Fresnel mirrors 1008A or 1008B and be considered the same relay system 5060. In a similar way, FIG. 9J is an orthogonal view of the optical system shown in FIG. 9H, wherein an image combiner 101 is added between the two relays 5030A and 5030B in the relay system 5090 in order to provide a second input interface for a second image source operable to define a second image surface and produce a set of light rays to be relayed. Light from a second image source would be sent in a direction perpendicular to the plane of the page and be combined by 101 into light paths which would travel along with light paths 131B (see FIG. 9G). This optical configuration shown in FIG. 9J is a variation of the relay 5090 shown in FIG. 9G but will not be given a separate distinction in this disclosure.

In many of the holographic relay systems, such as relay 5030 shown in FIG. 3A, the holographic object volume centered on the display plane 1021 is relayed to a virtual screen plane 1022, which is floating in free space. The distance between the virtual screen plane 1022 and the transmissive reflector relay 5030 shown in FIG. 3A is determined by the distance between the transmissive reflector relay 5030 and the display screen plane 1021. To achieve the largest distance between a relayed virtual screen plane and any physical device within a compact design, it may be advantageous to use an optical folding system in the design. FIG. 10A shows an optical folding system 1150 comprised of a plurality of internal optical layers, wherein light from the respective image source is directed along a plurality of internal passes between internal optical layers. Such a configuration may be used to increase a distance between a relay system and the respective relayed locations. In an embodiment, the optical folding system is comprised of five layers, the optical folding system receiving light from a display 1101, which may be a LED display, an LCD display, an OLED, or some other type of display. In an embodiment, the internal optical layers comprise first a circular polarizer comprised of an input polarizer 1111 and a quarter wave retarder 1112, the circular polarizer optically preceding a reflector 1113, then a quarter wave retarder 1114, and finally an output polarizer 1115. The quarter wave retarder 1114 having an optical axis in a first direction. The first quarter wave retarder 1112 has an optical axis in a first direction, while the second quarter wave retarder 1114 has an optical axis in a second direction. Light from the display 1101 passes through the five or more layers 1111-1115 of the optical fold system 1150 in a sequence of three passes with two reflections. FIG. 10A demonstrates the sequence of reflections and transmissions of light as it travels through the five layers of the optical folding system 1150. The light from the display 1101 passes through the first four layers 1111-1114 as part of a first Path 1 2016, reflects from the last layer 1115 and passes through layer 1114 as part of a second Path 2 2017, and finally reflects from layer 1113 and passes through layers 1114 and 1115 as part of a third Path 3 2018. Layer 1114 is traversed three times. In other words, light from an image source is directed between the reflector 1113 and output polarizer 1115 through the quarter wave retarder 1114 in three internal passes. This optical system may be arranged so that layers 1111-1114 are placed together, with minimal spacing between them and far away from layer 1115, as shown in FIG. 10A, so that Path 2 and Path 3 are very close to the length of Path 1, resulting in a total optical path length equal to the length of Paths 1-3, which is about three times the length of Path 1 of the optical fold system 1150.

In an embodiment, the input polarizer 1111 may include a linear polarizer, which only transmits light in a first state of linear polarization, and reflects or absorbs the orthogonal second state of linear polarization. The quarter wave retarder 1112 of the circular retarder and the quarter wave retarder 1114 may form a pair of quarter wave retarders or quarter wave plates (QWP), where the fast axis angle of the first $QWP_1$ may be 45 deg relative to the plane of polarization, and the fast axis angle of the second $QWP_2$ may be −45 deg relative to the plane of polarization, or vice-versa, so that $QWP_2$ 1114 may reverse the effect of $QWP_1$ 1112 on linear-polarized light. The reflector 1113 may be a half-mirror reflector formed by a half-transmissive mirror, a dielectric mirror, a reflective polarizer, some other reflector. The reflective polarizer 1115 may reflect a first state of linear polarization and transmit an orthogonal state of linear polarization, or may reflect a first state of circular polarization (e.g. left-hand circular polarization LHC) with or without a change in the first state of circular polarization (e.g. the reflected LHC may be LHC or an orthogonal state of right-hand circular polarization, RHC), and transmit a second state of circular polarization (e.g. RHC), orthogonal to the first state of circular polarization LHC. The optical fold system 1150 may include some other optical layer in some embodiments.

FIG. 10B shows a table which in one embodiment tracks how light from an image source such as display 1101 changes polarization states after interacting with each layer of the optical fold system 1150. Light leaves the display on Path 1, and is filtered by the polarizer layer 1111, which may be a linear polarizer, which transmits a first state of linear polarization L1, and absorbs a second state of linear polarization L2, orthogonal to the first. This transmitted linearly polarized light L1 is depicted by the vertical arrow polarization state in the 'Polariz. State' row under 1111 and Path 1 in the table of FIG. 10B. The quarter wave retarder 1112 converts the linear polarized light L1 into a circular polarization state LHC, denoted by the counter-clockwise spiral under 1112 and Path 1 in FIG. 10B. The linear polarizer 1111 and the quarter wave retarder 1112 are referred to as a circular polarizer because functioning together, they are operable to convert unpolarized input light into circularly polarized light. The reflector layer 1113 may be a semitransparent layer, such as a half-silvered mirror, and some of the circularly polarized light LHC is transmitted through this layer, labelled as a counter-clockwise spiral under 1113 and Path 1 in FIG. 10B. The portion of light that is not transmitted may be reflected back toward the display 1101 in a circular polarization state RHC, orthogonal to LHC, be converted by layer 1112 into a second state of linear polarization L2, orthogonal to the first state L1, and be absorbed by the polarizer 1111. The LHC polarized light leaving the reflector 1113 is converted by quarter wave retarder 1114 back into linearly polarized light L1 with a first state of linear polarization L1 (vertical arrow under 1114 and Path 1 in FIG. 10B), and this first state of linear polarization L1 is reflected by reflective polarizer layer 1115 into Path 2 back toward layer 1114 wherein the first state of linear polarization L1 is preserved (vertical arrow under 1115 and Path 2 in FIG. 10B). The layer 1114 converts this light L1 into transmitted LHC polarized light, denoted by the counter-clockwise spiral shown in the table of FIG. 10B under 1114 and Path 2. This LHC light is received by reflector 1113, and some of this light may be reflected by the reflector 1113 back toward layer 1114, into Path 3, and this light may have a RHC polarization state orthogonal to state LHC as a result of the reflection, denoted by the clockwise arrow under 1113 and Path 2 in the table of FIG. 10B. The quarter wave retarder 1114 coverts this RHC polarization state into a second state of linear polarization L2, orthogonal to the first state L1, denoted by the horizontal arrow under 1114 and Path 3 in the table of FIG. 10B, and this light passes through the reflective polarizer layer 1115. In this way, the light from the display has been routed through Path 1, Path 2, and Path 3 before leaving the last reflective polarizer layer 1115 of optical folding system 1150.

FIG. 10C is an orthogonal view of a display system comprising an optical fold system 1160 which offers selective path length extension. The folding system 1160 is designed to be placed in the light path of an imaging system which increases the path length for a selected area of incident light rays using a polarization control panel, a polarization beam splitter and two planes of reflective surfaces. The polarization control panel 1123 is a panel that may selectively change the state of incoming polarization for addressable regions such as 1188 and may be a portion of an LCD panel comprising a plane of liquid crystal. Each plane of reflective surface 1125A and 1125B is paired with a quarter wave retarder plane 1126A and 1126B disposed close to the reflective surface, respectively, in order to create a configuration which will convert a light ray with a first state of polarization into a light ray with a second state of polarization upon reflection from the reflective surface. Light from an object 1121 may be emitted with both polarizations, but polarization filter 1122 only allows light paths 1131 of a first state of polarization to pass towards the polarization control panel 1123. In FIG. 10C, light rays of a first polarization are dashed, while light rays of a second polarization orthogonal to the first are solid. The light paths 1131 received by the polarization control panel 1123 may be categorized as a first portion of light rays 1131A which are incident on a selected area 1188 of the polarization control panel and have their first state of polarization changed by the polarization control panel 1123 into light rays 1132A of a second state of polarization (solid lines) orthogonal to the first, and a second portion of light rays 1131B which retain their first state of polarization and continue substantially unaffected along light paths 1132B (dashed lines). Light rays 1132 leaving the polarization control panel include light rays 1132A of the second state of polarization (solid lines) and light rays 1132B of the first state of polarization (dashed lines), which are received by a polarization beam splitter 1130. Light rays 1132B of the first state of polarization (dashed lines) pass through this polarization beam splitter and exit the optical system 1160. Light rays 1132A of the second state of polarization which include light ray 1133A are deflected by the polarization beam splitter and these deflected light rays which include light ray 1133B are directed toward a first paired quarter wave retarder 1126A and reflective surface 1125A. Upon reflection from these two planes, the light rays of a second state of polarization (solid lines) are converted into light rays with a first state of polarization (dashed lines), which include light ray 1133C, and these light rays pass through the polarization beam splitter 1130 toward the second paired quarter wave retarder 1126B and reflective surface 1125B. Upon reflection from paired quarter wave retarder 1126B and reflective surface 1125B, the light rays of a first state of polarization which include light ray 1133C (dashed lines) are converted into light rays with a second state of polarization which include light ray 1133D (solid lines), and these light rays are deflected by the polarization beam splitter 1130 into output light rays 1133, which includes light ray 1133E. Light rays 1132B undeflected by the optical system 1160 in FIG. 10C can be traced back to originate at the source object 1121 at point 1135A, while the light rays 1133 deflected by the switching region 1188 of the polarization control panel 1123 may be traced back to a common divergence point 1135V. This means that all the light paths 1131A incident on the polarization control panel 1123 in a selected region 1188 have effectively been path length increased so their apparent convergence point 1135V is separated from source point 1135A, and the plane of polarization selection 1121 with selection region 1188 has been effectively moved back to virtual plane 1121V with virtual selection region 1188V. An optional output polarization filter 1124 may be placed in the optical path of output rays 1132B and 1133 to pass only the rays of light 1133 corresponding to the subset of light rays 1131A from source object 1121 in FIG. 10C that are path-length increased, thereby reflecting or absorbing light rays 1132B corresponding to the subset of light rays 1131B that are not path-length increased, thereby providing an optical system which relays the light paths passing through a selected occlusion region 1188 to another location 1188V.

Figure 10D:
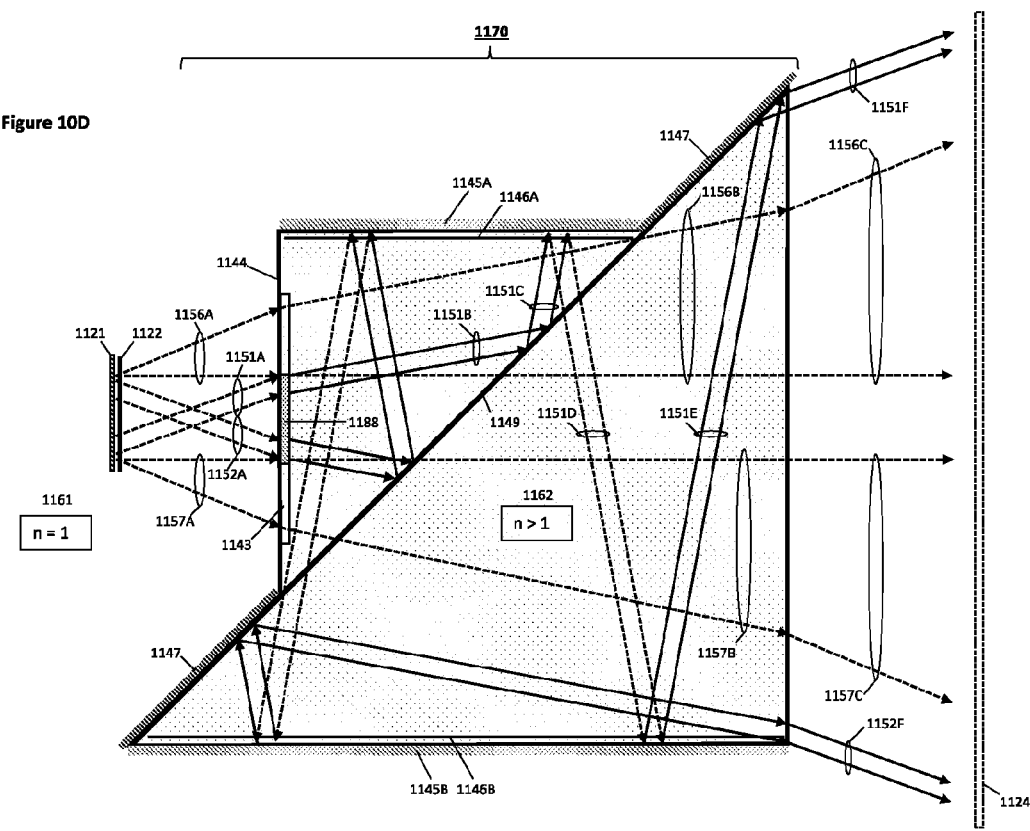
FIG. 10D is an orthogonal view of an optical fold system with increased path length for a selected region of light rays and an increased field of view.

The selective path length extending system 1160 shown in FIG. 10C has a FOV limitation, in that incident light paths 1131 from the object 1121 that are at an angle of greater than about 10 degrees from the horizontal optical axis may not be deflected. FIG. 10D is an orthogonal view of an optical fold system 1170 which increases the path length for a selected region of light rays in a low refractive index n~1 medium 1161 using a polarization beam splitter embedded in a medium of high refractive index n>1 material 1162, and two planes of reflective surfaces to increase the field of view of the optical system shown in FIG. 10C. The high refractive index material 1162 within the near prism-shaped boundary 1144 bends incident light towards the optical axis, thus increasing the acceptance angle of incident light rays. Otherwise, the principle of operation of selective path length expander 1170 is similar in operation to selective path length expander 1160. Incident light rays 1151A, 1152A, 1156A, and 1157A of a first polarization (dashed lines) may be produced by a source 1121 and a polarization filter 1122, where 1121 and 1122 are not part of the selective optical fold system 1170. These light rays are received by a polarization control panel 1143 which may selectively switch one polarization state to another in addressable regions such as region 1188 and may be a portion of an LC panel. Light rays 1151A pass through this selected region, and are converted into a second state of polarization 1151B (solid lines) which are deflected by the polarization beam splitter 1149 into light rays 1151C, which reflect from a first paired quarter wave retarder 1146A and reflective surface 1145A into light paths 1151D, switching polarization state into the first polarization state (dashed lines), and passing through the polarization beam splitter 1149. Upon reflection from the second paired quarter wave retarder 1146B and reflective surface 1145B, light paths 1151D of the first polarization state are converted into light paths 1151E of a second polarization state (solid lines), which deflect from the polarization beam splitter 1149 and exit the optical system 1170 as light paths 1151F. Similarly, incident light paths 1152A follow a similar path and exit the optical system 1170 as light paths 1152F. Light 1156A and 1157A incident on areas of the polarization control panel which are not selected may not switch polarization state, but of this group of light rays the ones that are incident at an angle to the normal to the plane of the boundary 1144 are deflected toward the horizontal optical axis into light paths 1156B and 1157B, respectively, upon entering the region of a higher index of refraction 1162. Upon leaving the high-index medium 1162, the light paths 1156B and 1157B that are at an angle with respect to the horizontal optical axis are deflected away from the optical axis in accordance with Snell's law into light paths 1156C and 1157C. Although it is not shown in the optical system 1170, the light rays 1151A and 1152A that are selected by the polarization control plane and deflected by the polarization beam splitter 1149 have a virtual convergence point to the left of the source object plane 1121 much like convergence point 1135V in FIG. 10C, and the selective polarization control plane may have a corresponding virtual plane between this virtual convergence point and the source object 1121, similar to plane 1121V in FIG. 10C. As in FIG. 10C, an optional polarization filter 1124 may be placed in the optical path of output rays 1151F, 1152F, 1156C, and 1157C to pass only light rays 1151F and 1152F corresponding to the light rays 1151A and 1152A from source object 1121 which are path length increased, thereby providing an optical system which relays the light paths passing through a selected occlusion region 1188 to another location (e.g. similar to 1188V in FIG. 10C).

Figure 11A:
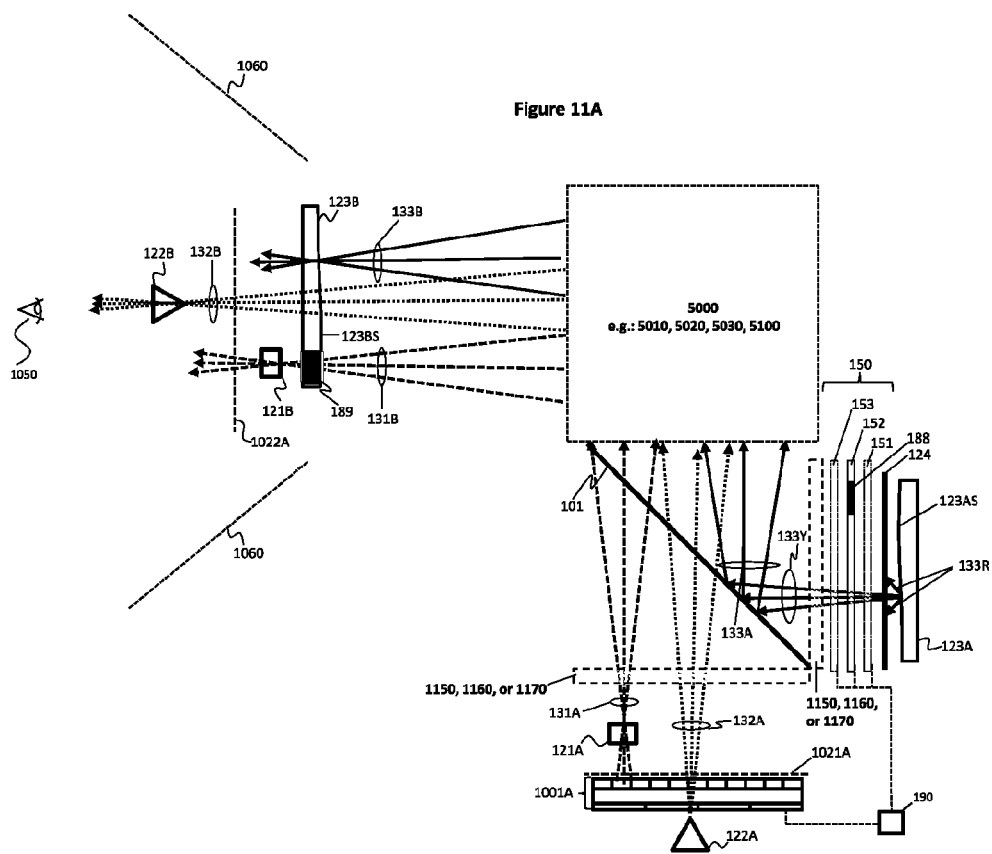
FIG. 11A shows an embodiment of a relay system configured to relay light from holographic object surfaces projected from a light field display simultaneously with the light from one or more real-world objects.
Figure 11B:
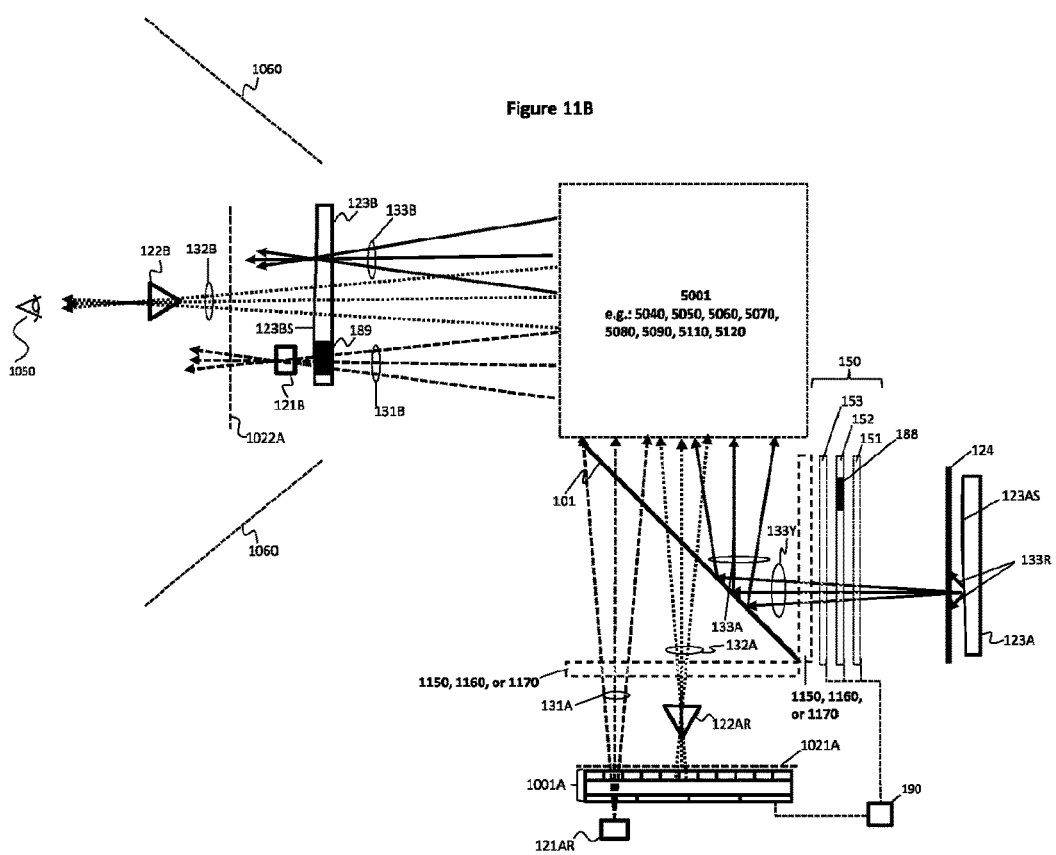
FIG. 11B illustrates an embodiment of a relay system that performs depth reversal.
Figure 11C:
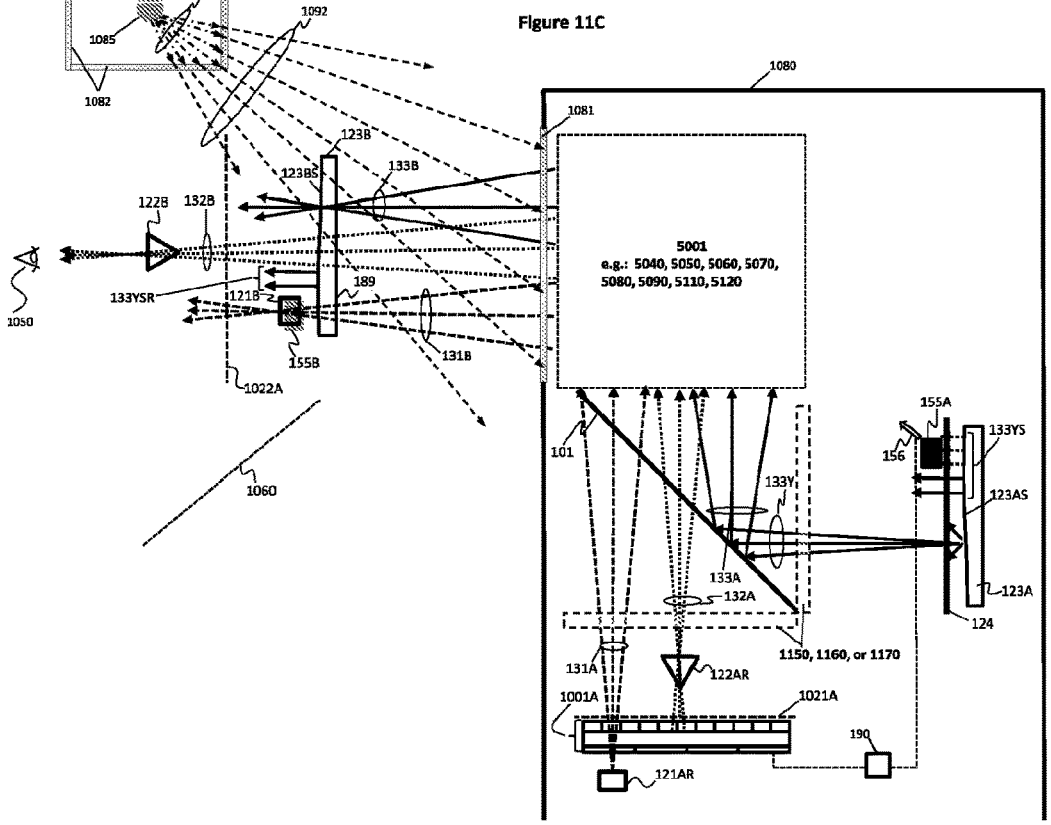
FIG. 11C illustrates an embodiment of a relay system configured to relay light from two image sources and reject ambient light.

FIGS. 11A, 11B, and 11C show embodiments of an optical system comprising a first input interface configured to receive light along a first set of light paths from a first image source, wherein the light from the first image source is operable to define a first image surface; and a second input interface configured to receive light along a second set of light paths from a second image source, wherein the light from the second image source is operable to define a second image surface; and a first relay system configured to receive combined image light from the optical combining system and relay the received light to relayed locations in a viewing volume thereby defining first and second relayed image surfaces corresponding to the first and second image surfaces respectively; wherein at least one of the first and second image sources comprises a light field display, and the first set of light paths are determined according to a four-dimensional function defined by the light field display such that each projected light path has a set of spatial coordinates and angular coordinates in a first four-dimensional coordinate system. FIG. 11A shows a general relay system 5000 which reverses the depth profile of surfaces it relays, while FIG. 11B shows a general relay system 5001 which preserves the depth profile of the surfaces it relays. FIG. 11C shows a slightly different configuration of FIG. 11B.

FIG. 11A shows an example of a display system comprising an optical combining system 101 and a first relay system 5000 which reverses the depth profiles of objects that it relays. The numbering of FIG. 9A is used in FIG. 11A for similar elements. The relay system 5000 may be relay 5010 shown in FIG. 1A, relay system 5020 shown in FIG. 1B, the relay system 5030 shown in FIG. 3A, or any other relay system which performs depth reversal. The relay system 5000 may also be relay system 5100 to be introduced in FIGS. 20 and 22 below. In FIG. 11A, light field display 1001A projects light ray groups 131A and 132A to produce holographic surfaces 121A and 122A, respectively. The light rays 131A and 132A are combined with light rays 133Y from the surface 123AS of a real-world object 123A by an image combiner 101, wherein the image combiner 101 deflects the light rays 133Y into light rays 133A so they are travelling in the same direction with the portion of light rays 131A and 132A which pass through 101. These combined light rays 131A, 132A, and 133A are received by the relay system 5000 and relayed to light rays 131B, 132B, and 133B. Light rays 131B and 132B form relayed holographic object surfaces 121B, 122B around virtual relayed screen plane 1022A, respectively, while light rays 133B form the relayed surface 123BS of real-world object 123A. The relayed surfaces 121B, 122B, and 123BS have been relayed to a viewing volume defined by boundary 1060 and viewable by observer 1050. The viewing volume boundary 1060 is illustrated in FIGS. 11A-11J to indicate the location where relayed surfaces may be seen fully within the field of view of the display. An observer 1050 will view the relayed surfaces 121B, 122B, and 123BS from within the viewing volume boundary 1060. This boundary is not shown in other figures in this disclosure. Notice that the relayed holographic surfaces 121B and 122B are depth reversed from their projected holographic surfaces 121A and 122A, respectively, while the surface 123BS of real-world object 123B is also depth reversed compared to the surface 123AS of the real-world object 123A. In an embodiment, a holographic surface 121A/122A is formed by light paths 131A/132A projected from the light field display 1001A and has a first projected depth profile, and the first relayed image surface 121B/122B comprises a relayed holographic surface with a first relayed depth profile that is different from the first projected depth profile. In an embodiment, the light field display comprises a controller 190 configured to issue instructions for accounting for the difference between the first projected depth profile and the first relayed depth profile by operating the light field display 1001A to output projected light such that the first relayed depth profile of the first relayed image surface 121B/122B is the depth profile intended for a viewer 1050. In another embodiment, the relayed locations of the first relayed image surface 121B/122B are determined according to a second 4D function defined by the relay system, such that the received light paths 131A/132A and 133A from the first and second image sources, respectively, are relayed along relayed light paths 131B/132B and 133B each having a set of spatial coordinates and angular coordinates in a second 4D coordinate system defined with respect to a first virtual display plane 1022A, wherein the light field display 1001A comprises a controller configured to issue instructions for accounting for the second 4D function by operating the light field display 1001A to output projected light according to the first 4D function such that the positional coordinates and angular coordinates in the second 4D coordinate system for each of the set of relayed light paths 131B/132B respectively, allow the first relayed image surface 121B/122B to be presented to a viewer as intended. One or more occlusion layers 151, 152, and 153 with individually-addressable regions such as 188 may be disposed in the optical path of light rays 133Y from the real-world object 123A to offer occlusion of the real-world object 123A much the same way as pictured in FIGS. 9B, 9C and 9D. Optional optical path folding system 1150 shown in FIG. 10A-B, 1160 shown in FIG. 10C, or 1170 shown in FIG. 10D may be disposed in the path of light 131A and 132A from the light field display 1021A or the light 133Y from the real-world object 123A in order to increase the relative path length of these light rays, causing the corresponding surfaces produced by those light rays to be relayed further from the relay 5000. For example, if a path length extender 1150, 1160, or 1170 is disposed in the path of light rays 131A and 132A, then the relayed holographic surfaces 121B and 122B as well as the virtual relayed screen plane 1022A will all be relayed closer to the observer 1050 and further from the relay 5000. As shown above, a selective optical fold system 1160 shown in FIG. 10C or selective optical fold system 1170 shown in FIG. 10D may be used to selectively extend the path lengths of a first group of light rays 131A forming holographic surface 121A without affecting the second group of light rays 132A forming holographic surface 122A, and vice-versa. As an example, activating an optical fold system in the path of light rays 131A from projected surface 121A would move the corresponding relayed surface 121B closer to observer 1050. In an embodiment, the display system shown in FIG. 11A may comprise a controller 190 which issues coordinated display instructions to the light field display 1001A, configuration instructions to the occlusion layers of an occlusion system 150, and configuration instructions for a selective optical fold system 1160 or 1170.

In this disclosure, sometimes no distinction is made between a relayed object and a relayed surface. In FIG. 11A, the projected holographic objects 121A and 122A are surfaces which are relayed by relay system 5000 to relayed holographic surfaces 121B and 122B, respectively. The projected holographic object surfaces 121A and 122A, as well as the relayed holographic object surfaces may be referred to as 'projected holographic object surfaces' or 'projected holographic objects' or even 'holographic objects' equally in this disclosure. The corresponding relayed holographic surfaces 121B and 122B may be referred to as 'relayed holographic surfaces' or 'relayed holographic objects'. Similarly, in FIG. 11A, a real-world object 123A has a surface 123AS which reflects or emits light, and the light from this surface 123AS is relayed to relayed surface 123BS by relay system 5000. This disclosure may use the equivalent description of a 'real-world object' being relayed to 'relayed real-world object' or 'relayed image of real-world object', without mention of surfaces—sometimes the real-world object 123A or the relayed real-world object 123B will be shown without any separate mention of surfaces. Also, the image source for a holographic surface is a light field display, which projects light which converges at the surface of a holographic object and leaves this surface just as if a real object were there emitting or reflecting light. In this example, the surface of a holographic object is a true location of converged light. However, the image surfaces produced by other types of image sources, such as some stereoscopic, autostereoscopic displays, or horizontal parallax only (HPO) multi-view displays are operable to define perceived image surfaces even though the viewer may be focusing his or her eyes at the display screen when observing these perceived surfaces. In these instances, the relay will relay the light rays forming a perceived image surface to a perceived relayed image surface at another location that may be observed by a viewer.

The field-of-view of a light field display 1001A may be more limited than angular range of light leaving a real-world object 123A. In some circumstances, in order to allow the observer 1050 to see a consistent field-of-view for both the relayed holographic object surfaces 121B and 122B as well as the relayed image surface 123B of real-world object 123A, and to also reduce stray light that may enter the relay system 5000, an angular filter 124 may be placed in front of the real-world object 123A in order to absorb or reflect away light that is beyond an intended field of view for the observer or the optical system. In the embodiment shown in FIG. 11A, the angular filter 124 absorbs rays of light 133R from the real-world object 123A that have an angle with respect to the normal to the surface of the angular filter that exceeds a threshold value. In all following example figures showing light field display systems, which combine relayed images of real-world objects with relayed holographic objects, an angular filter 124 may be used in front of the real-world object 123A, whether or not it is shown in the figure.

FIG. 11B is an example of a display system comprising the same configuration of FIG. 11A, except that the relay system 5001 preserves the depth profile of the image surface it relays. The numbering of FIG. 11A is used in FIG. 11B. The relay system 5001 in FIG. 11B may be relay system 5040 shown in FIGS. 4C and 5D, relay system 5050 shown in FIG. 5E, relay system 5060 shown in FIG. 5F, relay system 5070 shown in FIG. 4E, relay system 5080 shown in FIG. 9A, relay system 5090 shown in FIG. 9G, or any other relay system that doesn't reverse depth. The relay system 5001 may be relay system 5110 to be introduced in FIG. 25A, or relay system 5120 to be introduced in FIG. 25B below. The light field display 1001A in FIG. 11B projects depth reversed holographic object surface 121AR in place of 121A shown in FIG. 11A, and 122AR in place of 122A shown in FIG. 11A so the corresponding relayed holographic object surfaces 121B and 122B are the same as shown in FIG. 11A. Note that in FIG. 11B, the projected holographic surfaces 121AR and 122AR have a depth profile relative to display plane 1021A which is the same as the depth profile of their respective relayed holographic surfaces 121B and 122B relative to the relayed display plane 1022A. Relayed real-world object surface 123BS has a depth profile which is also the same as real-world object 123A depth profile 123AS, and since relayed surface 123BS is further from the virtual screen plane 1022A then relayed holographic surfaces 121B and 122B, the corresponding real-world object 123A must also be located at a greater distance (optical path length) from the image combiner 101 than projected holographic object surfaces 121AR and 122AR. In an embodiment shown in FIG. 11B, a relay system 5001 is configured to relay the relayed image surface 123B of the real-world object 123A to the relayed locations that define the respective relayed image surface 123B of the real-world object in the viewing volume defined by boundary 1060 and viewable by observer 1050 such that the respective relayed image surface 123B of the real-world object in the viewing volume has a depth profile that is substantially the same as the depth profile of the surface of the real-world object 123A.

In an embodiment, the relay system of FIG. 11A may further include an occlusion system configured according to any embodiment described in the present disclosure, include the occlusion system 150 discussed above with respect to FIGS. 9A-9D. The occlusion system may be comprised of a real-world occlusion object 155A shown in FIGS. 9E and 9F, which will be shown below in FIG. 11C. In addition, the controller 190 may send display instructions to the light field display 1001A as well as the occlusion system 150, which as discussed above, may include one or more occlusion planes 151, 152, and 153. A controller 190 may issue display instructions to the light field 1001A and simultaneously issue occlusion instructions to the occlusion layers 151, 152, and 153 in order to correctly occlude the relayed surface of the real-world object 123BS behind one or more of the relayed holographic surfaces 121B and 122B as viewed by a viewer 1050 anywhere in the field of view of the relayed objects 121B, 122B, and 123B. In subsequent diagrams that appear in this disclosure, the controller 190 may not be shown as connected to the occlusion system 150, but it should be assumed that the controller may be connected to the occlusion system 150 as well as the image source 1001A in the system.

Figure 14A:
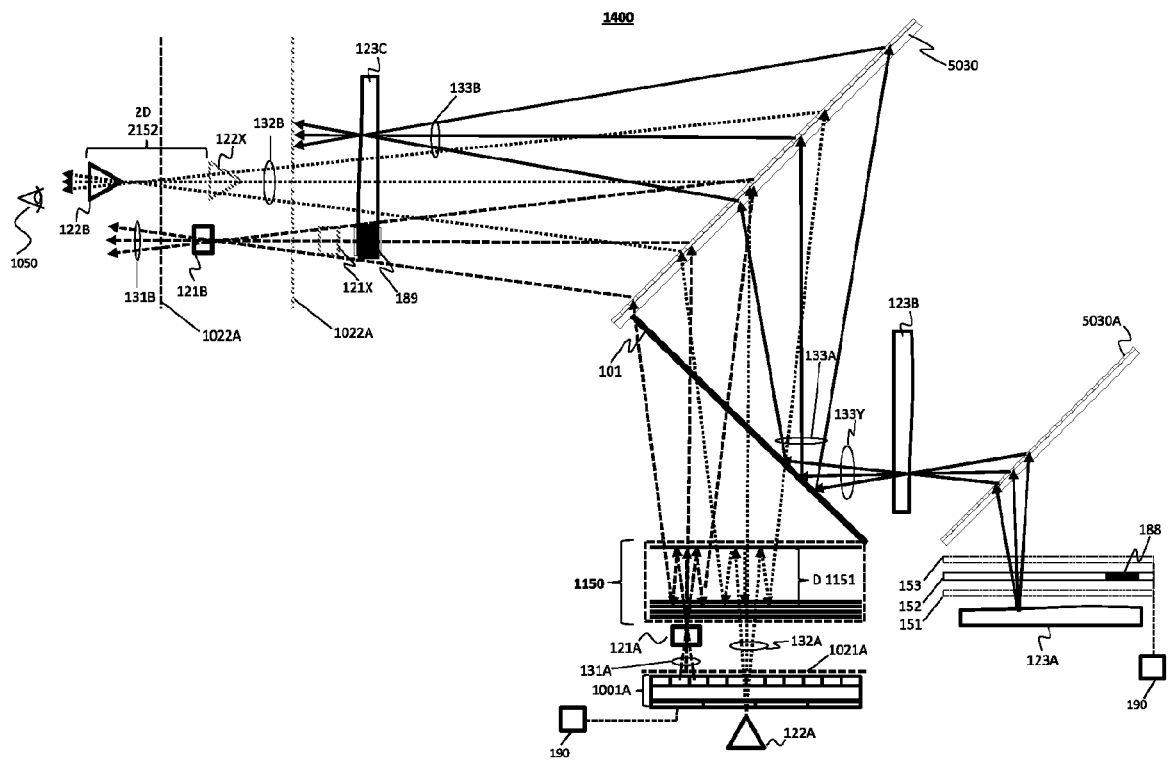
FIG. 14A shows the relay configuration shown in FIG. 13, except that an input relay system is included to relay the image of the real-world object.

FIG. 11C is the display system of FIG. 11B with the occlusion system 150 replaced by a real-world occlusion object 155A, and an enclosure which blocks ambient light from entering the relay system 5001. The numbering of FIG. 11B is used in FIG. 11C. The real-world occlusion object 155A was presented in reference to FIG. 9E, and the ambient light rejection enclosure 1080 is presented in reference to FIGS. 5G and 5H above. The occlusion object 155A blocks unwanted light rays from the real-world object 123A. The real-world occlusion object 155A may be similar in shape or profile to at least one projected holographic object 121AR and may be painted or coated with a light absorbing material such as matte black paint. In FIG. 11C, the real-world occlusion object 155A has been positioned so that it is equidistant from the image combiner 101 as the projected holographic object 121AR and thus has an equal optical path length to the relay system 5001 as holographic object 121AR. Because of this, if the real-world occlusion object 155A were reflective or emissive, the surface of 155A would be relayed to relayed surface 155B by the relay system 5100 so that it coincides at substantially the same location as the relayed surface 121B of the projected holographic object surface 121AR. As shown above in reference to FIG. 5G, some of the light rays 133YS from the surface 123AS of real-world object 123A are blocked by the real-world occlusion object 155A (dashed lines). The entire distribution of light rays from surface 123AS, including 133YS and 133Y that are unobstructed by 155A is relayed by the relay system 5001 into light rays 133YSR and 133B, and these light rays offer occlusion of relayed surface 123BS of real-world object 123A by relayed holographic object 121B for substantially all angles of relayed light from surface 123AS, given the same relative placement of relayed holographic object surface 121B to relayed real-world object surface 123B compared to the placement of real-world occlusion object 155A to real-world object surface 123AS, as well as substantially the same dimensions of the real-world occlusion object 155A to relayed holographic object surface 121B. For reference, FIG. 9F shows the effect of the real-world occlusion object 155A shown in FIG. 9E on the relayed real-world object image surface 123C, as viewed by observer positions 1050A, 1050B, and 1050C shown in FIG. 9E. In summary, FIG. 11C shows that in a display system in which the light from a projected holographic surface 121AR and a real-world object surface 123A are combined and relayed, then a real-world occlusion object 155A with the same dimensions as the dimensions of the relayed holographic object surface 121B may be placed in a location which blocks a portion of the light from the real-world object 123A such that the relayed holographic object surface 121B and the relayed surface of real-world occlusion object 155B are coincident, the real-world occlusion object 155A offering occlusion of the relayed real-world object surface 123B behind the relayed holographic object surface for all viewers 1050 within the FOV of the relayed object surfaces 121B and 123B. In an embodiment, the real-world occlusion object 155A has its location controlled by a motorized positioning stage (not shown), and 155A can be moved 156 in coordination with the movement of a projected holographic object 121A so that the relayed position 155B of relayed occlusion object 155A continually coincides with the position of a relayed holographic object surface 121B. A controller 190 may simultaneously issue display instructions to the light field display 1001A as well as issue commands to a motion controller in order to direct coordinated movement 156 of the real-world occlusion object 155A as well as movement of a projected holographic object 121AR. While the relay 5001 shown in FIG. 11C does not invert the depth profile of relayed objects 121AR, 122AR, and 123A, it is possible to use an occlusion object in a relay which does invert depth such as relay 5000 in FIG. 11A. In this case, the real-world object 123A could be replaced by a relayed real-world object with reversed depth. To arrange this, the real-world occlusion object 155A and a real-world object copy of 123A may have the same relative placement of 155A and 123A shown in FIG. 11C, but the real-world object copy of 123A would be relayed to the location 123A shown in FIG. 11C using a relay which inverts depth, such as a transmissive reflector relay 5030. Such a configuration will be shown in the display system 1400 in FIG. 14A presented below.

Many of the display systems in this disclosure are designed to relay light from one or more light sources through a relay system and to an observer. For the purposes of avoiding unwanted scattering and reflection within these display systems, it is best to avoid directing light into the display system in a direction opposite to the direction of the light being relayed and seen by one or more viewers. It is not always possible to keep the viewing area for relayed objects presented by a display system in the dark. FIG. 11C shows the display system of FIG. 11B confined to a light blocking enclosure or portion of an enclosure 1080 with a polarization filter 1081 used as a window in the path of relayed light paths in order to reject ambient environmental light. This ambient light rejection system comprised of enclosure 1080 and polarization filters 1081 and 1082 is discussed above with respect to FIGS. 5G and 5H for the case when relay 5001 is relay 5060. The polarization filter 1081 is placed in the path of relayed light paths 131B and 132B forming the surfaces 121B and 122B of relayed holographic objects, respectively, as well as relayed light paths 133B forming the relayed surface 123BS of a real-world object. The window 1081 may only pass the portion of these relayed light paths 131B, 132B, and 133B that are in a first state of polarization, while absorbing or reflecting the portion of these relayed light paths that is in a second state of polarization. The environmental light source 1085 produces light of two polarizations 1091, but a light source polarization filter 1082 only allows light 1092 of a second state of polarization to pass through and illuminate the environment around the display system, and this light will not pass through the polarization filter window 1081 of the display system and reflect or scatter from elements within the relay 5001 or any other components in display system in FIG. 11C. In an embodiment, a polarized light source 1085 may be used without a light source polarization filter 1082. It should be appreciated that the ambient light rejection system formed by ambient light polarization filter 1082, the light blocking enclosure 1080, and the display system polarization filter window may be used for any of the display systems with relays presented in this disclosure.

In FIGS. 11A-C, the optical combining system 101 may include a first input interface configured to receive light along a first set of light paths (e.g. 131A) from a first image source which is the surface 1021A of light field display 1001A wherein the light from the first image source is operable to define a first image surface (e.g. 121A in FIG. 11A, 121AR in FIGS. 11B and 11C); and a second input interface configured to receive light along a second set of light paths (e.g. 133Y) from a second image source (e.g. emissive or reflective surface 123AS of real-world object 123A), wherein the light from the second image source is operable to define a second image surface (e.g. 123AS). In an embodiment, the first image source 1001A comprises the surface 1021A of a light field display 1001A as shown in FIG. 11A operable to define a holographic first image surface (e.g. 121A in FIG. 11A, 121AR in FIG. 11B), and the first set of light paths (e.g. 131A) of the light field display 1001A image source is determined according to a four-dimensional function defined by the light field display 1001A such that each projected light path (e.g. 131A) has a set of spatial coordinates and angular coordinates in a first four-dimensional coordinate system defined with respect to a light field display screen plane 1021A. The first image surface of the light field display 1001A may include a holographic surface, such as holographic surfaces 121A and 122A in FIG. 11A, and 121AR and 122AR in FIG. 11B.

In an embodiment, the second image source 123A may include the surface of a 2D display, a stereoscopic display surface, an autostereoscopic display surface, a multi-view display surface including a multi-view display surface in one axis (e.g. the surface of a horizontal parallax only or HPO display such as a lenticular display), the surface or surfaces of a volumetric 3D display, a second light field display surface, the surface of real-world object emitting light, or the surface of a real-world object reflecting light. Correspondingly, the image surface of the second image source may include an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object formed by light paths projected from a second light field display, a surface of a real-world object, or a relayed image of the surface of the real-world object. In an embodiment, the first relay system 5000 or 5001 may be configured to receive combined image light from the optical combining system 101 and relay the received light to relayed locations in a viewing volume defined by boundary 1060 and viewable by observer 1050, whereby first and second relayed image surfaces 121B/122B and 123B in FIGS. 11A-C are observable at the respective relayed locations. The image source for a holographic object is a light field display surface, which projects light which converges at the surface of a holographic object and leaves this surface just as if a real object were there emitting or reflecting light. In this example, the surface of a holographic object is a true location of converged light. However, the image surfaces produced by other types of image sources, such as some stereoscopic, autostereoscopic displays, or horizontal parallax only (HPO) multi-view displays are operable to define perceived image surfaces even though the viewer may be focusing his or her eyes at the display screen when observing these perceived surfaces. In these instances, the relay will relay the light rays forming a perceived image surface to a perceived relayed image surface at another location that may be observed by a viewer.

Many variations of the configuration shown in FIG. 11A-C are possible. The occlusion system may comprise an occlusion system optically preceding at least one of the first and second input interface (e.g. on light path 133Y in FIG. 11A), the occlusion system configured to occlude a portion of at least one of the first and second image surfaces (e.g. surface 123A in FIGS. 11A-C), wherein the occluded portion corresponds to a relayed occluded portion of at least one of the first and second relayed image surfaces (e.g. occluded portion 189 of relayed image surface 123BS in FIGS. 11A-B), the relayed occluded portion (e.g. 189 in FIGS. 11A-B) being observable as being occluded by the other one of the first and second relayed image surfaces (e.g. relayed image 121B in FIGS. 11A-B). In an embodiment, the occlusion system comprises at least one occlusion layer (e.g. layers 151, 152, and 153 of occlusion system 150 in FIG. 11A). In an embodiment, the occlusion layer comprises one or more individually addressable elements (e.g. 188 in FIGS. 11A-B). The one or more individually addressable elements may comprise occlusion sites configured to block a portion of incident light or parallax barriers. In an embodiment, the one or more occlusion layers with individually addressable elements comprises one or more transparent LED panels, transparent OLED panels, LC panels, or other panels operable to selectively occlude light. In an embodiment the first relayed image surface 121B in FIGS. 11A-B comprises a foreground surface in front of the second relayed image surface 123B comprising a background surface, and the at least one occlusion layer is located in front of second image source 123A and is operable to define an occlusion region 188 having a size and shape scaled to that of the foreground surface 121B so that an occluded portion 189 of the background surface 123B cannot be observed behind the foreground surface 121B. In an embodiment, a distance between the at least one occlusion layer 152 and the second image surface source 123AS is substantially equal to a distance between the foreground relayed surface 121B and the background relayed surface 123B. In an embodiment, the occlusion region 188 defined by the at least one occlusion layer is relayed to the viewing volume defined by boundary 1060 to substantially coincide with the foreground surface 121B. In an embodiment, the optical system further comprises a controller operable to coordinate a movement of the occlusion region 188 with a movement of an image surface 121B/122B in the viewing volume defined by boundary 1060. In an embodiment, the movement of the occlusion region in the at least one occlusion layer 152 in FIG. 11A is effected at least in part by modulating individually addressable elements 188 in FIG. 11A in the at least one occlusion layer.

In an embodiment, the occlusion system may be provided by a real-world occlusion object (155A in FIG. 11C), and this occlusion object may be motorized so it's relayed position (155B in FIG. 11C) may stay in synchronization with the relayed image surface (121B in FIG. 11C). In an embodiment, and referencing FIG. 11C, the first relayed image surface 121B comprises a foreground surface in front of the second relayed image surface 123B comprising a background surface, and wherein the at least one occlusion object 155A is located in front of the second image source 123A, and the size and shape of the at least one occlusion object 155A is scaled to that of the foreground surface 121B in the viewing volume defined by boundary 1060 so that an occluded portion of the background surface 123BS cannot be observed behind the foreground surface 121B. In an embodiment, and referencing FIG. 11C, a distance between the at least one occlusion object 155A and the second image surface source 123A is substantially equal to a distance between the foreground 121B and background 123B relayed surfaces. In another embodiment, and referencing FIG. 11C, an occlusion region defined by the at least one occlusion object 155A is relayed to the viewing volume defined by boundary 1060 to 155B to substantially coincide with the foreground surface. In an embodiment, the at least one occlusion object 155A is motorized so it may be moved 156. In another embodiment, the optical system further comprises a controller 190 operable to coordinate a movement 156 of the at least one occlusion object 155A with a movement of a relayed image surface 121B, 122B, or 123B in the viewing volume defined by boundary 1060. In an embodiment, a first relayed image surface 121B/122B in FIGS. 11A-C is observable in the foreground, while a second relayed image surface 123B in FIGS. 11A-C is observable in the background. In another embodiment, the first relayed image surface could be observable in a background, and the second relayed image surface could be observable in the foreground. In still another embodiment, the first and second relayed image surfaces may be both observable in a foreground or a background. In an embodiment shown in FIG. 11B, wherein the relay system does not reverse the depth profile of a relayed object surface, a relay system is configured to relay the relayed image surface 123B of the real-world object 123A to the relayed locations that define the respective relayed image surface 123B of the real-world object in the viewing volume defined by boundary 1060 such that the respective relayed image surface 123B of the real-world object in the viewing volume has a depth profile that is substantially the same as the depth profile of the surface of the real-world object 123A.

In an embodiment, there may be an optical fold system optically preceding at least one of the first and second interfaces of the optical combining system 101 (in the path of light from the holographic display 1001A or in the path of light from the real-world object 123A in FIGS. 11A-C). Alternatively, in FIG. 11A, the optical fold system 1150 may be placed: between the optical combining system 101 and the relay system 5000 (after the light 131A and 132A from the holographic objects has been combined with the light 133Y from the real-world object 123A); between the relay system 5000 and the observer 1050, or in some other location in an optical path of the system. An optical fold system 1150 may be used to extend the path lengths of light from either first source 1001A or second source 123A. As shown above, a selective optical fold system (selective path length extender) 1160 shown in FIG. 10C or selective optical fold system 1170 shown in FIG. 10D may be used to selectively extend the path lengths of a first group of light rays 131A in FIG. 11C forming holographic surface 121AR without affecting the second group of light rays 132A forming holographic surface 122AR, and vice-versa. As an example, activating an optical fold system in the path of light rays 131A from projected surface 121AR would move the corresponding relayed surface 121B closer to observer 1050. In an embodiment, the display system shown in FIG. 11C may comprise a controller 190 which issues coordinated display instructions to the light field display 1001A, configuration instructions to motion controllers responsible for movement 156 of occlusion object 155A, and configuration instructions for a selective optical fold system 1160 or 1170.

In an embodiment the optical display system of FIGS. 11A-C may further comprise an optical fold system optically preceding one of the first and second interfaces of the relay 5000 or 5001. These optional optical fold systems are labelled 1150, 1160, or 1170 located in the paths of light 133A from first image source 123A or located in the light paths 131A and 132A from second image source 1001A in FIGS. 11A-C. Optical fold system 1150 is described in detail above in reference to FIGS. 10A-B, while selective optical fold systems 1160 and 1170 are described above in detail in reference to FIGS. 10C and 10D, respectively. In an embodiment, the optical fold system 1150, 1160, or 1170 comprises a plurality of internal optical layers, and light from the respective image source 1001A or 123A is directed along a plurality of internal passes between internal optical layers thereby increasing an optical path distance between the relay subsystem and image surface locations in the viewing volume defined by boundary 1060. In an embodiment, in FIGS. 11A-C, one image source comprises the light field display 1001A, and the optical fold system is located in the path of the light 131A and 132A from the light field display to increase the optical path length distance between respective image surface locations 121B/122B in the viewing volume defined by boundary 1060 and the relay system 5000 or 5001. In an embodiment, referencing FIGS. 11A-C, one image source comprises the light field display 1001A, and the optical fold system is located in the path of the second image source 123A to increase the optical path length distance between respective image surface locations such as 123B in the viewing volume defined by boundary 1060 and the relay system 5000 or 5001. In another embodiment, the optical system shown in FIG. 11C may further comprise an optical fold system optically following at least one of the first and second interfaces of the relay system, within the internal layers of the relay system 5001 or on the output of the relay system 5001 in the path of light rays 131B, 132B, and 133B. In an embodiment, the optical systems shown in FIGS. 11A-C have an environmental light rejection system as shown in FIG. 11C which comprises an enclosure (e.g. 1080 in FIG. 11C) that partially encloses the relay system and a window comprising a polarization filter (e.g. 1081 in FIG. 11C). In a further embodiment, the polarization filter is operable to block ambient light having a first polarization state. The ambient light has may have a first polarization state and is provided by a light source comprising a polarization output filter configured to allow light only of the first polarization state to pass through (e.g. light source 1085 being filtered by polarization output filter 1082 in FIG. 11C).

The relay system 5001 in FIG. 11B may be configured like relay system 5080 in FIG. 9A or relay system 5090 in FIG. 9G such that the real-world object 123A may be relayed twice possibly for the purpose of solving depth reversal. In some configurations, the relay system 5001 may introduce magnification changes of the relayed holographic objects or real-world objects, like relay 5040 in FIG. 5D, 5050 in FIG. 5E, or 5060 in FIG. 5F. In other configurations, the relay 5001 may introduce u-v angular coordinate remapping for light rays, as described above for the curved surface relays 5040 in FIG. 5D and 5050 in FIG. 5E, or the Fresnel mirrors of relay 5060 in FIG. 5F. The relay may introduce a 90 degree rotation between the light field display plane 1021A and the relayed virtual display plane 1022A, a 180 degree rotation, or, in another embodiment, no rotation in a configuration where the relay is in-line with the light field display 1001A and the observer, described below. In some configurations, there is substantial distance between the first relayed image surface 121B/122B of the light field display 1001A and the second relayed image surface 123B of the real-world object 123A. In another embodiment, the relay system 5000 or 5001 may relay only the holographic object surfaces 121A/122A in FIG. 11A and 121AR/122AR in FIG. 11B, and merely transmit the light from the real-world object without relaying it, or, conversely, the relay may relay only the image surface 123A from the real-world object and merely transmit the light from the respective holographic object surfaces 121A/122A in FIG. 11A and 121AR/122AR in FIG. 11B without relaying the holographic object surfaces. Examples of many of these configurations are given below.

Figure 11D:
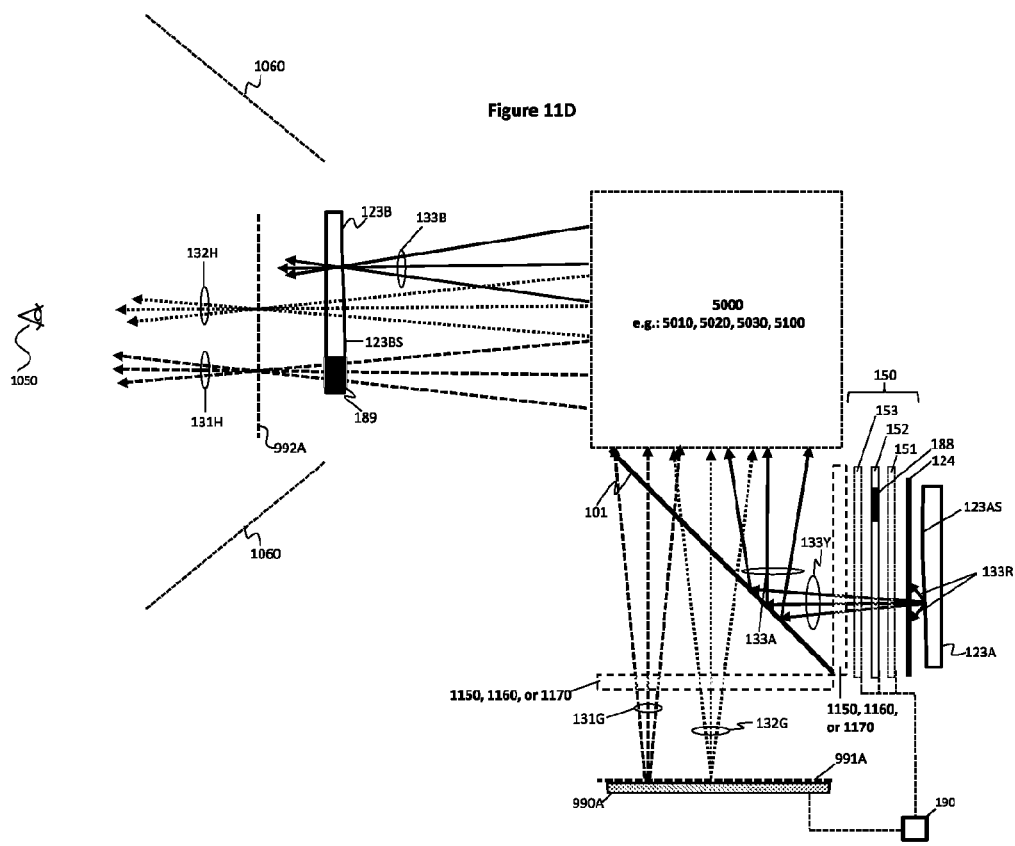
FIG. 11D illustrates an embodiment of a relay system configured to relay light from two sources.
Figure 11E:
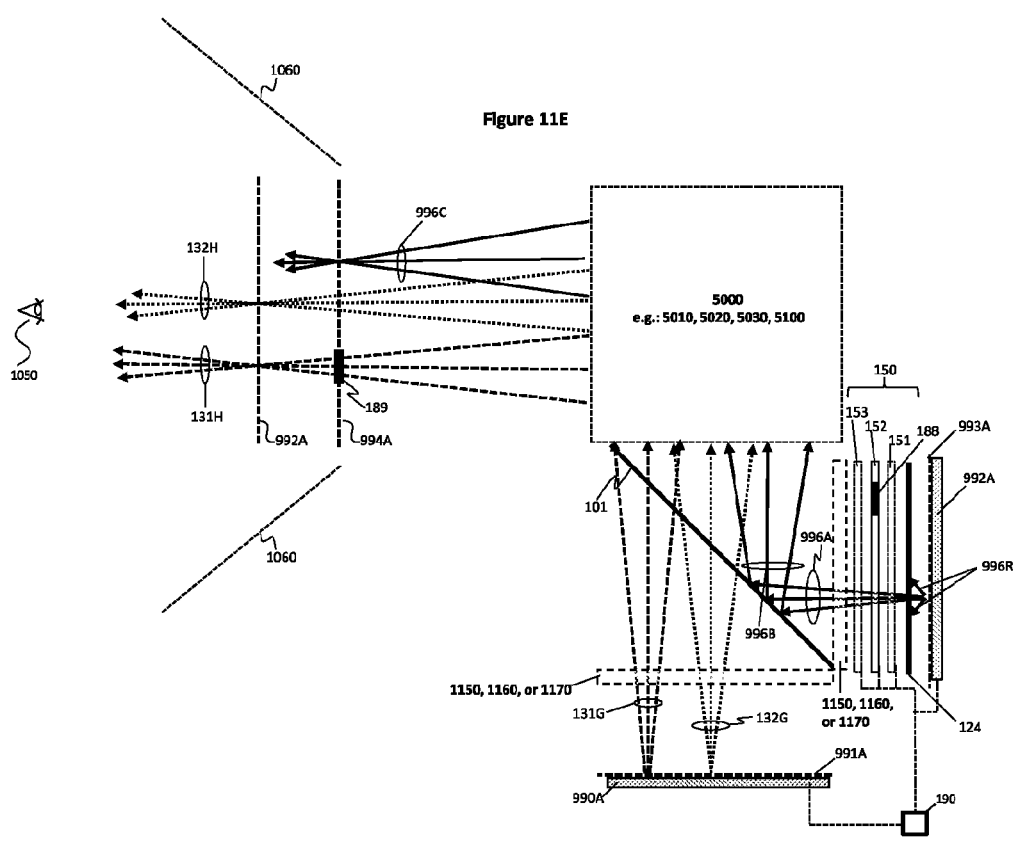
FIG. 11E illustrates an embodiment of a relay system configured to relay light from a display and one other source.

The next two figures FIGS. 11D and 11E illustrate optical systems comprising: an optical combining system comprising a first input interface configured to receive light along a first set of light paths from a first image source, wherein the light from the first image source is operable to define a first image surface; a second input interface configured to receive light along a second set of light paths from a second image source, wherein the light from the second image source is operable to define a second image surface; a relay system configured to receive combined light from the optical combining system and relay the received light to relayed locations in a viewing volume defined by boundary 1060, whereby first and second relayed image surfaces are observable at the respective relayed locations; and an occlusion system configured to occlude a portion of light from at least one of the first and second image sources. In these optical systems, neither the first image source nor the second image source is required to be a light field display, but otherwise these optical systems are like the optical systems shown in FIGS. 11A-C.

FIG. 11D is the display system of FIG. 11A with the first image source light field display 1001A replaced by display 990A with display surface 991A. The numbering of FIG. 11A is used in FIG. 11D. Light rays 131G and 132G from the first image source display 990A with surface 991A are relayed to light paths 131H and 132H, respectively, and are focused on relayed virtual display plane 992A. Real-world object 123B is relayed to the same place as shown in FIG. 11A. Sites 188 on occlusion planes 151-153 may be activated to block out some of the light from real-world object 123A, so that portions of the relayed image 123B of the real-world object cannot be seen behind relayed images on the virtual display plane 992A. The controller 190 may issue instructions to the occlusion system 150 as well as the first image source 990A. In an alternate configuration, light rays 133Y may be blocked using a real-world occlusion object like 155A shown in FIG. 11C, and this occlusion object may be moved using one or more motorized stages as directed by the controller 190. In an embodiment, while the first and second image sources in FIG. 11D are a display 990A and a real-world object 123A, the first and second image sources can each be any of: a 2D display surface, a stereoscopic display surface, an autostereoscopic display surface, a multi-view display surface which may be the surface of a horizontal parallax-only multi-view display such as a lenticular display, the surface or surfaces of a volumetric 3D display, the surface of a real-world object emitting light, or the surface of a real-world object reflecting light. The light from each of the first and second image source is operable to define a corresponding image surface which may be any of: an image surface projected from a 2D display surface, an image surface projected from a stereoscopic display surface, an image surface projected from an autostereoscopic display surface, an image surface projected from a multi-view display surface, the image surface of a volumetric 3D display, the surface of a holographic object formed by light paths projected from a light field display, a surface of a real-world object, or a relayed image of the surface of a real-world object. In an embodiment, the depth profile reversing relay 5000 in FIG. 11D may be replaced with another relay 5001 introduced in FIG. 11B which does not perform depth reversal, resulting in projected image surfaces defined by first and second image sources being relayed to relayed image surfaces with different depth profiles than the projected image surfaces.

In another embodiment, and as a further configuration option of the relay system shown in FIG. 11A, the real-world object 123A in FIG. 11D may be instead may be a second display. FIG. 11E is the display system of FIG. 11A with both the light field display 1001A and the real-world object 123A both replaced by displays 990A and 992A, possibly of different types. In FIG. 11E, display surface 991A of display 990A and display surface 993A of display 992A may each be a 2D display surface, a stereoscopic display surface, an autostereoscopic display surface, a multi-view display surface, the surface or surfaces of a volumetric 3D display, a light field display surface, the surface of a real-world object emitting light, or the surface of a real-world object reflecting light. Some of the numbering of FIG. 11D is used in FIG. 11E. Light paths 131G and 132G from display 990A are relayed to light paths 131H and 132H, respectively, forming a focused first virtual relayed image plane 992A. Light paths 996A from display 993A are deflected by the image combiner 101 into light paths 996B, the light paths 996B received by relay 5000 and relayed to light paths 996C which converge on a second relayed virtual image plane 994A. Light paths 996R at a high angle may be rejected by an angle filter 124. For observer 1050, virtual relayed image plane 992A is in front of relayed image plane 994A, and so occlusion regions 188 on the one or more occlusion planes 151-153 may be activated in order to block portions of light 189 from the background relayed image plane 994A from being seen behind foreground images on the foreground relayed image plane 992A. The controller 192 may be connected to the occlusion system 150 as well as the first image source 990A and the second image source 992A. Occlusion may be also achieved by instructing the display 992A not to emit light, rather than relying on an occlusion system 150. The occlusion system 150 may be replaced by a real-world occlusion object 155A shown in FIG. 11C.

In an embodiment, as illustrated in FIGS. 11D-E, a display system may be comprised of an optical combining system 101 which may include 1) a first input interface configured to receive light along a first set of light paths 131G or 132G from a first image source 990A, wherein the light from the first image source 990A is operable to define a first image surface 991A; and 2) a second input interface configured to receive light 133Y in FIG. 11D or 996A in FIG. 11E along a second set of light paths from a second image source 123A in FIG. 11D or 992A in FIG. 11E, wherein the light from the second image source is operable to define a second image surface 123AS in FIG. 11D or 993A in FIG. 11E. The display system may also be configured to receive combined image light (e.g. 131G, 132G, and 133A in FIG. 11D and 131G, 132G, and 996B in FIG. 11E) from the optical combining system 101 and relay the received light to relayed locations (e.g. 992A and 123B in FIG. 11D, and 992A and 994A in FIG. 11E), whereby first and second relayed image surfaces (e.g. images on 992A or the surface 123BS of the relayed image 123B of the real-world object in FIG. 11D, or images on 992A and 994A in FIG. 11E) are observable at the respective relayed locations. The display system may also be comprised of an occlusion system optically preceding at least one of the first and second input interface (occlusion regions 188 on occlusion layers 151A, 151B, and 151C), the occlusion system configured to occlude a portion of at least one of the first and second image surfaces (123AS in FIG. 11D, 993A in FIG. 11E), wherein the occluded portion corresponds to a relayed occluded portion (189) of at least one of the first and second relayed image surfaces (123BS in FIG. 11D, or 994A in FIG. 11E), the relayed occluded portion being occluded by the other one of the first and second relayed image surfaces (123BS may be occluded by images on surface 992A in FIG. 11D, and images on surface 994A may be occluded by images on surface 992A in FIG. 11E). Alternatively, the occlusion system shown in FIG. 11C may be utilized wherein the occlusion of at least one of the first and second relayed image surfaces (123BS in FIG. 11D, or 994A in FIG. 11E) may be achieved with a real-world occlusion object 155A disposed in front of the first or second image surfaces. More generally, and as demonstrated in FIGS. 11A-D, the at least one of the first and second image sources comprises: a 2D display surface, a stereoscopic display surface, an autostereoscopic display surface, a multi-view display surface including the display surface of a horizontal parallax-only or HPO display, the surfaces within a volumetric 3D display, a light field display surface, the surface of a real-world object emitting light, or the surface of a real-world object reflecting light. In an embodiment, at least one of the first and second image surface comprises: an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object formed by light paths projected from a light field display, a surface of a real-world object, or a relayed image of the surface of the real-world object. The characteristics of the occlusion system, optical fold systems, and ambient light rejection shown in FIGS. 11D-E has been described in reference to FIGS. 11A-C above.

It is possible that an optical system may contain a first input interface configured to receive light along a first set of light paths from a first image source, wherein the light from the first image source is operable to define a first image surface, a second input interface configured to receive light along a second set of light paths from a second image source comprising a light field display, and a relay system configured to direct the received light from the first and second image sources to a viewing volume defined by boundary 1060, wherein at least one of the first and second image surfaces is relayed by the relay system into the viewing volume defined by boundary 1060. Light from only one of the first or second image sources may be relayed. FIGS. 8A-C demonstrate relay configurations with two sources, where the relay itself combines the light from the two sources. FIG. 11F illustrates an optical display system wherein the relay 5002 accepts light paths from two image sources and simultaneously combines and relays the light paths. The relay 5002 may be the relay 5090 shown in FIG. 9G, or the relay 5080 shown in FIG. 9A with an image combiner placed between the two relay elements 5030A and 5030B to accept light paths from a second image source (see FIG. 9J). In FIG. 11F, the relay 5002 has a first input interface configured to receive light along a first set of light paths 133A from a first image source 123A, wherein the light from the first image source is operable to define a first image surface 123AS on the surface of a real-world object 123A which may take the form of an emissive surface 123AS or a reflective surface 123AS. A second interface of relay system 5002 is configured to receive a second set of light paths 131A and 132A from second image source light field display 1001A which are determined according to a four-dimensional function defined by the light field display 1001A such that each projected light path 131A and 132A has a set of spatial coordinates and angular coordinates in a first four-dimensional coordinate system defined with respect to a display screen plane 1021A of the second image source. The light 131A, 132A from the second image source is operable to define second image surfaces 121A and 122A comprising holographic image surfaces. The relay system 5002 is configured direct the received light 121A, 122A from the second image source 1001A and the received light 133A from first image source 123AS to a viewing volume defined by boundary 1060 near virtual plane 1022A, wherein at least one of the first 123A and second 121A/122B image surfaces and in this case both are relayed by the relay system into the viewing volume defined by boundary 1060. In FIG. 11F, the relay system 5002 relays the received light 131A, 132A forming image surfaces 121A, 122A into light paths 131B, 132B forming relayed image surfaces 121B, 122B, respectively. The relay system 5002 also relays the received light 133A from real-world image surface 123AS into light rays 133B forming relayed surface 123BS.

In FIG. 11F, a controller 190 may be connected to the occlusion system 150 as well as the image source light field display 1001A and issue display instructions to the light field display 1001A and simultaneously issue occlusion instructions to the one or more occlusion layers 151, 152, and 153 in occlusion system 150 in order to correctly occlude the relayed surface of the real-world object 123BS behind one or more of the relayed holographic surfaces 121B and 122B as viewed by a viewer 1050 anywhere in the viewing volume defined by boundary 1060 of the relayed objects 121B, 122B, and 123B. In FIG. 11F, both the first 123A and second 121A/122A image surfaces are relayed by the relay system 5002 into the viewing volume near observer 1050 to define first 123B and second 121B/122B relayed image surfaces, respectively, and wherein the occluded portion 188 of the light 133A corresponds to a relayed occluded portion 189 of at least one of the first 123B and second 121B/122B relayed image surfaces (in this case the first relayed image surface 123B), the relayed occluded portion being observable in the viewing volume defined by boundary 1060 near observer 1050 as being occluded by the other one of the first and second relayed image surfaces (in this case 121B). In an embodiment, at least one occlusion layer may have one or more individually addressable elements, which may be occlusion sites configured to block a portion of incident light or parallax barriers. The occlusion layers with individually addressable occlusion elements may be one or more transparent LED panels, transparent OLED panels, LC panels, or other panels operable to selectively occlude light or form parallax barriers. Alternatively, the occlusion system shown in FIG. 11C may be utilized wherein the occlusion of at least one of the first and second relayed image surfaces (123BS in FIG. 11F) may be achieved with a real-world occlusion object (155A in FIG. 11C) disposed in front of the first or second image surfaces (123A in FIG. 11F). In this case, the controller 190 may issue instructions to a motion controller which changes the position of the real-world occlusion object in coordination with the movement of a relayed holographic object 121B, as demonstrated in FIG. 11C. In an embodiment, a distance between the at least one occlusion layer 152 and the background image source 123A is substantially equal to a distance between a foreground relayed surface 121B and the relayed background surface 123B. In another embodiment, the occlusion region 188 defined by the at least one occlusion layer 152 is relayed to the viewing volume defined by boundary 1060 to substantially coincide with the foreground surface 121B. In an embodiment, a controller 190 is operable to coordinate a movement of the occlusion region 188 (or the position of a real-world occlusion object such as 155A in FIG. 11C) with a movement of an image surface 121B or 122B in the viewing volume defined by boundary 1060. In an embodiment, the first image source 123A comprises: a 2D display surface, a stereoscopic display surface, an autostereoscopic display surface, a multi-view display surface, the surface or surfaces of a volumetric 3D display, a second light field display surface, the surface of a real-world object emitting light, or the surface of a real-world object reflecting light. In an embodiment of FIG. 11F, an additional occlusion system comprised of a real-world occlusion object (e.g. 155A in FIG. 11C) or one or more occlusion planes (e.g. 150) optically preceding the second input interface of the relay 5002 in the path of light rays 131A and 132A may be configured to occlude a portion of light from the light field display 1001A corresponding to a portion of relayed holographic surfaces 121B or 122B which may be occluded by relayed first image surface 123B in the event that 123B is relayed in front 121B or 122B. In an embodiment, the size and shape of the at least one occlusion region 188 or occlusion object (not shown, but similar to 155A in FIG. 11C) is scaled to that of the foreground surface 121B in the viewing volume defined by boundary 1060 so that an occluded portion 189 of the background surface 123B cannot be observed behind the foreground surface 121B. In an embodiment, light from the first 123A and second 1001A image sources are both relayed into the viewing volume defined by boundary 1060 to form first relayed image surface 123B and second relayed image surfaces 121B, 122B, respectively. The first and second relayed image surfaces may be both observable by 1050 in a foreground, both observable in a background, or one may be in the foreground and the other one in the background.

The relay 5002 of the display system shown in FIG. 11F may be the relay 5090 shown in FIG. 9G comprised of two transmissive reflectors 5030 placed on parallel planes and separated from one another with an image combiner 101F disposed between them. The first transmissive reflector relay subsystem offers a first input interface configured to receive light from a first image source which is the surface of real-world object 123A and is operable to relay the received light to a define a first relayed image surface of the real-world object 123A and be received by an image combiner, the first relayed image surface having a depth profile different from a depth profile of the respective image surface 123A. The relay system 5090 further comprises an image combining element positioned to combine light from the first relay subsystem forming the relayed surface of real-world object surface 123A and the light from the second image source defining a holographic surface, wherein the combined light comprising the first relayed image surface and the holographic surface is directed to the second relay subsystem, which is configured to relay the combined light to the viewing volume defined by boundary 1060 near viewer 1050. The image combiner offers a first interface to receive light from the surface 123AS of the first image source 123A, and this light is combined with the light from the second image source 1001A and relayed to a viewing volume 1060 near viewer 1050 by the second transmissive reflector relay subsystem. The surface of real-world object 123A is relayed twice to 123B, while the surfaces of projected holographic objects 121A, 122A ae relayed once to 121B, 122B, respectively. For this reason, the depth profile of the once relayed holographic surfaces 121B, 122B is reversed, while the depth profile of the twice-relayed holographic surface 123B of real-world object 123A is not reversed. In other words, the relay system 5002 comprises a second relay subsystem (e.g. 5030G in FIG. 9G) configured to relay the first relayed image surface relayed from surface 123AS to relay locations in the viewing volume 1060 near observer 1050 to define a second relayed image surface 123B corresponding to the respective image surface 123A defined by light from the first image source 123A, the second relayed image surface 123B having a depth profile that is substantially the same as depth profile of the respective image surface 123A defined by light from the first image source 123A. In an embodiment, holographic surfaces 121A, 122A defined by light paths 131A, 132A projected from the light field display 1001A have first projected depth profiles with respect to screen plane 1021A, respectively, and the holographic surfaces are relayed by the relay system to define first relayed image surfaces 121B, 122B comprising relayed holographic surfaces with first relayed depth profiles relative to virtual plane 1022A that are different from the corresponding first projected depth profiles. In an embodiment, the light field display comprises a controller 190 configured to receive instructions for accounting for the difference between the first projected depth profiles and the first relayed depth profiles by operating the light field display 1001A to output projected light such that the first relayed depth profiles of the first relayed image surfaces are the depth profiles intended for a viewer. In another embodiment, relayed locations of the first relayed image surfaces 121B, 122B are determined according to a second 4D function defined by the relay system 5002, such that light from the light field display 1001A is relayed along respective relayed light paths 131B, 132B each having a set of spatial coordinates and angular coordinates in a second 4D coordinate system, and the light field display 1001A comprises a controller 190 configured to receive instructions for accounting for the second 4D function by operating the light field display 1001A to output light according to the first 4D function such that the positional coordinates and angular coordinates in the second 4D coordinate system for the relayed light paths 131B, 132B allow the relayed image surfaces 121B, 122B to be presented to a viewer 1050 as intended. This is discussed in detail with reference to FIG. 5D above.

In an embodiment the optical display system of FIG. 11F may further comprise an optical fold system optically preceding one of the first and second interfaces of relay 5002. These optional optical fold systems are labelled 1150, 1160, or 1170 located in the paths of light 133A from first image source 123A or located in the light paths 131A and 132A from second image source 1001A in FIG. 11F. Optical fold system 1150 is described in detail above in reference to FIGS. 10A-B, while selective optical fold systems 1160 and 1170 are described above in detail in reference to FIGS. 10C and 10D, respectively. In an embodiment, the optical fold system 1150, 1160, or 1170 comprises a plurality of internal optical layers, and light from the respective image source is directed along a plurality of internal passes between internal optical layers thereby increasing an optical path distance between the relay subsystem and image surface locations in the viewing volume defined by boundary 1060. In an embodiment, one image source comprises the light field display 1021A, and wherein the optical fold system is located in the path of the light 131A and 132A from the light field display to increase the optical path length distance between respective image surface locations in the viewing volume near observer 1050 and the relay system 5002. In an embodiment, one image source comprises the light field display 1001A, and wherein the optical fold system is located in the path of the second image source 123A to increase the optical path length distance between respective image surface locations such as 123B in the viewing volume defined by boundary 1060 near viewer 1050 and the relay system 5002. In another embodiment, the optical system shown in FIG. 11F may further comprise an optical fold system optically following at least one of the first and second interfaces of the relay system, within the internal layers of the relay system 5002 or on the output of the relay system 5002 in the path of light rays 131B, 132B, and 133B. In an embodiment, the optical system shown in FIG. 11F has an environmental light rejection system as shown in FIG. 11C which comprises an enclosure (e.g. 1080 in FIG. 11C) that partially encloses the relay system and a window comprising a polarization filter (e.g. 1081 in FIG. 11C). In a further embodiment, the polarization filter is operable to block ambient light having a first polarization state. The ambient light has may have a first polarization state and is provided by a light source comprising a polarization output filter configured to allow light only of the first polarization state to pass through (e.g. light source 1085 being filtered by polarization output filter 1082 in FIG. 11C).

The relay 5002 of the display system shown in FIG. 11F relays first emissive or reflective surface 123AS from first image source real-world object 123A as well as second holographic image surfaces 121A, 122A projected by second image source light field display 1001A. In an embodiment, the optical system shown in FIG. 11F may be comprised of a relay which receives sets of light paths from these two image sources and directs this light to a viewing volume defined by boundary 1060, but wherein only one set of light paths from one of the image sources is relayed. FIG. 11G is the display system in FIG. 11F wherein the relay 5002 which relays image surfaces from two sources has been replaced by relay 5003 which only relays the image surfaces projected from one source, the light field display 1001A, while directly passing light from the other image source real-world object 123A to the viewing volume near observer 1050. The numbering of FIG. 11F is used in FIG. 11G. The relay 5003 may be the relay system 5020 shown in FIG. 1B with only one retroreflector 1006B, the relay system 5050 shown in FIG. 5E with only one reflective mirror 1007B, relay system 5060 shown in FIG. 5F with only one reflective Fresnel mirror 1008B, or some other relay which simultaneously relays light from a first interface while directly passing light that arrives from a second interface. Each of these relays 5020, 5040, and 5050 may be comprised of a beam splitter and a focusing element (e.g. a retroreflector for 5020 or a reflective focusing mirror for 5040 and 5050) disposed opposite to a first relay interface which accepts light from the light field display 1001A. Projected holographic surfaces 121A and 122A will be relayed by the first interface of these relay configurations 5020, 5040, and 5050, while light from the real-world object 123A received on the second relay interface will pass directly through the beam splitter of the relay and to observer 1050 without being actively relayed.

An observer 1050 in a viewing volume defined by boundary 1060 may see two foreground relayed holographic surfaces 121B and 122B in front of a real-world background object 123A which produces light 133A which passes directly through the relay 5003. An occlusion system 150 comprised of occlusion planes, or a real-world occlusion object like 155A shown in FIG. 11C may be used to occlude the portion of the real-world background object 123A behind one or more relayed holographic surfaces 121B and 122B. In an embodiment, only one of the first and second image surfaces (e.g. 121A/122A, but not 123AS in FIG. 11G) is relayed into the viewing volume near viewer 1050 to define a relayed image surface 121B/122B in the viewing volume defined by boundary 1060, and wherein the occluded portion of the light (e.g. 133A in FIG. 11G) corresponds to an occluded portion of the other one of the first and second image surfaces (e.g. 123AS) observable in the viewing volume as being occluded by the relayed image surface (e.g. 121B/122B).

Figure 11H:
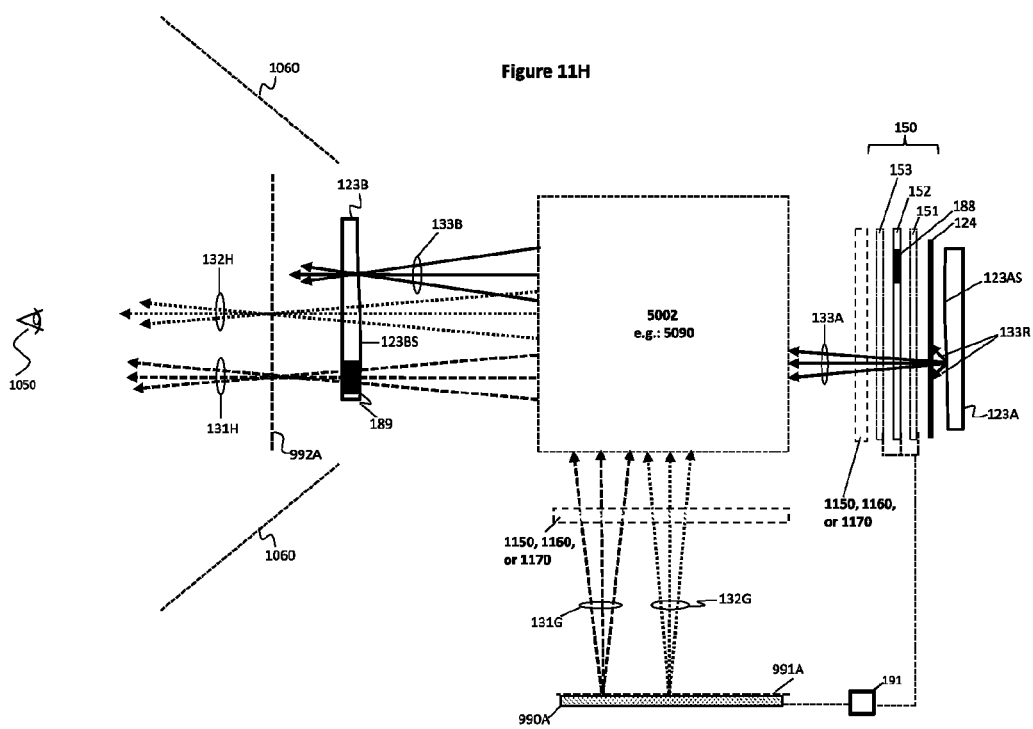
FIG. 11H illustrates yet another embodiment of a relay system with two interfaces configured to relay light from two image sources.
Figure 11I:
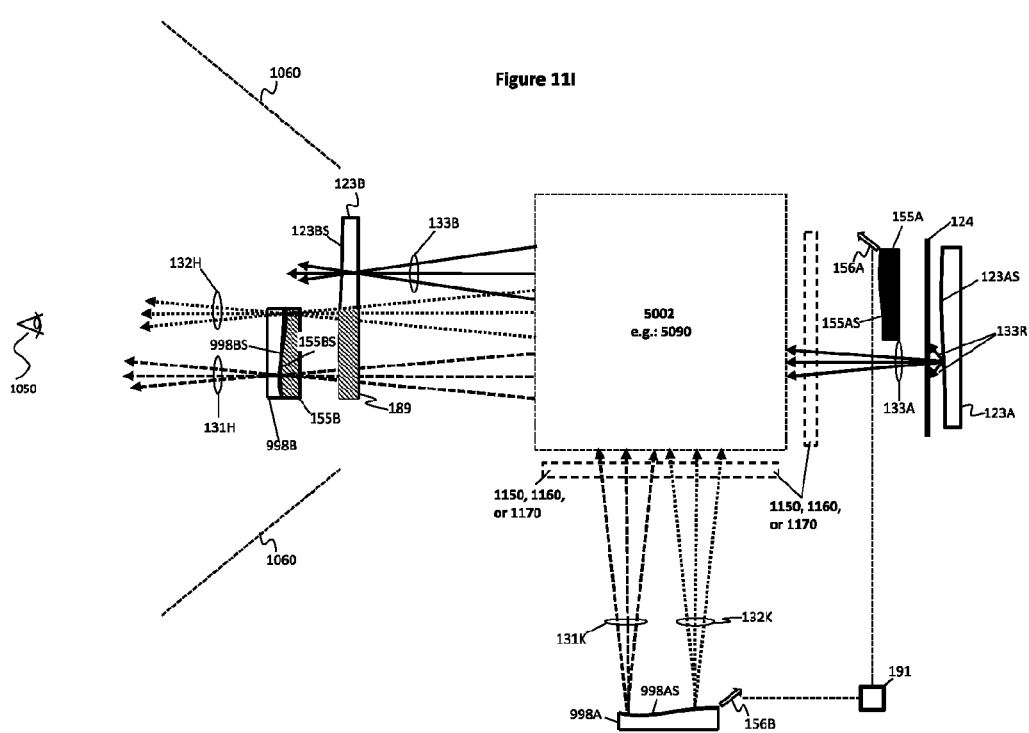
FIG. 11I illustrates an embodiment of a relay system configured to relay light projected from a first image source comprising a real-world object simultaneously with the light from a second image source comprising a real-world object.
Figure 11J:
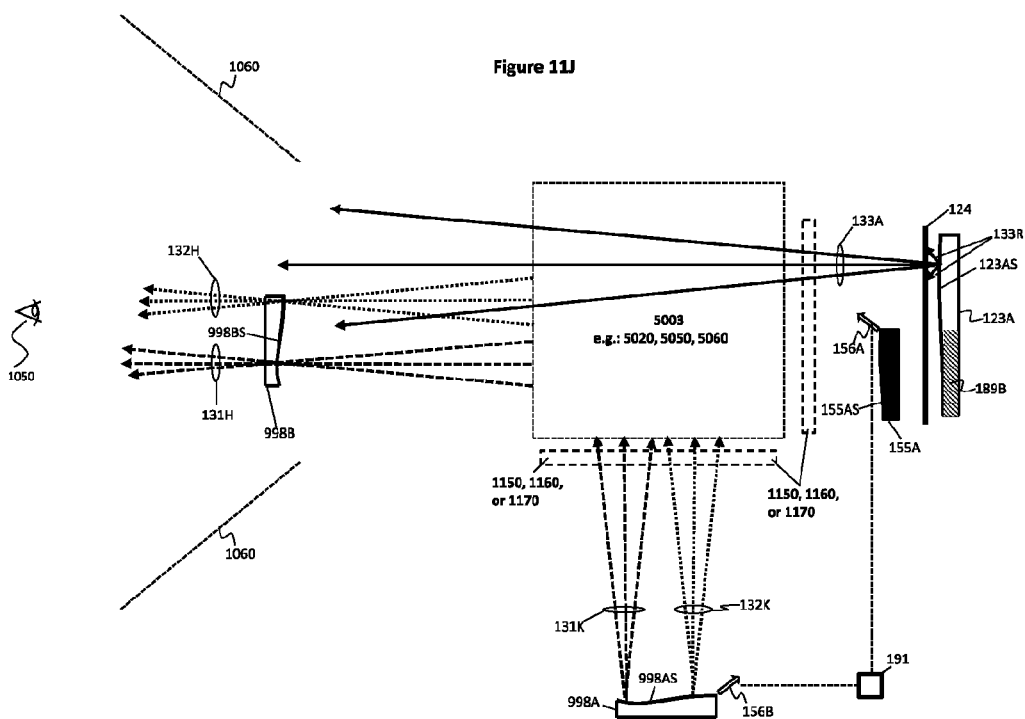
FIG. 11J illustrates an embodiment of a relay system configured to relay light projected from a first image source and simultaneously transmit light from a second image source.

In an embodiment, the light field display 1001A in FIGS. 11F and 11G instead may be another type of display. FIGS. 11H, 11I, and 11J below are embodiments of an optical system comprising a first input interface configured to receive light 133A along a first set of light paths from a first image source 123A, wherein the light from the first image source is operable to define a first image surface 123AS; a second input interface configured to receive light along a second set of light paths from a second image source, wherein the light from the second image source is operable to define a second image surface; a relay system configured to direct the received light from the first and second image sources to a viewing volume defined by boundary 1060, wherein at least one of the first 123A and second image surfaces is relayed by a relay system 5002 or 5003 into the viewing volume near viewer 1050; and an occlusion system 150 or 155A configured to occlude a portion of light from at least one of the first and second image sources. FIG. 11H is the display system of FIG. 11F with the second image source light field display 1001A replaced by second image source display 990A with display surface 991A. In an embodiment, the second image source may be the a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a real-world object emitting light, or the surface of a real-world object reflecting light. Some of the numbering of FIG. 11F is used in FIG. 11H. Light rays 131G and 132G from the second image source display 990A with surface 991A are relayed to light paths 131H and 132H, respectively, and are focused on relayed virtual display plane 992A. Real-world object 123B is relayed to the same place as shown in FIG. 11F. Occlusion planes 151-153 may be activated to block out some of the light from real-world object 123A, so that portions of the relayed image of the real-world object cannot be seen behind images that are relayed to the relayed virtual display plane 992A. The controller 191 may be connected to the occlusion system 150 as well as the first image source display 990A and possibly optional selective optical folding systems 1160 or 1170 if they are in place. In an embodiment, the first image source real-world object 123A as well as the second image source display 990A may be replaced by any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a light field display, the surface of a real-world object emitting light, or the surface of a real-world object reflecting light. The first image surface 123AS as well as the second image surface 991A may be any of: an image surface projected from a 2D display surface, an image surface projected from a stereoscopic display surface, an image surface projected from an autostereoscopic display surface, an image surface projected from a multi-view display surface, the image surface of a volumetric 3D display, the surface of a holographic object, a surface of a real-world object, or a relayed image of the surface of the real-world object.

FIG. 11I is the display system of FIG. 11F with the second image source light field display 1001A replaced by second image source real-world object 998A, and an occlusion system comprised of real-world occlusion object 155A used in place of the occlusion system 150 having one or more occlusion planes 151, 152, and 153. Light rays 131K and 132K from the real-world object 998A are received by the relay and relayed to light paths 131H and 132H, respectively, forming relayed object 998B with relayed surface 998BS. A real-world occlusion object 155A may be placed to occlude a portion of the light 133A from the first image source real-world object 123A. In an embodiment both the first 123AS and second 998AS image surfaces are relayed by the relay system 5002 into the viewing volume defined by boundary 1060 to define first 123BS and second 998BS relayed image surfaces, respectively, and wherein the occluded portion of the light corresponds to a relayed occluded portion of at least one of the first and second relayed image surfaces, in this example first image surface 123AS, the relayed occluded portion 189 being observable in the viewing volume near viewer 1050 as being occluded by the other one of the first and second relayed image surfaces, in this example second relayed image surface 999BS which will appear to block out a portion 189 of the light rays from background relayed image surface 123BS to observer 1050 when foreground relayed real-world object surface 999BS is in front of background relayed real-world object 123B. A controller 191 may be connected to a motion controller imparting motion 156A to the occlusion object 155A. In an embodiment, real-world objects 998A or 123A may be on a motorized stage controlled by controller 191, and the controller 191 may simultaneously adjust the position of the real-world object and change the location of the occlusion object 155A in order to keep the background relayed surface 123BS occluded when it is behind the foreground relayed surface 998BS.

FIG. 11J is the display system of FIG. 11I with the relay 5002 replaced by relay 5003. The relay 5003 may be the relay system 5020 shown in FIG. 1B with only one retroreflector 1006B, relay system 5050 shown in FIG. 5E with only one reflective mirror 1007B, relay system 5060 shown in FIG. 5F with only one reflective Fresnel mirror 1008B, or some other relay which simultaneously relays light from a first interface while directly passing through light that arrives from a second interface. Each of these relays 5020, 5040, and 5050 may be comprised of a beam splitter and a focusing element (e.g. a retroreflector for 5020 or a reflective focusing mirror for 5040 and 5050) disposed opposite to a first relay interface which accepts light from a second image source 998A which defines image surface 998AS. In an embodiment, only one of the first 123AS and second 998AS image surfaces, here the second image surface 998AS, is relayed into the viewing volume defined by boundary 1060 near observer 1050 to define a relayed image surface 998B in the viewing volume, and wherein the occluded portion of the light 133A corresponds to an occluded portion of the other one of the first and second image surfaces which is not relayed, here first image source 123A observable in the viewing volume defined by boundary 1060 as being occluded by the relayed image surface 998B.

Figure 12:
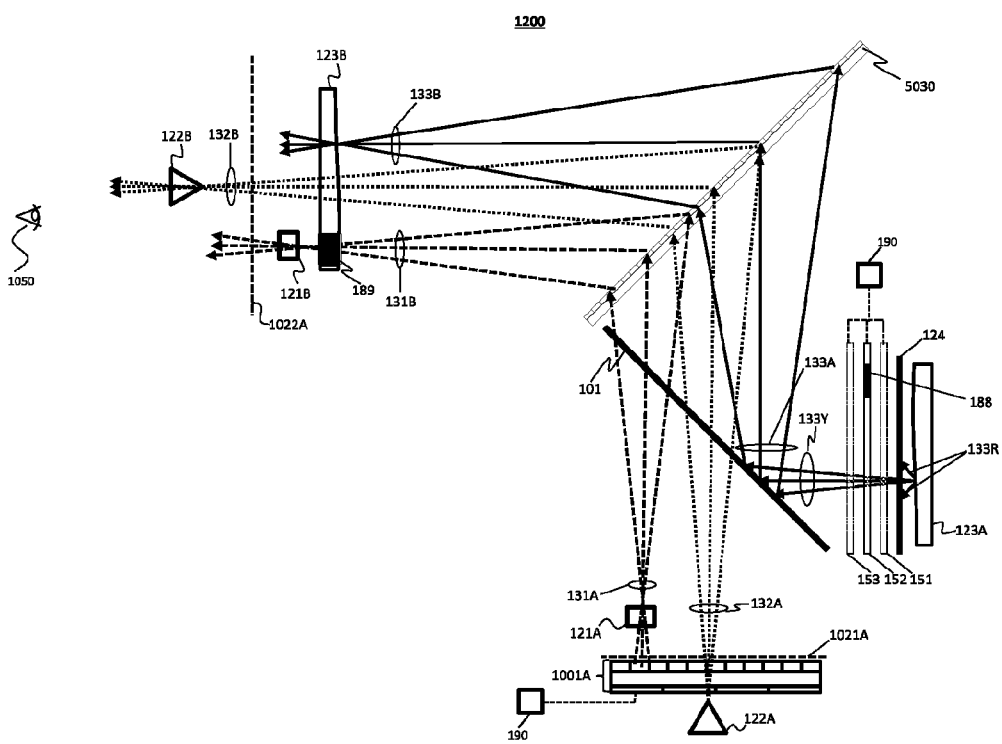
FIG. 12 shows the configuration shown in FIG. 11A where the relay system is realized by a transmissive reflector.

FIG. 12 shows a display system 1200 comprised of the display system shown in FIG. 11A, where the relay system 5000 is realized by a transmissive reflector 5030, and there are no optical fold systems 1150, 1160, or 1170 illustrated. The numbering of FIG. 11A is used in FIG. 12. Relayed holographic object surfaces 121B/122B are located at relayed locations distributed around a virtual display plane 1022A, and the relayed image surface 123B of the real-world object 123A is projected close to the relayed holographic objects 121B and 122B.

Figure 13:
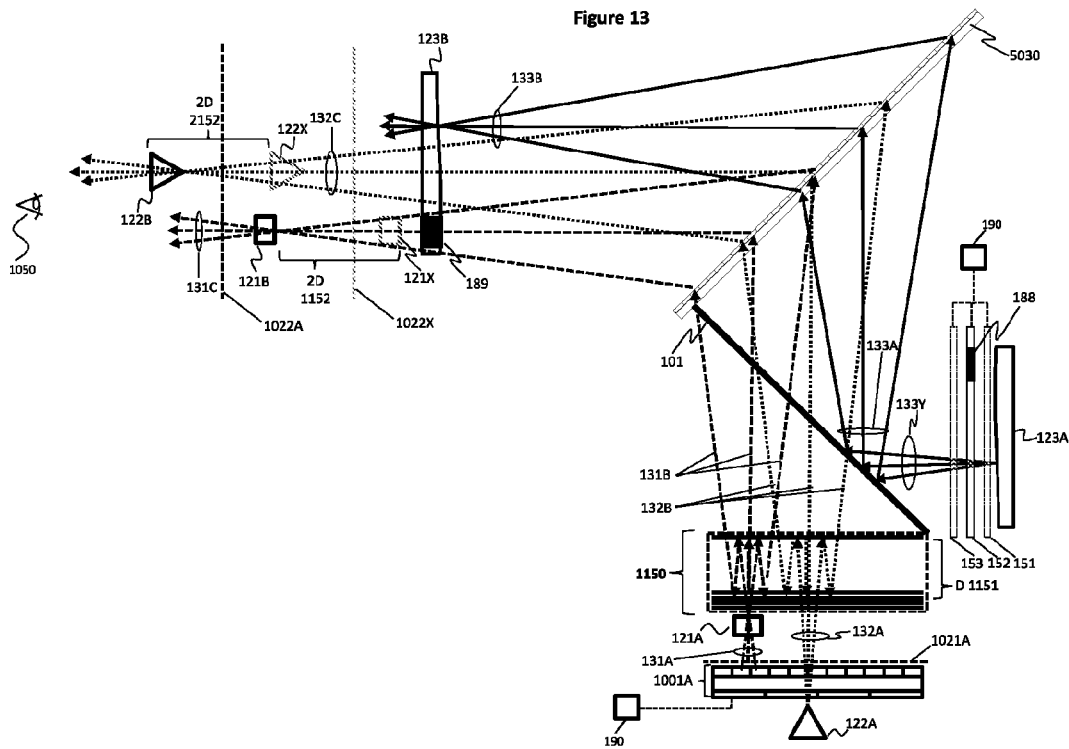
FIG. 13 shows the configuration shown in FIG. 12, except that an optical fold system has been placed between the light field display and the beam splitter.

FIG. 13 shows the display configuration shown in FIG. 12, except that an optical fold system 1150 has been placed between the light field display 1001A and the beam splitter 101 of the optical combining system. The numbering of FIG. 12 is used in FIG. 13. FIG. 13 is the display system shown in FIG. 11A with the relay system comprised of a transmissive reflector relay 5030. The effective optical path length of the optical fold system 1150 is about three times the distance D 1151, where D 1151 is the length of Path 2 or Path 3 shown in FIG. 10B. The result is that the diverging rays 131A forming the holographic object surface 121A have enough optical path length to spread out into rays 131B, which are relayed into rays 131C which will converge at a further distance from the transmissive reflector 5030 than the convergence distance with no optical fold system 1150. Similarly, the diverging rays 132A forming holographic object 122A spread out into rays 132B as a result of the optical fold system 1150, which are relayed to light rays 132C. In FIG. 13, holographic object surfaces 121X and 122X at relayed locations around virtual display plane 1022X show the location of the relayed holographic object surfaces 121B and 122B shown in FIG. 12 with no optical fold system 1150, respectively, while holographic object surfaces 121B and 122B at relayed locations around virtual display plane 1022A show the location of the relayed holographic object surfaces with the optical fold system 1150 present. The offset 1152 between virtual display plane 1022X and 1022A is 2D, where D is the effective path length 1151 of the optical fold system 1150 placed in the path of the light field display 1001A. In another embodiment, the optical fold system 1150 is placed in the path of the real-world object 123A, which acts to move just the relayed real-world image surface 123B closer to the observer 1050. In a different embodiment, the optical fold system 1150 may be placed between the beam splitter 101 and the relay system 5030, acting to move both the relayed holographic objects and the relayed real-world image closer to the observer. In still another embodiment, the optical fold system 1150 may be placed between the relay system 5030 and the relayed real-world image surface 123B, resulting in this relayed image 123B as well as the holographic object surfaces 121B and 122B moving closer to the observer 1050. Note the reversal of depth shown in FIG. 13. The depth ordering of the relayed holographic objects 121B and 122B around virtual display screen 1022A is reversed from the depth ordering of directly projected object surfaces 121A and 122A relative to the display screen plane 1021A, respectively. Similarly, the relayed image surface 123B of the real-world object 123A is also depth reversed as shown by how the curved face of the real-world object 123A is relayed. Under the circumstance in which the real-world object 123A is complex, such as a real person's face or a complex real-world background scene, and cannot be easily built with depth reversal, it is possible to replace the real-world object 123A by the relayed surface of a real-world object with reversed depth. In an embodiment, the optical fold system 1150 may be replaced with a selective optical fold system 1160 or 1170 described above. In this embodiment, only one group of light rays 131B or 132B may have their optical path length extended, resulting in only one of the relayed objects 121B or 122B being relayed closer to observer 1050.

FIG. 14A shows a display system 1400 which is modified from the display system configuration shown in FIG. 13 by an extra relay for the real-world object 123A. In FIG. 14A, an input relay system 5030A is used to relay the image surface 123A of the real-world object to form an intermediate, depth-reversed, relayed image 123B of the real-world object, which is then received by relay system 5030 and relayed once again with depth reversal to form a depth-correct relayed real-world image surface 123C. FIG. 13 is the display system shown in FIG. 11A with the relay system comprised of a transmissive reflector relay 5030, and wherein the surface of real-world object 123A is relayed twice. Note that the only difference between real-world image surface 123A and the relayed real-world image surface 123C is that the image is up-down flipped, a feature that may be corrected with a 180 degree rotation of the position of real-world object 123A. The capability of the relay system comprised of relays 5030 and 5030A in display system 1400 shown in FIG. 14A to relay images of real-world objects without depth reversal allows images of complex real-world dynamic objects to be relayed real-time so they may be displayed alongside relayed holographic object surfaces 121B and 122B relayed from the light-field display 1001A. In this configuration, the angular light field coordinates u and v may be reversed computationally for the holographic object surfaces 121A and 122A projected by the light field display 1001A in order to achieve the correct depth profile desired for relayed holographic image surfaces 121B and 122B, as discussed above in regard to FIGS. 1A and 1B. In FIG. 14A, the occlusion system 150 could be replaced by a real-world occlusion object like object 155A in FIG. 11C. Also, as shown in FIGS. 11D-E above, the first image source light field display 1001A surface 1021A and the second image source real-world object 123A surface may each be replaced by any of: a 2D display surface, a stereoscopic display surface, an autostereoscopic display surface, a multi-view display surface which may be the surface of a horizontal parallax-only multi-view display such as a lenticular display, the surface or surfaces of a volumetric 3D display, the surface of a real-world object emitting light, or the surface of a real-world object reflecting light.

Figure 14B:
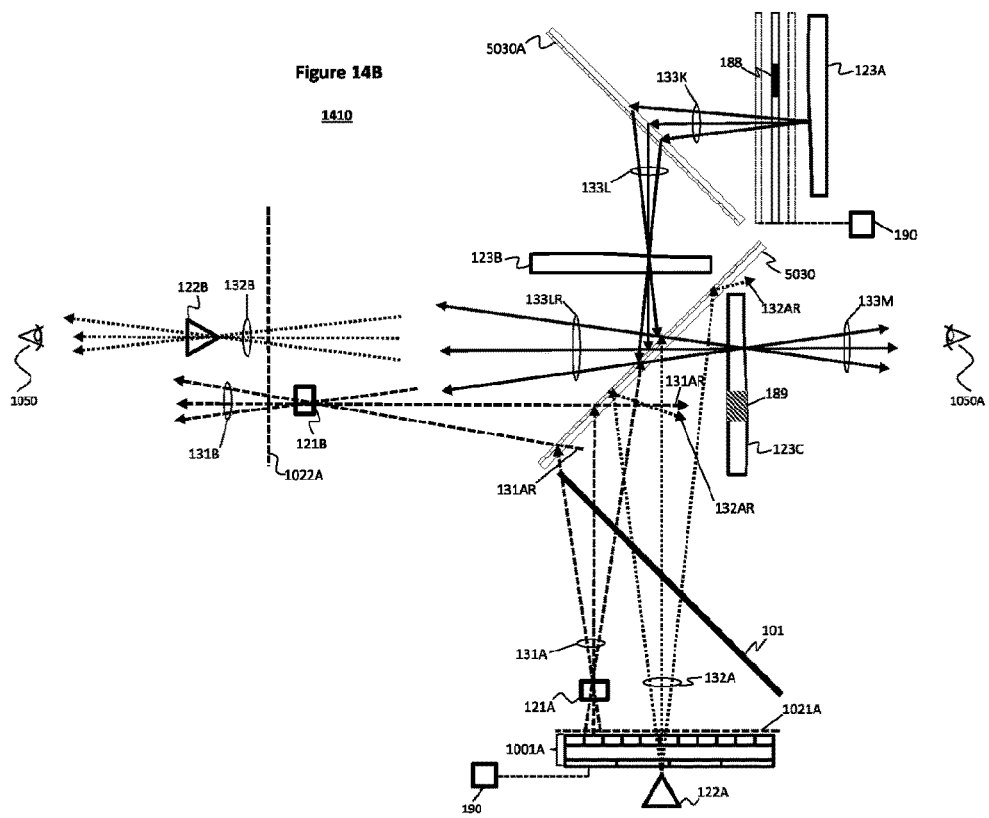
FIG. 14B shows the relay configuration shown in FIG. 12, except that an input relay system is included to relay the image of a real-world object to a location on the opposite side of the transmissive reflector from the viewer

FIG. 14B shows a display system 1410 which is modified from the display system configuration shown in FIG. 12 by an extra relay for the real-world object 123A. The numbering of FIG. 12 is used in FIG. 14B. FIG. 14B is the display system shown in FIG. 11F with the relay system comprised of a transmissive reflector relay 5030, and wherein the surface of real-world object 123A is relayed twice. In FIG. 14B, an input relay 5030A is used to relay the light rays 133K from the surface of a real-world object 123A to once-relayed light rays 133L which form an intermediate, depth-reversed, relayed surface 123B of the real-world object 123A. A first portion of the light rays 133L which form the relayed surface 123B reflect from the surface of the transmissive reflector 5030 into light rays 133LR observable by viewer 1050, while a second portion of the light rays 133L are relayed by relay 5030 into light rays 133M which form the twice-relayed surface 123C of real-world object surface 123A. The fraction of once-relayed light 133L which is reflected into light paths 133LR toward the observer 1050 may be tuned by selecting the reflectivity of the surface of relay 5030. While the twice-relayed surface 123C of real-world object 123A is relayed to a position opposite of relay 5030 from the viewer 1050, the reflected light rays 133LR reaching viewer 1050 substantially line up with light rays 133M forming the surface 123C and are thus observed by viewer to originate from twice-relayed surface 123C of real-world object 123A. Observer 1050 sees the relayed holographic object surfaces 121B and 122B as well as the back of surface 123C. On the opposing side of the relay 5030, an observer 1050A will see the back of relayed holographic object 121B by receiving a reflected portion 131AR of the incident light rays 131A forming holographic object 121A, the back of relayed holographic object 122B by receiving a reflected portion 132AR of the incident light rays 132A forming holographic object 122A, and the front of twice-relayed surface 123C of real-world object surface 123A formed by light rays 133M. In this configuration, the angular light field coordinates u and v may be reversed computationally for the holographic object surfaces 121A and 122A projected by the light field display 1001A in order to achieve the correct depth profile desired for relayed holographic image surfaces 121B and 122B, as discussed above in regard to FIGS. 1A and 1B. In FIG. 14B, the occlusion system 150 could be replaced by a real-world occlusion object like object 155A in FIG. 11C. Also, as shown in FIGS. 11D-E above, the first image source light field display 1001A surface 1021A and the second image source real-world object 123A surface may each be replaced by any of: a 2D display surface, a stereoscopic display surface, an autostereoscopic display surface, a multi-view display surface which may be the surface of a horizontal parallax-only multi-view display such as a lenticular display, the surface or surfaces of a volumetric 3D display, the surface of a real-world object emitting light, or the surface of a real-world object reflecting light.

Figure 15:
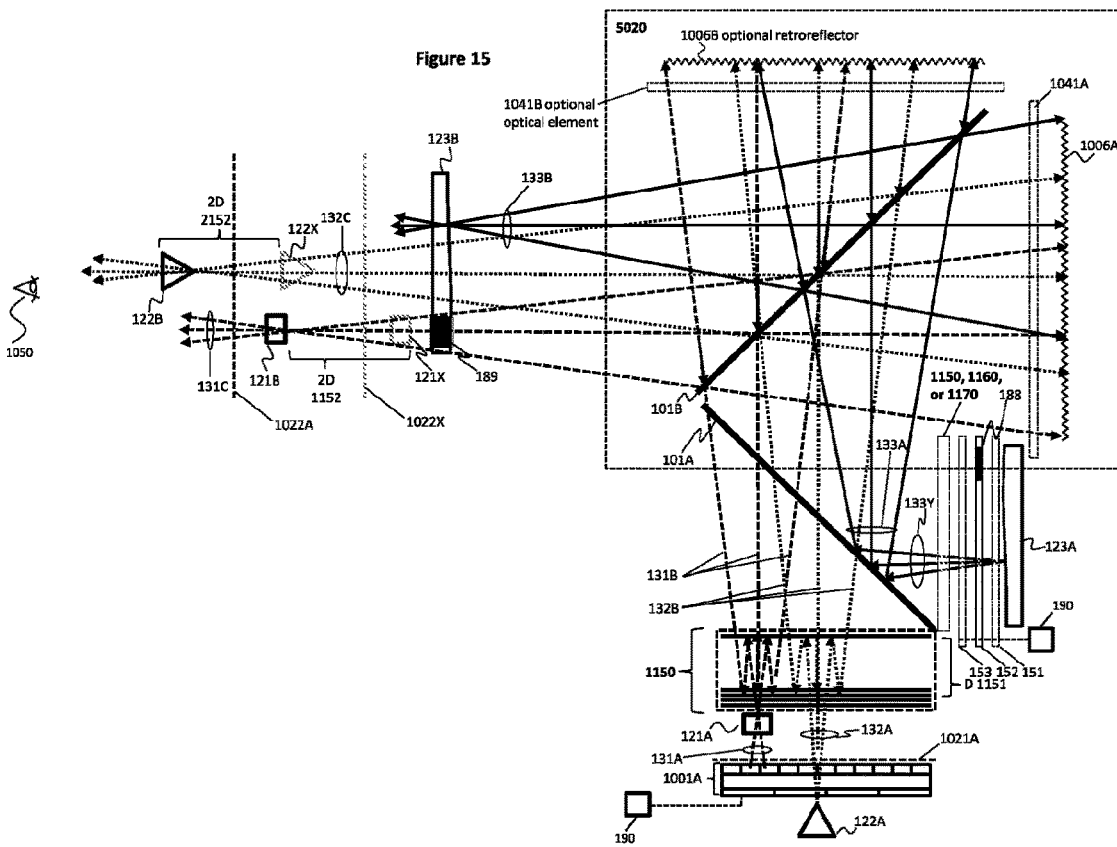
FIG. 15 shows an embodiment of a relay system comprised of a beam splitter and one or more retroreflectors.

FIG. 15 is the display system configuration shown in FIG. 11A, with the relay 5020 used with an optical folding system 1150 in the path of the light 131A and 132A from the light field display 1001A. The configuration of FIG. 15 is similar to the configuration shown in FIG. 13, except that instead of a relay system comprised of a transmissive reflector 5030, the relay system 5020 is comprised of a beam splitter 101B and one or more retroreflectors 1006A, 1006B, similar to the configuration 5020 shown in FIG. 1B. The numbering in FIG. 13 applies to FIG. 15 for similar elements, and some of the discussion of FIG. 1B applies to this relay configuration. In an embodiment in which an optional additional retroreflector 1006B is included in the relay system 5020, the additional retroreflector 1006B may be placed orthogonally to the first retroreflector 1006A, and in some embodiments, the additional retroreflector 1006B may be positioned at equal distance away from the beam splitter 101B as the distance between the first retroreflector 1006A and the beam splitter 101B. It is to be appreciated that the configuration of the relay system 5020 shown in FIG. 15 may be implemented with: 1) only the retroreflector 1006A; 2) only the retroreflector 1006B; or 3) both retroreflectors 1006A and 1006B included and aligned. In an embodiment, light rays 131A forming holographic object surface 121A and light rays 132A forming holographic object surface 122A may have their optical path lengths extended within the optical fold system 1150, and become light rays 131B and 132B, respectively. In an embodiment, the light rays 131B and 132B from the holographic object surfaces 121A and 122A are received through a first input interface of an optical combining system 101A, and light 133Y from a second image source 123A is received through a second input interface of the optical combining system 101A. In an embodiment, the second image source comprises a real-world object 123A emitting or reflecting light. In an embodiment, a portion of the light 133Y from the real-world object 123A is reflected from a beam splitter 101A of the optical combining system into light rays 133A and is combined by the beam splitter 101A with the light 131B and 132B from the holographic object surfaces 121A and 122A. This combined image light 131B, 132B, and 133A is received by the relay system 5020. In an embodiment, the retroreflector 1006A and the beam splitter 101B of the relay system 5020 are aligned such that the combined light is directed from the beam splitter 101B in an approach direction towards the retroreflector 1006A and is reflected from the retroreflector 1006A along a return direction opposite of the approach direction. Light along the return direction is directed towards the relayed locations around the relayed virtual screen plane 1022A. In an embodiment, the retroreflector 1006A and the beam splitter 101B of the relay system 5020 are aligned such that a first portion of the combined light 131B, 132B, and 133A is reflected by the beam splitter 101B of the relay system 5020 toward the retroreflector 1006A. Upon reflecting from the reflector 1006A, the light paths are reversed, and a portion of these reversed paths pass through the beam splitter 101B along light rays 131C, 132C, and 133B, being focused by the relay system 5020 at relayed locations to form holographic object surfaces 121B, 122B, and relayed surface 123B of the real-world object 123A, respectively. A second portion of the combined light 131B, 132B, and 133A is received by relay system 5020 and is transmitted through the beam splitter 101B toward the optional additional retroreflector 1006B along an additional approach direction. These light paths reflect from the optional additional retroreflector 1006B along an additional return direction opposite the additional approach direction towards the beam splitter 101B, upon which they are reflected along substantially the same light paths 131C, 132C, and 133B as the first portion of the combined light from first retroreflector 1006A, contributing to forming holographic object surfaces 121B, 122B, and relayed surface 123B of real-world object 123A, respectively.

In the event that unpolarized light is received by the relay system 5020, the addition of the optional additional retroreflector 1006B may result in increased brightness of the relayed holographic object surfaces 121B and 122B as well as relayed image surface 123B of the second image source 123A. A polarization beam splitter 101B may be used to direct a first linear polarization of combined light 131B, 132B, and 133A toward retroreflector 1006A, and a second linear polarization of combined light 131B, 132B, and 133A toward retroreflector 1006B. The first linear polarization of light may be converted to a first circular polarization by a quarter wave retarder 1041A before reflection by the retroreflector 1006A, which acts to change the reflected light to a second circular polarization orthogonal to the first circular polarization. Upon passing back through the quarter wave retarder 1041A toward the beam splitter 101B, the reflected light is converted to a second linear polarization orthogonal to the first. This state of polarization will pass through the beam splitter 101B without significant reflection. Similarly, the second state of linear polarization of light directed at the optional retroreflector 1006B will be converted into the orthogonal state of first linear polarization by passing through the quarter wave retarder 1041B, reflecting from the optional retroreflector 1006B, and passing through the quarter wave retarder 1041B a second time, and this first state of linear polarization should be substantially reflected by the polarization beam splitter 101B and contribute to imaging the relayed holographic image surfaces 121B and 122B, and the relayed image 123B of the real-world object. If the light received by the relay system 5020 is polarized, then a polarization beam splitter 101B may be used, and good performance may be achieved with just the first retroreflector 1006A alone, without the optional retroreflector 1006B. In other embodiments, the optional optical elements 1041A and 1041B may be polarization controlling elements apart from quarter wave retarders, refractive elements, diffractive elements, or other optical elements.

Figure 16:
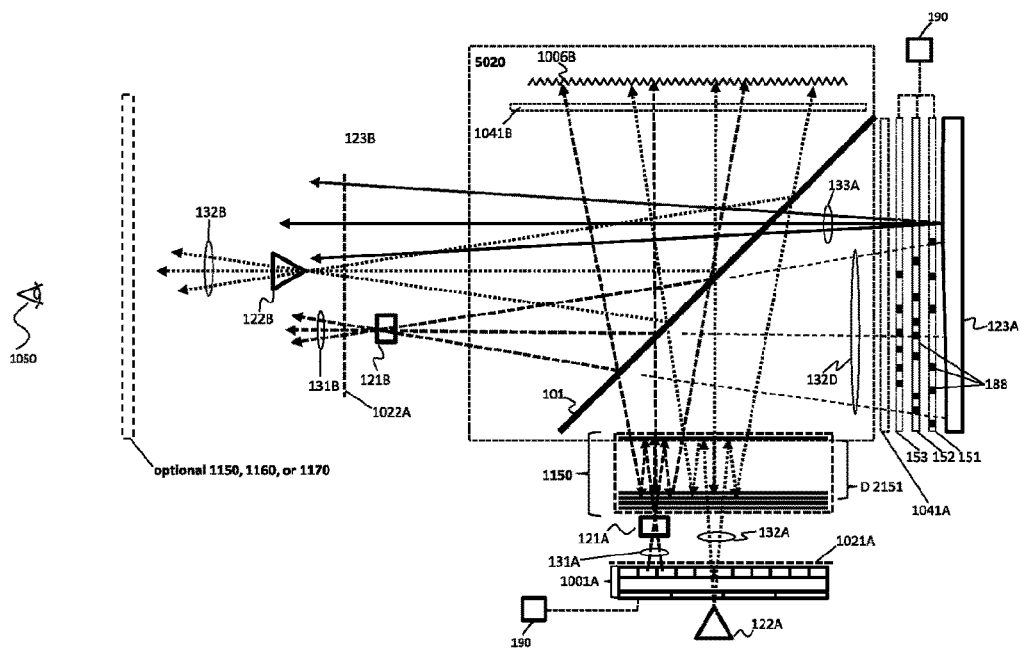
FIG. 16 shows an embodiment of a relay system comprised of a beam splitter and a single retroreflector.

A technical advantage allowed by the relay configuration shown in FIG. 15 is that relayed holographic object surfaces and a relayed image surface of a second image source, such as images of real-world objects, may be combined in substantially the same space, close to the relayed virtual screen plane 1022A if desired. However, in some applications, it may be desirable to relay the holographic object surfaces to a foreground in front of a background such as a real-world background. FIG. 16 is the display configuration of FIG. 11G comprising relay system 5020 which simultaneously relays the surface of holographic objects and passes light directly from a real-world background source through to an observer. The relay 5020 in FIG. 16 comprised of a beam splitter and a retroreflector, in which holographic object surfaces 121A and 122A projected around a display plane 1021A are relayed to holographic object surfaces 121B and 122B around a virtual screen plane 1022A, respectively. In an embodiment, the relay system 5020 may be considered as an optical combiner for the light from the real-world background object 123A and the holographic object surfaces 121A and 122A. FIG. 16 shows a configuration for a relay system in which is similar to the configuration of FIG. 15, except that the relay system 5020 contains only a single retroreflector disposed on the opposite side of the beam splitter 101 from the light field display 1001A, and the beam splitter 101 also allows light 133A from the real-world object 123A to reach the observer 1050 with a single pass through the beam splitter 101. The numbering of FIG. 15 is used in FIG. 16 for similar elements, and the description of the operation of the relay 5020 given for FIG. 15 with only one retroreflector applies here. In an embodiment, an occlusion system may include one or more occlusion layers 151, 152, and 153 with individually-addressable occlusion elements 188, and the occlusion layers may be transparent, semi-transparent, or fully occluding. In FIG. 16, the observer 1050 views the relayed holographic object surface 121B, but the pattern of occlusion elements 188 has been configured so that the observer 1050 does not receive light from the portion of the real-world background image surface 123A behind the holographic object 121B, along the lines 132D illustrated as extensions of the rays 131B, so that the relayed holographic object surface 121B appears to occlude the real-world background image surface 123A in the same way that a real object placed at relayed holographic object surface 121B would occlude the background image surface 123A. In an embodiment, a real-world occlusion object like object 155A in FIG. 11C could replace the occlusion system comprised of occlusion layers 151, 152, and 153. In another embodiment, optional optical folding system 1150 shown in FIGS. 10A-B, selective folding system 1160 shown in FIG. 10C, or selective folding system 1170 shown in FIG. 10D may be used in the light paths 131B, 132B of relayed objects 121B, 122B, respectively. If selective optical folding systems 1160 or 1170 are configured to only increase the path lengths on light paths 131B and 132B, and not light paths 133A, and the optical path length of these selective folding systems 1160 or 1170 were made to be sufficiently long, then the observer 1050 may perceive relayed holographic surfaces 121B and 122B to be behind the surface of real-world object 123A. In this instance, an occlusion system in the path of the relayed image source light field display 1001A may provide occlusion of a background relayed object 121B or 122B behind the non-relayed image surface 123A.

Figure 17:
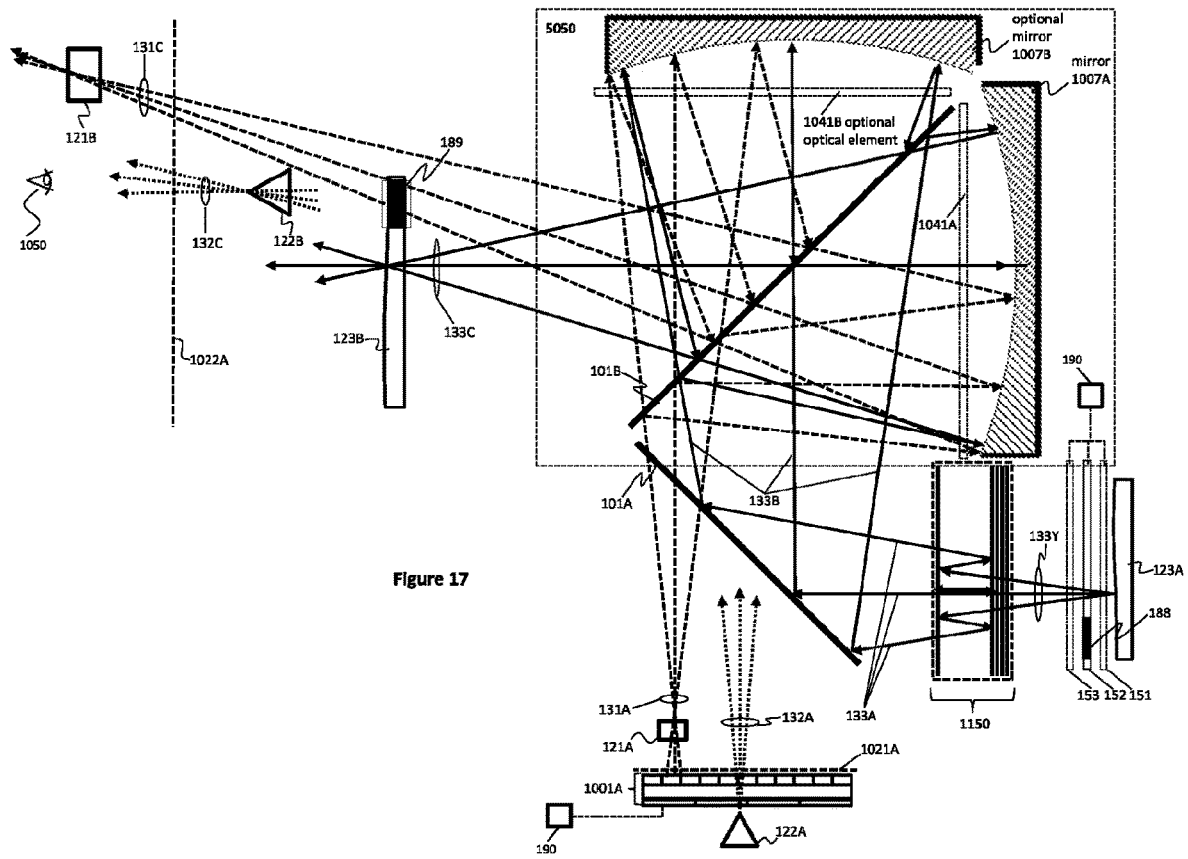
FIG. 17 shows an embodiment of a relay system comprised of a beam splitter and more than one concave mirrors.

In an embodiment, it is possible to use relays with mirrored surfaces, which may include curved mirrors or Fresnel mirrors, to relay holographic object surfaces and image surfaces of real-world objects. FIG. 17 is display system with a relay configuration that is similar to the relay configuration shown in FIG. 15, wherein the relay system 5020 comprised of retroreflector 1006A and optional additional retroreflector 1006B has been replaced with relay system 5050 comprised of a mirrored surface 1007A which may include a curved reflective mirror and an optional additional mirrored surface 1007B, which may be orthogonally placed and may include a curved reflective mirror. Relay system 5050 is shown in FIG. 5E and is described above. FIG. 17 is the relay system of FIG. 11B with the relay 5050 used in place of 5001. In FIG. 17, rather than having an optical fold system 1150 placed in the light paths 131A and 132A of the projected holographic object surfaces 121A and 122A, respectively, the optical fold system 1150 is placed in the light path 133Y of the second image source, which may be a real-world object 123A emitting or reflecting light. The magnification or minification of each relayed object surface may depend on the source object's distance to the effective focal point of the mirror system, as described above in reference to the curved mirror relay configurations shown in FIGS. 4D, 5D and 5E. In FIG. 17, the light 133Y from a real-world object 123A passes through an optical fold system 1150, into light rays 133A, in which the optical fold system 1150, as shown in FIGS. 10A and 10B, causes the relayed real-world image surface 123B to move further from the relay system 5050. The light 133A from the surface of real-world object 123A is received by a first input interface of beam splitter 101A of the optical combining system, and light 131A and 132A from holographic object surfaces 121A and 122A is received through a second input interface of the beam splitter 101A. The combined light is received the relay system 5050. The relay system 5050 and the detailed reflection of light within 5050 is described above with reference to FIG. 5E. A first fraction of received light 131A, 132A, and 133B is reflected from the beam splitter 101B to the right, next reflecting from the first mirror 1007A in a return direction opposite the approach direction, and passes through the beam splitter 101B into light paths 131C, 132C, and 133C, forming relayed image surfaces 121B, 122B, and 123B, respectively. A second fraction of received light 131A, 132A, and 133B is transmitted by the beam splitter 101B, and continues vertically in an additional approach direction, reflecting from the optional mirror 1007B in an additional return direction generally opposite the additional approach direction, and next reflecting from the beam splitter 101B into substantially the same light paths 131C, 132C, and 133C, also contributing light to form relayed image surfaces 121B, 122B, and 123B, respectively. In an embodiment in which both mirrored surfaces 1007A and 1007B are present, it may be desirable to match them geometrically, be placed equal distance from the beam splitter 101B of the relay system 5050 and be orthogonal to one another. The relay system 5050 may also be implemented with only one of the mirrored surfaces 1007A or 1007B present. In an embodiment a linear polarization beam splitter 101B is used, and the optional optical elements 1041A and 1041B comprising quarter wave retarders may be included to allow light returning to the beam splitter 101B after being reflected from a mirrored surface 1007A or 1007B to be in a state of linear polarization opposite to the state of linear polarization of the light approaching mirrors 1007A or 1007B, and this allows for reducing the unwanted reflections from beam splitter 101B as described above in reference to FIGS. 5C and 5E. The full light paths for rays 132A from holographic object 122A and relayed rays 132C for the relayed holographic object 122B are not shown in FIG. 17 for simplification (see the discussion of FIG. 5E). Finally, an occlusion system, which may comprise individually addressable occlusion regions 188 on the occlusion layers 151, 152, and 153, may block relayed light from a portion of the surface of real-world object 123A, resulting in the observer 1050 not being able to see the blacked-out region 189 of the relayed image surface 123B of the real-world object 123A behind the relayed holographic image surface 122B, resulting in natural occlusion handling for the relayed background image surface 123B behind relayed holographic image surface 122B.

Figure 18:
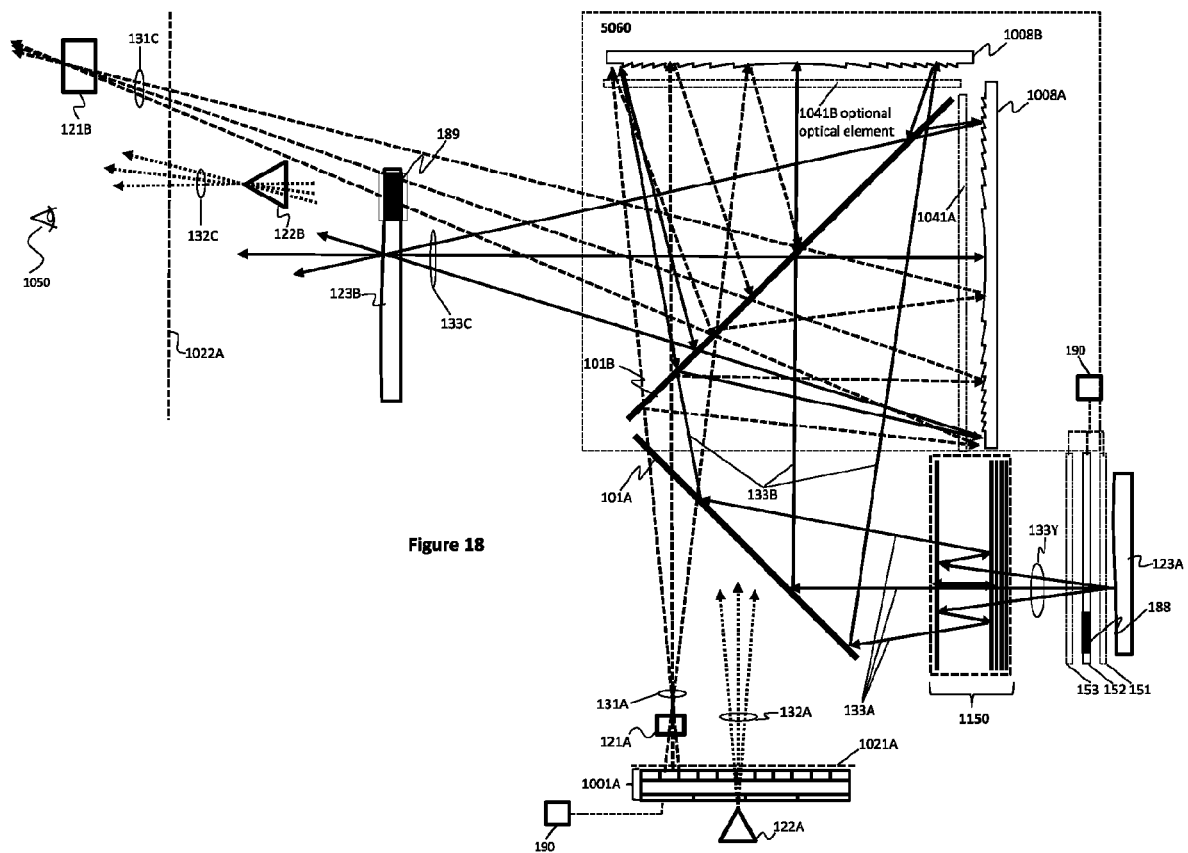
FIG. 18 shows an embodiment of a relay system comprised of a beam splitter and two Fresnel mirrors.

FIG. 18 is a display system which behaves like the display system of FIG. 17, but with a relay 5060 comprised of reflective Fresnel mirror 1008A and optional reflective Fresnel mirror 1008B used in place of the relay system 5050 in FIG. 17. The numbering from FIG. 17 is used in FIG. 18 for similar elements. FIG. 18 is the relay system of FIG. 11B with the relay 5060 used in place of 5001. As found in the above discussion of the relay system 5050 shown in FIG. 5E, the relay system 5060 may be implemented with either Fresnel reflector 1008A or 1008B removed. The detailed reflections within the relay system 5060 are described above for the discussion of 5060 in FIG. 5F.

Figure 19:
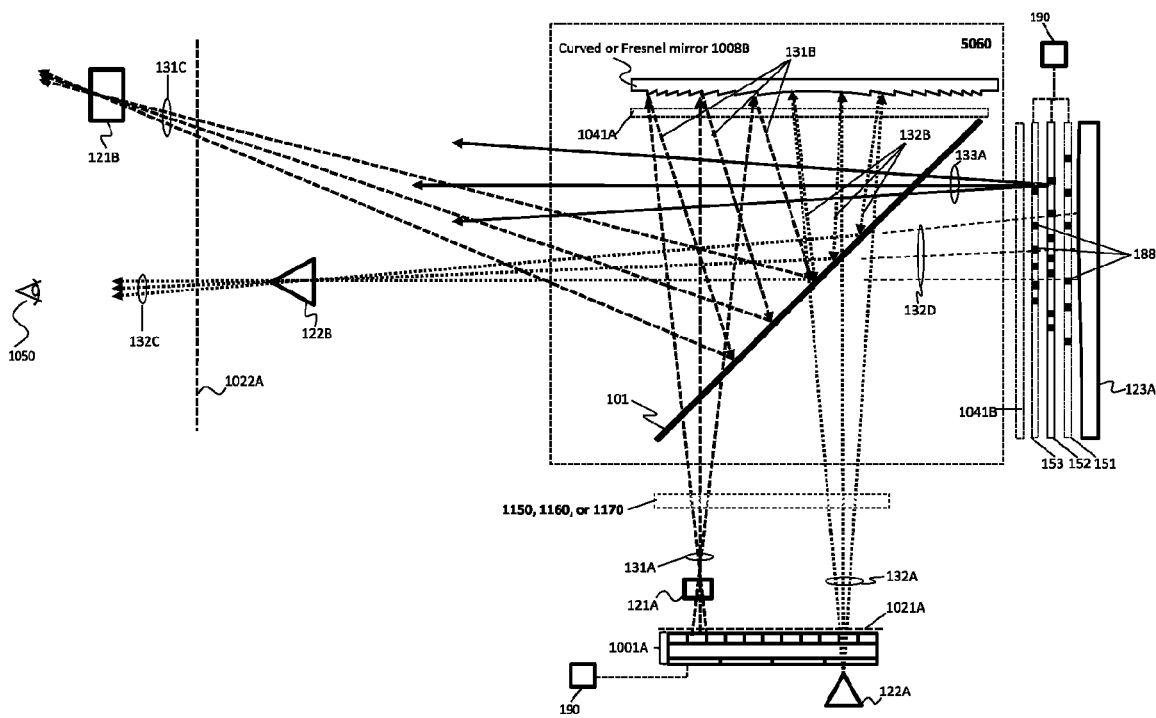
FIG. 19 shows an embodiment of a relay system comprised of a beam splitter and a single Fresnel mirror.

FIG. 19 is the display system of FIG. 11G with a relay 5060 comprised of an image combiner 101 and a Fresnel mirror 1008B, wherein the surface of holographic objects are relayed by the relay 5060, and a real-world background is visible through the relay 5060. The function of the display system of FIG. 19 would be the same if relay 5060 were replaced by a relay 5050 by exchanging Fresnel mirror 1008B with a curved mirror 1007B as shown in FIG. 5E. Holographic object surfaces 121A and 122A around a display plane 1021A are relayed to relayed holographic image surfaces 121B and 122B around a virtual screen plane 1022A, respectively. The relay system 5060 may be considered as functioning as an optical combiner for the light rays 131A and 132A from holographic object surfaces 121A and 122A projected by the light field display 1001A, respectively, and light rays 133A from the surface of real-world background object 123A which merely pass through the optical combiner 101. A portion of light rays 131A and 132A from the surfaces of holographic objects 121A and 122A are received by the relay 5060, passing through the image combiner 101, reflecting from the Fresnel mirror 1008B into light rays 131B and 132B, and then reflecting from the image combiner 101 toward light rays 131C and 132C, which converge to form the holographic objects 121B and 122B, respectively. The optical fold system 1150, 1160, or 1170 described above is optional. In the example shown in FIG. 19, the observer 1050 viewing relayed holographic image surface 122B may not be able to see the background real-world object surface 123A behind the relayed holographic image surface 122B because of the operation of an occlusion system 150 with one or more occlusion layers 151, 152, and 153, which as discussed above may include individually-addressable occlusion regions 188. The operation of the occlusion system 150 allows the observer 1050 to view the relayed holographic image surface 122B as it were a real object that occludes the relayed background object surface 123B. Lines 132D are illustrated extensions of the light rays 132C forming relayed holographic image surface 122B, showing how an occlusion region 188 intersects each of these lines to attenuate or block these light rays. The occlusion pattern 188 may be determined experimentally, computationally, algorithmically, or using some other method.

Figure 20:
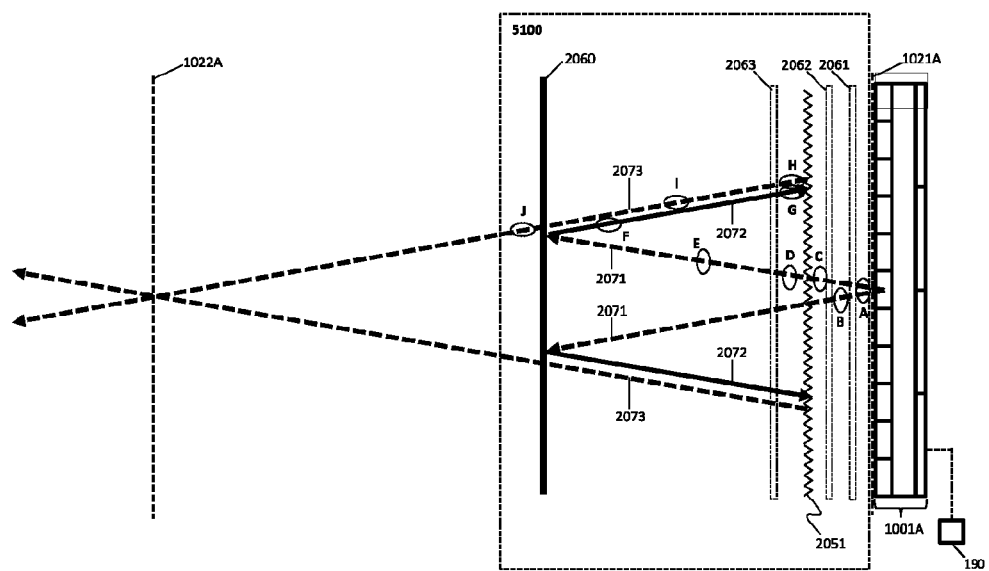
FIG. 20 shows an example of an in-line relay system.

Most of the relay systems shown above in this disclosure allow for relay locations distributed about a relayed virtual screen plane, which is rotated at 90 degrees or 180 degrees from the light field display screen plane. FIG. 20 shows an example of a display system with an in-line relay system 5100 comprised of a transmissive retroreflector 2051, a reflective surface 2060, and several optical layers 2061, 2062, and 2063 wherein the light field display screen plane 1021A and the relayed virtual screen plane 1022A are parallel. Some of the optical layers 2061, 2062, and 2063 are optional. The reflector 2060 of the relay system 5100 is configured to receive the rays 2071 projected from the light field display 1001A and reflect the received light into rays 2072, and the retroreflector 2051 is configured to retroreflect these light rays 2072 into light rays 2073 which trace the reverse path before leaving the relay system 5100. The transmissive retroreflector 2051 acts to focus the rays 2073, creating a relayed virtual screen plane 1022A. There are a number of configuration options for the optical layers within relay system 5100. In one embodiment, the reflector 2060 may include a half mirror, while in other embodiments the reflector 2060 may include a reflective polarizer. In the case where reflector 2060 is a reflective polarizer, the reflector 2060 may reflect light of a first state of linear polarization L1, and transmit the orthogonal second state of linear polarization L2, or the reflector 2060 may be configured to reflect a first state of circular polarization C1, and transmit a second state of circular polarization C2. If the reflector 2060 is a reflective polarizer, then the optical layers 2061, 2062, and 2063 may be configured to set the polarization of the light 2071 first approaching the reflective polarizer 2060 to a first state which will be reflected by the rays 2071, and set the state of the light 2073 approaching the reflective polarizer 2060 on the second pass to a second state of polarization orthogonal to the first state so it will pass through the reflective polarizer 2060. This can be achieved several ways. In an example, if the reflective polarizer 2060 reflects a first state of linear polarization L1, and transmits a second state of linear polarization L2, orthogonal to the first state L1, then the light approaching the reflector 2060 on light rays 2071 should be of linear polarization L1, and the light approaching the reflector 2060 on light rays 2073 should be of linear polarization state L2. To achieve this, optical layer 2061 can be configured to include a polarizing filter, which absorbs state L2 and transmits state L1. Alternatively, in an embodiment in which the display produces light only in the L1 state, like some LC panels, the layer 2061 may be omitted. Optical layer 2062 can be a quarter wave retarder with a fast axis angle of 45 degrees, and optical layer 2063 on the opposite side of the retroreflector 2051 may be a quarter wave retarder with the opposite fast axis angle of −45 degrees. In this configuration, light rays 2071 may have both L1 and L2 states of polarization at point A, contain only the L1 state of polarization at point B, be converted into a first state of circular polarization C1 at point C, which will pass through the retroreflector to point D, and be converted back into the L1 state of polarization at point E, reflect into light rays 2072 at point F as the L1 state, become the first state of circular polarization C1 at point G, reflect into light rays 2073 with the reverse second state of circular polarization C2 at point H as a result of the reflection, be converted into the second state L2 of linear polarization at point I, passing through the transmissive reflector 2060 at point J. In other embodiments, the reflector 2060 may be a reflective polarizer, which transmits a first state of circular polarization C1, and reflects a second orthogonal state of circular polarization C2, with or without a change of C2 to C1 for the reflected light. In addition, it is possible that the transmissive retroreflector 2051 is configured to be polarization dependent, so that it transmits a first state of polarization, and reflects or absorbs a second state of polarization, orthogonal to the first, with these states of polarization linear ones L1 and L2 or circular ones C1 and C2.

Figures 21A, 21B, 21C:
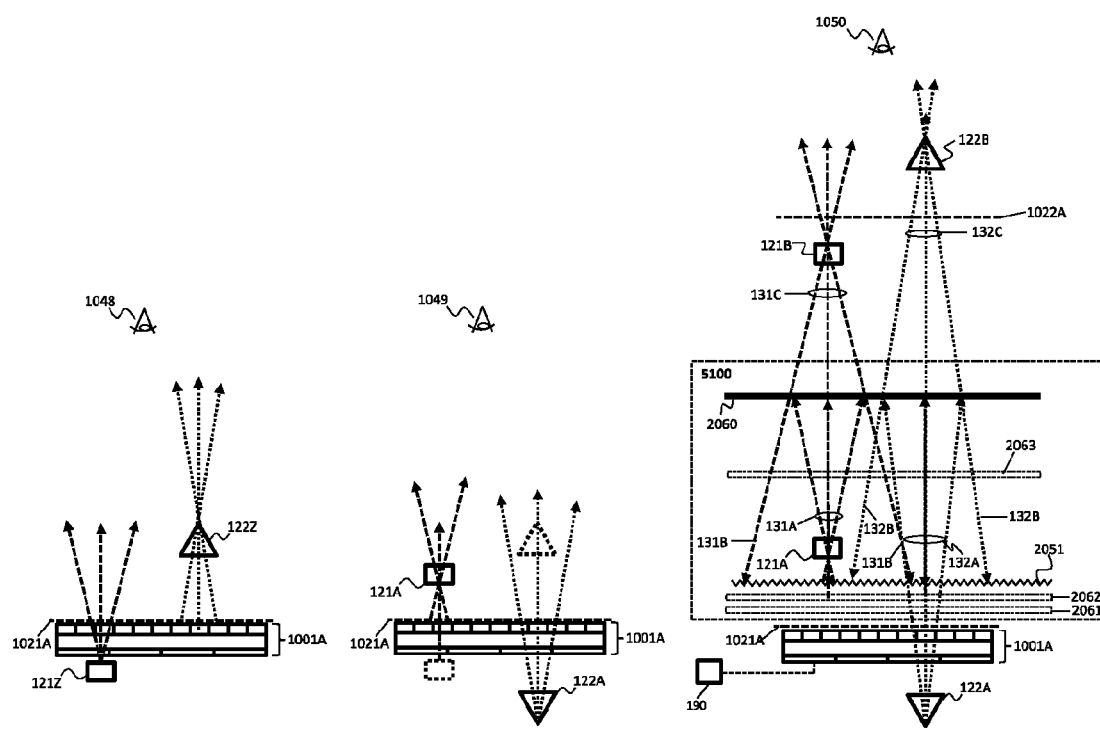
FIG. 21A shows holographic objects projected from a light field display and viewed by an observer.
FIG. 21B shows the projection of holographic objects obtained when the u-v angular light field coordinates in FIG. 21B have been reversed.
FIG. 21C shows how the holographic objects shown in FIG. 21B are relayed with the relay system shown in FIG. 20.

The relay system 5100 including the transmissive retroreflector 2051 described above will reverse the depth profiles of object image surfaces and the corresponding relayed image surfaces. FIG. 21A shows holographic object surfaces 121Z and 122Z projected from a LF display 1001A and viewed by an observer 1048. For these holographic objects to be relayed by the relay system 5100 so they appear in the same orientation relative to a virtual screen plane as they are relative to the display screen plane 1021A, the u-v angular coordinates may have their polarities reversed as shown in FIGS. 2B and 2C. FIG. 21B shows the projection of holographic object surfaces 121A and 122A obtained when all the u-v angular coordinates in FIG. 21A have been reversed. FIG. 21C is a view of a display system demonstrating how the holographic objects shown in FIG. 21B may be relayed by utilizing a relay system 5100 including a transmissive retroreflector 2051 shown in FIG. 20. Light rays 131A and 132A which form holographic object surfaces 121A and 122A, respectively, pass through the transmissive retroreflector 2051 as well as optical layers 2061, 2062, and 2063 in a first approach pass as they diverge in advance of reflecting from the reflector 2060. The reflected rays 131B and 132B, in a first return pass, continue to diverge as they pass through one optical layer 2063 before being retroreflected from transmissive reflector 2051 in a second approach pass, forming light rays 131C and 132C, which are now focused to form relayed holographic image surfaces 121B and 122B, respectively. LF display screen plane 1021A is relayed to virtual screen plane 1022A. Observer 1050 in FIG. 21C sees the same distribution of holographic objects as observer 1048 in FIG. 21A, and the same depth profile of these holographic objects.

Figure 22:
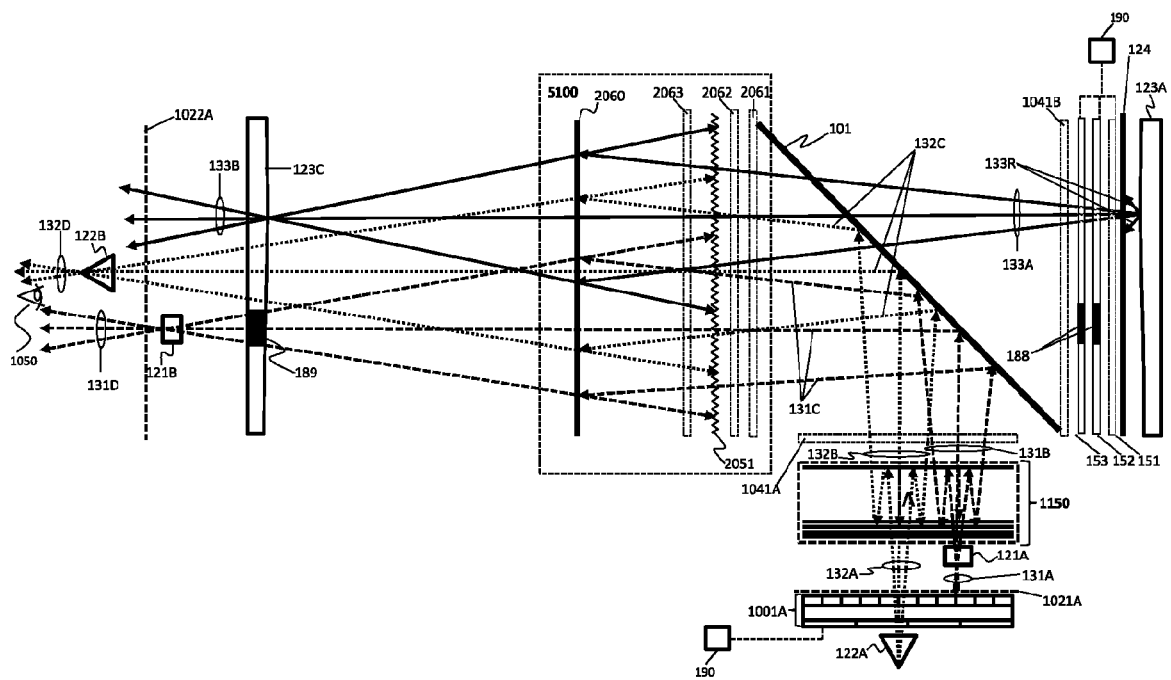
FIG. 22 shows a relay system comprised of an in-line relay system and an optical fold system.

FIG. 22 shows a display system which uses a relay system 5100 with a transmissive retroreflector 2051, employs an optical fold system 1150, and relays both holographic objects and images of real-world objects in a way that allows for occlusion handling. FIG. 22 is the configuration of FIG. 11A with relay system 5100. The numbering of FIG. 11A is used in FIG. 22. The optical fold system 1150 receives light rays 131A and 132A from holographic object surfaces 121A and 122A, respectively, and increases the path length of these rays as the light rays continue to diverge into light rays 131B and 132B, respectively. An optical combining system comprising a beam splitter 101 combines the light rays 131B and 132B from the optical fold system 1150 and the light rays 133A from the surface of the real-world object 123A, wherein some light rays 133A may be partially or fully occluded by an occlusion system 150, which in an embodiment, may include a plurality of individually-addressed occlusion regions 188 on one or more occlusion layers 151, 152, and 153. As described above, these layers 151, 152, 153 may be transmissive OLED panels or a portion of LCD panels, and the individually-addressable elements may be configured to be completely opaque, semi-transparent, or substantially transparent. Some portion of the light rays 131B and 132B from holographic object surfaces 121A and 122A, respectively, is reflected by the beam splitter 101 toward the relay system 5100 as light rays 131C and 132C, and these light rays are relayed by relay system 5100 into converging light rays 131D and 132D, which form relayed holographic image surfaces 121B and 122B, respectively. The display surface 1021A is relayed into virtual display plane 1022A. The operation of the relay system 5100 is described above in reference to FIG. 21C. A portion of the light rays 133A from the real-world object 123A pass through the image combiner 101, and then are relayed to light rays 133B forming the relayed real-world image surface 123C. As described above, occlusion regions 188 may result in no light rays from the portion 189 of relayed real-world image surface 123C to be visible behind relayed holographic image surface 121B as viewed by an observer 1050, for an observer 1050. In this way, relayed holographic image surface 121B appears to occlude the relayed background image surface 123C of real-world object 123A, just as it would if relayed holographic image surface 121B were a real physical object. In the embodiment shown in FIG. 22, the angular filter 124 absorbs rays of light 133R from the real-world object 123A that have an angle with respect to the normal to the surface of the angular filter 124 that exceeds a threshold value.

The relay system 5100 shown in FIG. 22 may result in a reversal of the depth profile of the holographic object surfaces 121A and 122A when it relays them to relayed holographic image surfaces 121B and 122B. This can be corrected computationally using the reversal of u-v angular light field coordinates shown in FIGS. 2B and 2C. However, the relay system 5100 also reverses the depth profile of the real-world object 123A when relaying an image of this object to form the relayed image surface 123C, and it may be very difficult or impossible to construct a real-world scene 123A, which has a compensating reversed depth profile. Another approach, as discussed previously in this disclosure, is to reverse the depth of the real-world object by replacing the real-world object 123A with a relayed depth-reversed image of the same object.

Figure 23:
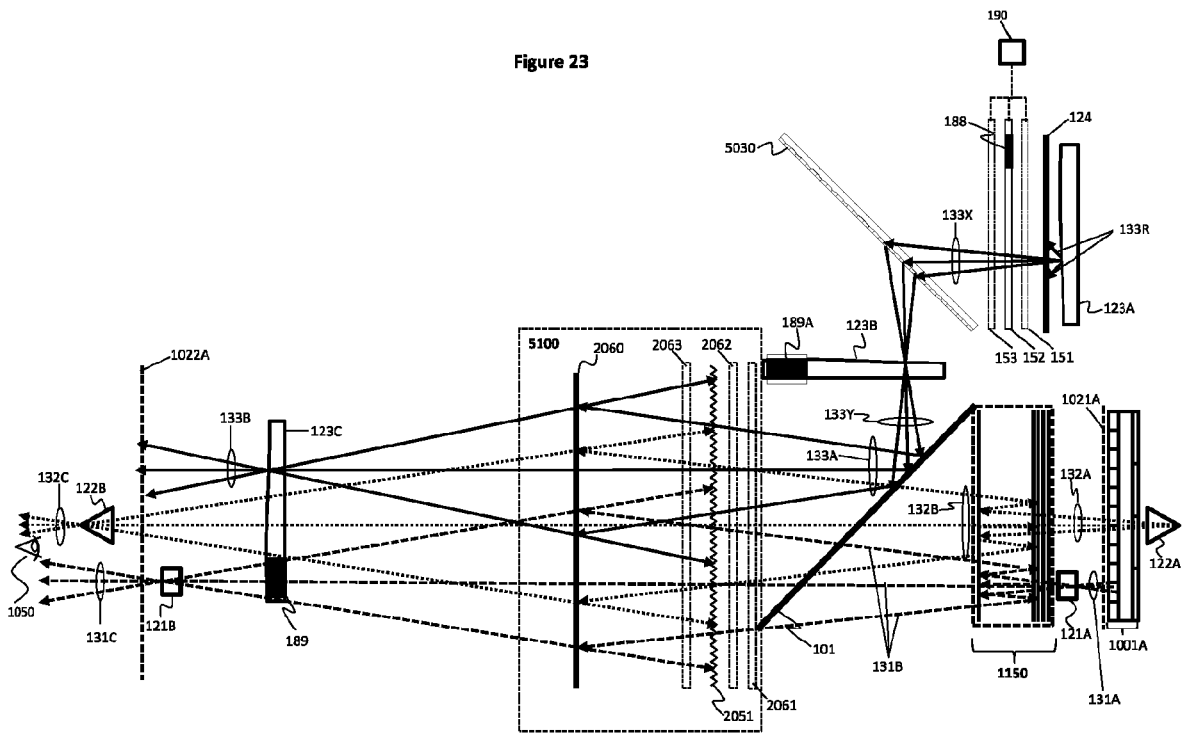
FIG. 23 shows the relay configuration of FIG. 22 but with the real-world object replaced by an input relay system.

FIG. 23 illustrates the display system configuration of FIG. 22, but the real-world object 123A in FIG. 22 has been replaced with a relayed image surface 123B of a real-world object 123A, using an input relay system 5030, which in an embodiment, may include a transmissive reflector. The numbering of FIG. 22 applies to FIG. 23. FIG. 22 is also the configuration of FIG. 11A with relay system 5100, and wherein the real-world object 123A is relayed twice. In FIG. 23, light 133X from the surface of real-world object 123A is relayed to form the depth-reversed relayed image 123B of real-world object 123A by relay 5030. The depth-reversed relayed image 123B of real-world object 123A is once again relayed by relay 5100 to relayed image of a real-world object 123C with the same depth profile as real-world object 123A. As a result, the relayed surface of a real-world object 123C observed by viewer 1050 has the same depth profile as the true real-world object 123A. The one or more occlusion layers 150, 151, and 152 are disposed in front of the real-world object, and after being relayed by relay 5030 and then relay 5100, the relayed occlusion planes will be located between the twice-relayed surface 123C of a real-world object and the observer 1050. Addressable regions 188 on these occlusion layers may be activated to block out a portion of the light from real-world object 123A so that light from a corresponding occluded portion 189 of the relayed surface 123C of the real-world object will not be visible behind a foreground relayed surface of a holographic object such as 121B for viewers 1050 in the viewing volume of the relayed surfaces 121B, 122B, and 123C. A controller 190 may issue display instructions to the light field 1001A and simultaneously issue occlusion instructions to the occlusion layers 151, 152, and 153 in order to achieve the occlusion properly. The up-down flip of the image 123C relative to the real-world object 123A may be corrected by rotating the real-world object 123A or the use of one or more mirrors. In the embodiment shown in FIG. 23, the angular filter 124 absorbs rays of light 133R from the real-world object 123A that have an angle with respect to the normal to the surface of the angular filter 124 that exceeds a threshold value.

Figure 24:
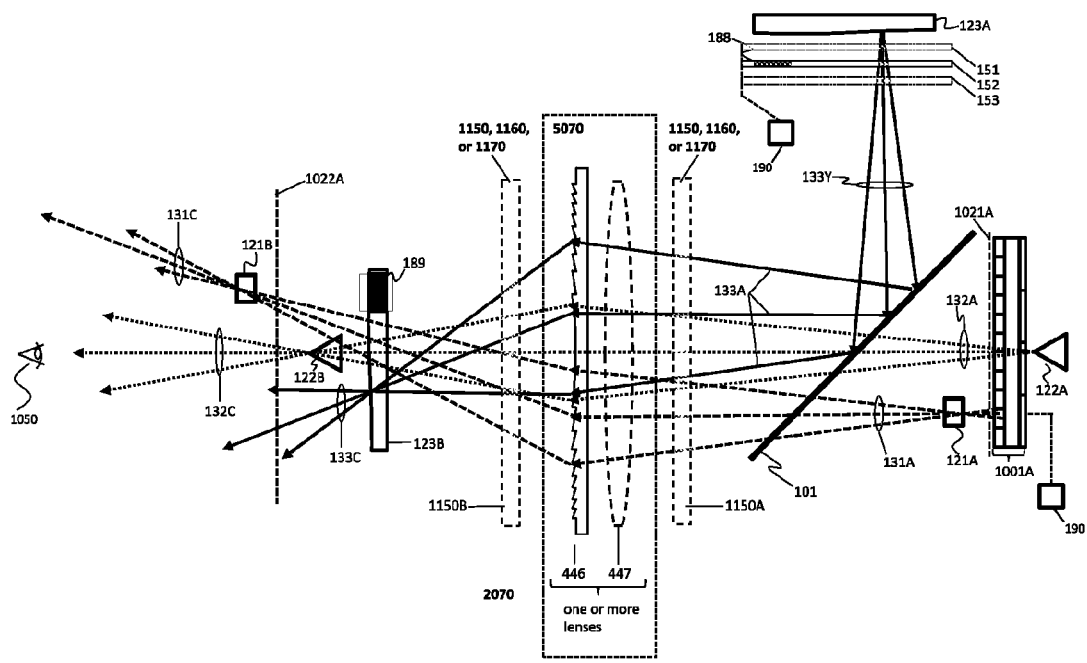
FIG. 24 shows a configuration for a relay system comprised of one or more lenses.

It is possible to use a simple lens system as a relay. FIG. 24 shows a display system which achieves simultaneous relay of both holographic objects and images of real-world objects using a relay system 5070 system comprised of one or more lenses 446 and 447. The relay system 5070 is introduced earlier in this disclosure in reference to FIG. 4E. FIG. 24 is the configuration shown in FIG. 11B with the relay 5070 utilized. The numbering of FIG. 23 is used in FIG. 24 for similar elements. In FIG. 24, light 131A and 132A from holographic object surfaces 121A and 122A, respectively, is combined with light 133Y from the surface of a real-world object 123A by an optical combining system 101, which may comprise a beam splitter, and the combined light is received by a relay system 5070 comprised of one or more lenses 446 and 447. The lenses 446 and 447 may be concave lenses, convex lenses, diffractive lenses such as Fresnel lenses, or any other type of simple or compound lenses. In FIG. 24, the focusing effect of only one Fresnel lens 446 is shown. The light rays 131A and 132A from holographic object surfaces 121A and 122A, respectively, are focused by the lens system 5070 to converging light rays 131C and 132C which form relayed holographic image surfaces 121B and 122B, respectively, at relay locations distributed around the relayed virtual screen plane 1022A. The light rays 133A are focused by lens relay 5070 to light rays 133C which form the relayed image surface 123B of real-world object 123A. An occlusion system 150, which may include one or more occlusion regions 188 on occlusion planes 151, 152, and 153, may act to block out the light rays from a portion 189 of relayed real-world image surface 123B from reaching the observer 1050 when the observer 1050 is viewing relayed holographic image surface 121B, so that relayed holographic image surface 121B appears to be a real object occluding the relayed real-world image surface 123B. To increase the optical path length of light rays travelling through relay system 5070, and change the location of the relayed holographic image surfaces 121B and 122B, as well as the location of the relayed image 123B of the real-world object 123A, optical folding systems 1150 (or 1160, 1170) may be placed either before the relay 5070 at 1150A, or after the relay 5070 at 1150B. An optical folding system such as 1150, 1160, or 1170 may be placed in the path of the light rays 133Y from the surface of real-world object 123A in order to allow the real-world object 123A and the occlusion planes to be closer to the beam splitter 101 for a more compact design.

Figure 25A:
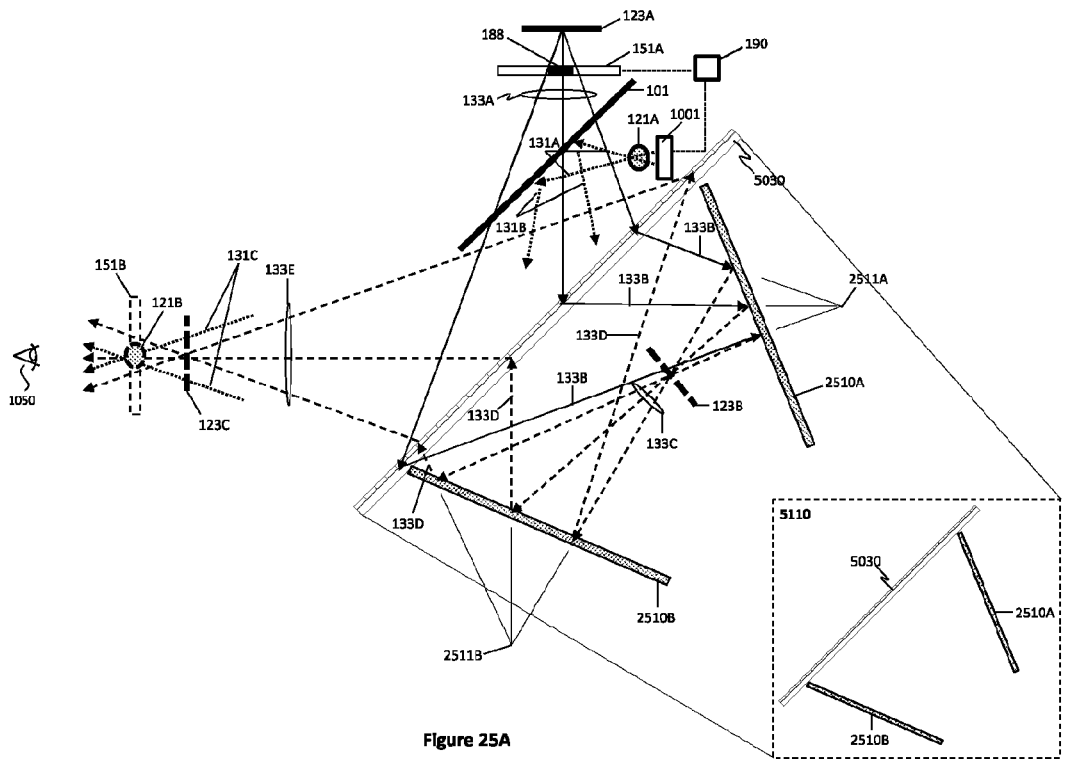
FIG. 25A illustrates an orthogonal view of a relay system in which the light from at least one object is relayed by passing through the same relay twice by reflecting from one or more mirrors.

Relay systems which preserve a depth profiles are able to transport to another location scenes presented by a stereoscopic, autostereoscopic, or multi-view displays, objects projected by a volumetric 3D display, holographic objects projected by a light field display, real-world objects emitting light, and real-world objects reflecting as they are originally exist, or as they are originally projected before being relayed. FIGS. 9A and 9G present a relay system comprised of two separate relays, in which the depth profile reversal of the first relay is substantially undone by the depth profile reversal of the second relay. It is possible to construct an imaging wherein light paths from an object are relayed twice by the same relay. Even if the relay inverts the depth profile of an object during each pass of the relay, two passes through the relay will restore the depth profile of the object. Such configurations may have the advantage of relaying an object without depth reversal and may be economical in materials and size. FIG. 25A is an orthogonal view of a display system comprising a relay system 5110 in which the light from at least one object is relayed by passing through the same relay twice by reflecting from one or more mirrors. FIG. 25A is the display system of FIG. 11B with the relay system 5110 utilized in place of 5001.

The optical combining system 101 includes a first input interface configured to receive light along paths 131A from first image source 1001 forming image surface 121A and a second input interface configured to receive light along paths 133A from second image source 123A. The configuration of FIG. 25A is the configuration of FIG. 11B with relay 5110 utilized, where relay 5110 is comprised of a transmissive reflector 5030 and two mirrors 2510A and 2510B. As described above in reference to in FIGS. 11A-D, the at least one of the first 1001 and second 123A image sources may comprise: a 2D display, a stereoscopic display, an autostereoscopic display, a multi-view display in one axis (e.g. a horizontal parallax only or HPO display), a volumetric 3D display, a light field display surface, a real-world object emitting light, a real-world object reflecting light, or the relayed image of a surface. In the example drawn in FIG. 25A, for the present discussion the first image source is a light field display 1001 operable to define holographic image surface 121A and the second image source 123A may be a 2D display with a 2D display surface or real-world object with a reflective or emissive surface. The light rays combined by the image combiner 101 received by the relay 5110 include light rays 131A from the first surface of the holographic object 121A projected by the first image source light field display 1001 and deflected into light rays 131B by 101, and the light rays 133A from the second surface of a 2D display or real world object 123A which pass through the image combiner 101. Light rays 133A from the display or real-world object 123A are relayed into light rays 133B focused toward a virtual convergence point 2511A. Light rays 133B reflect from the first mirror 2510A into light rays 133C, which converge at first virtual display plane 123B, which is the relayed surface of the 2D display or real world object 123A. Light rays 133C continue, reflecting from the second mirror 2510B into light paths 133D. Light paths 133D diverge from virtual convergence point 2511B. These light rays 133D are received again by relay 5030 and are relayed into light paths 133E, which converge to form a second virtual display plane 123C, which is the twice-relayed surface of the 2D display or real world object 123A. The light rays 131B from the holographic object 121A are not shown to be relayed during intermediate steps shown in FIG. 25A, but these light paths are relayed by the relay shown in FIG. 25A in much the same way as light rays 133A from the display or real-world object, being relayed into light rays 131C which form relayed holographic image surface 121B. The one or more occlusion planes 151A may be a portion of LC display panels, transmissive LED or LED panels, or some other type of panels with individually addressable occlusion sites 188. The distance between the one or more occlusion planes 151A from the display or real-world object 123A may be selected so that the corresponding relayed occlusion plane 151B coincides with the relayed holographic object 121B, as shown in FIG. 25A. To arrange this, the distance between the one or more occlusion planes 151 and the 2D display or real-world object 123A should be adjusted so that occlusion plane 151A and the projected holographic object surface 121A are equidistant from the image combiner 101, so that the relayed surface 123C of 2D display or real-world object 123A may be occluded from being seen behind the relayed holographic image surface 121B by an observer 1050 in as natural a way as possible (see FIGS. 9B, 9C, and 9D). This may be done to provide the correct depth cues to viewer 1050 that the relayed holographic image surface 121B is in front of the virtual object plane 123C. A controller 190 may generate display instructions for the light field display 1001 as well as send configuration instructions to the one or more occlusion planes 151A. In another embodiment, as shown in the configuration of FIG. 9B, it is possible that the one or more occlusion planes 151A will be relayed to virtual occlusion plane 151B at a location substantially different from the relayed holographic image surface 121B, but yet will still provide effective occlusion for observers 1050. In another embodiment, the holographic display 1001 is swapped with the object 123A and vice-versa in FIG. 25A, wherein the relayed object plane would be seen in front of the relayed holographic object, and the holographic object may be occluded from being seen directly behind portions of the relayed object plane. In another embodiment, in FIG. 25A the light rays 131A from the holographic object 121A may be combined with light rays 133B, 133C, or 133D from object 123A by an image combiner placed between the two mirrors 2510A and 2510B, allowing the object 123A to be positioned closer to the transmissive reflector relay 5030. In this configuration, the light from the holographic object 131A may reflect from one or both of mirrors 2510A-B in FIG. 25A, and this light 131A may only be relayed by one pass through the transmissive reflector 5030. In another embodiment, the two mirrors 2510A and 2510B may be replaced by three mirrors in a 3-sided rectangular or square configuration wherein the three sides of the mirrors may be orthogonal to one another and the fourth side of the rectangle or square is formed by the transmissive reflector 5030. In another embodiment, two or more mirrors may be used in a different configuration to that shown in FIG. 25A to relay the light from an object by passing the light multiple times through the same relay. An embodiment with a transmissive reflector and a single mirror is described next.

FIG. 25B is comprised of two orthogonal views of a display system with a relay system 5120 in which the light from at least one object is relayed by passing through the same relay twice by reflecting from a mirror. The optical combiner 101C includes a first input interface configured to receive light along paths 131A from image source 1001 forming object surface 121A, and a second input interface configured to receive light along paths 133A from second image source 123A. The configuration of FIG. 25B is the configuration of FIG. 11B with relay 5120 utilized, where relay 5120 is comprised of a transmissive reflector 5030, a mirror 2510C, and a beam splitter 101D. As described above in reference to in FIGS. 11A-D, the at least one of the first 1001 and second 123A image sources may comprise: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. In the example drawn in FIG. 25B, for the present discussion the first image source is a light field display 1001 operable to define holographic image surface 121A and the second image source 123A may be a 2D display with a 2D display surface or real-world object with a reflective or emissive surface. The side view 2501 in FIG. 25B reveals that the light rays received by the image combiner 101C include the group of light rays 131A from the first surface of the holographic object 121A projected by the first image source light field display 1001, and the group of light rays 133A from the second image source 2D display or real-world object 123A. The light rays 131A forming the holographic object 121A include light ray 1310A which is deflected by image combiner 101C into light ray 1310B. The light rays 133A from the 2D display or the real-world object 133A include light ray 1330A and 1331A projected at different angles, where light rays 1330A and 1331A are combined with light ray 1310B and are received by the beam splitter 101D of the relay system 5120, and these light rays 1330A, 1331A, and 1310B are deflected into light rays 1330B, 1331B, and 1310C, respectively, by beam splitter 101D of the relay system 5120.

The top view 2502 in FIG. 25B shows how the light ray 1310C from the holographic object 121A and the light rays 1330B and 1331B from the 2D display or real-world object 123A traverse the relay system 5120. The light ray 1310C is relayed into light ray 1310D by transmissive reflector 5030, whereupon 1310D reflects from the mirror 2510C at the same angle of approach into light ray 1310E which is relayed once again by the transmissive reflector 5030 into light path 1310F which contributes to forming the surface of relayed holographic object 121B. Similarly, 1330B and 1331B are relayed by the transmissive reflector 5030 into light paths 1330C and 1331C, respectively, toward the mirror, reflecting from the mirror into light paths 1330D and 1331D which are then relayed by the transmissive reflector 5030 into light paths 1330E and 1331E which exit the relay 5120 by passing through beam splitter 101D, and converge to form the relayed object 123B which may be the relayed surface of a 2D display 123A or the relayed surface of a real-world object 123A. In FIG. 25B, one or more occlusion planes 151A may occlude a portion of the light from the object 2511A at occlusion sites such as 188, in order to block light from the portion of the relayed surface 123B of the 2D display or real-world object behind a relayed holographic image surface 121B from reaching an observer 1050. A controller 190 may generate display instructions for the light field display 1001 as well as send configuration instructions to the one or more occlusion planes 151A. In FIG. 25B, the holographic object 121A is closer from the first image combiner 101C than the 2D display or real-world object 123A, and the corresponding relayed object 121B is closer to the viewer 1050 than the relayed object 123B. As a result, depth may not be reversed by this relay 5120. FIG. 25B may have an optional optical element 1041A located between the transmissive reflector 5030 and the reflective element 2510C, which may be a quarter wave retarder. If a polarization beam splitter 101D is used, then most of the light 1330B, 1331B, and 1310C received by the relay 5030 and relayed to respective light paths 1330C, 1331C, and 1310D toward the reflective element 2510C may be of a first polarization state. The combination of a quarter wave retarder 1041A and a reflective surface 2510C may change these light paths to a state of second polarization orthogonal to the first as they are again received by the relay 5030 and relayed through the beam splitter 101D whereupon most of these light rays will pass without being deflected. This may result in less light loss for the relay system 5120.

FIG. 25C is an orthogonal view of an imaging relay system 2503 comprised of a transmissive reflector 5030 with a polarization beam splitter 2521 on one side of the transmissive reflector, and a mirror 2510D paired with a quarter wave retarder 2522, the plane of the mirror disposed at an acute angle relative to the surface of the transmissive reflector 5030. The plane of the polarization beam splitter 2521 is placed parallel to the face of the transmissive reflector 5030, on the side of the mirror, with the polarization beam splitter 2521 possibly attached to the surface of 5030. The polarization beam splitter 2521 may pass a first state of linear polarization and reflect a second state of linear polarization orthogonal to the first. In some embodiments, the polarization beam splitter 2521 may pass a first state of circular polarization and reflect a second state of circular polarization orthogonal to the first. In some embodiments the quarter wave retarder 2522 is another polarization element, such as a half wave plate, or may be absent altogether. The plane of the quarter wave retarder 2522 is disposed to be parallel to the plane of the mirror 2510D, on the reflective part of the mirror, and may be attached to the plane of the mirror. In one embodiment, the angle between the mirror 2510D and the transmissive reflector 5030 is about 22.5 degrees, but other configurations with different angles may be achieved. Incident light rays of a first linear polarization state to the relay system 2503 along path 1, designated by the solid line, are received by the transmissive reflector 5030, and relayed into path 2, passing through the polarization beam splitter 2521 and toward the mirror 2510D. Before reaching the mirror 2510D along path 2, the quarter wave retarder 2522 changes the polarization state of the light 2 from a first polarization state into a first circular polarization state. Upon reflection of this light 2 from the mirror into path 3, the first circular polarization state is converted into a second circular polarization state orthogonal to the first. After passing again through the quarter wave retarder 2522, the light on path 3 is converted into a second state of linear polarization orthogonal to the first state of linear polarization on path 2, designated by the dashed line along path 3. In other words, the linear state of polarization of path 2 has been converted from a first to a second state upon a first pass through quarter wave retarder 2522, reflecting from mirror 2510D, and passing a second time through the quarter wave retarder 2522, which is well known in the art. The light on path 3 of the second state of linear polarization is reflected from the polarization beam splitter 2521 into path 4 without changing state, so the line for path 4 in FIG. 25C is shown as remaining dashed. Upon reflection of path 4 from the mirror, the second state of linear polarization of path 4 changes into a first state of linear polarization for path 5, which is shown as a solid line. This state of polarization may pass through the polarization beam splitter 2521, and so path 5 is relayed into path 6 by the transmissive reflector where path 6 intersects with path 1 at point 25115. This point of intersection 25115 for an incident light ray may be adjusted by changing the distance 25114 between the mirror 2510D and the transmissive reflector 5030. The relay system 2503 is reciprocal—in the example of FIG. 25C, light input on path 1 is relayed into path 6, but light input on path 6 will be relayed into path 1. This means light from a point 25115 received by the relay system 2503 will return to that point with the light ray angles swapped.

FIG. 25D is an orthogonal view of the light paths generated within the relay system shown in FIG. 25C for three input angles of light from a point source. Light input at three angles along light paths 25117A, 25118A, and 25119 pass through common point 25116, are received by the relay, are reflected, and exit the relay along paths 25117B, 25118B, and 25119, respectively. Light input along the center path 25119 returns along this same center path but with the direction reversed. A light ray along path 25117A received by relay 2503 at an incident angle $-\varphi$ relative to this center path 25119 is returned along a path 25117B at $\varphi$, the negative of the incident angle.

Figure 25E:
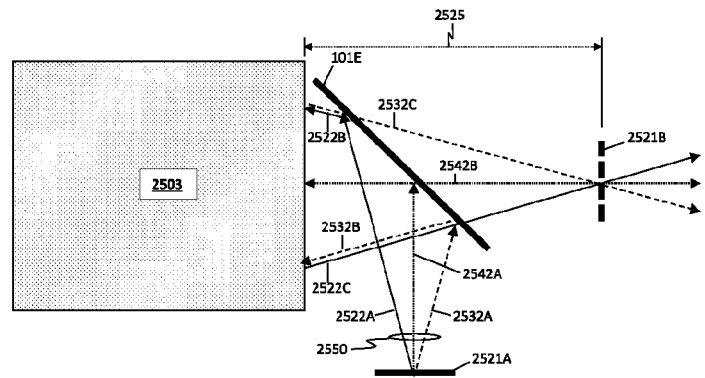
FIG. 25E illustrates light paths being received and relayed by the relay of FIG. 25C.

FIG. 25E is a display system employing the relay system 2503 shown in FIG. 25C to relay an object 2521A to a relayed object 2521B. Light rays 2550, including light rays along light paths 2522A, 2532A, and 2542A are directed toward an image combiner 101E. Light path 2522A is reflected by the image combiner 101E into path 2522B, which is received by the relay system 2503 and relayed to light path 2522C, which passes through the image combiner 101E. Similarly, light path 2532A is reflected by image combiner 101E into path 2532B, which is received by relay system 2503 and relayed to light path 2532C, which passes directly through the image combiner 2503. The vertical light path 2542A leaving object 2521A, is reflected by the image combiner 101E, received by the relay system 2503 along light path 2542B in a direction toward the relay system 2503, relayed back along light path 2542B in the opposite direction away from the relay system 2503, and straight through the image combiner 101E. The relayed light paths 2522C, 2532C, and 2542B converge to form the relayed object 2521B. In FIG. 25E, the desired distance 2525 between the relay system 2503 and the relayed object position 2521B may be tuned by adjusting the distance 25114 between the mirror 2510D and the transmissive reflector 5030 shown in FIG. 25C. The distance between the object 2521A and the image combiner 101E may be set equal to the distance between the relayed object 2521B and the image combiner 101E. In an embodiment, object 2521A may be replaced by any of: a 2D display surface, a stereoscopic display surface, an autostereoscopic display surface, or a horizontal parallax-only multi-view display such as a lenticular display.

Motion of Relayed Holographic and Real-World Objects

This disclosure has presented a number of ways to combine holographic objects with images of real-world objects in such a way that they appear together in approximately the same location, and occlusion of the holographic objects overlapping with the image of the real-world objects may be handled with the use of occlusion barriers. There are several ways in which motion of the holographic objects or real-world objects may be handled, which are outlined below.

Figure 26A:
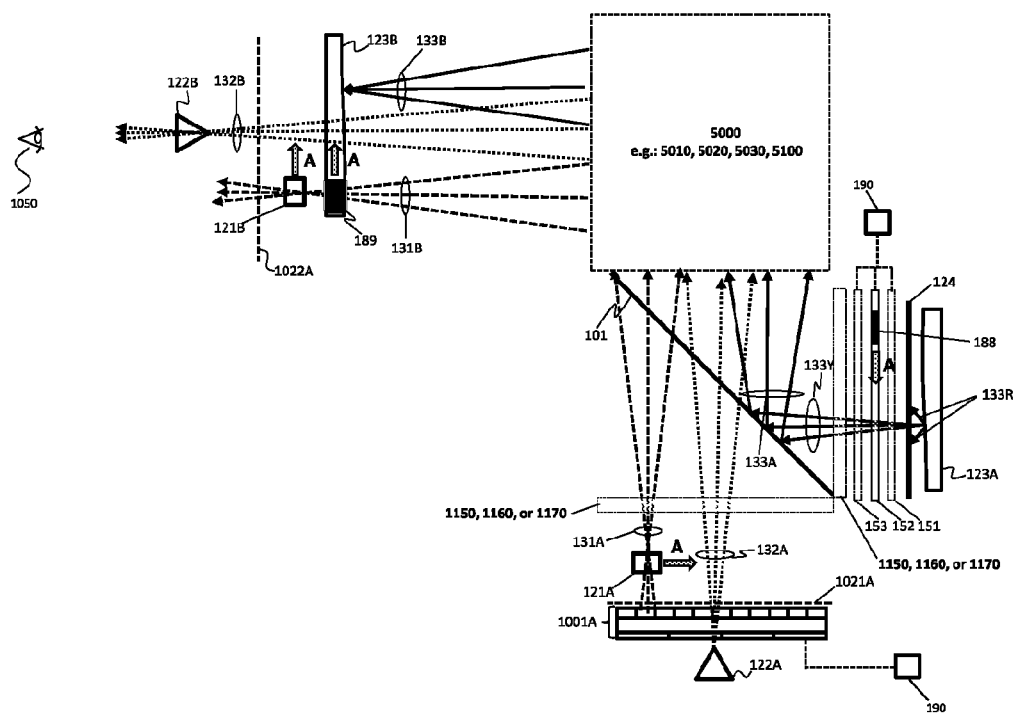
FIG. 26A shows the coordinated movement between a holographic object and an occlusion region on an occlusion plane within a display system with a relay.

FIG. 26A is the same display system shown in FIG. 11A in which relay system 5000, but with arrows showing how relayed holographic object surfaces 121B and 122B may be moved computationally. The relay 5000 relays light from holographic object surfaces projected from a first image source light field display 1001A simultaneously with the light from second image sources of one or more real-world objects, summarizing many of the systems shown in FIG. 9A and FIGS. 11-24. The numbering of FIG. 11A applies to FIG. 26A. The relay system 5000 is shown to reverse the depth profile of relayed objects (e.g. relayed holographic object surfaces 121B and 122B have a reverse depth profile from the projected object surfaces 121A and 122B), but the discussion here also applies to a display system shown in FIG. 11B with relay 5001 which preserves the depth ordering of surfaces that are relayed. The discussion shown in FIG. 26A also applies to the variations shown in FIGS. 11D and 11E in which the first and second image sources each comprises: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. In an embodiment, the relay system may include a controller 190 configured to supply display instructions to the light field display 1001A and the one or more occlusion planes 151, 152, and 153. FIG. 26A demonstrates how holographic objects may be moved completely computationally. In FIG. 26A, the holographic object surface 121A is moved in a direction denoted by the arrow A by the controller 190 supplying display instructions to the display 1001A. The display instructions may be determined from a rendering engine. The controller 190 may also issue instructions to an occlusion system 150, which in an embodiment, may include the occlusion planes 151, 152, and 153, to provide the correct real-time occlusion regions 188 to occlude light rays from real-world object 123A such that for possible viewing locations for observer 1050, the portion 189 of the relayed image surface 123B of the real-world object 123A that is behind the moving relayed holographic image surface 121B does not transmit light. Occlusion regions 188 move in the direction denoted by the arrow A near 188, and in turn, the occluded portion 189 of the relayed image surface 123B will move in a direction denoted by the arrow A near 189. All of this movement is achieved computationally. In an embodiment, an optical system comprises a controller 190 operable to coordinate a movement of the occlusion region 188 with a movement of an image surface 121B or 122B in the viewing volume.

In an embodiment, the occlusion barriers 151, 152, and 153 in FIG. 26A may be replaced with at least one real-world occlusion object. In an embodiment, the at least one occlusion object may be configured to have the same dimensions as a relayed holographic object 121B, 122B and is moved mechanically in synchronization with movement of the holographic object, wherein the holographic object may be moved computationally. FIG. 26B is the display system of FIG. 26A with a real-world object 121AS replacing the occlusion barriers 151, 152, and 153 in the occlusion system 150 shown in FIG. 26A. The numbering in FIG. 26A is used in FIG. 26B. The real-world object 121AS is designed to be an occlusion object, which may be painted matte black or have a light-absorbing texture and has a position which is motor controlled. In FIG. 26B, holographic object surface 121A is moved to the left along arrow B near 121A via display instructions from the controller 190. In response, relayed holographic image surface 121B moves vertically along arrow B near 121B in response to holographic object surface 121A being moved. The object 121AS may be motorized in an embodiment, and the controller 190 may also issue instructions to a motor, which moves occlusion object 121AS in the direction along arrow B near 121AS. The moving motorized occlusion object 121AS blocks light rays leaving real-world object 123A, allowing the occluded portion 189 of the relayed real-world image surface 123B to move vertically along the arrow B near 189, moving to track the motion of the relayed holographic image surface 121B, so that the relayed holographic image surface 121B seems to occlude the relayed background image surface 123B of real-world object 123A. In an embodiment, at least one occlusion object 121AS is motorized. In a further embodiment, the optical system comprises a controller 190 operable to coordinate a movement of the at least one occlusion object 121AS with a movement of an image surface 121B or 122B in the viewing volume.

In an embodiment, motion of both the relayed holographic image surfaces 121B and 122B, as well as the relay image surface 123B of the real-world object can be moved by simply mechanically moving the relay system 5000, or a portion of the relay system 5000. FIG. 26C is the display system of FIG. 26A showing the direction of motion for many of the elements shown in FIG. 26A when the relay system 5000 is moved vertically along direction of arrow C near relay 5000. The numbering of FIG. 26A is used in FIG. 26C. This motion of the relay 5000 results in both an upward motion for the relayed images 121B, 122B, and 123B, as well as the relayed images being projected further, for a combined motion diagonally upward toward the top left of the page along the associated arrows C near relayed objects 121B, 122B, and 123B. Depending on which configuration of the relay system 5000 is used, under some circumstances the controller 190 may issue instructions to the occlusion layers 151, 152, and 153 to adjust the occlusion regions 188, denoted by the downward arrow C, so that the occluded portion 189 of the relayed image surface 123B of the real-world object 123A tracks the motion of the relayed holographic object image surface 121B, so that the relayed holographic image surface 121B continues to appear to occlude the relayed image surface 123B of real-world object 123A. In an embodiment, a relay system 5000 comprises a mechanical mechanism operable to impart a motion of the relay system relative to at least one occlusion layer 151, 152, or 153 and the first and second image sources 1001A and 123A, wherein the relay system moves relative to the rest of the optical system. In another embodiment, the relay system 5000 comprises a controller operable to coordinate a movement of the relay system with a movement of an image surface 121B, 122B defined in the viewing volume, so that the desired movement of the relayed image surface may be achieved. In still another embodiment, a relay system comprises a controller 190 operable to coordinate a movement of the relay system 5000 with a movement of an occlusion region 188 defined by the at least one occlusion layer 151, 152, or 153 in order to allow for adjustable occlusion handling of relayed objects 121B, 122B, and 123B as they move in response to the relay movement. The optical display system shown in FIG. 26C may have an occlusion system comprised of a real-world occlusion object like 121AS shown in FIG. 26B. In an embodiment, the relay system 5000 comprises a mechanical mechanism operable to impart a motion of the relay system relative to the at least one occlusion object 121AS and the first and second image sources 1001A and 123A, and a controller 190 is operable to coordinate a movement of the relay system 5000 with the movement of the at least one occlusion object in order to correctly account for occlusion as the relayed objects 121B, 122B and 123B move in response to the relay motion. In still another embodiment, the relay system comprises a mechanical mechanism operable to impart a motion of the relay system 5000 relative to the at least one occlusion object 121AS and the first and second image sources 1001A and 123A, and a controller 190 is operable to coordinate a movement of the relay system with the movement of an image surface 121B, 122B, and 123B in the viewing volume.

Figure 26D:
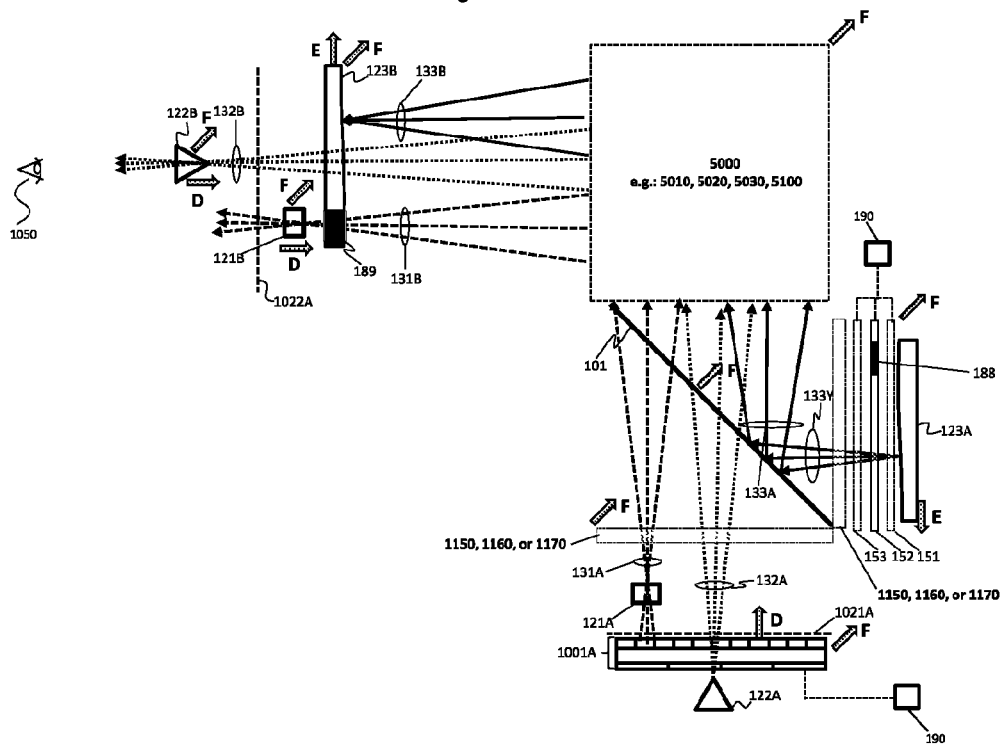
FIG. 26D shows options for motorized movement of some of the components of the relay system shown in FIG. 26A.

FIG. 26D is the display system of FIG. 26A showing three other options D, E, and F for motorized movement of some of the components of the relay system 5000. The numbering of FIG. 26A is used in FIG. 26D. In option D, the light field display 1001A is moved by a motor upward in direction D. In response, the relayed holographic image surfaces 121B and 122B move to the right, along arrows D near these objects. In an embodiment, at least one of the first and second image sources 1001A and 123A is movable to impart motion relative to the at least one occlusion layer. In another embodiment, at least one of the first and second image sources 1001A and 123A is movable to impart motion relative to the at least one occlusion object. In option E, the real-world object 123A is moved by a motor downward in the direction of arrow E near 123A, but nothing else is moved. In response, the relayed image surface 123B of the real-world object 123A moves upward along arrow E near 123A, but the relayed holographic image surfaces 121B and 122B do not move. Lastly, in option F, all the hardware components including the light field display 1001A, the relay system 5000, the optical combining system 101, the real-world object 123A, the optical folding systems 1150, and the occlusion barriers 151, 152, and 153 of the occlusion system 150 move with a motor along direction F. This causes the relayed holographic image surfaces 121B, 122B, and the relayed real-world image surface 123B to move relative to a stationary observer 1050 along the arrows F shown next to these respective objects. Finally, although not illustrated in FIG. 26A-D, it is possible to adjust an occlusion layer or an occlusion object by simply moving the occlusion layer or object. In an embodiment, the movement of the occlusion region 188 in the at least one occlusion layer 152 is effected at least in part by a physical motion of the at least one occlusion layer. In an embodiment, the occlusion region in the at least one occlusion layer is effected at least in part by modulating individually addressable elements in the at least one occlusion layer.

The motions shown in FIG. 26A-D are exemplary motions in particular directions, and many other directions of motion are possible for the elements of the display system 26A. As stated earlier, other configurations of display systems shown in FIGS. 11A-H or any other display system with relays presented in this disclosure may move relayed objects in a similar manner. Depending on the configuration of the relay 5000 or any other relay used in the display system, the motions described here may be accompanied by minification or magnification of a projected holographic object surface, a computational swap of U-V coordinates in order to reverse depth, or the computational adjustment of U-V mapping for light rays forming projected holographic object surfaces in order for the corresponding relayed objects to appear to move smoothly and without distortion.

Finally, although this discussion has focused on a first image source of a light field display and a second source of a real-world object with an emissive or reflective surface, the first and second image sources may include a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light, as detailed above in the discussion for FIGS. 11A-11I and the other display configurations of this disclosure which comprise at least one image relay.

Multi Relay Display Systems

Often imaging relay systems are more limited in field-of-view (FOV) than desired for a display application. For example, the FOV of a transmissive reflector or a retroreflector is about 45 degrees (+/−22.5 degrees), which means that a relay system built from such components may be limited to this output range of angles. To overcome this limitation, it is useful to use configurations with multiple relay systems. FIG. 27A is an orthogonal view of the surfaces of two relays angled with respect to one another to create a combined field-of-view (FOV) which is larger than either of the FOVs of the individual relays. Only the exit surface 2701A and 2701B of each relay is shown. While the surface is shown to be an angled surface, which could be the angled image combiner or the angled transmissive reflector of relays such as those illustrated in FIGS. 9A, 9G, FIG. 12-19, or FIG. 25A, 25B or 25E, the surface could be planar, similar to the relays illustrated in FIG. 20 and FIG. 24. A first relay 2701A may have a range of output angles for relayed light paths 2702A limited by a first FOV 2703A, while a second relay 2701B may have a range of output angles for relayed light paths 2702B limited by a second FOV 2703B. However, if the first relay surface 2701A and second relay surface 2701B are disposed next to one another, and in this configuration rotated with respect to one another by angle 2704, then a combined FOV 2703C may be achieved wherein a light path from either the first relay 2701A or the second relay 2701B may be observed at every angle. In an embodiment, the viewing volume of the relay system 2701A defines a first field of view 2703A; wherein the optical system further comprises an additional relay system 2701B configured to relay light from at least one additional image source along light paths to an additional viewing volume that defines a second field of view 2703B, and wherein the first relay system 2701A and the additional relay system 2701B are aligned such that the first and second fields of view are combined to define a combined field of view 2703C.

Figure 27B:
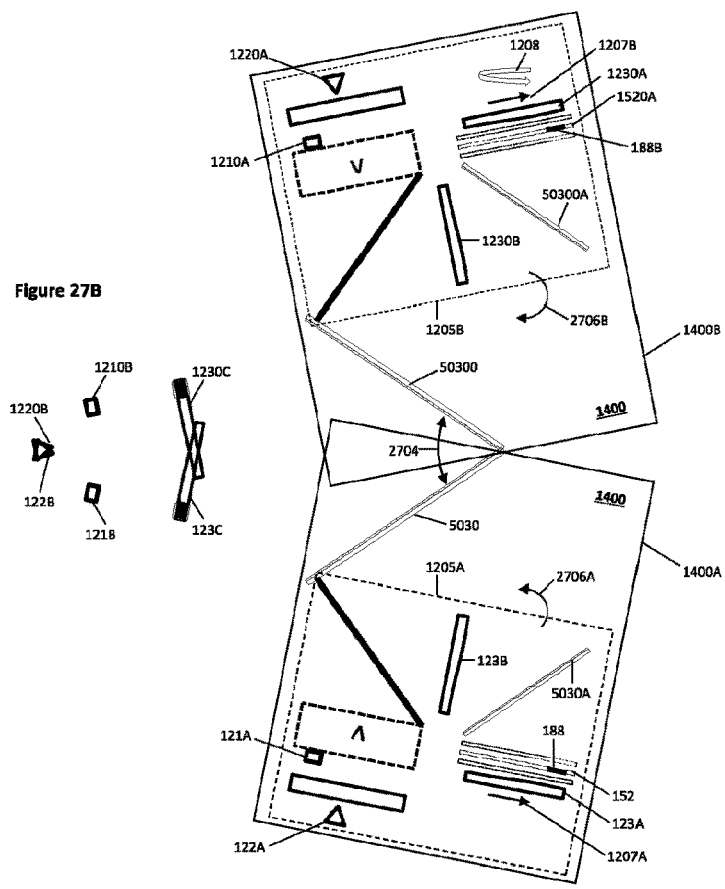
FIG. 27B shows two relays shown in FIG. 14 placed together to result in a larger combined field-of-view.

FIG. 27B is an orthogonal view of an implementation of the concept shown in FIG. 27A, comprising two identical display systems 1400 shown in FIG. 14A, each display system 1400 configured with a transmissive reflector relay, wherein the two display systems are arranged so that the FOV for the relayed objects is larger than the FOV for either of the separate display systems 1400. The relays 5030 and 50300 from the two display systems 1400A and 1400B, respectively, are disposed at an angle 2704 with respect to one another. In one embodiment, the angle 2704 is less than 90 degrees. In FIG. 27B, the numbering of FIG. 14 is used for the first display system 1400A, and the discussion of FIG. 14A describes in detail how objects are relayed within this display system. Within the first display system 1400A, relay 5030 relays a projected holographic object 121A to the relayed object 121B and projected holographic object 122A to relayed holographic object 122B. The surface of a real-world object 123A is relayed to surface 123B via transmissive reflector 5030A, and surface 123B is relayed to relayed surface 123C of real-world object 123A via transmissive reflector 5030. Similarly, within the second display system 1400B, relay 50300 relays projected holographic surface 1210A to relayed holographic object 1210B and projected holographic object 1220A to relayed holographic object 1220B. The surface of real-world object 1230A is relayed to relayed surface 1230B via transmissive reflector 50300A, and surface 1230B is relayed to relayed surface 1230C of real-world object 1230A via transmissive reflector 50300. Note that as pictured, the twice relayed real-world images of objects 123C from the first relay and 1230C from the second relay do not overlap. Moreover, these two relayed objects are up-down flipped. To achieve alignment between these relayed objects from the two relays, at several adjustments may be made. The first adjustment is to rotate toward one another 2706A and 2706B the image combining systems 1205A and 1205B within each relay system 1400A and 1400B, respectively, each image combining system comprised of all the optical components in each relay system except for the transmissive reflector. The image combining system 1205A comprising the first relay system 1400A may be rotated counterclockwise 2706A, and the image combining system 1205B comprising the second relay system 1400B may be rotated clockwise 2706B. In addition, one of the real-world objects 1230A within one of the relay systems 1400B may be rotated 1208 by an angle of about 180 degrees, but still have its surface aligned substantially parallel to the occlusion layers such as 1520A. The occlusion region 188B within relay system 1400B should also move in coordination with the movement of the real-world object 1230A. Also, to achieve vertical alignment between the relayed real-world objects 123C and 1230C, real-world object 123A may move in the direction indicated by the arrow 1207A, and the real-world object 1230A may move in the direction indicated by the arrow 1207B. The occlusion sites 188 within one or more occlusion planes 152 within the first relay system 1400A may adjust to the new position of real-world object 123A, while the occlusion sites 188B within one or more occlusion planes 1520A within the second relay system 1400B may adjust to the new position of real-world object 1230A. Similar adjustments in position to the ones just described may be made to the projected holographic objects 121A, 1210A, 121B, and 1210B. This example shown in FIG. 27B is only one implementation of several adjustments that may be made to one or more relay systems described earlier in this disclosure to achieve a combined FOV. There are many other configurations with varying angles of image combiners relative to the relay systems, placement of displays or real-world objects, projection of holographic objects, and other configurations which achieve a combined FOV using more than one relay which is greater than the single FOV of a display system with a single relay.

Figure 27C:
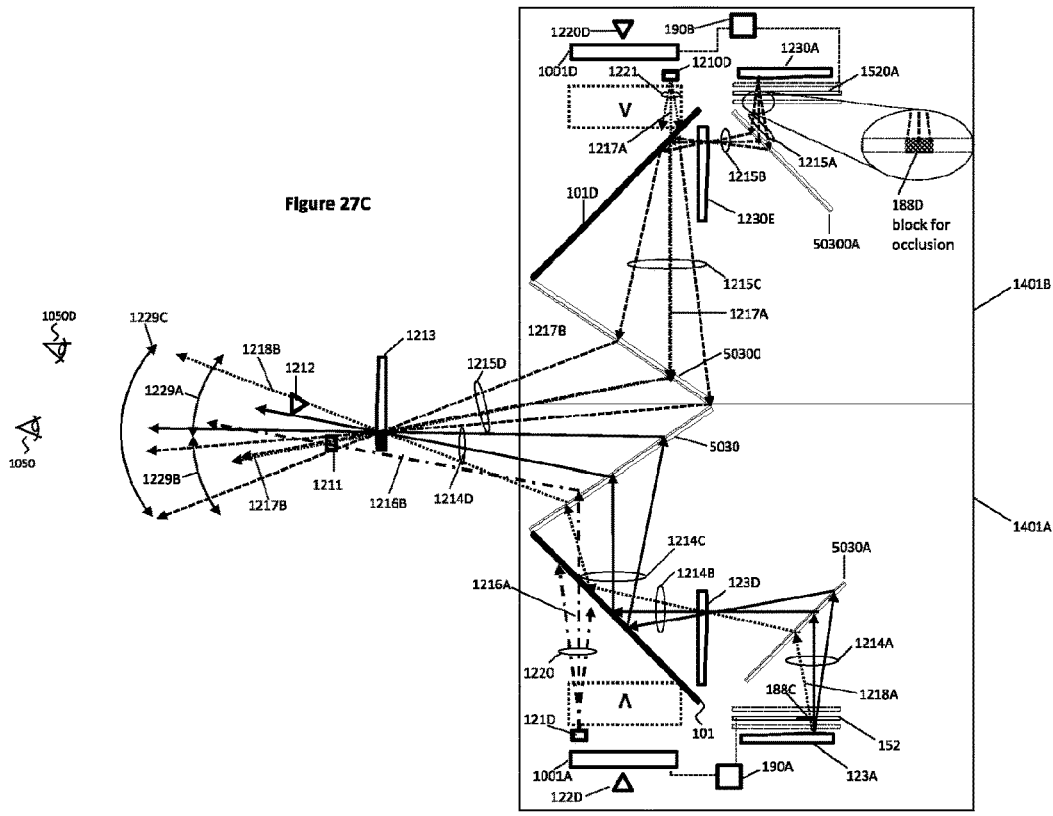
FIG. 27C shows the combined relay system of FIG. 27B after the adjustments have been made to have a larger combined field-of-view than either of the separate relays.

FIG. 27C is an orthogonal view of the display system shown in FIG. 27B wherein adjustments to each display system have been made to achieve overlap of relayed objects. The display system 1401A is the display system 1400A shown in FIG. 27B with some adjustments shown in FIG. 27B and described above including the rotation 2706A of the image-combining system 1205A relative to the transmissive reflector 5030, movement 1207A of the real-world object 123A to a new position, and some possible readjustment of the positions of projected holographic objects 121A and 122A to new locations 121D and 122D, respectively. The display system 1401B is the display system 1400B shown in FIG. 27B with some adjustments shown in FIG. 27B and described above including the rotation 2706B of the image-combining system 1205B relative to the transmissive reflector 50300, translation 1207B and rotation 1208 of the real-world object 1230A to a new position, and some possible readjustment of the positions of projected holographic objects 1210A and 1220A to new locations 1210D and 1220D, respectively. Both display system systems 1401A and 1401B are shown with a controller 190A and 190B, respectively, where 190A and 190B may be the same controller. In FIG. 27C, within relay system 1401A, light rays 1214A from a real-world object 123A are relayed by a transmissive reflector 5030A to light paths 1214B. Light paths 1214B form relayed image 123D, and are reflected into light rays 1214C by the image combiner 101, which combines these light paths 1214C with light 1220 from the holographic object 121D and light from the holographic object 122D (not shown for simplicity) projected from light field display 1001A. At this point in the drawing, only one ray 1216A of the group of light rays 1220 from the holographic object 121D is shown to continue through the image combiner 101 to avoid clutter of the FIG. 27C. Light rays 1214C and light ray 1216A are shown to be received by the relay 5030 and relayed to light rays 1214D and light ray 1216B, respectively, where relayed light rays 1214D form a portion of the relayed surface 1213 of real-world object 123A, and light ray 1216B forms a portion of the relayed holographic object 1211. Note that light path 1216A is projected at an angle normal to the surface of the light field display 1001A at light field angular coordinate (u,v)=(0,0), but the corresponding relayed light path 1216B is not normal to the viewer 1050, and therefore has a different light field angular coordinate than (u,v)=(0,0). In this case the 4D light field coordinates produced by light field display 1001A may be remapped computationally by the controller 190A so that the relayed holographic object 1211 has the appearance and depth profile intended for a viewer 1050. The one or more occlusion planes 188C may be activated in order to block some of the unwanted light paths. For example, light path 1218A of the group of light paths 1214A reflected or emitted by real-world object 123A and represented by the only dashed line in the group 1214A-D is relayed to light path 1218B which helps form the relayed surface 1213 of real-world object 123A. It may be desired that observer 1050D looking at the relayed holographic object 1212 should not be able to see relayed real-world object 1213 behind holographic object 1212. For this reason, the light ray 1218A may be blocked by an individually addressable occlusion region 188C on the one or more occlusion layers 152. The controller 190A may generate display instructions for the light field display 1001A as well as send configuration instructions to the one or more occlusion planes 152.

In FIG. 27C, within display system 1401B, light rays 1215A from a real-world object 1230A are relayed by a transmissive reflector 50300A to light paths 1215B. Light paths 1215B form relayed image surface 1230E, and these light paths are reflected into light rays 1215C by the image combiner 101D, which combines these light paths 1215C with light 1221 from the holographic object 1210D and light from the holographic object 1220D (not shown for simplicity) projected from light field display 1001D. At this point in the drawing, only one ray 1217A of the group of light rays 1221 from the holographic object 1210D is shown to continue past the image combiner 101D in order to avoid cluttering the FIG. 27C. Light rays 1215C and light ray 1217A are shown to be received by the relay 5030D and relayed to light rays 1215D and light ray 1217B, respectively, where relayed light rays 1215D form a portion of the relayed image surface 1313 of a real-world object 1230A, and light ray 1217B forms a portion of the relayed holographic object 1211. Note that light path 1217B is projected at an angle normal to the surface of the light field display 1001D at light field angular coordinate (u,v)=(0,0), but the corresponding relayed light path 1217B is not normal to the viewer 1050, and therefore has a different light field angular coordinate than (u,v)=(0,0). In this case the 4D light field coordinates produced by light field display 1001D may be remapped computationally by the controller 190B so that the relayed holographic object 1211 has the appearance and depth profile intended for a viewer 1050. The one or more occlusion planes 188D may be activated in order to block some of the unwanted light paths. For example, in may be desirable for observer 1050 looking at the relayed holographic object 1211 to not be able to see relayed real-world object 1213 behind holographic object 1211. For this reason, the source light rays 1215A may be blocked by one or more individually-addressable occlusion regions 188D on the one or more occlusion layers 1520A. The controller 190B may generate display instructions for the light field display 1001D as well as send configuration instructions to the one or more occlusion planes 1520A. The controller 190B in relay system 1401B may be the same as controller 190A in relay system 1401A and may send instructions to both light field displays 1001A and 1001D in FIG. 27C, and both sets of the one or more occlusion planes 152 and 1520A. The real-world object 123A may be a duplicate of real-world object 1230A.

Examining all the light paths in FIG. 27C, it is clear that both the display systems 1401A and 1401B may contribute light rays to the same image of a relayed real-world object 1213 or the same relayed surfaces 1211 or 1212 of projected holographic objects 121D/1210D or 122D/1220D. The FOV of light relayed by display systems 1401A and 1401B may each be similar to the FOV 2703A and 2703B shown in FIG. 27A, while the combined FOV of relayed object surfaces 1211, 1212, or 1213 may be similar to the wider angular range 2703C shown in FIG. 27A. In an embodiment, the viewing volume of the relay system 1401A defines a first field of view 1229A; wherein the optical system further comprises an additional relay system 1401B configured to relay light from at least one additional image source along light paths to an additional viewing volume that defines a second field of view 1229B, and wherein the first relay system 1401A and the additional relay system 1401B are aligned such that the first and second fields of view 1229A and 1229B are combined to define a combined field of view 1229C. In another embodiment, the at least one additional image source in additional relay 1401B comprises first and second additional image sources 1001D and 1230A, wherein the optical system further comprises a third input interface configured to receive light from the first additional image source 1001D and a fourth input interface configured to receive light from the second additional image source 1230A wherein the additional relay system is configured to direct light from the first and second additional image sources 1001D and 1230A to the additional viewing volume defining the combined field of view 1229C.

Figure 27D:
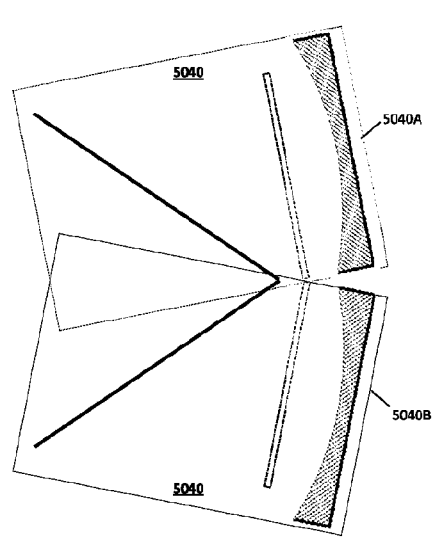
FIG. 27D shows two relays comprised of concave mirrors and beam splitters arranged to achieve a larger field-of-view.

FIG. 27D is an orthogonal view of a relay system comprised of two separate relays 5040A and 5040B angled with respect to one another to create a combined field-of-view (FOV) which is larger than either FOV of the separate relays, where each relay 5040A and 5040B is relay 5040 shown in FIG. 5D comprised of an image combiner and a curved mirror. The relays 5040A and 5040B each have a relay input interface configured to receive light. In one embodiment, the relays 5040A and 5040B each receive light along a set of light paths directly from at least a first image source, wherein the light from the first image source is operable to define at least one first image surface. The first image source for each relay 5040A and 5040B may be a light field display, and the first image surface may be the surface of a holographic object projected by the light field display. For example, 5040A and 5040B may each be relays 5040 in the configuration shown in FIG. 5D which relays light from a first light field display image source 1001 which projects holographic image surfaces 1015C and 1016C. In another embodiment, the relays 5040A and 5040B each receive combined image light from an optical combining system comprising a first optical combining input interface configured to receive light along a first set of light paths from a first image source wherein the light from the first image source is operable to define a first image surface, and second optical combining input interface configured to receive light along a second set of light paths from a second image source wherein the light from the second image source is operable to define a second image surface. As an example, each relay 5040A and 5040B may be the relay 5050 (with only one mirror) of a display system shown in FIG. 17, where each relay 5050 receives combined light from the optical combining system shown in FIG. 17 comprising image combiner 101A which receives a first set of light paths 131A and 132A from a first image source light field display 1001A which projects image surfaces of holographic objects 121A and 122A, respectively, as well as a second set of light paths 133A generated by a reflective or emissive real-world object 123A image source that has a real-world object surface. While the examples of FIG. 5D and FIG. 17 have been presented here with a first image source as a light field display for relays 5040A and 5040B, the first and second image sources may each be any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. Correspondingly, the image surface of the second image source may include an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object formed by light paths projected from a light field display, a surface of a real-world object, or a relayed image of the surface of the real-world object.

Figure 27E:
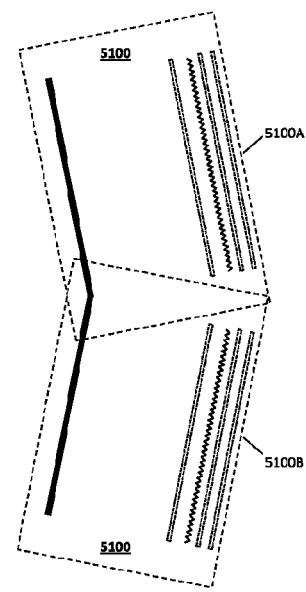
FIG. 27E shows two inline relays arranged to achieve a larger field-of-view.
Figure 27F:
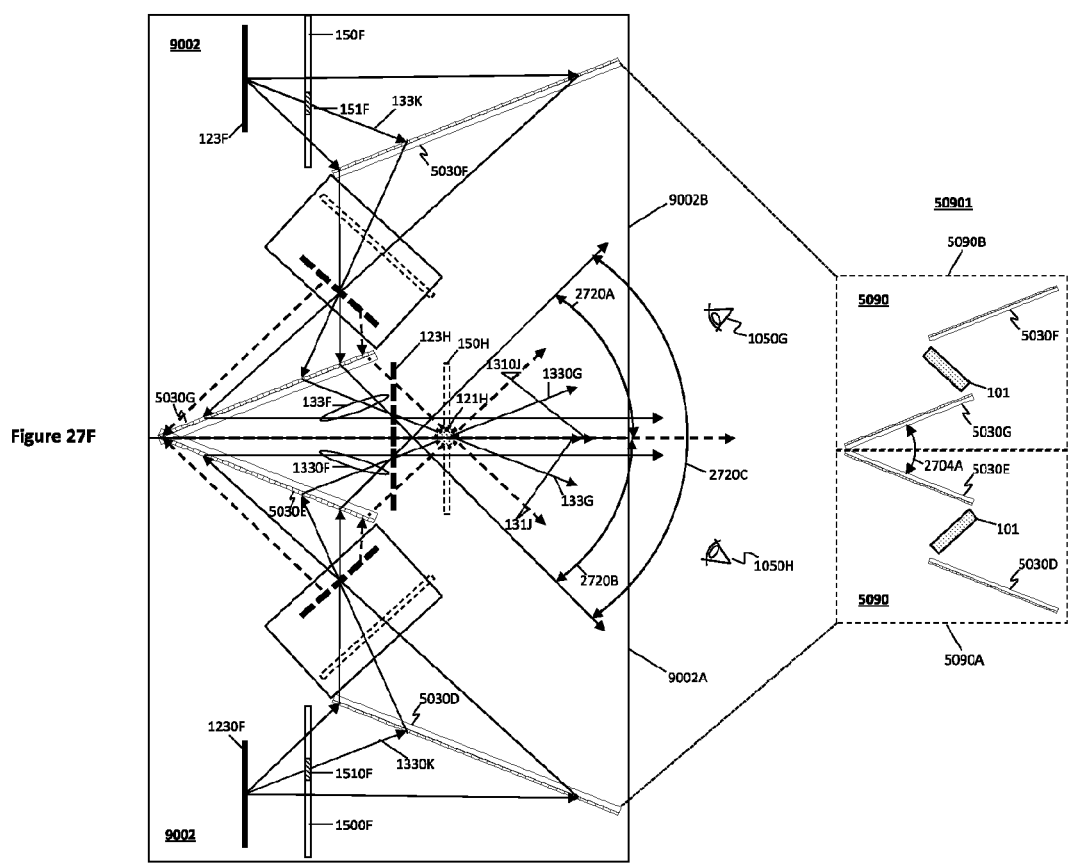
FIG. 27F shows two relays shown in FIG. 9G placed together to allow almost twice the field-of-view of the separate relays.

FIG. 27E is an orthogonal view of a relay system comprised of two separate relays 5100A and 5100B angled with respect to one another to create a combined field-of-view (FOV) which is larger than either FOV of the separate relays, wherein each separate relay 5100A and 5100B is the relay system 5100 shown in FIG. 20 comprised of a transmissive retroreflector, a reflective surface, and one or more layers of optional optical layers which may include polarization filters, quarter wave retarders, half wave retarders, or the like, and described above in reference to FIG. 20. The relays 5100A and 5100B each have a relay input interface configured to receive light. In one embodiment, the relays 5100A and 5100B each receive light along a set of light paths directly from at least a first image source, wherein the light from the first image source is operable to define at least one first image surface. The first image source for each relay 5100A and 5100B may be a light field display, and the first image surface may be the surface of a holographic object projected by the light field display. For example, 5100A and 5100B may each be relays 5100 in a display system shown in FIG. 21C which relays light from a first light field display image source 1001A projecting holographic image surfaces 121A and 122A. In another embodiment, the relays 5100A and 5100B each receive combined image light from an optical combining system comprising a first optical combining input interface configured to receive light along a first set of light paths from a first image source wherein the light from the first image source is operable to define a first image surface, and second optical combining input interface configured to receive light along a second set of light paths from a second image source wherein the light from the second image source is operable to define a second image surface. As an example, each relay 5100A and 5100B may be the relay 5100 in the display system shown in FIG. 22, where each relay 5100A and 5100B receives combined light from the optical combining system shown in FIG. 22 comprised of image combiner 101 which receives a first set of light paths 131B and 132B from a first image source light field display 1001A which projects image surfaces of holographic objects 121A and 122A, respectively, as well as a second set of light paths 133A generated by a reflective or emissive real-world object 123A image source that has a real-world object surface. While the examples of FIG. 21C and FIG. 22 have been presented here with a first image source as a light field display for relays 5100A and 5100B, the first and second image sources may each be any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. Correspondingly, the image surface of the second image source may include an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object formed by light paths projected from a light field display, a surface of a real-world object, or a relayed image of the surface of the real-world object.

FIG. 27F is an orthogonal top view of a combined display system comprised of two display systems 9002A and 9002B placed side by side, where each display system is the display system 9002 shown in FIG. 9G, wherein the combined display system has a combined FOV that is almost twice the FOV of a single display system 9002. The display system in FIG. 27F is comprised of 9002B, which is an exact copy of the display system 9002 shown in FIG. 9G, and display system 9002A, which is an exact copy of the display system 9002 shown in FIG. 9G but rotated 180 degrees from the top view, and placed directly aside relay 9002B.

In an embodiment, the viewing volume of the relay system 9002A defines a first field of view 2720A; wherein the optical system further comprises an additional relay system 9002B configured to relay light from at least one additional image source along light paths to an additional viewing volume that defines a second field of view 2720B, and wherein the first relay system 9002A and the additional relay system 9002B are aligned such that the first and second fields of view 2720A and 2720B are combined to define a combined field of view 2720C. In another embodiment, the at least one additional image source in additional relay 9002A comprises first and second additional image sources light field display 1001F shown in FIG. 9G and object 123F, wherein the optical system further comprises a third input interface configured to receive light from the first additional image source 1001F and a fourth input interface configured to receive light from the second additional image source 123F wherein the additional relay system 9002B is configured to direct light from the first and second additional image sources 1001F and 123F to the additional viewing volume defining the combined field of view of 2720C.

The numbering of FIG. 9G applies to the numbering of FIG. 27F, and the discussion of FIG. 9G above describes how light paths are relayed within each of the display systems 9002A and 9002B to relay the surface of a projected holographic object and the surface of a real-world object or a display, with the relayed background surface of the real-world object or display possibly occluded by the relayed foreground surface of the projected holographic object. The relay system 5090 in each display system 9002A and 9002B is comprised of two transmissive reflectors with an image combiner between them: display system 9002A is comprised of relay system 5090A which is relay 5090 in FIG. 9G with parallel transmissive relays 5030D, 5030E and image combiner 101, while display system 9002B is comprised of relay system 5090B which is also the configuration of relay 5090 in FIG. 9G with parallel transmissive relays 5030F, 5030G and image combiner 101. The combined relay 50901 of the combined display system shown in FIG. 27F is comprised of side-to-side relays 5090A and 5090B, which are disposed next to one another with output relay faces 5030E and 5030G forming an angle 2704A which may be less than 90 degrees just like the acute angle 2704 in FIG. 27A. The combined relay 50901 is comprised of four transmissive reflectors 5030D-F arranged to form the side-to-side relays 5090A and 5090B.

In the top display system in FIG. 27F, the relay 5090B relays light rays from a projected holographic object (numbered 121F in the side view of FIG. 9G, but not shown in this top-view diagram) to light rays 131J and 133G which form relayed holographic object 121H. In this discussion, the real-world object or display 123F will be called an object 123F. Similarly, light rays from object 123F are relayed to light paths 133F which form the relayed surface 123H of the object 123F. The light rays 131J and 133G forming the relayed holographic object 121H as well as the light rays 133F forming the relayed object 123H are projected into the angular range 2720B and observed by observer 1050H. The one or more occlusion planes 150F is relayed to relayed plane 150H. Similarly, within the bottom relay in FIG. 27F, the relay 9002A relays light rays from a holographic object projected from a light field display separate from the one in relay 9002B to light rays 1310J and 1330G which form relayed holographic object 121H. Similarly, light rays from object 1230F are relayed to light paths 1330F which contribute to forming the relayed object 123H. The light rays 1310J and 1330G which contribute to forming the relayed holographic object 121H as well as the light rays 133F forming the relayed object 123H are projected into the angular range 2720A and observed by observer 1050G. The occlusion plane 1510F is relayed to relayed plane 150H. To summarize, the light rays relayed by relay 5090B within display system 9002B and received by viewer 1050H fill the FOV angular range 2720B, while the light rays relayed by relay 5090A within display system 9002A and received by viewer 1050G fill the FOV angular range 2720A. The sum of these two angular ranges 2720A and 2720B forms a combined FOV that is larger than the individual FOV of 2720A or 2720B.

Each relay system 5090A and 5090B within the respective display system 9002A and 9002B contains a relay comprised of two individual transmissive reflector relays which may preserve the depth profile of relayed objects as discussed earlier. The one or more occlusion planes 150F in relay system 9002B is closer to the relay formed by 5030F and 5030G than the object 123F, and so it is relayed to relayed plane 150H at a position further from the relay than the surface 123H relayed from 123F. The separation between the occlusion plane 150F and the object plane 123F may be set to be about equal to the distance between the relayed holographic object 121H and the relayed object 123H to provide occlusion of the background relayed object 123H for a foreground relayed holographic object 121H. For example, if light ray 133G reaches an observer 1050H, then the observer 1050H can see a portion of the background relayed object 123H behind the relayed holographic object 121H. The origin of light ray 133G is light ray 133K, which may be blocked by activating the occlusion region 151F, providing an observer 1050H with an expected view of a foreground object 121H in front of a background object 123H and blocking some of the light from the background object 123H. Similarly, for display system 9002A, if observer 1050G can see light ray 1330G, which originates from object 1230F as light ray 1330K, then the observer 1050G may perceive that the relayed holographic object 121H is transparent to the relayed background object 123H. To avoid this, occlusion region 1510F may be activated to block light ray 1330K and prevent light 1330G from reaching observer 1050G.

Figure 27G:
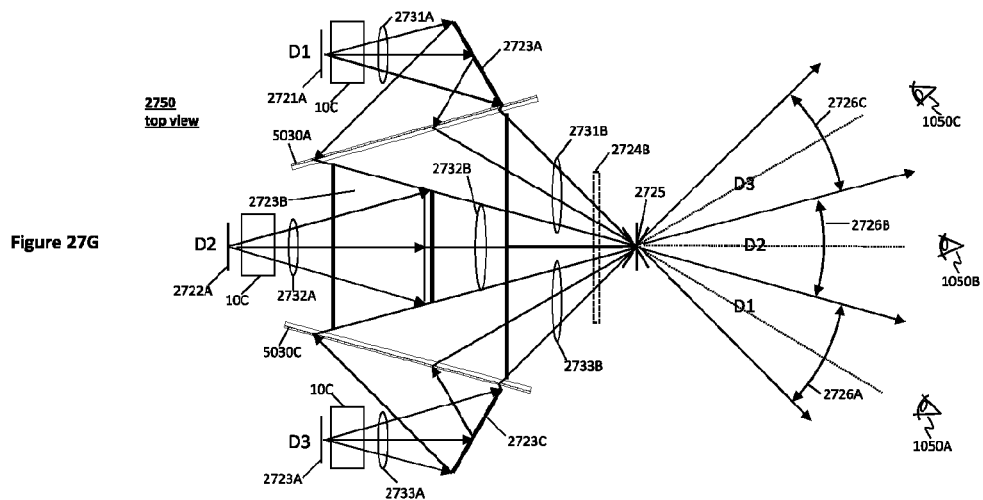
FIG. 27G is a top view of a display system comprised of three separate relays forming a single combined field of view.
Figure 27H:
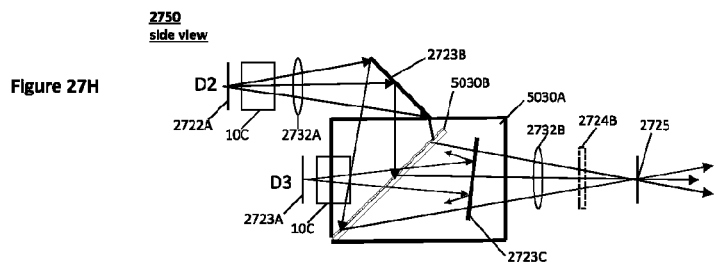
FIG. 27H is a side view of FIG. 27G.

More than two relays may be used in a relay system. FIG. 27G shows a top orthogonal view of a display system 2750 comprised of three individual relays, each relaying light rays from an object D1-D3 into paths that are divided into one of three angular ranges. FIG. 27H shows a side orthogonal view of the same display system 2750 shown in FIG. 27G. The numbering from FIG. 27G is used in FIG. 27H. The light from any of the objects D1-D3 may be combined with light from an image combining system 10C, which will be discussed below. Object D1 2721A produces light along paths 2731A which reflect from mirror 2723A, and are directed toward a transmissive reflector 5030A, whereupon the light rays are relayed to light rays 2731B, which converge at the relayed object 2725, and continue into the angular range 2726A. Similarly, light from object D3 2723A produces light along paths 2733A which reflect from mirror 2723C and are received by transmissive reflector 5030C and then are relayed into light paths 2733B which converge at the relayed object location 2725 and continue into angular range 2726C. The side view in FIG. 27H shows that light 2732A from object D2 2722A is reflected from an optical fold mirror 2723B, received by a transmissive reflector relay 5030B, and directed toward light paths 2732B, which contribute to forming relayed object 2725 and continue on into angular range 2726B. The entire angular range of light rays is the sum of the angular ranges 2726A, 2726B, and 2726C. The plane 2724B is a possible occlusion plane, depending on the details of the image combining system 10C.

Figure 27I:
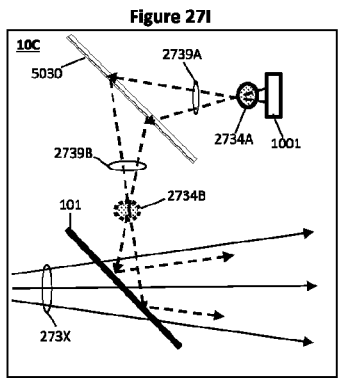
FIG. 27I shows the light from a holographic object being relayed and combined with other light within a portion of the display system of FIG. 27G.
Figure 27J:
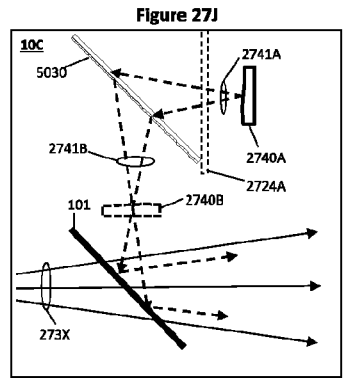
FIG. 27J shows the light from a real-world object being relayed and combined with other light within a portion of the display system of FIG. 27G.
Figure 27K:
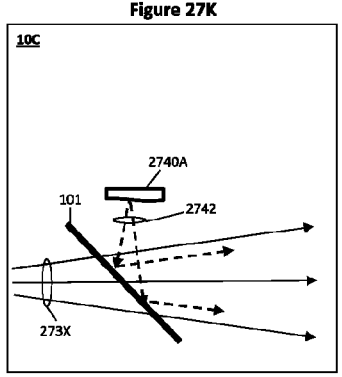
FIG. 27K shows the light from a real-world object being combined with other light within a portion of the display system of FIG. 27G.
Figure 27L:
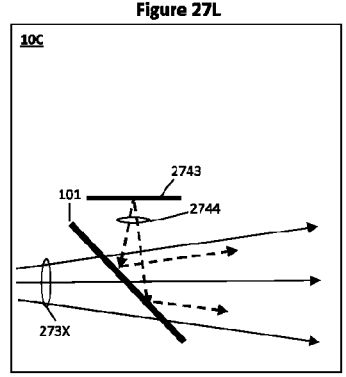
FIG. 27L shows light from a display being combined with other light within a portion of the display system of FIG. 27G.

FIGS. 27I-L are orthogonal side views of several possibilities for the image combining system 10C, which may be disposed in any of the paths of light rays from D1-D3 2721A, 2722A, or 2723A. In each of the four configurations shown in FIGS. 27I-L, input light paths 273X can be the light paths 2731A from object D1 2721A, light paths 2732A from object D2 2722A, or light paths 2733A from object D3 2723A. FIG. 27I shows an orthogonal view of a light combining system with a light field display and a relay. In FIG. 27I, light 2739A from a holographic object 2734A projected by a light field display 1001 is relayed by a relay 5030 into light paths 2739B which form relayed holographic object 2734B, and the light rays continue on to reflect from an image combiner 101 and are redirected to travel along with the paths of input light rays 273X. FIG. 27J shows an orthogonal view of a light combining system with a real-world object and a relay system. In FIG. 27J, light paths 2741A from a real-world object 2740A pass through an occlusion plane 2724A before being received and relayed by relay 5030 into light paths 2741B which converge to form the relayed image 2740B of real-world object 2740A, these light paths 2741B reflecting from the image combiner and sent along with input light 273X. The occlusion plane 2724A may be relayed to relayed occlusion plane 2724B shown in FIGS. 27G and 27H and occlude portions of the real-world object as was discussed in reference to FIG. 27F and earlier in this disclosure. FIG. 27K shows an orthogonal view of a light combining system with a real-world object. In FIG. 27K, light 2742 from a real-world object 2740A is redirected by the image combiner into light rays that travel with input rays 273X. FIG. 27L shows an orthogonal view of a light combining system with a generic object. In FIG. 27L, an object surface 2743 which may be a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light, or any other type of object that reflects or emits light produces light 2744 which is combined with the input light paths 273X by the image combiner 101.

Figure 27M:
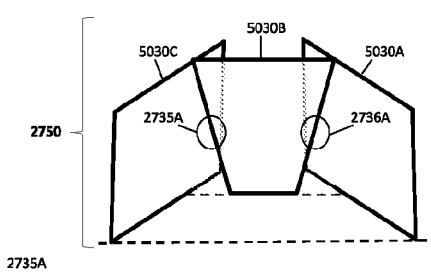
FIG. 27M shows a front view of the display surface of the display system of FIG. 27G.
Figure 27N:
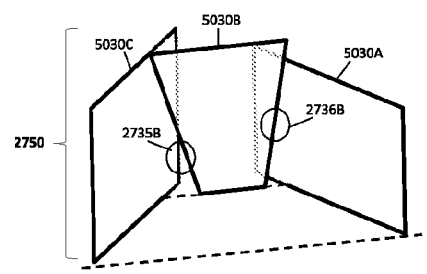
FIG. 27N shows an off center view of the display surface of the display system of FIG. 27G.

While in the example of FIGS. 27G and 27H there is almost no overlap illustrated between these three angular ranges 2726A, 2726B, and 2726C, some overlap is necessary to avoid dead regions of non-projecting display area. The relay surface is defined by the three planes of the transmissive reflectors 5030A, 5030B, and 5030C, and from different viewpoints, there must not be seams visible to viewers 1050A, 1050B, 1050C, or any other viewer in this combined FOV. FIG. 27M shows a front view of the 3-sided relay system used in display system 2750 shown in FIGS. 27G and 27H, which may be viewed by a viewer 1050B in front of display system 2750 as shown in FIG. 27G. Light from locations 2735A and 2736A reaches the viewer 1050B, and there is overlap between the panels at these locations. However, as the viewer moves to the left and becomes viewer 1050A in FIG. 27G, the view may change. FIG. 27N shows a front view of the 3-sided relay system used in display system 2750 shown in FIGS. 27G and 27H, which may be viewed by a viewer 1050A in front of display system 2750 as shown in FIG. 27G. Since only light relayed from relay surface 5030A reaches observer 1050A, the observer may not be able to notice the gap 2735B between relay surfaces 5030B and 5030C. There is plenty of overlap on the seam near location 2736B between relay surfaces 5030A and 5030B for this viewing position 1050A.

Figure 27O:
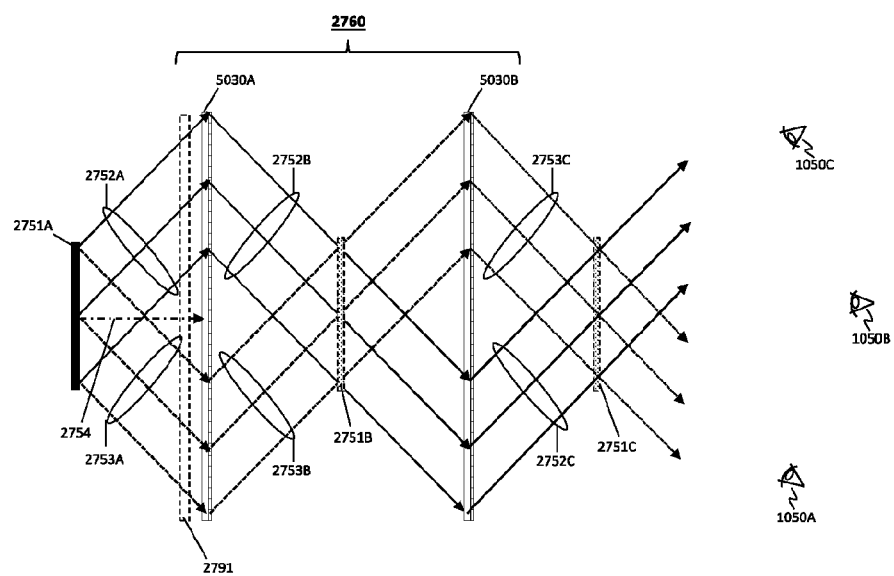
FIG. 27O shows a relay configuration comprised of two parallel transmissive reflectors wherein only light incident at an acute angle to the surface of the first transmissive reflector is relayed effectively.

FIG. 27O is an orthogonal view of a display system comprising a relay system 2760 which relays light rays from an object that are projected only at wide angles relative to the surface of the relay system. The relay system is comprised of two transmissive reflectors 5030A and 5030B, where 5030A relays the light from an object 2751A to an intermediate relayed image 2751B. This light is received by transmissive reflector 5030B which relays the relayed image 2715B to a second relayed image 2751C. The second relayed image 2751C is expected to have substantially the same depth profile as the source object 2751A. The light rays 2752A from object 2751A form a 45-degree incident angle with respect to the normal to the surface of the first relay 5030A. These light rays, as well as the light rays from the object 2751A that lie within a cone of about +/−22.5 degrees from these light rays 2752A will be relayed into light rays grouped around light paths 2752B, forming the relayed object image 2751B. These light paths are within first and second ranges of angular alignment relative to the first transmissive reflector 5030A. These light rays 2752B are received by the second relay 5030B, and are relayed into light paths 2752C, which may be seen by an observer 1050C but not by observers 1050B or 1050A. Similarly, light rays 2753A from object 2751A travel in a different direction from light rays 2752A but also form a 45-degree incident angle with the normal of the surface of the first relay 5030A. These light rays 2753A, as well as the light rays from the object 2751A that lie within a cone of about +/−22.5 degrees from these light rays 2753A will be relayed into light rays grouped around light paths 2753B, also forming the relayed object image 2751B. These light rays 2753B are received by the second relay 5030B, and are relayed into light paths 2753C, which may be seen by an observer 1050A but not by observers 1050B or 1050C. Light paths from the object 2751 that are along the path of normal incidence 2754 to the first relay 5030A surface, and most light rays within a cone of about +/−22.5 degrees away from this normal light path may be blocked by the two relays 5030A and 5030B, or may pass through relays 5030A and 5030B with some scattering. There may be one or more angle filters 2791 placed between the object 2751A and the first transmissive reflector 5030A to reject rays close to normal incidence to the relay surface 5030A so they do not reach observer 1050B. The relay system 2760 shown in FIG. 27O generates two fields of view for viewers 1050A and 1050C. It has some applications toward a table-top configuration, which will be discussed below. In an embodiment, a relay system comprises a first relay subsystem comprising: a transmissive reflector 5030A of the first relay subsystem, the first transmissive reflector positioned to receive image light from an image source 2751A along source light paths 2752A, 2753A within first and second ranges of angular alignment relative to the transmissive reflector to form a first image surface, wherein the first transmissive reflector is configured to relay the image light to form a first relayed image surface 2751B in a first relayed location; and a second transmissive reflector 5030B of the first relay subsystem, the second transmissive reflector positioned to receive light from the first transmissive reflector and relay the light from the first transmissive reflector to form a second relayed image surface 2751C in second relayed location; and wherein image light from an image source along source light paths outside of the first and second range of angular alignment relative to the transmissive reflector may not be relayed to form a first image surface. In an embodiment, image light from the image source along the image source light paths that are outside of the first and second ranges of angular alignment relative to the first transmissive reflector are relayed by the first relay subsystem with significantly more scattering than image light from the image source along source light paths that are within the first and second ranges of angular alignment relative the first transmissive reflector. The first and second ranges of angular alignment relative to the transmissive reflector comprise approximate ranges of −67.5 to −22.5 degrees and +22.5 to +67.5 degrees relative to a normal to the surface of the transmissive reflector, respectively. In an embodiment, an optional angle filter 2791 is employed between the image source 2751A and the first transmissive reflector 5030A to absorb or reflect image source light along source light paths outside of the first and second ranges of angular alignment relative to the transmissive reflector. In one embodiment the second relayed image surface is viewable in two different viewing volumes with no overlap, and in another embodiment, there is overlap. The viewing volumes may be separated by 90 degrees from one another. In an embodiment, the second transmissive reflector may form a table top, and the second relayed image surface is visible in two viewing volumes substantially centered at −45 degrees and +45 degrees relative to the normal of the table top, and viewable to two viewers located on opposite sides of the table top.

FIG. 27P is an orthogonal side view of a display system 2770 comprised of the display system shown in FIG. 27O with an added optical path for relaying incident light paths that are close in angle to the normal of the surface of the first relay 5030A. FIG. 27Q is an orthogonal top view of the display system 2770 shown in FIG. 27P. Some of the numbering from relay system 2760 shown in FIG. 27O is used in FIGS. 27P and 27Q. In an embodiment, the relay system of FIG. 27P is the relay system of FIG. 27O further comprising: a first beam splitter 101A positioned to receive the image light from the image source along the source light paths; a second beam splitter 101C and a second relay subsystem 5090 shown in FIG. 9J, wherein the first beam splitter 101A is configured to direct a first portion of the image light from the image source 2751A to the first relay subsystem 5030A, 5030B and a second portion of the image light from the image source to the second relay subsystem 5090; wherein the second relay subsystem 5090 is configured to relay light received from the first beam splitter 101A to the second beam splitter 101C; and wherein the second beam splitter is positioned to receive light from the second transmissive reflector 5030B of the first relay subsystem and is configured to combine the light from the second transmissive reflector of the first relay subsystem 5030A, 5030B with light from the second relay subsystem 5090 and to direct the combined light to form the second relayed image surface 2751C. In an additional embodiment, the second relay subsystem comprises first and second transmissive reflectors 5030C, 5030D of the second relay subsystem, wherein the first transmissive reflector 5030C of the second relay subsystem is positioned to receive light from the first beam splitter 101A and is configured to relay the received light to the second transmissive reflector 5030D of the second relay subsystem 5090, and wherein the second transmissive reflector 5030D of the second relay subsystem 5090 is configured to relay light from the first transmissive reflector 5030C of the second relay subsystem towards the second beam splitter 101C. In an additional embodiment, the display system further comprises an additional image source 1001 operable to output additional image light along additional source light paths 2762A to form a second image surface 2756A, and wherein the second relay subsystem 5090 further comprises a first beam splitter 101B of the second relay subsystem 5090 positioned to receive and combine the additional image light from the additional image source 1001 and the light 2754C from the first transmissive reflector of the second relay subsystem 5090 and direct the combined light to the second transmissive reflector 5030D of the second relay subsystem. In an embodiment, the relay system in 2770 further comprises an occlusion system operable to occlude a portion of light from the image source or the additional image source. The occlusion system may comprise at least one occlusion layer 2759A having one or more individually addressable elements or may comprise an occlusion object like 155A in FIG. 11C. In one embodiment, light from the additional image source 1001 is relayed to an additional relayed image surface 2756B in proximity to the twice relayed image surface 2751C, and wherein the occlusion system is operable to occlude a portion of the light from the image source, the occluded portion corresponding to a portion of the twice relayed image surface 2751C that is occluded by the additional relayed image surface 2756B. In another embodiment, light from the additional image source 2762A is relayed to an additional relayed image surface 2756B in proximity to the twice relayed image surface 2751C, and wherein the occlusion system is operable to occlude a portion of the light from the additional image source, the occluded portion corresponding to a portion of the additional relayed image surface 2756B that is occluded by the twice relayed image surface 2751C (not shown in FIGS. 27P and 27Q).

In both FIGS. 27P and 27Q, distance markers 2755 are used on the optical axes in the system to show one possible spacing between optical components, where the distance markers denote equivalent optical path length segments. In FIG. 27Q, the light from the object 2751A can be categorized into light rays 2752X centered around light path 2752A at a 45-degree incidence to the first relay surface 5030A and with angular range 2752Y, light rays 2753X centered around light path 2753A also at a 45-degree incidence to the relay surface 5030A and with angular range 2753Y, and light rays 2754X centered around a path 2754A normal to the relay surface 5030A which are not shown in detail in FIG. 27Q. In FIG. 27Q, and as discussed for FIG. 27O, the light paths 2752X from object 2751A centered around light path 2752A and found in angular range 2752Y are relayed to light rays 2752Z centered around light path 2752C, also in the same angular range 2752Y, forming a portion of relayed object 2751C. Similarly, in FIG. 27Q, and as discussed for FIG. 27O, the light paths 2753X from object 2751A centered around light path 2753A and found in angular range 2753Y are relayed to light rays 2753Z centered around light path 2753C, also in the same angular range 2753Y, forming a portion of relayed object 2751C. Finally, as discussed in reference to FIG. 27O, the light paths 2754A from object 2751A centered around the normal 2754 to the relay 5030A surface and found in the angular range 2754Y are not relayed by the relay pair 5030A and 5030B. Instead, these rays are directed along a separate optical path through two separate relays 5030C and 5030D as shown in FIG. 27P which is designed to pass this group of light rays that have close to normal incidence to the relay 5030A surface. These light paths 2754A are deflected by an image combiner 101A into light rays 2754B toward a third relay 5030C, which in this instance is a transmissive reflector which receives the light paths 2754B and relays these light paths 2754B to light paths 2754C which form the first relayed object 2751B, continuing on be received by the second relay 5030B. An optional image combiner 101B may combine the relayed light 2754C with the light 2762A from the surface of a holographic object 2756A projected by a light field display 1001. In other embodiments, image source 1001 may be a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. The image combiner 101B redirects the light 2756A from the holographic object into light rays 2762B travelling substantially in the same direction as the light 2754C from the relayed object 2751A. This combined light 2762B from the holographic object 2756A and the light 2754C from object 2751A is received by a fourth relay 5030D and relayed to combined light paths 2762C and 2754D, respectively. An image combiner 101C redirects and combines four sets of light paths: relayed light paths 2762C are reflected into light paths 2762D which converge to form relayed holographic object 2756B; light paths 2754D are reflected into light paths 2754E which converge to form the surface of relayed object 2751C viewable by observer 1050B; light paths 2752Z grouped around 45-degree angle light paths 2752C shown in FIG. 27Q which are relayed by relays 5030A and 5030B and converge to form the surface of relayed object 2751C viewable by observer 1050C; and light paths 2753Z grouped around 45-degree angle light paths 2753C shown in FIG. 27Q which converge to form relayed object 2751C viewable by observer 1050A. All of these light paths exist in the group 2763 in FIG. 27P, but only the light that takes the optical path through the relays 5030C and 5030D is shown in FIG. 27P. The layer 2759A may be one or more occlusion planes which is relayed to location 2759B, and may have individually-addressable regions activated so that the background relayed object 2751C may not be visible behind the relayed holographic object 2756B, much in the same way to the operation of occlusion layers 151, 152, and 153 in FIG. 9A, and shown in detail in FIGS. 9B, 9C, and 9D. As explained with reference to FIG. 27O, there may be one or more angle filters placed between the object 2751A and the first transmissive reflector 5030A to reject rays close to normal incidence to the relay surface 5030A that pass through the image combiner 101A so they do not reach observer 1050B.

Display Systems with Multiple Separate Viewing Volumes

Figure 28A:
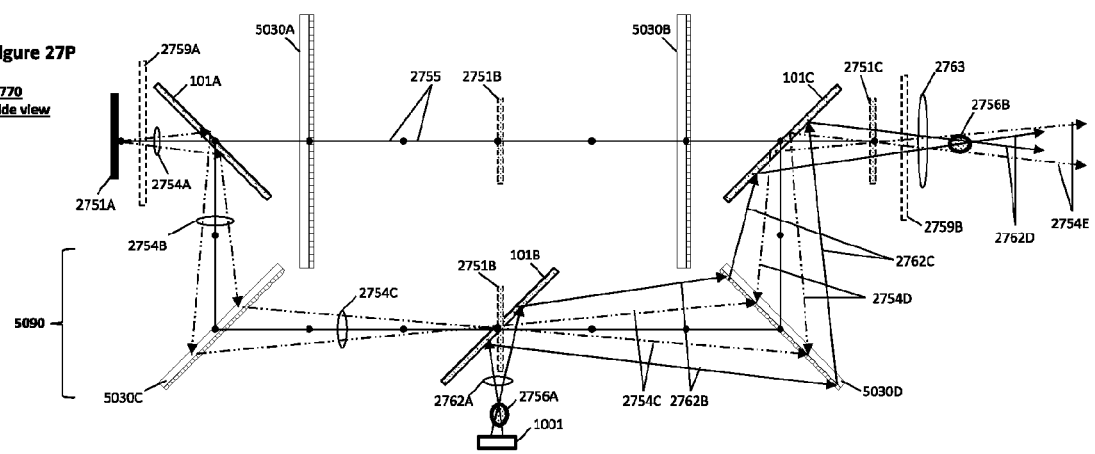
FIG. 28A illustrates a table-top display system comprised of an image source, a beam splitter, and a transmissive reflector.
Figure 28A:
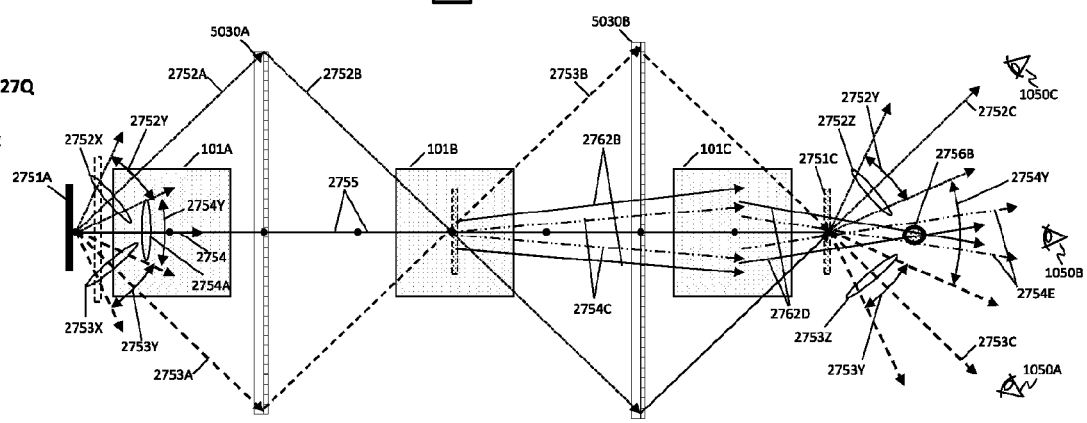
Figure 28A:
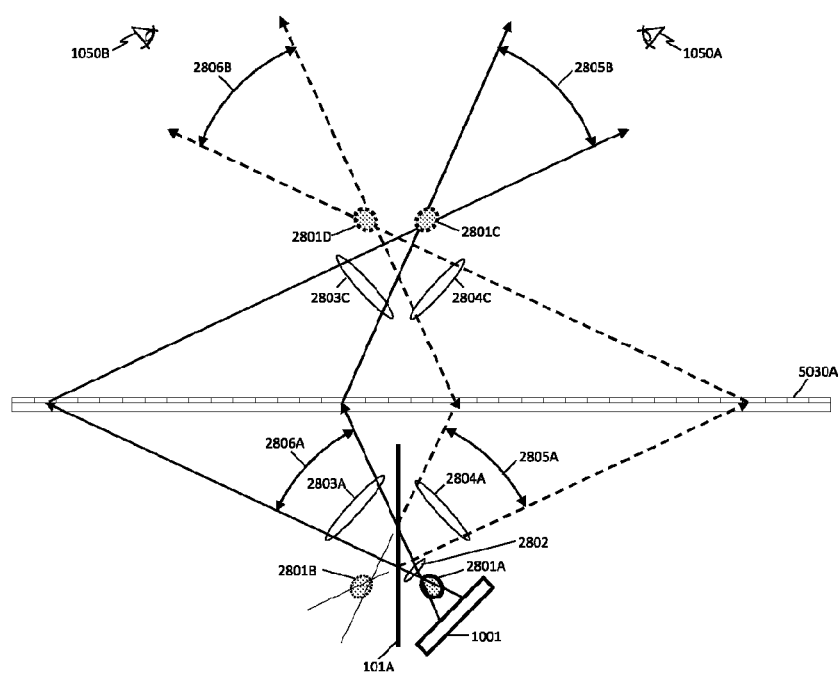

The relay in FIG. 27O relays light into two separate fields of view designed for two observers viewing the display in two different directions. Such an application may be used in table-top displays, where the display surface is horizontal and the points of observation of the display are above the display surface and may be on two or more sides of the display surface. FIG. 28A is an orthogonal view of a display system in which the light rays from a holographic object 2801A projected by a light field display 1001 are split by a beam splitter into two directions, with each direction providing a separate viewing volume. In an embodiment, the image source 1001 may be a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, a light field display surface, the surface of a real-world object emitting light, or the surface of a real-world object reflecting light. Light rays 2802 projected from a light field display 1001 form a holographic object 2801A and are split by a beam splitter 101A into light rays 2803A passing directly through the beam splitter 101A and 2804A deflected by 101A, where light rays 2803A form a first viewing volume 2806A of holographic object 2801A subtended by light rays 2803A, and light rays 2804A form a second viewing volume 2805A of holographic object 2801A subtended by light rays 2905A. Within the two dimensional view shown in FIG. 28A the first and second viewing volumes 2806A and 2805A, respectively, are shown as arcs subtending the group of light rays projected from the corresponding holographic object, but it should be appreciated that each of these arcs indicates a viewing volume in space. Light rays 2804A appear to diverge from virtual holographic object 2801B. Light rays 2803A and 2804A are received by a transmissive reflector relay 5030A, and are relayed into light paths 2803C and 2804C, forming relayed holographic objects 2801C and 2801D which may be viewed in viewing volumes 2805B and 2806B by observers 1050A and 1050B, respectively. The two angular ranges 2805B and 2806B that indicate the viewing volume for each relayed holographic object 2801C and 2801D, respectively, are not contiguous, as they are designed for two different viewers. In an embodiment, the light field display 1001 in FIG. 28A is replaced with a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a real-world object emitting light, or the surface of a real-world object reflecting light. FIG. 28A is an embodiment of a relay system comprising at least one transmissive reflector 5030A; an image source 1001 operable to output light 2802, a beam splitter 101A positioned to receive the light from the image source and direct the light along first and second sets of source light paths 2803A, 2804A wherein the image source and beam splitter are oriented relative to the at least one transmissive reflector such that light along the first and second sets of source light paths is relayed along first and second sets of relayed light paths 2803C, 2804C, respectively, the first and second sets of relayed light paths defining first and second relayed viewing volumes 2805A, 2806A, respectively; and wherein the first and second relayed viewing volumes are different. In one embodiment, first and second relayed viewing volumes partially overlap, while in another embodiment, first and second relayed viewing volumes don't overlap. In an embodiment, the image source 1001 and beam splitter 101A are oriented with respect with the at least one transmissive reflector 5030A such that the first and second sets of source light paths 2803A, 2804A respectively each comprise light paths oriented between 22.5 and 67.5 degrees relative to the surface of the at least one transmissive reflector. In another embodiment, the image source 1001 and beam splitter 101A are oriented with respect with the at least one transmissive reflector 5030A such that the first and second sets of relayed light paths 2803C, 2804C respectively each comprise light paths oriented between 22.5 and 67.5 degrees relative to the surface of the at least one transmissive reflector 5030A.

Figure 28B:
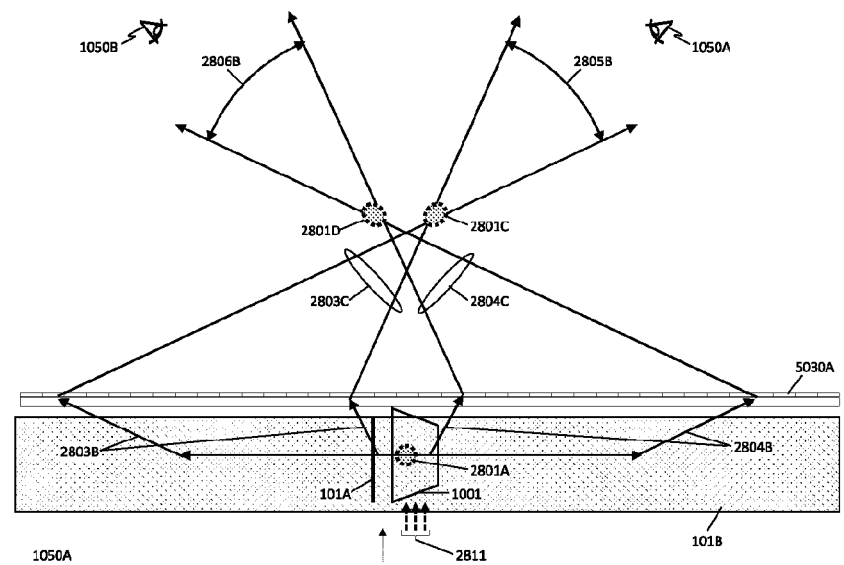
FIG. 28B shows the display system of FIG. 28A with an additional interface for another image source.
Figure 28B:
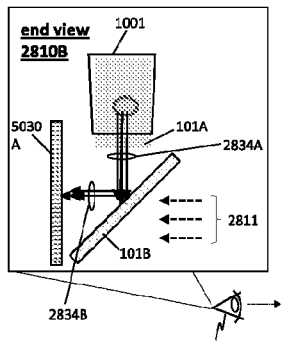

FIG. 28B is an orthogonal view of a display system 2810 similar to FIG. 28A, but with the light field display disposed out of the plane of the relay system, wherein the light from the light field display is directed toward the relay system using an image combiner to allow light from an additional source to enter the relay system. The numbering from FIG. 28A is used in FIG. 28B. The light field display 1001 is disposed to project light 2802 along an optical axis which is substantially parallel to the surface of the transmissive reflector relay 5030A. A side view 2810A from the viewpoint of observer 1050C shows that the light 2802 from the light field display is split into two paths 2803A and 2804A by the beam splitter 101A as was shown in FIG. 28A, but these light paths are directed diagonally downward toward a beam splitter 101B. An end view 2810B from the viewpoint of observer 1050D shows that all the light rays 2834A from the light field display, comprised of both sets of light rays 2803A and 2804A, are reflected by the beam splitter 101B into light rays 2834B that are incident on the beam splitter 5030A, where light rays 2834B comprise both light ray groups 2803B and 2804B. In this end view 2810B, only light rays in one plane from the light field display 1001 are shown. Groups of light rays 2803B and 2804B are received by the relay 5030A and relayed into groups of light rays 2803C and 2804C, respectively, forming the holographic objects 2801C and 2801D, respectively. The image combiner 101B is positioned to accept light 2811 from another source separate from the light field display 1001.

Figure 28C:
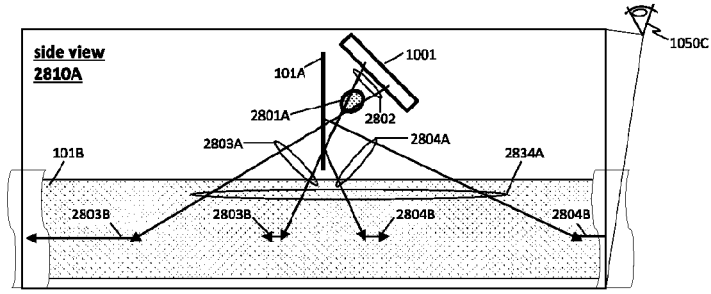
FIG. 28C shows the display system of FIG. 28B with an occlusion plane and an additional relay.
Figure 28C:
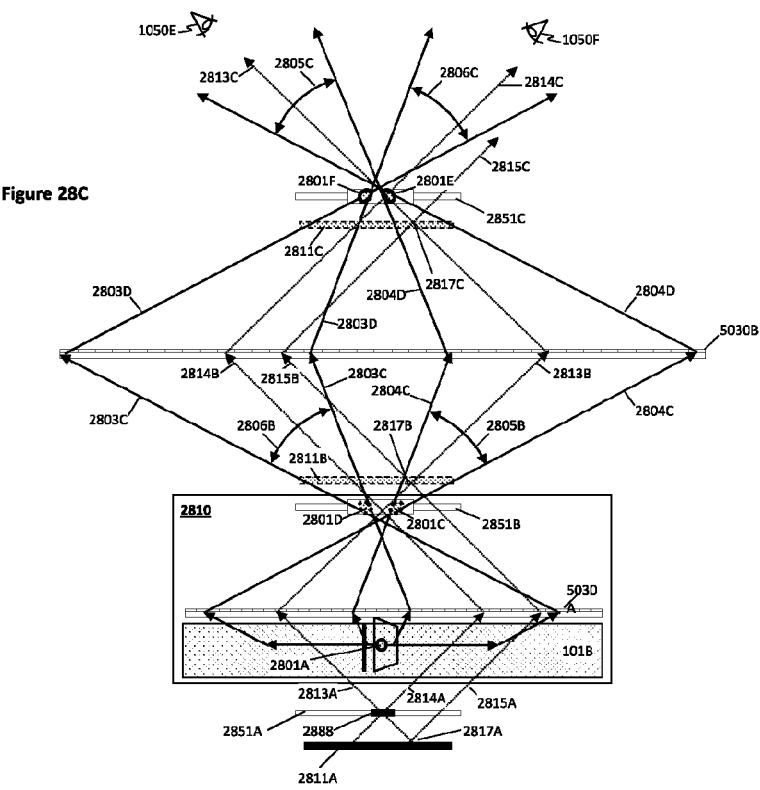

The display system 2810 shown in FIG. 28B provides relayed holographic objects in two separate fields of view above a relay surface, but it is possible to use this system within a larger system to relay the light from another object in addition to a holographic object, and also arrange for proper occlusion of a foreground holographic object with a background object, or vice-versa. To accomplish this, the double-relay configuration 2760 shown in FIG. 27O is used. FIG. 28C is an orthogonal top view of a display system which relays a background object with possible occlusion along with a relayed holographic object by using the display system 2810 shown in FIG. 28B and an additional relay system. The numbering of FIG. 28B is used in FIG. 28C. In FIG. 28C, the display system 2810 shown in FIG. 28B is one stage of a two-stage relay system which is comprised of the display system 2810 as the first stage, and a transmissive reflector 5030B as the second stage. The display system 2810 receives light from an object 2811A, combines this light with the light from holographic object 2801A, and relays this combined light to form both the relayed image 2811B of the object 2811A as well as the relayed holographic objects 2801C and 2801D. The details of relay 2810 are discussed with reference to FIG. 28B. This relayed light from display system 2810 is received by the second-stage relay system 5030B, wherein once-relayed object image 2811B is relayed to twice-relayed object image 2811C, and once-relayed holographic objects 2801C and 2801D are relayed to twice-relayed holographic objects 2801E and 2801F, respectively. The light rays 2804C from once-relayed holographic object 2801C subtend a holographic viewing volume 2805B, and these light rays are relayed by relay 5030B into light rays 2804D which form a twice-relayed holographic object 2801E viewable by observer 1050E in a viewing volume 2805C. The light rays 2803C from once-relayed holographic object 2801D subtend a holographic viewing volume 2806B, and these light rays are relayed by relay 5030B into light rays 2803D which form a twice-relayed holographic object 2801F viewable by observer 1050F in a viewing volume 2806C. In a similar manner, the occlusion plane 2851A is relayed by display system 2810 to once-relayed occlusion plane 2851B, and this once-relayed occlusion plane 2811B is relayed by relay 5030B to twice-relayed occlusion plane 2851C. In FIG. 28C, the portion of relayed occlusion planes 2851B and 2851C which overlap with the respective relayed holographic objects 2801C/

2801D and 2801E/2801F are not drawn. The depth ordering of the relayed object 2811C and the relayed occlusion plane 2851C is the same as the depth ordering of the object 2811A and the occlusion plane 2851A, which allows the configuration of the display system shown in FIG. 28C to handle occlusion properly. The occlusion plane 2851A may be offset from the object 2811A by a distance that is substantially the same as the distance between the relayed holographic objects 2801E and 2801F and the relayed object 2811C. Light from object 2811A along paths 2813A, 2814A, and 2815A are relayed by display system 2810 into light paths 2813B, 2814B, and 2815B, which are received by relay 5030B and relayed into light paths 2813C, 2814C, and 2815C, respectively. The light paths 2813A and 2815A originate from the same point 2817A on the object 2811A, and their once-relayed light paths 2813B and 2815B converge at the same corresponding point 2817B on the relayed object plane 2811B, while their twice-relayed light paths 2813C and 2815C converge at the same corresponding point 2817C on the relayed object plane 2811C. Observer 1050E can see light along path 2813C from both foreground relayed holographic object 2801E and background relayed object 2811C simultaneously, which may not be desired. To avoid this and block out light on or near light path 2813C, occlusion region 2888 on occlusion plane 2851A may be activated to a light-blocking state, preventing light on path 2813A from being relayed to light ray 2813C. Similarly, observer 1050F may be able to see light 2814C from background relayed object 2811C behind relayed holographic object 2801F. To block out the background light 2814C, an occlusion site near location 2888 on occlusion plane 2851A may be activated to a light-blocking state. The light ray 2815C which helps form the relayed object 2811C should be visible to observer 1050F, and so it's corresponding source ray 2815A should not be blocked by occlusion plane 2851A.

In an embodiment, a display system may further comprise an optical combiner 101B positioned to receive the light from the image source 2803B, 2804B and receive light 2811 from an additional image source and configured to direct the combined light 2811 and 2803B, 2804B along the first and second sets of source light paths to the at least one transmissive reflector 5030A, which is operable to relay the combined light from the first and second set of source light paths along the first and second set of relayed light paths 2811 and 2803C, 2804C into the first 2805B and second 2806B viewing volumes, respectively. In an embodiment, the light from the image source and the additional image source are provided from different directions. In an embodiment, the additional image source comprises any of: a 2D display surface, a stereoscopic display surface, an autostereoscopic display surface, a multi-view display surface, the surface of a volumetric 3D display, a light field display surface, the surface of a real-world object emitting light, or the surface of a real-world object reflecting light. In an embodiment, an input relay is configured to relay image light from the additional image source to the optical combiner 101B (not shown in FIG. 28B. The input relay is operable to relay image light from an additional image source to define a relayed image surface, whereby the additional image surface may comprise the relayed image surface of the additional image source; and wherein the optical combiner 101B is operable to combine the light defining the relayed image surface of the additional image source with light from the image source and direct the combined light to the at least one transmissive reflector 5030A where the combined light is relayed into the first and second viewing volumes. In an embodiment, the display system further comprises an occlusion system operable to occlude a portion of light from at least one of the image source and the additional image source. The occlusion system may comprise at least one occlusion layer having one or more individually addressable elements, one or more occlusion objects, and be positioned to be optically preceding the optical combiner 101B.

In an embodiment, the light from the image source and the additional image source defines first 2801A, 2801B and second 2811A image surfaces, respectively, along the first and second sets of source light paths relayed by the transmissive reflector forming first relayed image surfaces 2801C, 2801D formed by first and second sets of relayed light paths 2804C, 2803C from the image source, respectively, and second relayed image surface 2811B formed by first and second sets of relayed light paths 2813B and 2815B from the additional image source, and wherein the occlusion system 2851A is operable to occlude a portion of the light 2813A from the image source or the additional image source, the occluded portion 2813A corresponding to a portion of the first or second relayed image surface 2811B. In an embodiment, at least one transmissive reflector comprises a first transmissive reflector 5030 and an additional transmissive reflector 5030B configured to relay light along the first and second sets of relayed light paths from the first transmissive reflector along third and fourth sets of relayed light paths 2804D, 2803D for the light from the image source, and third and fourth sets of relayed light paths 2813C and 2815D from the additional image source, wherein the light from the image source defines a source image surface 2801A, 2801B along the first and second sets of source light paths, the light relayed from the first transmissive reflector defines a first relayed image surface 2801C, 2801D along the first and second sets of relayed light paths, and the light from the additional transmissive reflector defines a second relayed image surface 2801E, 2801F along third and fourth sets of relayed light paths, wherein the first relayed image surface 2801C, 2801D has a first relayed depth profile, and the second relayed image surface 2801E, 2801F has a second relayed depth profile that is different from the first relayed depth profile but the same as a depth profile of the source image surface.

The display system shown in FIG. 28C may be used as a horizontal display surface surrounded by viewers that are located in a viewing range of angles 2805C of twice relayed holographic object 2801E or located in the viewing range of angles 2806C of twice relayed holographic object 2801F. As described, these floating holographic objects 2801E and 2801F may be projected in front of a relayed background object 2811C that is also floating, with proper occlusion handling for the portion of the background object 2811C that lies behind the relayed holographic objects 2801E and 2801F as seen by one or more viewers in each of the two holographic viewing volumes of the display system.

An alternate display system that may be used to project holographic objects to one or more viewers in one or more holographic viewing volumes is shown in FIG. 28D. FIG. 28D is an orthogonal view of a display system comprised of two or more holographic displays angled with respect to the plane of a transmissive reflector relay. The light rays 2843A projected from light field display 1001A form holographic object 2844A viewable in a first holographic viewing 2847A, and these light paths 2843A are received by relay 5030C and relayed to relayed light paths 2843B forming relayed holographic object 2844B, viewable in a third holographic viewing volume 2847B by an observer 1050A.

Similarly, the light rays 2841A projected from light field display 1001B form holographic object 2842A viewable in a second holographic viewing volume 2846A, and these light rays 2841A are received by relay 5030C and are relayed to relayed light paths 2841B which form relayed holographic object 2842B viewable within a fourth holographic viewing volume 2846A by an observer 1050B. Within the two dimensional view shown in FIG. 28D the first, second, third, and fourth viewing volumes 2847A, 2846A, 2847B, and 2846B, respectively, are shown as arcs subtending the group of light rays projected from the corresponding holographic object, but it should be appreciated that each of these arcs indicates a viewing volume in space. The observers 1050A and 1050B may be seated across from one another on opposite sides of a table with a top surface which is comprised of relay 5030C, with the light field displays 1001A and 1001B hidden from view beneath the table. In an embodiment, the display system shown in FIG. 28D comprises a relay system comprising at least one transmissive reflector 5030C, first and second image sources 1001A, 1001B operable to output light along first and second sets of source light paths 2843A, 2841A, respectively, wherein the first and second image sources 1001A, 1001B are oriented relative to the at least one transmissive reflector such that light along the first and second sets of source light paths is relayed along first and second sets of relayed light paths 2843B, 2841B, respectively, the first and second sets of relayed light paths defining first and second viewing volumes 2847B, 2846B, respectively, wherein the first and second relayed viewing volumes 2847B, 2846B are different. In an embodiment, the first and second relayed viewing volumes partially overlap, while in another embodiment, the first and second relayed viewing volumes do not overlap. In an embodiment, the first and second image sources 1001A, 1001B are oriented with respect with the at least one transmissive reflector 5030C such that the first and second sets of source light paths 2843A, 2841A each comprise light paths oriented between 22.5 and 67.5 degrees relative to the at least one transmissive reflector 5030C. In an embodiment, the first and second image sources 1001A, 1001B are oriented with respect to the at least one transmissive reflector 5030C such that the first and second sets of relayed light paths 2843B, 2841B each comprise light paths oriented between 22.5 and 67.5 degrees relative to the at least one transmissive reflector 5030C. In another embodiment, the first and second image sources 1001A, 1001B each comprise a display surface oriented at an angle between 22.5 and 67.5 degrees relative to the at least one transmissive reflector 5030C.

While the number of holographic displays in FIG. 28D is shown to be two, any number of light field displays may be disposed on one side of a transmissive reflector to create multiple relayed holographic objects at multiple viewing locations. In one embodiment, any number of light field displays may be arranged as shown in FIG. 28D on one side of a transmissive reflector, or on both sides of a transmissive reflector. In another embodiment, the light field displays are arranged so the individual viewing volumes of one or more light field displays overlap. In another embodiment, the light field displays are arranged as shown in FIG. 28D, but in a substantially circumferential layout. In still another embodiment, the light field display sources 1001A and/or 1001B described in reference to FIG. 28D are replaced with any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a real-world object emitting light, or the surface of a real-world object reflecting light.

FIG. 28E is a top view of an embodiment of the two-display system shown in FIG. 28D, wherein the display system comprises at least one additional image source. FIG. 28E is a table-top display system comprised of four displays arranged underneath a transmissive reflector relay with each display angled with respect to the plane of the relay so that four holographic objects may be projected to viewers on each of the four sides of the table. All the displays including displays 1001A and 1001B in the display system 28E may be oriented in the same way as displays 1001A and 1001B in FIG. 28D, at roughly a 45 degree angle with the surface of the transmissive reflector relay 5030C, as FIG. 28D demonstrates how projected light rays 2841A and 2843A forming holographic objects 2842A and 2844A are relayed by such an arrangement, respectively. Note that in FIG. 28D that a relayed holographic object 2844B may be located directly over the projected holographic object 2844A, so that from a top view of FIG. 28D, these objects 2844B, 2844A are coincident. The same is true for the holographic objects and relayed holographic objects shown in FIG. 28E. In FIG. 28E, light rays 2886A projected by display 1001A form the first projected holographic surface 2880A, and these light rays diverge until they are received and relayed into light rays 2886B by the relay 5030C to form first relayed holographic object surface 2880E, viewable within a first viewing volume 2891 subtended by light rays 2886B by observer 1050A. Holographic object 2880A and relayed object 2880E are coincident in the top view of FIG. 28E. The light rays 2886A forming holographic surface 2880A travel under the tabletop relay 5030C, denoted as dashed lines, and the relayed light rays 2886B forming relayed holographic object surface 2880E travel over the tabletop, denoted as solid lines. In a similar way, light rays 2887A projected by display 1001B and forming second projected holographic object surface 2880B underneath the tabletop are relayed by relay 5030C into relayed light rays 2887B forming second relayed holographic object surface 2880F observed by viewer 1050B in the second viewing volume 2892 subtended by light rays 2887B. Light rays 2888A projected by display 1001C and forming third projected holographic object surface 2880C underneath the tabletop are relayed by relay 5030C into relayed light rays 2888B forming third relayed holographic object surface 2880F observed by viewer 1050C in the third viewing volume 2893 subtended by light rays 2888B. And finally, light rays 2889A projected by display 1001D and forming fourth projected holographic object surface 2880D underneath the tabletop are relayed by transmissive reflector relay 5030C into relayed light rays 2889B forming fourth relayed holographic object surface 2880H observed by viewer 1050D in the fourth viewing volume 2894 subtended by light rays 2889B. The relayed holographic surfaces 2880E-H may be the same or different, as in FIG. 28E the surfaces 2880E and 2880G may be the same, but different from surfaces 2880F and 2880H. In the display system shown in FIG. 28E, there are four displays used to create four non-overlapping viewing volumes for holographic objects that are each independent. In other embodiments, other configurations include more sides to the table top 5030C, more or fewer displays than four, and more or less than four viewing volumes, where some of the viewing volumes corresponding to one or more displays may or may not overlap. In still another embodiment, one or more of the light field displays 1001A-D described in reference to FIG. 28E are replaced with are replaced with any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a real-world object emitting light, or the surface of a real-world object reflecting light. In an embodiment shown in FIG. 28E, the display system of FIG. 28D comprises at least one additional image source 1001C, 1001D operable to output light along at least one additional set of source light paths 2888A, 2889A wherein the at least one additional image source is oriented relative to the at least one transmissive reflector 5030C such that light along the at least one additional set of source light paths 2888A, 2889A are relayed along at least one additional set of relayed light paths 2888B, 2889B, respectively, the at least one additional set of relayed light paths defining at least one additional viewing volume 2893, 2894, and wherein the at least one additional relayed viewing volume 2893, 2894 is different from any other viewing volumes 2891, 2892.

Figure 28F:
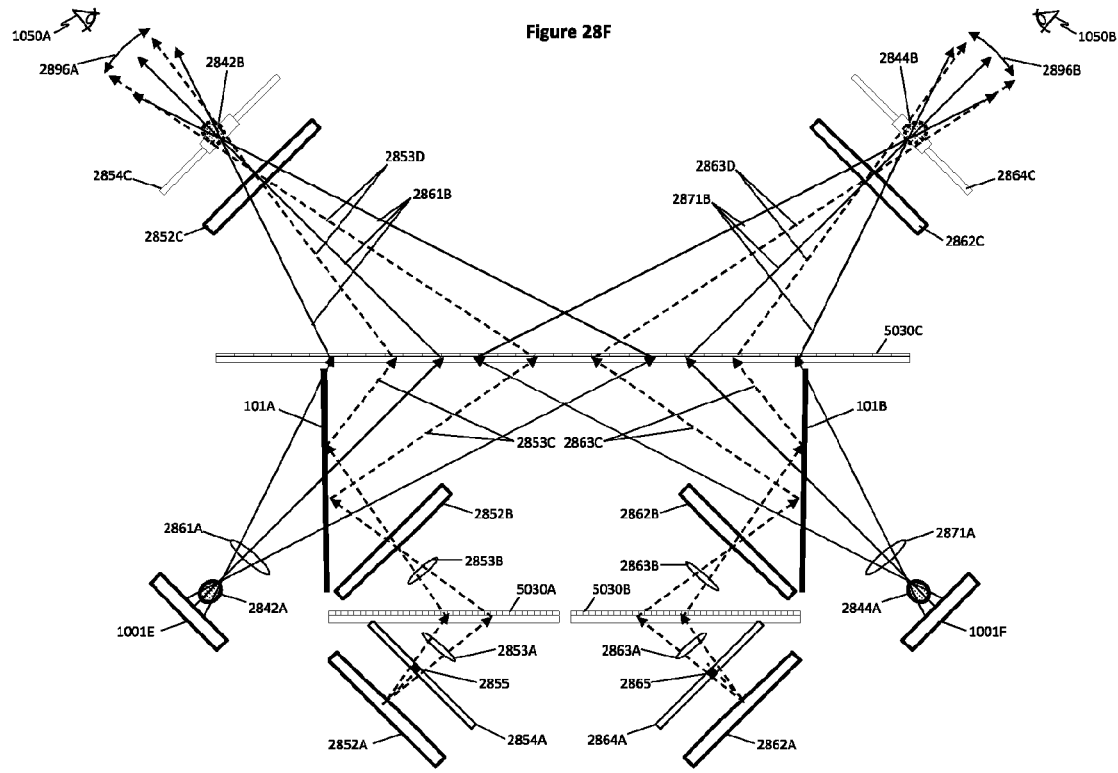
FIG. 28F shows a table-top display system which supports foreground relayed surfaces occluding background relayed surfaces.

FIG. 28F is an orthogonal view of a display system comprised of two or more image combining systems angled relative to the surface of a transmissive reflector relay, each image combining system combining light from a holographic object and another object, with the combined light from each image combining system relayed to a separate location, the separate locations designed for viewing by separate viewers. The first image combining system is comprised of light field display 1001E, object 2852A, transmissive reflector relay 5030A, and image combiner 101A. Light rays 2861A projected from light field display 1001E form holographic object 2842A and pass through an image combiner 101A. Light rays 2853A from an object 2852A pass through one or more occlusion planes 2854A and are relayed into light paths 2853B by transmissive reflector relay 5030A, forming first relayed object 2852B. The light paths 2853B are reflected by the image combiner 101A into light paths 2853C which are combined with the light rays 2861A from the holographic object 2842A. These combined light paths 2853C and 2861A are received by the relay 5030C and relayed into light paths 2853D and 2861B, respectively, wherein light paths 2853D converge to form relayed object 2852C and light paths 2861B converge to form relayed holographic object 2842B. The occlusion plane 2854A near object 2852A is relayed to relayed occlusion plane 2854C. The portion of the relayed occlusion plane 2854A which overlaps with the relayed holographic object 2842B is not shown in FIG. 28F. An observer 1050A may observe relayed holographic object 2842B, but not see light rays from the relayed object 2852C directly behind the holographic object 2842B if the center rays in the group of rays 2853D are missing. This occlusion may be achieved by occluding the center portion of corresponding light rays 2853A from the object 2852A by activating the occlusion plane locations 2855 on occlusion plane 2854A to block light. The distance between the occlusion plane 2854A and the object 2852A may be substantially the same as the distance between the relayed holographic object 2842B and the relayed object 2852C. The double relay of light from object 2852A through transmissive reflector 5030A followed by transmissive reflector 5030C substantially preserves the depth of the object 2852A for the corresponding relayed object 2852C, as well as maintaining the depth ordering of the one or more occlusion planes 2854A in front of the object 2852A so that the corresponding relayed occlusion planes 2854C may be placed in substantially the same location as the relayed holographic object 2842B. In an embodiment, the display system in FIG. 28F comprises a first optical combiner 101A positioned to receive the light 2861A from the first image source 1001E and light from a third image source 2852A and configured to direct combined light 2861A, 2853C to the at least one transmissive reflector 5030C, which is operable to relay the combined light into the first viewing volume 2896A. In an embodiment, the third image source comprises any of: a 2D display surface, a stereoscopic display surface, an autostereoscopic display surface, a multi-view display surface, the surface of a volumetric 3D display, a second light field display surface, the surface of a real-world object emitting light, or the surface of a real-world object reflecting light. In an embodiment, the display system comprises an input relay 5030A, wherein the input relay 5030A is configured to relay image light from third image source to the first optical combiner 101A. The input relay 5030A is operable to relay image light from a surface of the third image source 2852A to define a first relayed image surface 2852B, whereby the third image surface comprises the first relayed image surface 2852B, and wherein the first optical combiner 101A is operable to combine the light defining the first relayed image surface 2852B with light from the first image source 2853A and direct the combined light to the at least one transmissive reflector 5030C where the combined light is relayed into the first viewing volume 2896A. In an embodiment, the combined light 2861B, 2853D relayed from the at least one transmissive reflector defines at least a second relayed image surface 2852C of the third image source 2852A in the first viewing volume 2896A, and wherein the first relayed image surface 2852B has a first relayed depth profile, and the second relayed image surface 2852C has a second relayed depth profile that is different from the first relayed depth profile 2852B but the same as a depth profile of the surface of the third image source 2852A.

The second image combining system in FIG. 28F is comprised of light field display 1001F, object 2862A, transmissive reflector relay 5030B, and image combiner 101B. Light rays 2871A projected from light field display 1001F forming holographic object 2844A pass through an image combiner 101B. Light rays 2863A from an object 2862A pass through one or more occlusion planes 2864A and are relayed into light paths 2863B by transmissive reflector relay 5030B, forming first relayed object 2862B. The light paths 2863B are reflected by the image combiner 101B into light paths 2863C which are combined with the light rays 2871A from the holographic object 2844A. These combined light paths 2863C and 2871A are received by the relay 5030C and relayed into light paths 2863D and 2871B, respectively, wherein light paths 2863D converge to form relayed object 2862C and light paths 2871B converge to form relayed holographic object 2844B. In an embodiment, the display system further comprises a second optical combiner 101B positioned to receive the light 2871A from the second image source and light 2863A from a fourth image source 2862A and configured to direct combined light from the second optical combiner 101B to the at least one transmissive reflector 5030C, which is operable to relay the combined light of the second optical combiner 101B into the second viewing volume 2896B. In an embodiment, the fourth image source comprises any of: a 2D display surface, a stereoscopic display surface, an autostereoscopic display surface, a multi-view display surface, the surface of a volumetric 3D display, a light field display surface, the surface of a real-world object emitting light, or the surface of a real-world object reflecting light. In an embodiment, the display system of FIG. 28F comprises an input relay 5030B, wherein the input relay is configured to relay image light 2863A to the second optical combiner 101B. In an embodiment, the input relay 5030B is operable to relay image light from a fourth image source 2862A to define a first relayed image surface, whereby the fourth image surface comprises the first relayed image surface 2862B; and wherein the second optical combiner 101B is operable to combine the light 2863B defining the first relayed image surface 2862B with light 2871A from the second image source 1001F and direct the combined light to the at least one transmissive reflector 5030C where the combined light is relayed into the second viewing volume. In an embodiment, the combined light from the at least one transmissive reflector 5030C defines at least a second relayed image surface 2862C of the fourth image source in the second viewing volume 2896B and wherein the first relayed image surface 2862B of the fourth image surface has a first relayed depth profile, and the second relayed image surface 2862C of the fourth image surface has a second relayed depth profile that is different from the first relayed depth profile of 2862B but the same as a depth profile of the surface of the object 2862A.

In an embodiment, the display system of FIG. 28F further comprises an occlusion system operable to occlude a portion of light from at least one of the first 1001E and third 2852A image sources. In one embodiment, the occlusion system comprises at least one occlusion layer 2854A having one or more individually addressable elements 2855. In another embodiment, the occlusion system comprises at least one occlusion object (not shown). The occlusion system may be positioned to be optically preceding the optical combiner 101A. In an embodiment, the light from the first 1001E and third 2852A image sources defines first 2842A and second 2852B image surfaces, respectively, and this light is relayed by the at least one transmissive reflector 5030C to define first 2842B and second 2852C relayed image surfaces in the first viewing volume 2896A, and wherein the occlusion system 2854A is operable to occlude a portion of the light from the first or third image source 2852B, the occluded portion corresponding to a portion of the first or second relayed image surface 2852C that is occluded by the other one of the first or second image relayed image surface 2842B viewed by 1050A.

In an embodiment, the display system of FIG. 28F further comprises an occlusion system operable to occlude a portion of light from at least one of the second 1001F and fourth 2862A image sources. In one embodiment, the occlusion system comprises at least one occlusion layer 2864A having one or more individually addressable elements 2865. In another embodiment, the occlusion system comprises at least one occlusion object (not shown). The occlusion system may be positioned to be optically preceding the optical combiner 101B. In an embodiment, the light from the first 1001F and fourth 2862A image sources defines first 2844A and second 2862B image surfaces, respectively, and this light is relayed by the at least one transmissive reflector 5030C to define first 2844B and second 2862C relayed image surfaces in the second viewing volume 2896B, and wherein the occlusion system 2864A is operable to occlude a portion of the light from the first or fourth image source 2862A, the occluded portion corresponding to a portion of the first or second relayed image surface 2862C that is occluded by the other one of the first or second relayed image surface 2844B and viewed by viewer 1050B.

The occlusion plane 2864A near object 2862A is relayed to relayed occlusion plane 2864C. The portion of the relayed occlusion plane 2864C which overlaps with the relayed holographic object 2844B is not shown in FIG. 28F. An observer 1050B may observe relayed holographic object 2844B, but not see light rays from the relayed object 2862C directly behind the holographic object 2862B if the center rays in the group of rays 2863D are missing. This occlusion may be achieved by occluding the center portion of corresponding light rays 2863A from the object 2862A at the occlusion plane location 2865. The distance between the occlusion plane 2864A and the object 2862A may be substantially the same as the distance between the relayed holographic object 2844B and the relayed object 2862C. The double relay of light from object 2862A through transmissive reflector 5030B followed by transmissive reflector 5030C substantially preserves the depth profile of the object 2862A for the corresponding relayed object 2862C, as well as maintaining the depth ordering of the one or more occlusion planes 2864A in front of the object 2862A so that the corresponding relayed one or more occlusion planes 2864C may be placed in substantially the same location as the relayed holographic object 2844B. Many display variations of the display system shown in FIG. 28F are possible. In an embodiment, the holographic displays 1001E and 1001F as well as the objects 2852A and 2862A in FIG. 28F can be any of: a 2D display surface, a stereoscopic display surface, an autostereoscopic display surface, a multi-view display surface which may be the surface of a horizontal parallax-only HPO multi-view display such as a lenticular display, the surface or surfaces of a volumetric 3D display, the surface of a real-world object emitting light, or the surface of a real-world object reflecting light.

Modular Display Systems

Figure 29A:
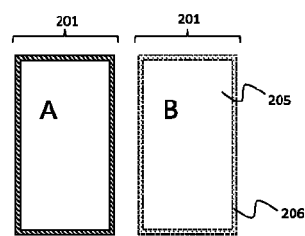
FIG. 29A shows a top view of two display devices with each display comprised of a display area and a non-imaging area.
Figure 29B:
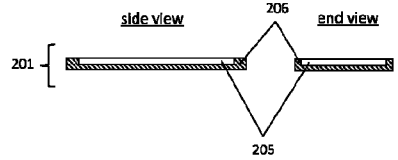
FIG. 29B shows a side view and an end view of the display device shown in FIG. 29A.
Figure 29C:
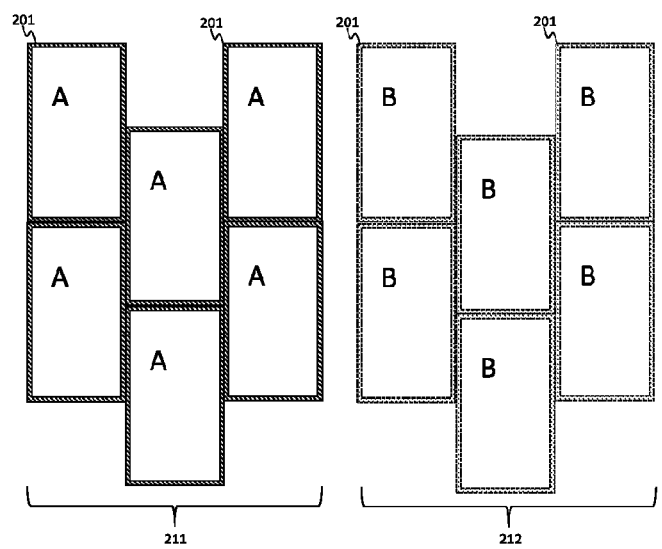
FIG. 29C shows multiple displays placed on a first plane A, and multiple displays placed on a second plane B.
Figure 29D:
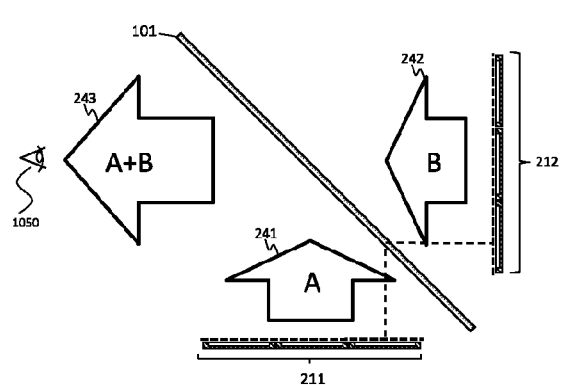
FIG. 29D shows a side view of first display plane A and second display plane B of displays disposed orthogonal to one another.
Figure 29E:
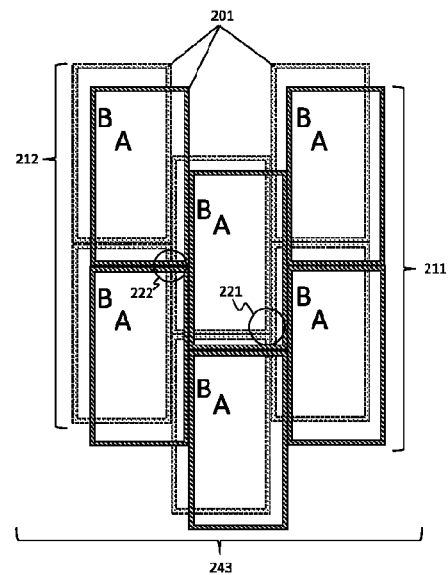
FIG. 29E shows the combined light of FIG. 29D as viewed by the observer, with display plane A and display plane B superimposed.

FIG. 29A shows a top view of two display devices 201, one for placement on first imaging plane A, and the other for placement on a second imaging plane B, each display device comprised of a display area 205 and a non-imaging area 206, which may be a bezel, for example. FIG. 29B shows a side view and an end view of the display device 201. The display devices 201 may be emissive displays such as LED, OLED, or micro-LED displays, or transmissive displays such as an LCD display. FIG. 29C shows multiple displays 201 placed on a first plane A 211, and multiple displays 201 placed on a second plane B 212. FIG. 29D shows a side view of first display plane A 211 and second display plane B 212 disposed orthogonal to one another, the light 241 from plane A 211 superimposed together with the light 242 from plane B 212 to form superimposed light 243 using a light combining system comprising an optical image combiner 101, where the superimposed light 243 reaches an observer 1050. The optical combiner 101 may be a non-polarizing beam splitter, a polarizing beam splitter, a half-mirror, or some other optical system, which may contain refractive optics, diffractive optics, or mirrored systems. FIG. 29E shows the combined light 243 as viewed by the observer 1050, with display plane A 211 and display plane B 212 superimposed, with the displays 201 on plane B shown with dashed lines and slightly faded to distinguish them from displays 201 on plane A. The small shift between the planes allows the formation of regions 221, where a non-imaging region producing no light from display plane B 212 is overlapped with an imaging region on display plane A 211 producing light, so that some light may be produced in this region 221 from at least one display. There are still regions 222 wherein the non-imaging areas from displays on the planes overlap, and these regions produce no light. If the non-imaging areas are negligible in size, then this overlap region may be acceptable, but for practical displays this non-imaging region is usually substantial enough to be noticed by an observer 1050.

Figure 29F:
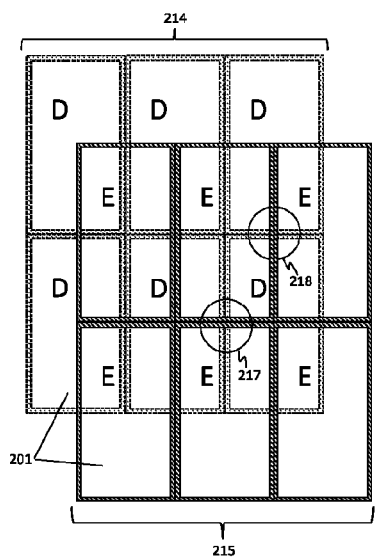
FIG. 29F shows two display planes of display devices placed on a regular rectangular grid.

Other arrangements of display planes may be superimposed using beam splitter configurations similar to the one shown in FIG. 29D. FIG. 29F shows two display planes of display devices 201 placed on a regular rectangular grid, display plane D 214 and display plane E 215, offset from one another in two dimensions by a small amount in order to maximize the overlapping regions 217 where at least one display plane produces light, and minimize the non-imaging regions 218 overlap on both display planes in which neither display plane D 214 nor E 215 produces light.

Figure 29G:
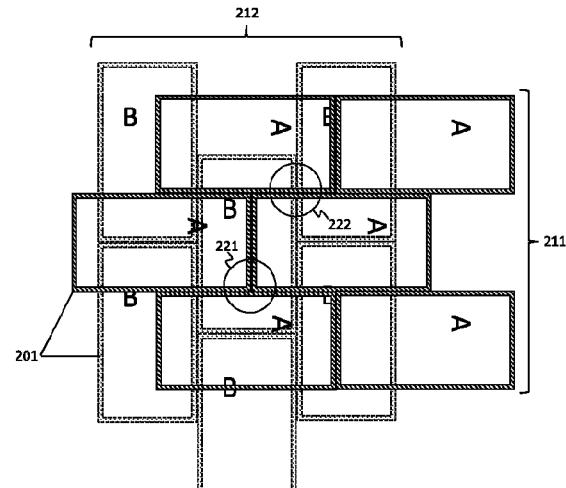
FIG. 29G shows a combined image of the display planes A and B shown in FIG. 29C, where the display plane A is rotated 90 degrees relative to the other display plane B.
Figures 29H, 29I:
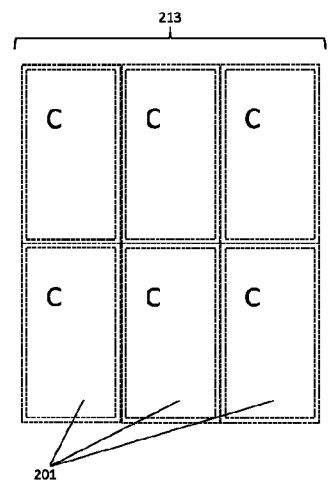
FIG. 29H shows a display plane C comprised of a regular rectilinear grid of display devices placed size-by-side in rows.
FIG. 29I shows a side view of one embodiment of a light combining system comprising two optical combiners combining the light from three display planes.

It is possible to use display planes that are rotated with respect to one another. FIG. 29G shows two overlapped display planes A 211 and B 212 shown separately in FIG. 29C, where the display plane A 211 is rotated 90 degrees relative to the other display plane B 212. As in previous configurations, this causes regions 221 where there is one but only one non-imaging region on one of the planes, and non-imaging regions 222 where there are non-imaging regions on both planes A 211 and B 212. It is possible to use a third display plane with non-imaging regions to eliminate these non-imaging regions 222. FIG. 29H shows a display plane C 213 comprised of a regular rectilinear grid of display devices 201 placed size-by-side in neat rows. FIG. 29I shows a side view of one embodiment of a display system 2910 comprised of a light combining system comprising at least two optical combiners 101A and 101B combining the light from three display planes A 211, B 212, and C 213. Display planes B 212 and C 213 are placed parallel with respect to one another but may be offset so that the distance between display plane B 212 and beam splitter 101B is the same distance between display plane A 211 and the beam splitter 101B. Plane B 212 is rotated 90 degrees relative to plane C 213 so that for the side view shown in FIG. 29I, the two long sides of displays 201B are visible on display plane B 212, while the three short sides of displays 201C are visible on display plane C 213. Display plane A 211 is disposed orthogonally to display plane C 213, and for the side view shown in FIG. 29I the short sides of display devices 201A in plane A 211 are visible. Light 241 from the surface 280A of display plane A 211 may be combined with the light 251 from the surface 280C of display plane C 213 into combined light 252. This combined light 252 is combined with the light 242 from the surface 280B of display plane B 212 into combined light 253 from the three display planes A 211, B 212, and C 213, which reaches observer 1050. Observer 1050 sees the combined light 274 as if it came from a single display that is at the distance between the observer 1050 and display plane A 211. The optical path length between the observer 1050 and any of the three display planes A 211, B 212, or C 213 may be adjusted to be substantially the same. These equal path lengths may be necessary if the combined light 253 is to be relayed so that it is focused at a virtual display plane.

Figure 29J:
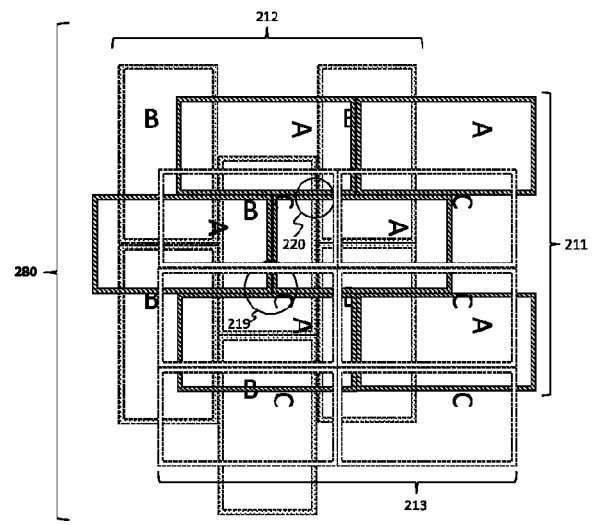
FIG. 29J is the combined light observed by an observer of the three display planes shown in FIG. 29I.

FIG. 29J is the combined light 253 observed by observer 1050 from the three display planes shown in FIG. 29I. Display planes A 211 and C 213 are parallel but offset from each other by less than a short dimension of the display device. Display plane B 212 is orthogonal to display planes A 211 and C 213. The display planes have been aligned so that there may be locations 219 with only one bezel from one display plane at the corresponding location, but display regions existing on the other two planes, or locations 220 with a display regions existing on one display plane (e.g. display plane C 213), but perhaps only one due to two non-imaging regions on the other two planes (e.g. planes A 211 and B 212) at the location 220. In FIG. 29J, every location has at least one display source on one of the three display planes. In this way, the combined light from display planes A 211, B 212, and C 213 shown in FIG. 29J is a seamless display surface 280, which has a combined resolution of many separate display devices 201, where each separate display device 201 contains a non-imaging region. The seamless display surface 280 shown in FIG. 29J composed of three contributing planes of display surfaces 280A, 280B, and 280C shown in FIG. 29I may be made as large and with as high a resolution as desired, provided that optical combiners 101A and 101B in FIG. 29I may be made suitably large.

Figure 29K:
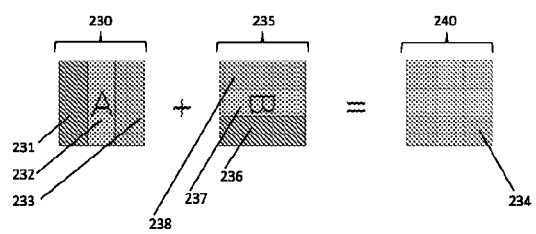
FIG. 29K shows an embodiment in which each pixel is comprised of three rectangular subpixels.

One possible advantage of placing display devices on display planes which are rotated with respect to one another (e.g. display planes A 211 and B 212 in FIG. 29J) is an increase in resolution of the combined pixels that result from the overlap of pixels on more than one display plane. For example, in some embodiments, the display pixels on each plane will be comprised of more than one subpixel. FIG. 29K shows an embodiment in which each pixel such as 230 or 235 is comprised of three rectangular subpixels, which may be red, blue, and green in color. Corresponding to the display arrangement shown in FIG. 29J, it is possible that the subpixels 231, 232, and 233 (e.g. red, green, and blue subpixels) that form A-plane pixel 230 for the displays on plane A 211 may be taller than they are wider, which means that the subpixels 236, 237, and 238 (e.g. red, green, and blue subpixels) that form B-plane pixel 235 for the displays on plane B 212, rotated to be orthogonal to the display devices on plane B, may be wider than they are taller. After being superimposed, pixel 230 and pixel 235 may result in the crossed superimposed subpixel pattern 240, containing 9 crossed subpixel regions such as 234. The larger number of crossed subpixel regions on superimposed pixel 240 may offer more color choices and a higher effective spatial resolution than the combined number of source subpixels from pixels 230 and 235.

Figure 29L:
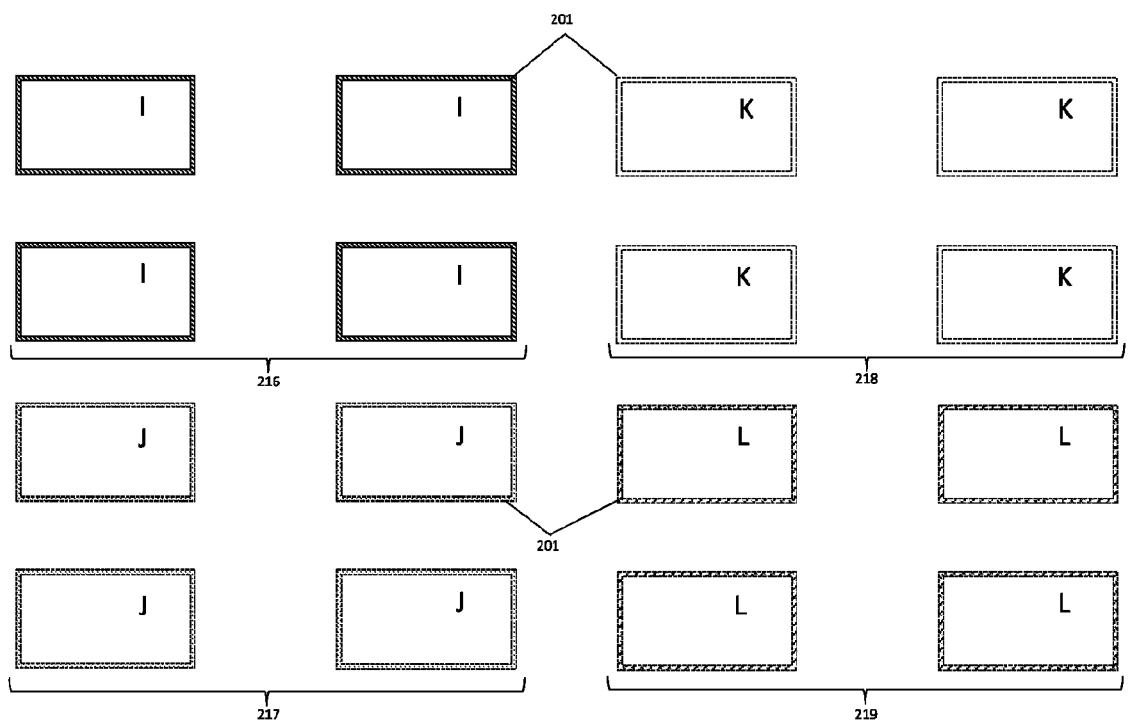
FIG. 29L shows four identical display planes, display plane I, display plane J, display plane K, and display plane L, each comprised of a pattern of displays with spaces between each display and its neighbors.
Figure 29M:
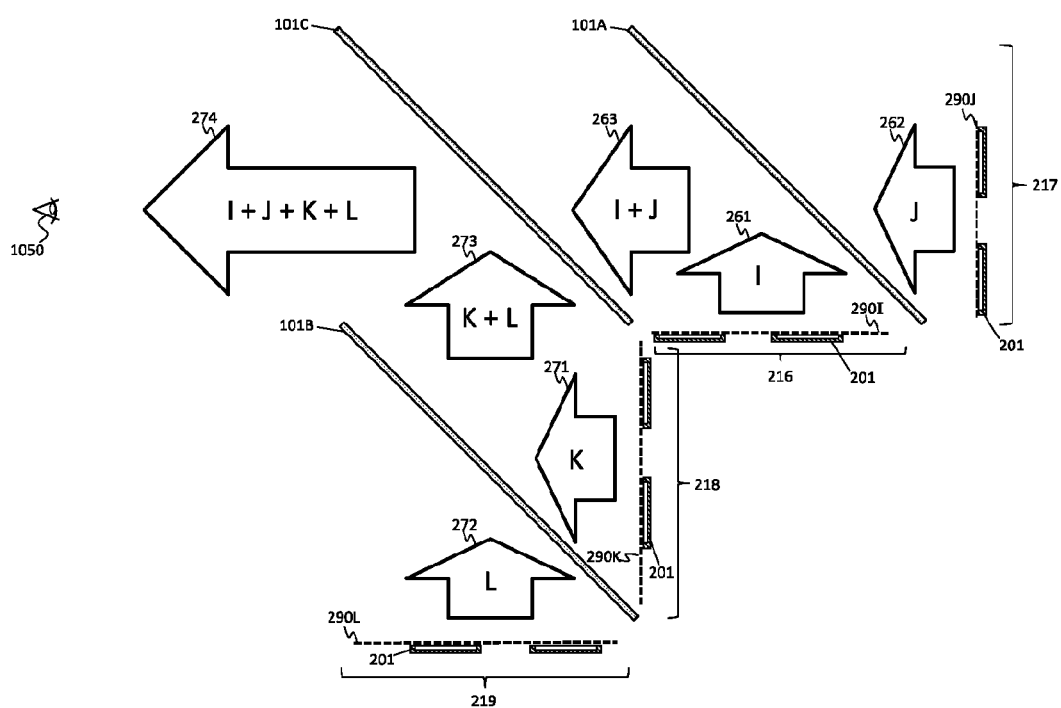
FIG. 29M shows four display planes I, J, K, and L as shown in FIG. 29L combined using three optical combiners to form a display system.

While the seamless display surface 280 shown in FIG. 29J may not have non-display regions, it is composed of three contributing planes of displays A 211, B 212, and C 213, each of which has displays placed in a close-packed formation. Other more efficient arrangements of display device planes are possible. FIG. 29L shows four identical display planes, display plane I 216, display plane J 217, display plane K 218, and display plane L 219, each comprised of a pattern of displays 201 with spaces between each display 201 and its neighbors. While these display planes only show four displays each, they may be made as large as desired with the same display-to-display separation in each axis. These four display planes may be combined using a light combining system with one or more optical combiners much the same way that three display planes are combined in FIG. 29I. FIG. 29M shows how four display planes I 216, J 217, K 218, and L 219 shown in FIG. 29L may be combined using three optical combiners 101A, 101B, and 101C of a light combining system to form an overlapped 2D display system 2920. The light 261 from display plane I 216 surface 2901 and the light 262 from display plane J 217 surface 290J are combined by beam splitter 101A into combined light I+J 263. The light 271 from display plane K 218 surface 290K and the light 272 from display plane L 219 surface 290L is combined by beam splitter 101B into combined light K+L 273. The light I+J 263 and the light K+L 273 is combined by beam splitter 101C into the combined light 274 I+J+K+L seen by observer 1050. FIG. 29N shows that observer 1050 should see overlapping display planes 275 from the configuration shown in FIG. 29M, with an effective overlapped seamless 2D display surface 290. FIG. 29O shows the configuration of four overlapping display planes I 216, J 217, K 218, and L 219 that produce the combined light 274 I+J+K+L seen by observer 1050 from the configuration shown in FIG. 29M. These four overlapping display planes I 216, J 217, K 218, and L 219 have non-imaging regions overlap in some regions 265 where at most three, but never four non-imaging regions overlap simultaneously. This means that substantially all regions on combined seamless display surface 290 produce light. The seamless display surface 290 shown in FIG. 29O comprised of four contributing planes of displays may be made as large as desired, and with as high a resolution as desired, provided that optical combiners 101A, 101B, and 101C may be made suitably large. The configurations shown in this disclosure are exemplary, and many other configurations of display planes with non-imaging area may be combined to produce one effective seamless display plane.

In view of the principles illustrated with the above examples, it is to be appreciated that, generally, a display system can be constructed to include arrays of modular display devices, each modular display device comprising a display area and a non-imaging area, wherein the arrays of modular display devices define a plurality of display planes, each display plane comprising imaging regions defined by the display areas of the respective display devices and non-imaging regions defined by the non-imaging areas of the respective display devices. Further, the display system can be constructed to further include a light combining system operable to combine light from the arrays of modular display devices, wherein the light combining system and the arrays of modular display devices are arranged such that the combined light has an effective display plane defined by superimposing the plurality of display planes so that the non-imaging regions of the plurality of display planes are superimposed by the imaging regions of the plurality of display planes.

Seamless display planes with resolution that may be made as large as required may be combined with arrays of waveguides in order to create light field display systems. FIG. 30A shows a single waveguide 1004A placed over an illumination plane 3002 which is comprised of individually addressable pixels 3003 at coordinates $u_0$ 3010, $u_k$ 3011, and $u_{-k}$ 3012 located on a seamless display surface 3020. The seamless display surface 3020 may be seamless display surface 290 in FIG. 29O, seamless display surface 280 in FIG. 29J, the display area 205 of display device 201 shown in FIG. 29A, or some other display surface. The illumination plane 3002 may be an embodiment of the display area 205 from display device 201 shown in FIGS. 29A and 29B. The illumination plane 3002 contains pixels in a plane defined by two orthogonal axes U 3005 and V 3006, but in FIG. 30A pixels 3002 are only shown in the U-axis 3005. Each waveguide is associated with a group of pixels 3002. A waveguide 1004A will receive light 3041 from pixel $u_{-k}$ 3012 on the illumination plane 3002 and project this light 3041 into a direction 3031 defined by an angle determined at least in part by the location of the pixel 3012 on the U-V plane with respect to the waveguide 1004A. Some of the light 3042 from the pixel at the left $u_k$ 3011 is received by the waveguide 1004A and propagated into chief ray propagation path 3032, the direction of 3032 up and to the right determined by the location of pixel $u_k$ 3011 relative to the waveguide 1004A. The chief ray propagation path 3030 that is normal to the illumination plane is provided in this example by the light from pixel $u_0$ 3010 close to the optical axis of the waveguide 1004A. The coordinates $u_0$, $u_k$, and $u_{-k}$ are light field angular coordinates of light propagation paths in one dimension, called axis U, but there is a corresponding angular coordinate in the orthogonal dimension V. In general, the waveguide 1004A is assigned to have a single spatial coordinate in two dimensions (X,Y), and a pixel 3003, 3010, 3011, or 3012 associated with a waveguide may produce a light propagation path with a two-dimensional angular coordinate (U,V). Together, these 2D spatial coordinates (X,Y) and 2D angular coordinates (U,V) form a 4-dimensional (4D) light field coordinate (X, Y, U, V) assigned to each pixel 3003, 3010, 3011, or 3012 on the illumination plane 3002.

The 4D light field is comprised of all the 4D coordinates (X, Y, U, V) for multiple waveguides at various spatial coordinates, each waveguide 1004A associated with multiple angular coordinates (U,V) corresponding to the illumination source pixels 3003 associated with the waveguide 1004A (e.g. spanning $u_{-k}$ and $u_k$ in the U-axis 3005 for waveguide 1004A shown in FIG. 30A). FIG. 30B shows a light field display system 3060 comprised of a plane of waveguides 1004 disposed over an illumination plane 3002 which contains illumination sources (e.g. pixels) 3003 and forms a seamless display surface 3020. The seamless display surface 3020 may be seamless display surface 290 in FIG. 29O, seamless display surface 280 in FIG. 29J, the display area 205 of display device 201 shown in FIG. 29A, or some other display surface. Above the illumination plane is a waveguide array 1004 comprised of three waveguides 1004A, 1004B, and 1004C. Associated with each waveguide 1004A, 1004B, and 1004C is a group of pixels 3002A, 3002B, and 3003B, which produce groups of propagation paths 3025A, 3025B, and 3025C, respectively. The chief rays 3031, 3030, and 3032 define the propagation paths of light projected from the waveguide 1004A at the minimum, mid-value, and maximum values of light field angular coordinate U, respectively. The light field angular coordinate V is orthogonal to U. In FIG. 30B, the light-inhibiting structures 3009 forming vertical walls between neighboring waveguides 1004A, 1004B, and 1004C prevent light generated by one group of pixels associated with a first waveguide from reaching the neighboring waveguide. For example, light from any pixel 3002B associated with the center waveguide 1004B cannot reach waveguide 1004A because of the light-inhibiting structure 3009 between these two waveguides.

FIG. 30C shows a side view of a light field display 3050 comprised of the display device 201 shown in FIG. 29B with a waveguide array such as 1004 shown in FIG. 30B mounted an active display area. This light field display projects light rays into propagation paths as shown in FIG. 30B. Below, this disclosure demonstrates how this building block 3050 may be used as a building block in a light field display with a higher resolution than the light field display 3050.

FIG. 30D shows a display device 201 with an active display area 205 covered with an array of waveguides 1004, surrounded by a non-imaging area 206. A magnified view 3030 of the two waveguides 1004A at (X,Y)=(0,0) and 1004B at (X,Y)=(1,0) shows the U,V, and Z-axes 3040 that are also shown in FIG. 30A, as well as the 4-D pixel coordinates associated with each waveguide. These pixels collectively form an illumination source plane 3002 which is also shown in FIG. 30B. For example, pixel 3083 is associated with (X, Y, U, V) coordinates (0, 0, −2, −2), denoted by $x_0 y_0 u_{-2} v_{-2}$. The pixel 3093, under the same relative location relative to waveguide 1004B as the location of pixel 3083 relative to waveguide 1004A, has the same (U,V) coordinate (−2, −2), with (X, Y, U, V) coordinate (1, 0, −2, −2). Similarly, pixel 3081 at the center of waveguide 1004A, has the (X, Y, U, V) coordinate (0, 0, 0, 0), while pixel 3091 at the center of waveguide 1004B, has (X, Y, U, V) coordinate (1, 0, 0, 0). Some other 4D light field coordinates are shown in FIG. 30D, including (X, Y, U, V)=(0, 0, −1, 0), (0, 0, −2, 0), (0, 0, −3, 0), and (1, 0, 0, −1).

Figure 30E:
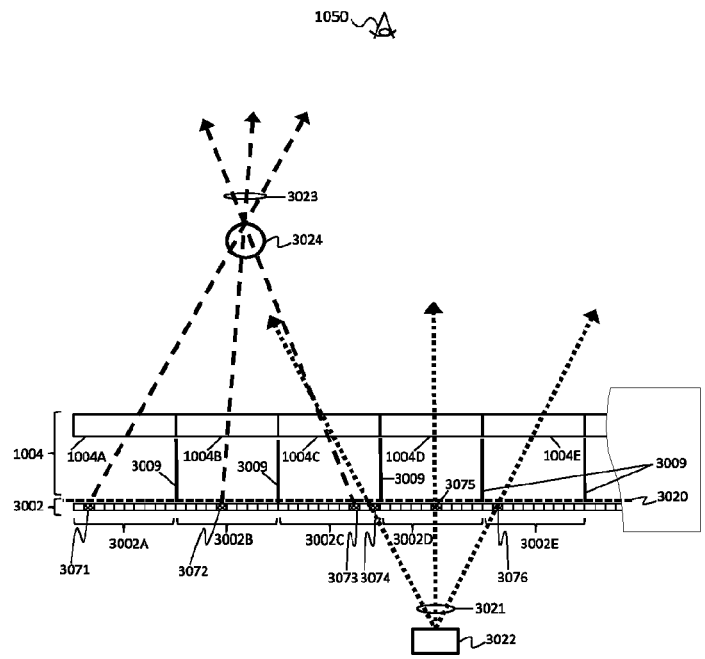
FIG. 30E shows two holographic objects projected by a light field display system comprised of five waveguides, each projecting light from a group of associated pixels and perceived by an observer.

FIG. 30E shows two holographic objects 3022 and 3024 projected by a light field display system comprised of five waveguides 1004A-E, each projecting light from a group of associated pixels 3002A-D, respectively, and perceived by an observer 1050. The pixels are part of a seamless display surface 3020, which may be seamless display surface 290 in FIG. 29O, seamless display surface 280 in FIG. 29J, the display area 205 of display device 201 shown in FIG. 29A, or some other display surface. The light rays defined by chief rays 3023 forming holographic object 3024 include light from pixel 3071 projected by waveguide 1004A, light from pixel 3072 projected by waveguide 1004B, and light from pixel 3073 projected by waveguide 1004C. The light rays defined by chief rays 3021 forming holographic object 3022 include light from pixel 3074 projected by waveguide 1004C, light from pixel 3075 projected by waveguide 1004D, and light from pixel 3076 projected by waveguide 1004E. In FIG. 30E, the light-inhibiting structures 3009 forming vertical walls between neighboring waveguides 1004A-D prevent light generated by one group of pixels associated with a first waveguide from reaching a neighboring waveguide. For example, light from any pixel 3002C associated with the waveguide 1004C cannot reach waveguide 1004B or waveguide 1004D because the light-inhibiting structures 3009 surrounding waveguide 1004C would block and absorb this stray light. While only the groups of chief ray propagation paths 3023 and 3021 are shown in FIG. 30E, it should be appreciated that the light from the illumination source plane pixels 3071-3076 may substantially fill the apertures of the respective waveguides, just as the light 3041 from pixel 3012 substantially fills the aperture of waveguide 1004A as this light 3041 is projected into chief ray propagation path 3031 in FIG. 30A.

It should be noted that throughout this disclosure, any light field display may be converted to a normal display with the addition of a layer of switchable glass (e.g. "smart glass"), which is layer of glass or glazing with light transmission properties that change from transparent to translucent when voltage, light, or heat is applied. For example, in polymer-dispersed liquid-crystal devices (PDLCs), liquid crystals are dissolved or dispersed into a liquid polymer followed by solidification or curing of the polymer. Typically, the liquid mix of polymer and liquid crystals is placed between two layers of transparent and conductive glass or plastic followed by curing of the polymer, thereby forming the basic sandwich structure of the smart window. Electrodes from a power supply are attached to the transparent electrodes. With no applied voltage, the liquid crystals are randomly arranged in the droplets, resulting in scattering of light as it passes through the smart window assembly. This results in a translucent, milky white appearance. When a voltage is applied to the electrodes, the electric field formed between the two transparent electrodes on the glass causes the liquid crystals to align, allowing light to pass through the droplets with very little scattering and resulting in a state with varying transparency depending on the voltage applied.

Figure 30F:
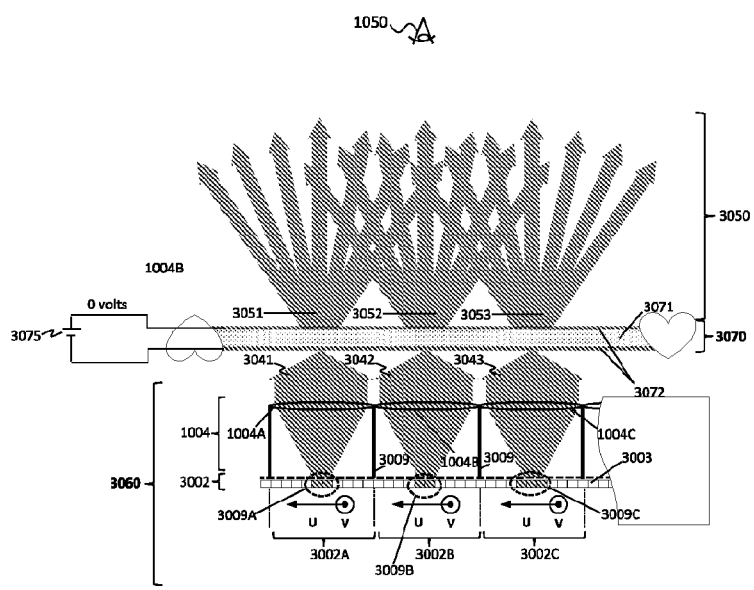
FIG. 30F shows the light field display shown in FIG. 30B, with a layer of smart glass placed in a plane parallel to the plane of waveguides and displaced a small distance from the surface of the waveguides.

FIG. 30F shows the light field display 3060 shown in FIG. 30B, with a layer of smart glass 3070 placed in a plane parallel to the plane of waveguides 1004 and displaced a small distance from the surface of the waveguides 1004. The numbering of FIG. 30B is used in FIG. 30F. A substrate 3071, which may be a mix of cured polymer and liquid crystals, with the liquid crystal molecules forming droplets in the polymer, lies between two transparent plastic or glass electrode plates 3072. A voltage source 3075 is attached to the electrode plates 3072 and applies a voltage to the substrate 3071 between the plates. In the case of a PDLC substrate 3071, an application of zero volts from the voltage source 3075 results in the liquid crystals being randomly arranged in the droplets, causing the smart glass 3070 to scatter the incident light. Under these circumstances, illumination plane 3002 pixels 3009A, 3009B, and 3009C produce light projection paths 3041, 3042, and 3043 which are scattered by smart glass 3070 into scattered light bundles 3051, 3052, and 3053, each with an angular distribution which may be larger than that of the incident light 3041, 3042, and 3043, respectively. The set of all light rays 3050 leave the layer of smart glass 3070 with an angular distribution produced at each location on the smart glass layer that may correspond to the wide field of view for an observer 1050 expected from a traditional 2D display.

FIG. 30G shows the light field display shown in FIG. 30F, but wherein the voltage source 3075 applies a sufficient voltage to the transparent smart glass electrodes 3072 for the smart glass to become transparent. The applied voltage forms an electric field and causes the liquid crystals in the droplets suspended within the polymer to align, allowing light to pass through the droplets with very little scattering and resulting in a transparent state for the smart glass layer 3070. The incident light rays 3041, 3042, and 3042 from waveguides 1004A, 1004B, and 1004C pass directly through the smart glass layer 3070, respectively, and the light field display 3060 behaves as a light field display with a thin layer of transparent glass suspended above it, operable to project holographic objects.

The switchable smart glass layer 3070 may take forms alternate to PDLC structures. For example, in suspended-particle devices (SPDs), a thin film laminate of rod-like nano-scale particles is suspended in a liquid 3071 and placed between two pieces of glass or plastic 3072 or attached to one of these layers. When no voltage is applied, the suspended particles are randomly organized, thus blocking, absorbing, and perhaps scattering light. When voltage is applied, the suspended particles align and let light pass. Another alternative for the smart glass layer 3070 is one of many types of glazing that can show a variety of chromic phenomena, which means that based on photochemical effects, the glazing changes its light transmission properties in response to an environmental signal such as voltage (electrochromism). In another embodiment, a smart glass layer may be achieved with micro-blinds that may be implemented in a reflective color such as white and control the amount of light passing through or scattered in response to an applied voltage.

Display devices, imaging relays, and waveguides may be combined to realize a light field display in a variety of ways. FIG. 31A shows a side view of an array of modular display devices 1002, comprised of individual displays 201 shown in FIGS. 29A and 29B. The array of modular display devices 1002 may take the form of a 2D array of display devices such as 211 display plane A, 212 display plane B, or 213 display plane C shown in FIGS. 29I and 29J. FIGS. 29I and 29J demonstrate how a combined seamless display surface 280 may be formed from multiple instances of 2D arrays of display devices 1002 combined with beam splitters 101, despite the fact that each 2D plane of display devices 1002 contains gaps due to the presence of non-imaging regions.

FIG. 31B shows how a 2D array of display devices 1002 containing imaging gaps may be combined with an array of energy relays 1003 to produce a seamless display system with a seamless display surface 3121 with no non-imaging regions such as bezels 206. In this instance, the energy relays 1003A, 1003B, and 1003C are tapered energy relays that are used to relay the image received from multiple display areas 205 of display devices 201 to a common seamless display surface 3121 on the opposite side of the relay. Each tapered energy relay 1003A, 1003B, and 1003C relays the image without a substantial loss in spatial resolution of the image, and without a substantial loss in light intensity from the display area 205. The tapered energy relays 1003A-C may be tapered fiber optic relays, glass or polymer material which contains an random arrangement of materials and relays light according to the Anderson localization principle, or glass or polymer material which contains an ordered arrangement of materials and relays light according to an Ordered Energy localization effect, which is described in commonly-owned International Publication Nos. WO 2019/140269 and WO 2019/140343, all of which are incorporated herein by reference for all purpose. The tapered relays 1003A, 1003B, and 1003B have a small end 3157 near the display area 205 of the display device 201, and a magnified end 3158, which contributes to forming the seamless display surface 3121. The tapered energy relays 1003A-C may each have a sloped section 3155 between one narrow end 3157 of the relay 1003A-C at the display area 205 of the display device 201 with a first imaging area, and the other wider end 3158 of the relay 1003A-C at the seamless display surface 3121 with a second imaging area, wherein the second imaging area may be larger than the first, which means that the tapers 1003A-C may be providing magnification of the image. The seam 3156 between tapered relays in the relay array 1003 may be small enough not to be noticed at any reasonable viewing distance from the seamless display surface 3121. While FIG. 31B shows the display areas 205 from three separate display devices 201 on display device plane 1002 being relayed by the three tapered imaging relays 1003A, 1003B, and 1003C of the array of tapered relays 1003 to a common display surface 3121 with substantially no noticeable seam 3156, it is possible to construct similar combined display planes by relaying many more devices in two orthogonal planes, so that any practical number of display devices, each comprised of a non-imaging area, may contribute to an essentially seamless display surface 3121. As many display devices as desired may be combined in two dimensions with the method shown in FIG. 31B, forming a seamless display surface with as much resolution as required for an application. Multiple display surfaces 3121 may be arranged into separate display planes, which may be superimposed on each other using a beam splitter or another optical combining device, or they may be used as a building block for a light field display with no beam splitter required, as will be shown below.

As shown in FIGS. 30A-D, a light field display may be constructed from a display surface, which provides an illumination source plane 3002 as well as an array of waveguides 1004, with each waveguide projecting one or more illumination sources into projection paths, the direction of each projection path at least in part determined by the location of the respective illumination source relative to the waveguide. The illumination source plane 3002 may be provided by the seamless display surface 3121 shown in FIG. 3121, the seamless display surface 290 in FIG. 29O, seamless display surface 280 in FIG. 29J, the display area 205 of display device 201 shown in FIG. 29A, or some other display surface. FIG. 31C shows an array 3150 of individual light field display units 3050 shown in FIGS. 30C and 30D, each light field display unit 3050 comprising an array of waveguides 1004, and an array of individually-controlled illumination sources provided by a display unit 201. Below, this disclosure describes a light field display that is constructed from light field display units 3050 with a resolution that may be larger than that of an individual light field display unit 3050. The array of waveguides 1004 may contain light inhibiting structures 3009 as shown in FIGS. 30B and 30E.

FIG. 31D is one embodiment of a light field display 1001 that appears as 1001 or 1001A in many of the diagrams of this disclosure, including FIGS. 1A-B, 3A, 5A-H, 6, 7, 8A-C, 9A, 11A-B, 11F, 11C, and 12-26. It is comprised of a layer of display devices 1002, a layer of image relays 1003 which may form a seamless energy surface 3121, and an array of waveguides 1004, each waveguide associated with a group of illumination sources, wherein each waveguide may project the light from at least one illumination source of the group of illumination sources into a direction determined at least in part by the location of the illumination source relative to the waveguide. The array of waveguides 1004 may contain light inhibiting structures 3009 as shown in FIGS. 30B and 30E. As discussed with reference to FIG. 31B, the seamless display surface may be made to combine the imaging areas of multiple displays 201, so that a display resolution as large as desired may be achieved.

Figure 32:
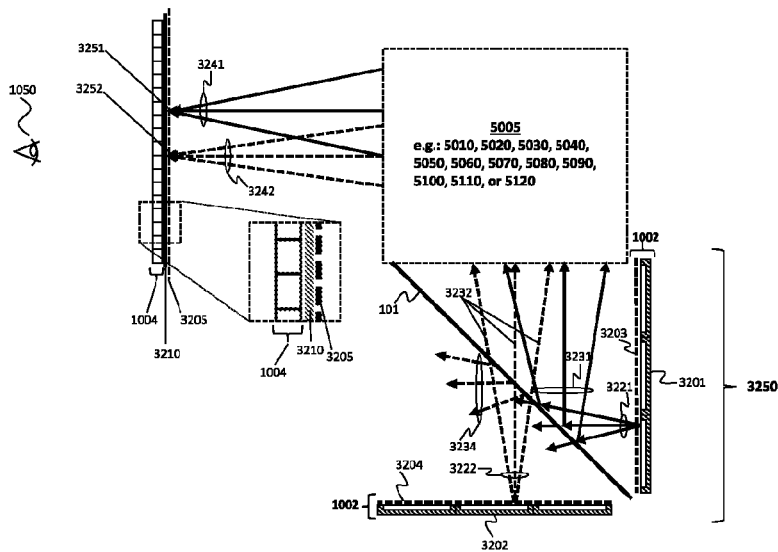

Each of the building blocks shown in FIGS. 31A-C may be used in combination with any relay system disclosure herein, including but not limited to the relay system 5000 shown in FIG. 11A, the relay system 5001 shown in FIG. 11B, the relay system 5002 shown in FIG. 11F, and the relay system 5003 shown in FIG. 11G to create a light field display. FIG. 32 shows a light field display system comprised of an overlapped 2D display system 3250, a relay system 5005, and an array of waveguides 1004, which is placed at a virtual display plane 3205 of the relay 5005. For the purposes of illustration, the overlapped 2D display system 3250 is shown with only two display array planes, 3201 and 3202, which may be embodiments of the display plane 1002 shown in FIG. 31A. However, the overlapped 2D display system 3250 may be an overlapped 2D display system 2910 shown in FIG. 29I, or an overlapped 2D display system 2920 shown in FIG. 29M. The relay system 5005 may be the relay 5010, 5020, 5030, 5040, 5050, 5060, 5070, 5080, 5090, 5100, 5110 or 5120 shown in this disclosure, or some other relay which may convert diverging light rays from a light source into converging light rays, and allows the surface of an object to be relayed to another location. A portion of light rays 3222 from a point on the surface 3204 of display array plane 3202 passes through the beam splitter 101 to become light rays 3232, and these light rays 3232 are combined with light rays 3231 which originate as light 3221 from the surface 3203 of display array plane 3201 and then are reflected by the beam splitter 101. Light rays 3232 from display device array 3202 and light rays 3231 from display device array 3201 are received by relay 5005 and relayed to light rays 3242 and 3241, respectively, becoming focused on relayed virtual display plane 3205 at points 3252 and 3251, respectively. Virtual display plane 3205 is relayed from the combined display surface 3204 from display device array 3202 and display surface 3203 from display device array 3201. A diffusing element 3210 may be used at the virtual display plane 3205 to diffuse the focused light rays 3241 and 3242 from the relay, so that a desired angular distribution of light rays may be received by the waveguide array 1004, which is disposed at substantially the same location as the virtual display plane 3205. The diffusing element 3210 may be a diffusing film comprised of micro lenses or micro beads, a thin film of polymer, a thin layer of relay material which may be composed of glass or polymer, or some other layer which results in a desired distribution of light which may result in the apertures of each waveguide in the array of waveguides 1004 being substantially filled. The angular distribution of light received by the diffusing layer 3210 may be broader or narrower than the angular distribution of light presented to the waveguide array 1004, or it may have a custom distribution suitable for the individual waveguides in the array of waveguides 1004. Together, the illumination plane formed at the virtual display plane 3205 combined with the array of waveguides 1004 generates a light field to observer 1050 as demonstrated in FIG. 30E. The array of waveguides 1004 may contain light inhibiting structures 3009 as shown in FIGS. 30B and 30E.

Figure 33:
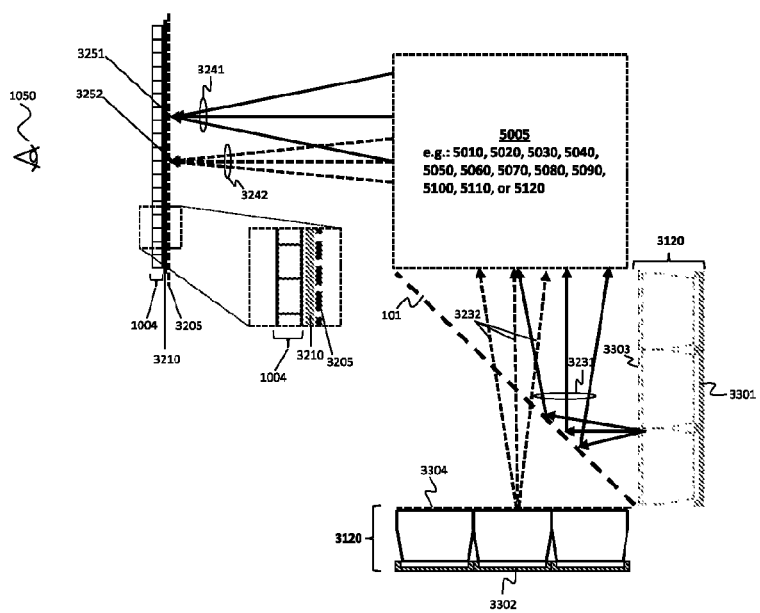

FIG. 33 is a light field display similar to the light field display shown in FIG. 32, except that the two display planes 3201 and 3202 in FIG. 32 are each replaced with a single seamless display surface 3302 which may be an embodiment of the seamless display surface 3120 shown in FIG. 31B, and an optional second seamless display surface 3301. The optical combiner 101 may be necessary if both seamless display surfaces 3301 and 3302 are present, and it may be omitted if only one seamless display surface 3302 is present. For this reason, the seamless display surface 3301 and the beam splitter 101 are shown as optional, denoted by the dashed lines. The numbering of FIG. 32 is used in FIG. 33. In FIG. 33, the virtual display plane 3205 is relayed from the combined display plane 3304 of the seamless display surface 3302 and display plane 3303 of seamless display surface 3301 if it is present. In this diagram, even if only one seamless display surface 3302 is present, the relayed virtual display plane 3205 will not contain any imaging "holes". In FIG. 33, the seamless display surfaces 3304 and 3303 if it exists are simultaneously relayed by relay 5005 to virtual display plane 3205, being combined at this virtual display plane 3205. A light field is generated by the relayed illumination sources at virtual display plane 3205, and the array of waveguides 1004 disposed close to the virtual display plane. The array of waveguides 1004 may contain light inhibiting structures 3009 as shown in FIGS. 30B and 30E.

Figure 34A:
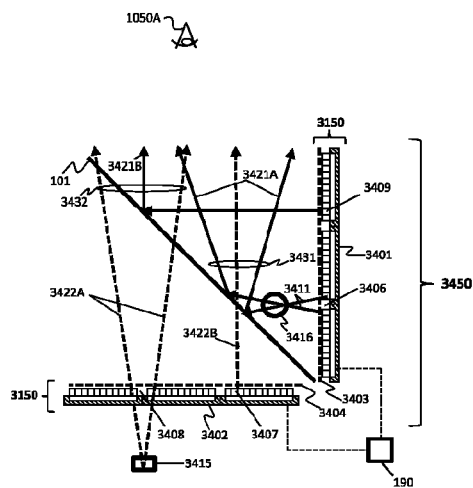

FIG. 34A is a light field display system 3450 comprised of two arrays of light field display devices 3401 and 3402, each of which may contain non-imaging regions, combined by a light combining system, which in an embodiment, can include at least one optical combiner 101. The two arrays of light field display devices 3401 and 3402 may each be embodiments of the array of light field display devices 3150 in FIG. 31C. Each array of light field display devices 3401 and 3402 contains gap regions, which project no light, including region 3406 on array 3401 and 3408 on array 3402. However, the light field reaching observer 1050A, which is the light combined from the two arrays of light field devices 3401 and 3402 by optical combiner 101 may be a light field without any gaps. In FIG. 34A, holographic object 3416 is formed primarily from light rays 3411 projected from the first light field device array 3401, denoted as solid lines. The two light rays 3411 shown are projected near the non-display region 3406 of light field device array 3401, and these light rays 3411 are deflected into light rays 3421A by the image combiner 101. As a result of the non-display region 3406, no light ray may be projected by the first light field device array 3401 for angles that are close to normal to the screen plane 3403 of the first array of light field devices 3401. However, these light rays may be supplied by the second array of light field display devices 3402, denoted as dashed lines. For example, light ray 3442B is projected from location 3407 of the second array of light field devices 3402, and is combined by the beam splitter 101 with light rays 3421A from the first array of light field display devices 3401, forming a group of light rays 3431 which together are all the light rays required for light field display of holographic object 3416 as intended, with light projected across a full field of view for observer 1050A. In FIG. 34A, the light ray 3442B from the second array of light field devices 3402 is shown dashed, while the light rays 3421A from the first array of light field devices 3401 are shown as solid lines. Thus, both the first array of light field devices 3401 and the second array of light field devices 3402 contribute light rays to forming the light forming projected holographic object 3416 as seen by observer 1050A. In a similar way, in-screen holographic object 3415 is projected by waveguides in the second array of light field devices 3402 near a non-imaging region 3408 in such a way that light rays near the normal to the screen plane 3404 of the second array of light field devices 3402 cannot be produced by this second array of light field devices 3402. These light rays, such as light ray 3421B, are produced by the first array of light field devices 3401, projected from location 3409 of the first array 3401. Light ray 3421B is combined by the beam splitter 101 with light rays 3422A that form most of the holographic object 3415 so that light ray group 3432 contains the light rays required to display holographic object 3415 at angles across a full field of view for observer 1050A. The light rays 3442A, which form the holographic object 3415 and originate from the second array of light field display devices 3402, are shown as dashed lines. The light ray 3421B, representing the light that cannot be projected normal to screen plane 3404 of the second array 3402 due to the display gap at location 3408, and supplied by first array 3401, is shown as a solid line.

Figure 34B:
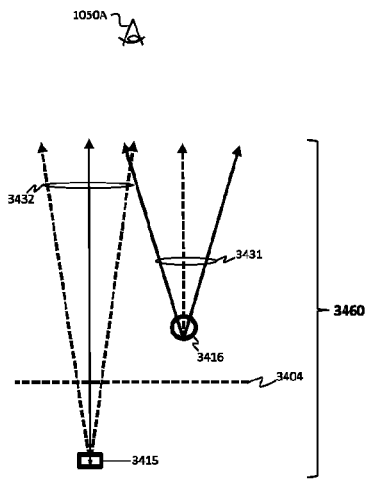

FIG. 34B shows how the display system 3450 shown in FIG. 34A appears to observer 1050A, who sees two holographic objects 3415 and 3416 projected around a screen plane 3404, and who may not be able to distinguish the fact that the light from each of these holographic objects originates from two separate orthogonal planes of light field display devices 3401 and 3402 shown in FIG. 34A. The controller 190 coordinates instructions between all of the light field displays in planes 3401 and 3402 so the correct light rays are projected by each of the light field display devices 3050 within the arrays 3150 of light field display devices.

Figure 34C:
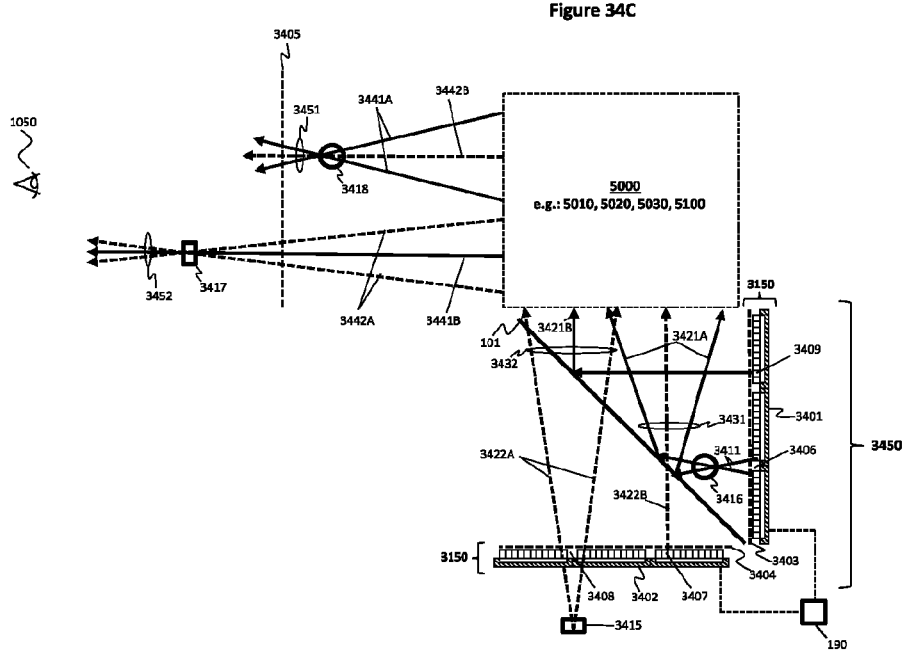

FIG. 34C is the light field display system shown in FIG. 34A combined with a relay system 5000 which relays holographic objects to a virtual display plane. The numbering in FIG. 34A is used in FIG. 34C. The light rays 3431 are received by the relay 5000, and relayed to light rays 3451, which form the relayed surface 3418 of projected holographic object 3416. In FIG. 34C, the light ray 3422B projected from the second array of light field devices 3402 is shown dashed, being relayed to light ray 3442B, while the light rays 3421A from the first array of light field devices 3401 are shown as solid lines, relayed to light rays 3441A. Thus, both the first array of light field devices 3401 and the second array of light field devices 3402 contribute light rays 3441A and 3442B to forming the relayed surface 3418. In a similar way, the light ray group 3432 is received by the relay 5000 and relayed to light ray group 3452 which forms relayed holographic object 3417. The light rays 3442A, which form the holographic object 3415 and originate from the second array of light field display devices 3402, are shown as dashed lines, and these are relayed by relay 5000 to dashed lines 3442A. The light ray 3421B, representing the light that cannot be projected normal to screen plane 3404 of the second array 3402, and supplied by first array 3402, is shown as a solid line, and this light ray is relayed by relay 5000 to light ray 3441B, also shown as a solid line. Observer 1050 sees two relayed holographic objects 3417 and 3418, and s/he cannot distinguish the fact that the light that forms each object originates from two separate orthogonal planes of light field display devices 3401 and 3402. A controller 190 issues coordinated display instructions to the arrays of light field devices 3401 and 3402 to project relayed holographic object surfaces 3417 and 3418 as intended. The display system shown in FIG. 34C uses a relay 5000 which inverts the depth of the surface of a holographic object 3415 or 3416, including the depth ordering of these holographic objects as they are relayed to relayed holographic surfaces 3417 and 3418, respectively. However, in other embodiments, the relay system 5000 may be replaced by relay system 5001 shown in FIG. 11B, which does not invert depth, and will relay the holographic objects 3415 and 3416 into different positions. The relay 5000 shown in FIG. 34C may be replaced with any relay presented in this disclosure, or any other relay which relays the surfaces of projected holographic objects to relayed holographic surfaces in a different location.

In view of the principles illustrated with the examples provided above, it is to be appreciated that, generally, a light field display system can be constructed to include arrays of modular display devices, each modular display device comprising a display area and a non-imaging area, wherein the arrays of modular display devices define a plurality of display planes, each display plane comprising imaging regions defined by the display areas of the respective display devices and non-imaging regions defined by the non-imaging areas of the respective display devices. The light field display system can further include arrays of waveguides each positioned to receive light from the of the display plane of one of the arrays of modular display devices, and a light combining system operable to combine light from the arrays of waveguides. Each array of waveguides can be configured to direct light from the respective array of modular display devices such that the combined light from the light combining system comprises light paths each defined according to a four-dimensional function and having a set of spatial coordinates and angular coordinates in a first four-dimensional coordinate system. The light field display system can further include a controller operable to operate the arrays of modular display devices to output light such that the combined light from the light combining system defines a holographic surface, the combined light defining the holographic surface comprises light from at least one imaging region of different arrays of modular display devices.

Display Systems with Interactive Relayed Objects

Figure 35:
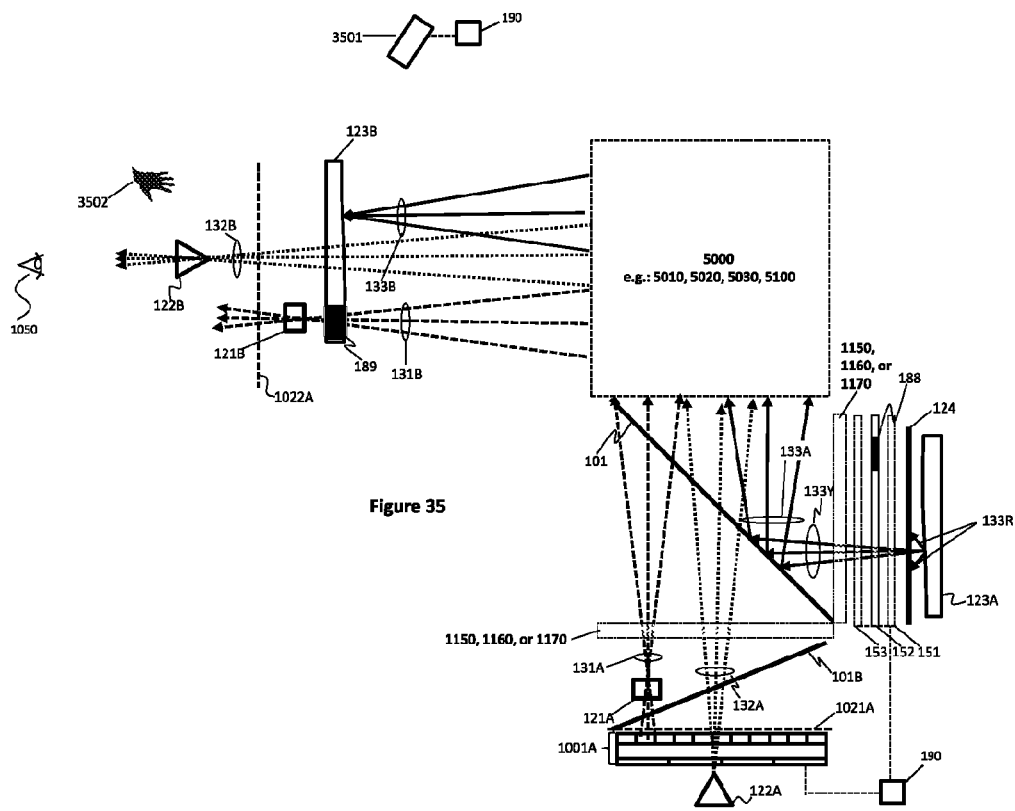

Within a display system, relayed objects are ideal candidates for interactive applications, wherein a sensor monitors the area around a relayed object, records a viewer in proximity to the display system, and changes the relayed object in response to the viewer's actions or characteristics. FIG. 35 is a diagram of a display system shown in FIG. 11A with a first image source light field display 1001A projecting holographic object surfaces 121A and 122A, which are relayed by relay 5000 to relayed holographic surfaces 121B and 122B, respectively, and a second image source real-world object 123A, which is relayed to relayed surface 123B of real-world object 123A. The numbering of FIG. 11A is used in FIG. 35. A viewer 1050 may place his/her hand 3502 in the vicinity of one of the relayed objects 121B, 122B, or 123B, and sensor 3501 may record the movement of the viewer's hand 3502. Alternatively, the sensor 3501 may sense any other attribute of the viewer 1050, including the viewer position, a position of a body part of the viewer, sound from the viewer, a gesture of the viewer, a movement of the viewer, an expression of the viewer, a characteristic of the viewer such as age or sex, a clothing of the viewer, or any other attribute. The sensor 3501 may be a camera, a proximity sensor, a microphone, a depth sensor, or any other sensing device or combination of sensing devices which records sound, images, or any other energy. The controller 190 may record this information and change the content or position of relayed objects 123A, 123B or the occlusion zones of real-world object 123C by issuing instructions to the light field display 1001A and/or to the occlusion planes 151, 152, and 153. In another embodiment, the real-world source object 123A is on a motor control system, and the position of real-world object 123A may be changed as well by the controller 190 in response to interaction by a viewer 1050. The display system shown in FIG. 35 uses a relay 5000 which inverts the depth of the surface of holographic objects 121A and 122A and the surface of real-world object 123A, including the depth ordering of these objects as they are relayed to relayed surfaces 121B, 122B, and 123B respectively. However, in other embodiments, the relay system 5000 may be replaced by relay system 5001 shown in FIG. 11B, which does not invert depth, and will relay the objects 121A, 122A, and 123A into different positions. The relay 5000 shown in FIG. 35 may be replaced with any relay presented in this disclosure, or any other relay which relays the surfaces of objects to relayed surfaces in a different location.

Figure 36:
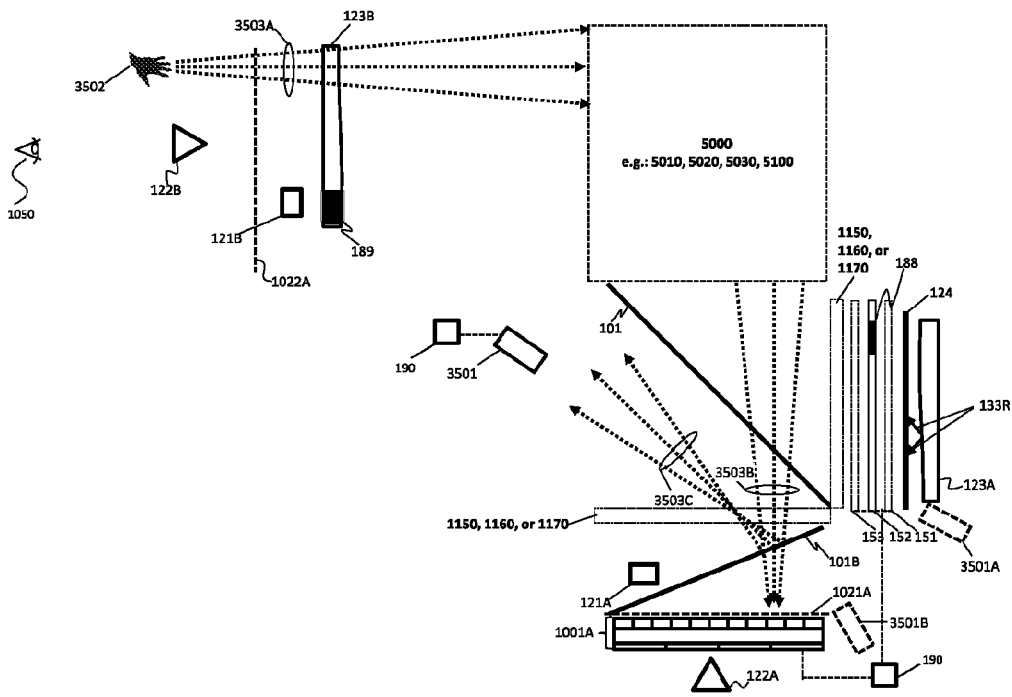

The relay system 5000 or any other imaging relay may be a bidirectional relay. This means that light from the viewer's hand 3502 may be seen from the position of the light field display 1001A or the real-world object 123A. FIG. 36 shows the display system of FIG. 35 in which light from the environment in front of the display is transported through the image relay and sensed within the display system. The numbering in FIG. 35 is used in FIG. 36, and the light paths 131A, 131B, 132A, 132B, 133A, 133Y, and 133B are not drawn for simplicity. In FIG. 36, the paths of light 3503A from a viewer's hand 3502 travel through the relay 5000 in the direction opposite from the direction of the relayed light rays forming the relayed surface 123B of the real-world object 123A. The configuration of FIG. 36 is the same as that of FIG. 35, except for an additional beam splitter 101B disposed at an angle between the light field display 1001A and the beam splitter 101, and a change in location of the sensor 3501. Light rays 3503A from the viewer's hand 3502 are received by the relay 5000, and relayed to light paths 3503B, some fraction of which are reflected by the additional beam splitter 101B into light rays 3503C, which may be received by a sensor 3501. The sensor 3501 may be a camera, a proximity sensor, a microphone, a depth sensor, or any other sensing device which records sound, images, depth, or any other physical quantity. The sensor 3501 may record a viewer's interaction with the relayed objects or the viewer's attributes or characteristics as described above, and this information may be interpreted by the controller 190. In response the controller 190 may modify the way the relayed holographic objects 121B and 122B are displayed or modify the occlusion sites 188 on the occlusion plane system comprising layers 151, 152, and 153, or both. In FIG. 36, the sensor 3501 instead may be located at 3501A next to the real-world object, or at 3501B, next to the light field display, in alternate configurations which may be allowed by the choice of implementation of FIG. 36, where these sensor locations may not require the presence of the additional beam splitter 101B. In addition, multiple other similar configurations exist—for example, the sensor could be co-located with the real-world object 123A, at a position of object 123A which does not emit or reflect light. In another embodiment, if the light field display 1001A has a bidirectional surface which both projects light and senses light, the sensor 3501 could be integrated into the light field display. The display system shown in FIG. 36 uses a relay 5000 which inverts the depth of the surface of holographic objects 121A and 122A and the surface of real-world object 123A. In other embodiments, the relay system 5000 may be replaced by relay system 5001 shown in FIG. 11B, which does not invert depth. The relay 5000 shown in FIG. 36 may be replaced with any relay presented in this disclosure, or any other relay which relays the surfaces of objects to relayed surfaces in a different location.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically, and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. In general, but subject to the preceding discussion, a value herein that is modified by a word of approximation such as "about" or "substantially" may vary from the stated value by at least ±1, 2, 3, 4, 5, 6, 7, 10, 12 or 15%.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

Words of comparison, measurement, and timing such as "at the time," "equivalent," "during," "complete," and the like should be understood to mean "substantially at the time," "substantially equivalent," "substantially during," "substantially complete," etc., where "substantially" means that such comparisons, measurements, and timings are practicable to accomplish the implicitly or expressly stated desired result. Words relating to relative position of elements such as "near," "proximate to," and "adjacent to" shall mean sufficiently close to have a material effect upon the respective system element interactions. Other words of approximation similarly refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

The invention claimed is:

1. An optical system, comprising
a first input interface configured to receive light along a first set of light paths from a first image source, wherein the light from the first image source is operable to define a first image surface;
a second input interface configured to receive light along a second set of light paths from a second image source, wherein the light from the second image source is operable to define a second image surface;
a relay system configured to direct the received light from the first and second image sources to a viewing volume, wherein at least one of the first and second image surfaces is relayed by the relay system into the viewing volume;
an occlusion system optically preceding at least one of the first and second input interface, the occlusion system configured to occlude a portion of light from at least one of the first and second image sources;
wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system; and wherein the occlusion system comprises at least one occlusion layer that comprises one or more individually addressable elements;

wherein light from the first image source defines a foreground surface in the viewing volume in front of a background surface defined by light from the second image source in the viewing volume, and the at least one occlusion layer is located in front of second image source and is operable to define an occlusion region having a size and shape scaled to that of the foreground surface so that an occluded portion of the background surface cannot be observed behind the foreground surface.

2. The optical system of claim 1, wherein the other one of the at least one of the first and second image sources comprises: a 2D display surface, a stereoscopic display surface, an autostereoscopic display surface, a multi-view display surface, a volumetric 3D display surface, a second light field display surface, a surface of a real-world object emitting light, or a surface of a real-world object reflecting light.

3. The optical system of claim 1, wherein the at least one of the first and second image surfaces comprises: an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object, a surface of a real-world object, or a relayed image of the surface of the real-world object.

4. The optical system of claim 1, wherein the first image source comprises the light field display, and the first image surface comprises a surface of a holographic object; and further wherein the second image source comprises a 2D display surface, a stereoscopic display surface, an autostereoscopic display surface, a multi-view display surface, a volumetric 3D display surface, a second light field display surface, a surface of a real-world object emitting light, or a surface of a real-world object reflecting light.

5. The optical system of claim 4, wherein the second image surface comprises an image surface projected from a 2D display surface, an image surface projected from a stereoscopic display surface, an image surface projected from an autostereoscopic display surface, an image surface projected from a multi-view display surface, an image surface of a volumetric 3D display, a surface of a holographic object, or a surface of a real-world object, or a relayed image of the surface of the real-world object.

6. The optical system of claim 1, wherein both the first and second image surfaces are relayed by the relay system into the viewing volume to define first and second relayed image surfaces, respectively, and wherein the occluded portion of the light corresponds to a relayed occluded portion of at least one of the first and second relayed image surfaces, the relayed occluded portion being observable in the viewing volume as being occluded by the other one of the first and second relayed image surfaces.

7. The optical system of claim 1, wherein only one of the first and second image surfaces is relayed into the viewing volume to define a relayed image surface in the viewing volume, and wherein the occluded portion of the light corresponds to an occluded portion of the other one of the first and second image surface observable in the viewing volume as being occluded by the relayed image surface.

8. The optical system of claim 1, wherein only one of the first and second image surfaces is relayed into the viewing volume to define a relayed image surface in the viewing volume, and wherein the occluded portion of the light corresponds to a relayed occluded portion of the relayed image surface, the relayed occluded portion being observable in the viewing volume as being occluded by the other one of the first and second image surfaces.

9. The optical system of claim 1, further comprising an additional occlusion system optically preceding the other one of the at least one of the first and second input interface, the additional occlusion system configured to occlude a portion of light from the other one of the at least one of the first and second image sources.

10. The optical system of claim 1, wherein the one or more individually addressable elements comprise occlusion sites configured to block a portion of incident light or parallax barriers.

11. The optical system of claim 1, wherein the one or more occlusion layers comprises one or more transparent LED panels, transparent OLED panels, or LC panels.

12. The optical system of claim 1, wherein a distance between the at least one occlusion layer and the second image source is substantially equal to a distance between the foreground surface and the background surface.

13. The optical system of claim 1, wherein the occlusion region defined by the at least one occlusion layer is relayed to the viewing volume to substantially coincide with the foreground surface.

14. The optical system of claim 1, wherein optical system further comprises a controller operable to coordinate a movement of the occlusion region with a movement of an image surface in the viewing volume.

15. The optical system of claim 1, wherein light from the first image source is relayed into the viewing volume to define a relayed image surface observable in a foreground and light from the second image source is observable in the viewing volume in a background.

16. The optical system of claim 1, wherein light from the first image source is observable in the viewing volume in a background and light from the second image source is relayed into the viewing volume to define a relayed image surface observable in a foreground.

17. The optical system of claim 1, wherein light from the first and second image sources are both relayed into the viewing volume to form first and second relayed image surfaces, respectively.

18. The optical system of claim 17, wherein:
a. the first and second relayed image surfaces are both observable in a foreground;
b. the first and second relay image surface are both observable in a background; or
c. one of the first and second relay image surfaces is observable in a foreground and the other of the first and second relay image surface is observable in a background.

19. An optical system, comprising
a first input interface configured to receive light along a first set of light paths from a first image source, wherein the light from the first image source is operable to define a first image surface;
a second input interface configured to receive light along a second set of light paths from a second image source, wherein the light from the second image source is operable to define a second image surface;

a relay system configured to direct the received light from the first and second image sources to a viewing volume, wherein at least one of the first and second image surfaces is relayed by the relay system into the viewing volume; and an occlusion system optically preceding at least one of the first and second input interface, the occlusion system configured to occlude a portion of light from at least one of the first and second image sources;

wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system; and wherein the occlusion system comprises at least one occlusion object, and wherein light from the first image source defines a foreground surface in the viewing volume in front of a background surface defined by light from the second image source in the viewing volume, and wherein the at least one occlusion object is located in front of the second image source, and the size and shape of the at least one occlusion object is scaled to that of the foreground surface in the viewing volume so that an occluded portion of the background surface cannot be observed behind the foreground surface.

20. The optical system of claim 19, wherein a distance between the at least one occlusion object and the second image source is substantially equal to a distance between the foreground and background surfaces.

21. The optical system of claim 19, wherein an occlusion region defined by the at least one occlusion object is relayed to the viewing volume to substantially coincide with the foreground surface.

22. The optical system of claim 1, An optical system, comprising
a first input interface configured to receive light along a first set of light paths from a first image source, wherein the light from the first image source is operable to define a first image surface;
a second input interface configured to receive light along a second set of light paths from a second image source, wherein the light from the second image source is operable to define a second image surface; and
a relay system configured to direct the received light from the first and second image sources to a viewing volume, wherein at least one of the first and second image surfaces is relayed by the relay system into the viewing volume;
wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system; and
wherein:
a holographic surface is defined by light paths from the light field display and has a first depth profile; and
the holographic surface is relayed by the relay system to define a first relayed image surface comprising a relayed holographic surface with a first relayed depth profile that is different from the first depth profile.

23. The optical system of claim 22, wherein the light field display comprises a controller configured to provide instructions for accounting for the difference between the first depth profile and the first relayed depth profile by operating the light field display to output light such that the first relayed depth profile of the first relayed image surface is the depth profile intended for a viewer.

24. The optical system of claim 22, wherein:
relayed locations of the first relayed image surface are determined according to a second 4D function defined by the relay system, such that light from the light field display is relayed along relayed light paths each having a set of spatial coordinates and angular coordinates in a second 4D coordinate system, and;
wherein the light field display comprises a controller configured to provide instructions for accounting for the second 4D function by operating the light field display to output light according to the first 4D function such that the positional coordinates and angular coordinates in the second 4D coordinate system for the relayed light paths allow the first relayed image surface to be presented to a viewer as intended.

25. An optical system, comprising
a first input interface configured to receive light along a first set of light paths from a first image source, wherein the light from the first image source is operable to define a first image surface;
a second input interface configured to receive light along a second set of light paths from a second image source, wherein the light from the second image source is operable to define a second image surface; and
a relay system configured to direct the received light from the first and second image sources to a viewing volume, wherein at least one of the first and second image surfaces is relayed by the relay system into the viewing volume;
wherein at least one of the first and second image sources comprises a light field display, and the first set of light paths are determined according to a four-dimensional (4D) function defined by the light field display such that each light path from the light field display has a set of spatial coordinates and angular coordinates in a first four-dimensional coordinate system; and
wherein the relay system is configured to receive light from the other one of the at least one of the first and second image sources through a first relay subsystem of the relay system, the first relay subsystem operable to relay the received light to define a first relayed image surface corresponding to the respective image surface, the first relayed image surface having a depth profile different from a depth profile of the respective image surface defined by light from the other one of the at least one of the first and second image sources.

26. The optical system of claim 25, wherein the other one of the at least one of the first and second image sources comprises a surface of a real-world object; wherein the first relay subsystem is operable to receive light from the surface of the real-world object; and wherein the first relayed image surface comprises a relayed image surface of the real-world object having a depth profile different from a depth profile of the surface of the real-world object.

27. The optical system of claim 25, wherein the relay system further comprises a second relay subsystem configured to direct light from the first relayed image surface to the viewing volume, and to relay light from the at least one of the first and second image sources defining a holographic surface to relayed locations in the viewing volume, thereby defining a relayed image surface of the holographic surface.

28. The optical system of claim 25, wherein the relay system further comprises a second relay subsystem configured to relay the first relayed image surface to relay locations in the viewing volume to define a second relayed image surface corresponding to the respective image surface defined by light from the other one of the at least one of the first and second image sources, the second relayed image surface having a depth profile that is substantially the same as depth profile of the respective image surface defined by light from the other one of the at least one of the first and second image sources.

29. The optical system of claim 28, wherein the relay system further comprises an image combining element positioned to combine light from the first relay subsystem and light from the at least one of the first and second image sources defining a holographic surface, wherein the combined light comprising the first relayed image surface and the holographic surface is directed to the second relay subsystem, which is configured to relayed the combined light to the viewing volume.

30. The optical system of claim 29, wherein the other one of the at least one of the first and second image sources comprises a surface of a real-world object; wherein the first relay subsystem is operable to receive light from the surface of the real-world object; wherein the first relayed image surface corresponding to the respective image surface of other one of the at least one of the first and second image sources comprises a relayed image surface of the real-world object, the relayed image surface of the real-world object having a depth profile different from a depth profile of the surface of the real-world object.

31. The optical system of claim 30, wherein the second relayed image surface comprises a second relayed image surface of the real-world object, the second relayed image surface of the real-world object having a depth profile that is substantially the same as the depth profile of the surface of the real-world object.

32. The optical system of claim 29, wherein the viewing volume of the relay system defines a first field of view, and wherein the optical system further comprises an additional relay system configured to relay light from at least one additional image source along light paths to an additional viewing volume that defines a second field of view; and wherein the relay system and the additional relay systems are aligned such that the first and second fields of view are combined to define a combined field of view.

33. The optical system of claim 32, wherein the at least one additional image source comprises first and second additional image sources; wherein the optical system further comprises:
a third input interface configured to receive light from the first additional image source;
a fourth input interface configured to receive light from the second additional image source;
wherein the additional relay system comprises first and second relay subsystem and an optical combining element of the additional relay system;
wherein the first relay subsystem of the additional relay system is positioned to receive light from the first additional image source and configured to relay the received light towards the second relay subsystem of the additional relay system;
wherein the optical combining element of the additional relay system is positioned to receive the light from the first relay subsystem of the additional relay system and the light from the additional second image source and is configured to combine and direct the received light to the second relay subsystem of the additional relay system; and
wherein the second relay subsystem of the additional relay system is configured to relay the received light from the optical combining element to the additional viewing volume.

* * * * *